US005592349A

United States Patent [19]

Morehouse et al.

[11] Patent Number: 5,592,349
[45] Date of Patent: * Jan. 7, 1997

[54] MICROMINIATURE DISK DRIVE WITH CLAMP HAVING FINGERS FOR RADIALLY POSITIONING A PAIR OF DISKS AND A SPINDLE MOTOR PROVIDING A REDUCED DISK DRIVE HEIGHT

[75] Inventors: James H. Morehouse, Jamestown; Robert A. Alt, Longmont; James A. Dunckley; David M. Furay, both of Boulder; Bruce D. Emo, Niwot; Steven B. Volk, Boulder, all of Colo.

[73] Assignee: Integral Peripherals, Inc., Boulder, Colo.

[ * ] Notice: The term of this patent shall not extend beyond the expiration date of Pat. No. 5,243,481.

[21] Appl. No.: 206,192

[22] Filed: Dec. 7, 1993

Related U.S. Application Data

[62] Division of Ser. No. 766,480, Sep. 25, 1991, Pat. No. 5,379,171.
[51] Int. Cl.⁶ ..................................................... G11B 17/08
[52] U.S. Cl. ...................................... 360/98.08; 360/99.12
[58] Field of Search ............................... 360/98.08, 99.12

[56] References Cited

U.S. PATENT DOCUMENTS

| 3,299,581 | 1/1967 | Price . |
| 3,531,788 | 9/1970 | Brown . |
| 3,577,133 | 5/1971 | Garfein et al. . |

(List continued on next page.)

FOREIGN PATENT DOCUMENTS

| 0400946A2 | 12/1990 | European Pat. Off. . |
| 98580 | 11/1983 | Japan . |
| 59-77685 | 5/1984 | Japan . |

(List continued on next page.)

OTHER PUBLICATIONS

Quantum Corporation, "*Quantum Low Power Products . . .*" Sep., 1990, pp. 1–5.

(List continued on next page.)

*Primary Examiner*—A. J. Heinz
*Attorney, Agent, or Firm*—Skjerven, Morrill, MacPherson, Franklin & Friel; David W. Heid

[57] ABSTRACT

A disk drive information storage device having a pair of disks for storing information, the storage device including a clamp for mounting disks on a hub, the clamp including an annular element having a first set of fingers extending from the annular element in the first direction parallel to the central axis of the annular element, the first set of fingers providing a radial force on the inside edge of one of the disks, and the clamp including a second set of fingers extending from the annular element in a second direction parallel to the central axis of the annular element and opposite to the first direction, the fingers of the second set being for imposing a radially force on an inside edge of a second disk. In another embodiment, a disk drive information storage device with a pair of disks includes a spindle motor having a rotor which includes a disk-shaped portion having an outer diameter, and an upper surface for supporting one of the pair of disks. A second one of the pair of disks is connected to the rotor on a side of the first disk opposite the spindle motor. A clamp having an outer diameter smaller than the outer diameter of the disk-shaped portion of the rotor is connected to a cylindrical portion of the rotor between the first and second disk. An actuator is provided to support first and second read/write heads, with the actuator being movable to position the first and second read/write heads such that the first read/write head reads information from or writes information to a portion of a second surface of the first disk between the outer diameter of the disk-shaped portion of the rotor and the outside diameter of the clamp. In one embodiment, the disk drive information storage device comprises a housing having a footprint that includes a first dimension of about 35 mm. In another embodiment, at least one of the disks of the pair of disks in the disk drive information storage device has a diameter in the range of from about 33 mm to about 34 mm.

23 Claims, 83 Drawing Sheets

U.S. PATENT DOCUMENTS

| | | |
|---|---|---|
| 3,984,873 | 10/1976 | Pejcha . |
| 4,125,883 | 11/1978 | Rolph . |
| 4,138,741 | 2/1979 | Hedlund . |
| 4,379,316 | 4/1983 | Krane . |
| 4,409,629 | 10/1983 | Puls . |
| 4,420,830 | 12/1983 | Green . |
| 4,424,543 | 1/1984 | Lewis . |
| 4,443,874 | 4/1984 | Steenberg . |
| 4,473,153 | 9/1984 | Colangeo . |
| 4,495,553 | 1/1985 | Chambers . |
| 4,497,003 | 1/1985 | Abe . |
| 4,502,136 | 2/1985 | Rickert . |
| 4,510,592 | 4/1985 | Kanamaru . |
| 4,515,272 | 6/1985 | Newhouse . |
| 4,518,904 | 5/1985 | MacLeod . |
| 4,530,019 | 7/1985 | Penniman . |
| 4,535,374 | 8/1985 | Anderson . |
| 4,539,614 | 9/1985 | Thompson . |
| 4,568,988 | 2/1986 | McGinlay . |
| 4,568,994 | 2/1986 | Lynch . |
| 4,578,723 | 3/1986 | Betts . |
| 4,594,622 | 6/1986 | Wallis . |
| 4,627,288 | 12/1986 | Guzik . |
| 4,628,379 | 12/1986 | Andrews . |
| 4,630,190 | 12/1986 | Alaimo . |
| 4,631,606 | 12/1986 | Sugaya . |
| 4,638,383 | 1/1987 | McGinlay . |
| 4,647,997 | 3/1987 | Westwood . |
| 4,649,531 | 3/1987 | Horowitz . |
| 4,655,348 | 4/1987 | Takagi . |
| 4,658,308 | 4/1987 | Sander, Jr. . |
| 4,663,682 | 5/1987 | McNeil . |
| 4,669,004 | 5/1987 | Moon . |
| 4,679,102 | 7/1987 | Wevers et al. . |
| 4,683,506 | 7/1987 | Toldi . |
| 4,705,279 | 11/1987 | Mizukami . |
| 4,716,480 | 12/1987 | Wiens . |
| 4,724,501 | 2/1988 | Buchwald . |
| 4,725,907 | 2/1988 | Jue . |
| 4,734,813 | 3/1988 | Bessho . |
| 4,736,358 | 4/1988 | Hoshi . |
| 4,747,002 | 5/1988 | Takikawa . |
| 4,752,848 | 6/1988 | Garcia . |
| 4,755,981 | 7/1988 | Ekhoff . |
| 4,760,477 | 7/1988 | Takikawa . |
| 4,772,972 | 8/1988 | Maeda . |
| 4,772,974 | 9/1988 | Moon . |
| 4,783,705 | 11/1988 | Moon . |
| 4,786,995 | 11/1988 | Stopper et al. . |
| 4,799,209 | 1/1989 | Grobben . |
| 4,819,103 | 4/1989 | Okamura . |
| 4,823,212 | 4/1989 | Knowles . |
| 4,824,059 | 4/1989 | Butler . |
| 4,825,321 | 4/1989 | Hassel . |
| 4,827,364 | 5/1989 | Sheriff . |
| 4,829,501 | 5/1989 | Seto . |
| 4,839,756 | 6/1989 | Chew . |
| 4,841,517 | 6/1989 | Kurihara . |
| 4,864,443 | 9/1989 | Peterson . |
| 4,870,703 | 9/1989 | Augeri . |
| 4,901,173 | 2/1990 | Jones . |
| 4,907,214 | 3/1990 | Nagano . |
| 4,920,437 | 4/1990 | Washo . |
| 4,920,462 | 4/1990 | Couse . |
| 4,933,785 | 6/1990 | Morehouse . |
| 4,943,748 | 7/1990 | Shiozawa . |
| 4,958,839 | 9/1990 | Guzik . |
| 4,965,684 | 10/1990 | Stefansky . |
| 4,969,059 | 11/1990 | Volz . |
| 4,979,055 | 12/1990 | Squires . |
| 4,979,056 | 12/1990 | Squires . |
| 4,996,617 | 2/1991 | Yaeger . |
| 5,001,700 | 3/1991 | Rowden . |
| 5,014,142 | 5/1991 | Nakanishi . |
| 5,023,736 | 6/1991 | Kelsic . |
| 5,023,737 | 6/1991 | Yaeger . |
| 5,025,335 | 6/1991 | Stefansky . |
| 5,025,336 | 6/1991 | Morehouse et al. . |
| 5,027,241 | 6/1991 | Hatch . |
| 5,034,837 | 7/1991 | Schmitz . |
| 5,036,416 | 7/1991 | Mastache . |
| 5,041,926 | 8/1991 | Ockerse . |
| 5,050,016 | 9/1991 | Squires . |
| 5,072,318 | 12/1991 | Yu . |
| 5,189,576 | 2/1993 | Morehouse . |
| 5,237,472 | 8/1993 | Morehouse et al. . |
| 5,243,481 | 9/1993 | Dunckley et al. ................... 360/98.08 |
| 5,274,517 | 12/1993 | Chen ................................. 360/98.08 |
| B1 4,568,988 | 11/1988 | McGinley . |
| B1 4,638,383 | 11/1988 | McGinlay . |

FOREIGN PATENT DOCUMENTS

| | | |
|---|---|---|
| 17281 | 1/1986 | Japan . |
| 2161179 | 9/1986 | Japan . |
| 2000893 | 1/1979 | United Kingdom . |
| 2237920 | 5/1991 | United Kingdom . |
| WO91/02354 | 2/1991 | WIPO . |
| WO91/02349 | 2/1991 | WIPO . |

OTHER PUBLICATIONS

Quantum Corporation, "*Quantum Go Drive Series*," comprising 3 unnumbered pages, date and place of publication unknown.

LaPine Technology Disk Drive, Photocopy of best available photograph, marked as Item 15.

PrairieTek Corporation rigid disk drive model 120, photocopies of two photographs (labelled 16a and 16b), drawing (16C) and Brochure (16d).

Quantum Corporation, *Technical Highlights*: Go–Drive Series, Sep. 1990, pp. 1–5 and 3 unnumbered pages.

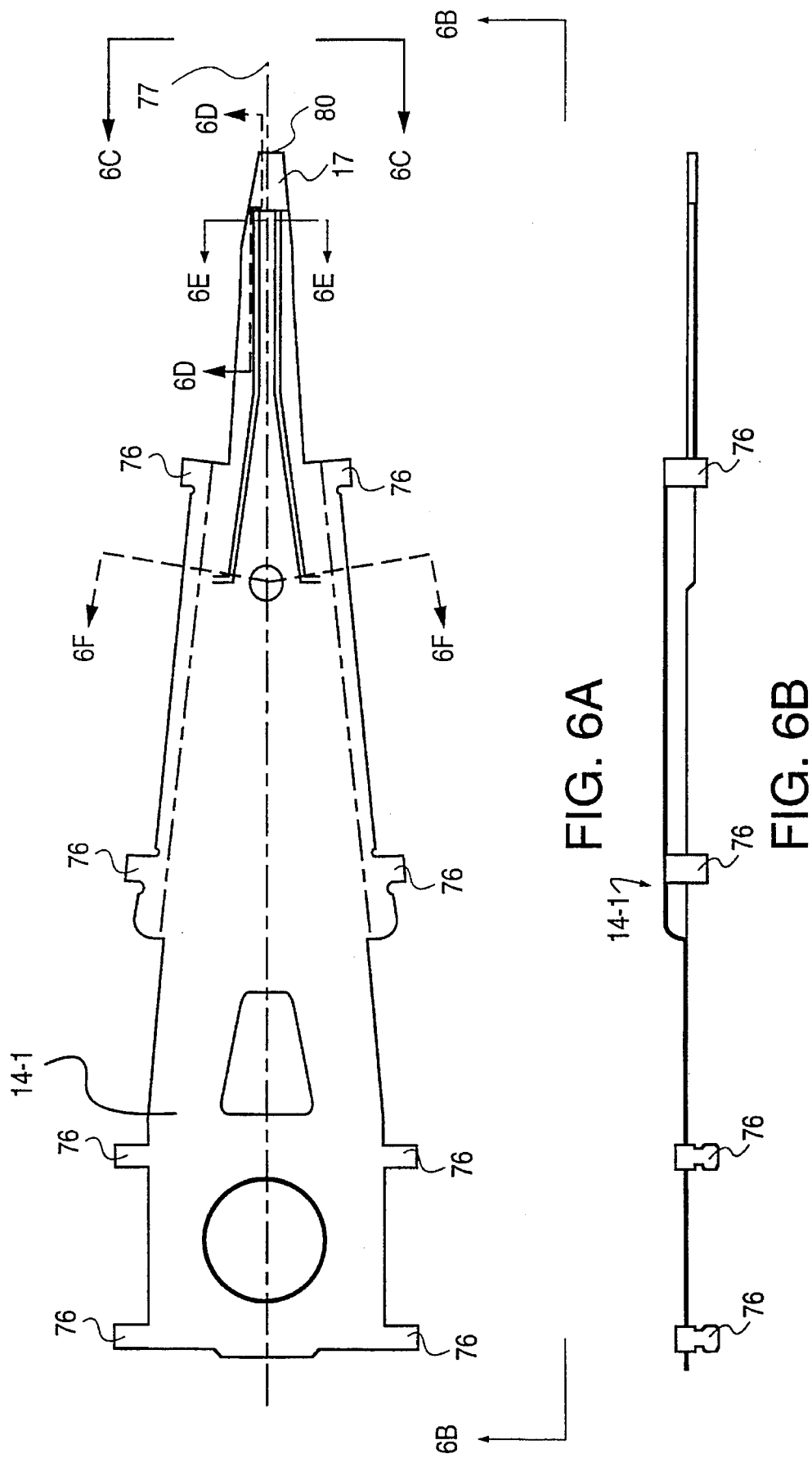

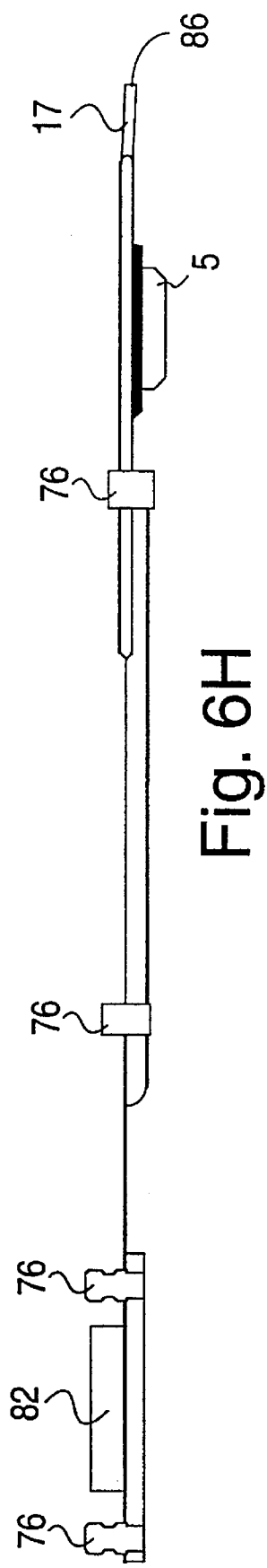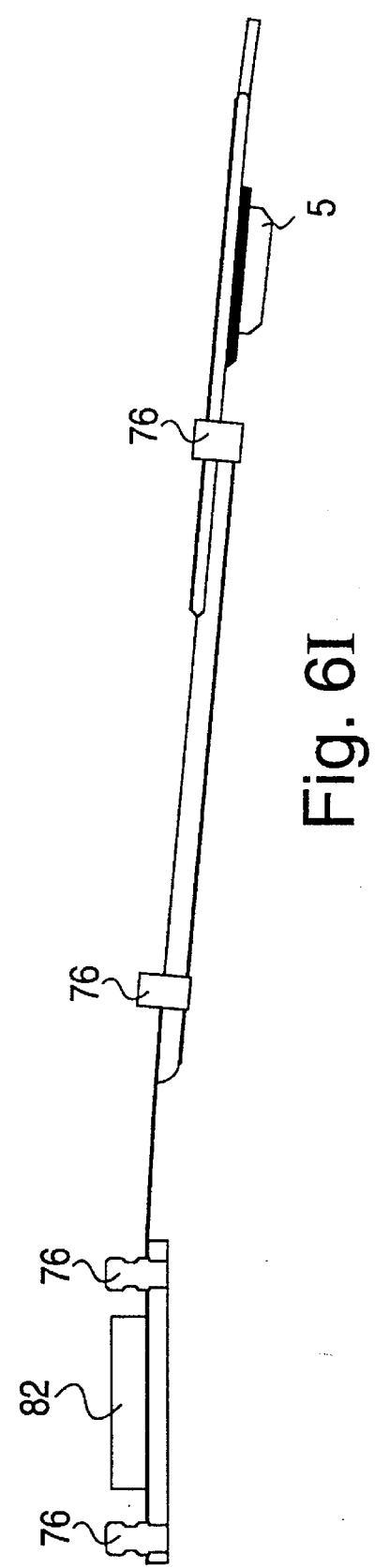
Fig. 6H
Fig. 6I

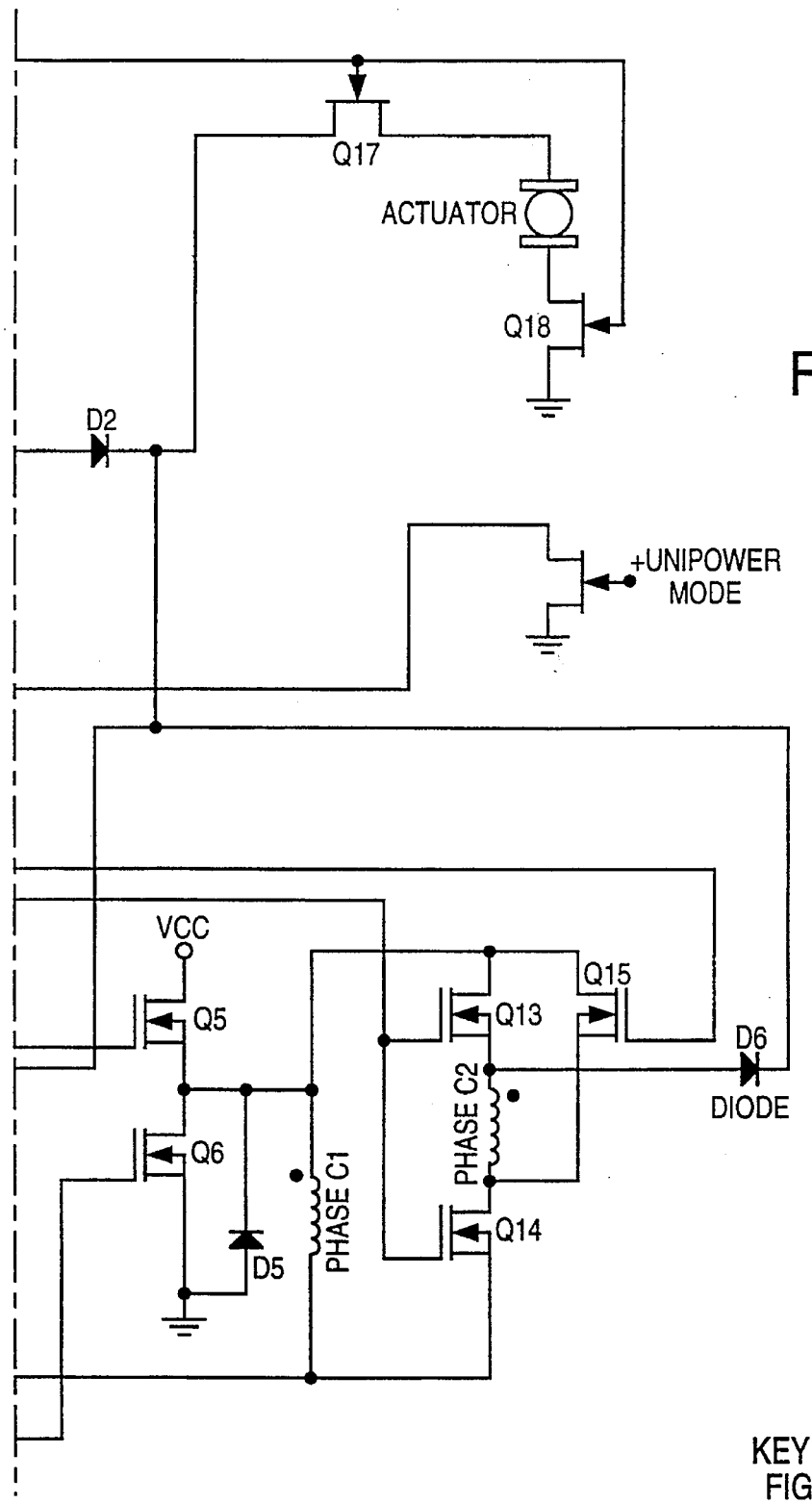
FIG. 9"
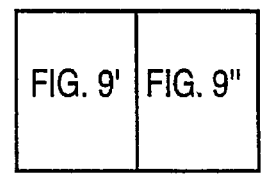
KEY TO FIG. 9
| FIG. 9' | FIG. 9" |

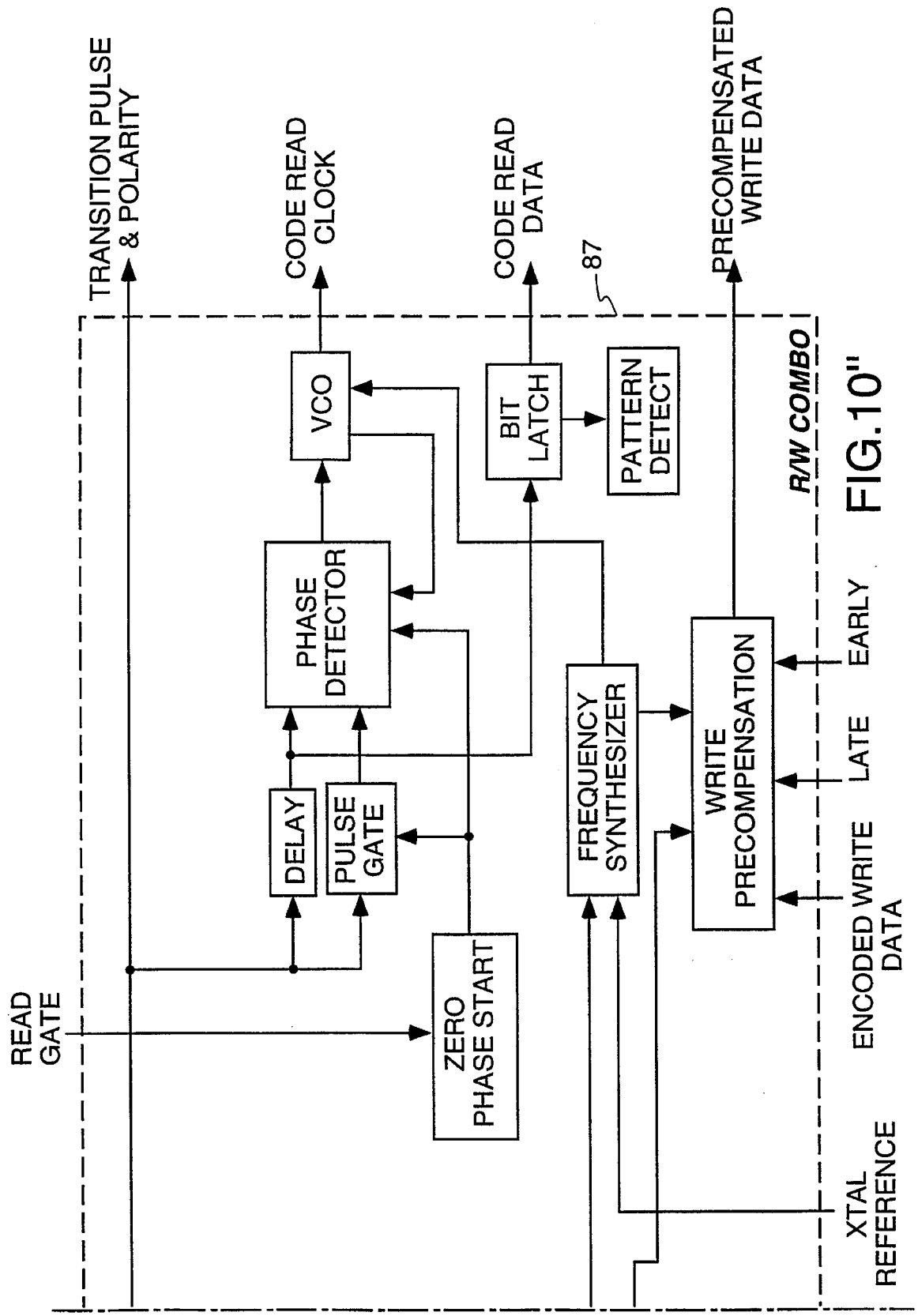
FIG. 10"

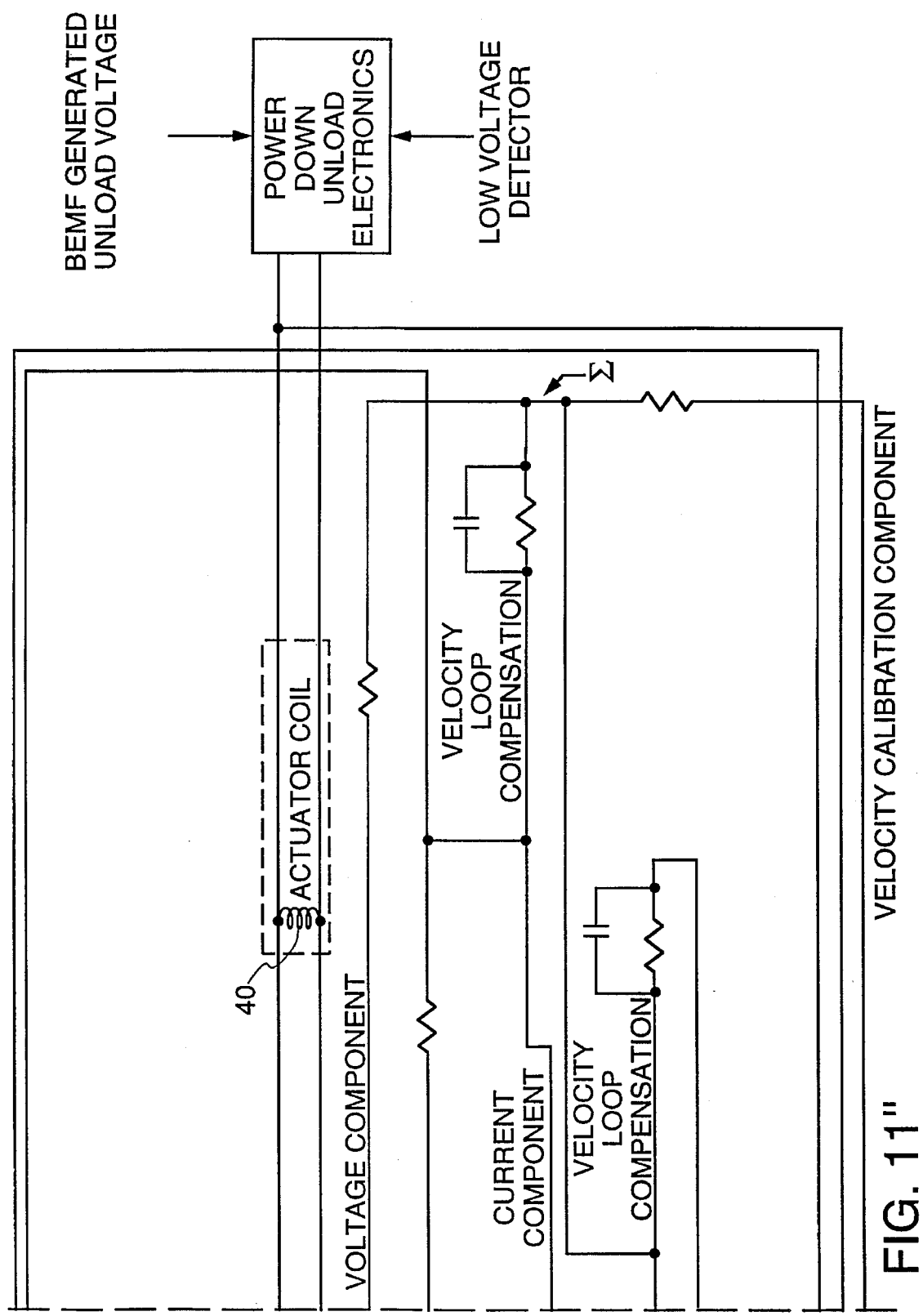
FIG. 11"

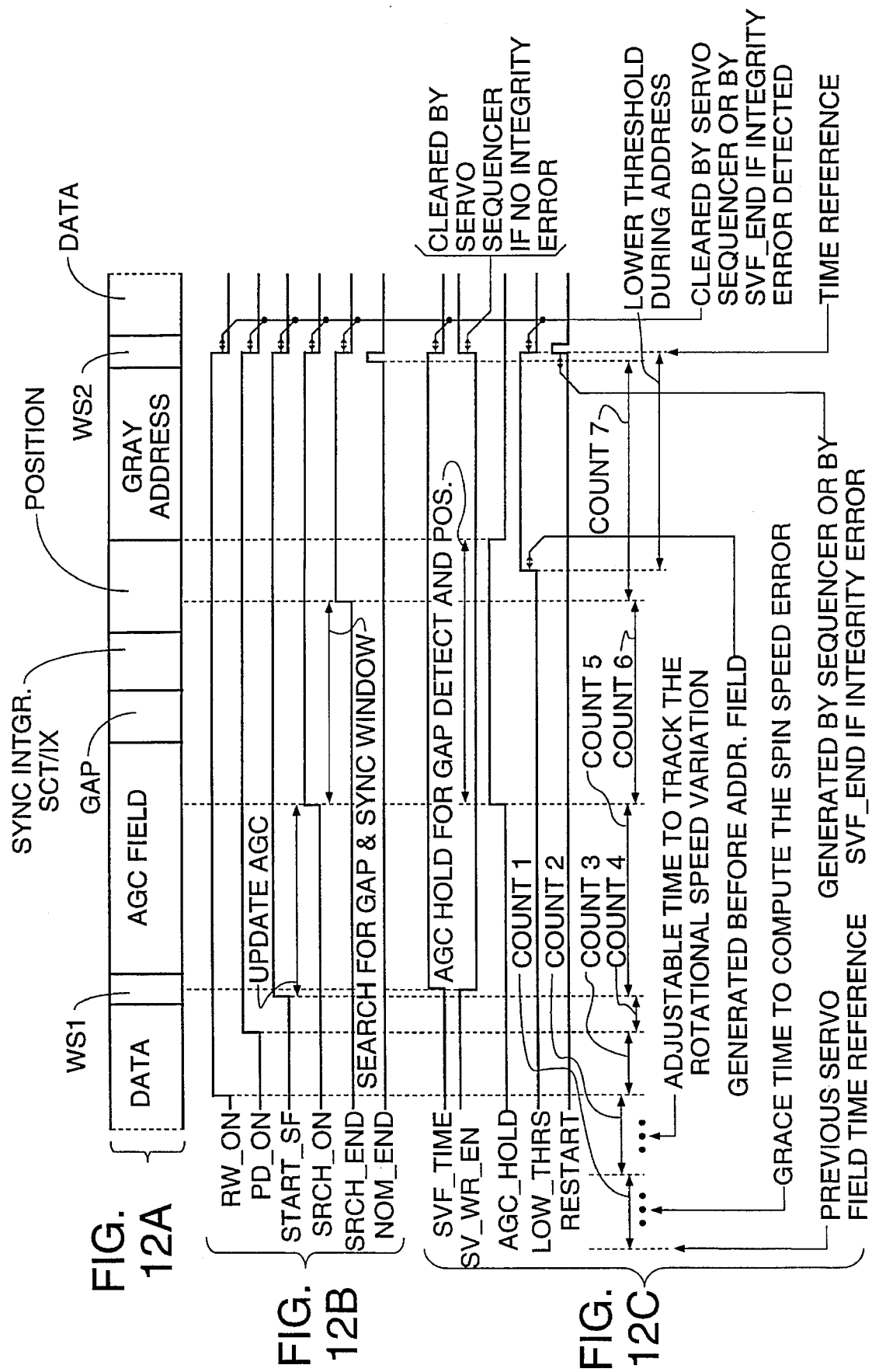

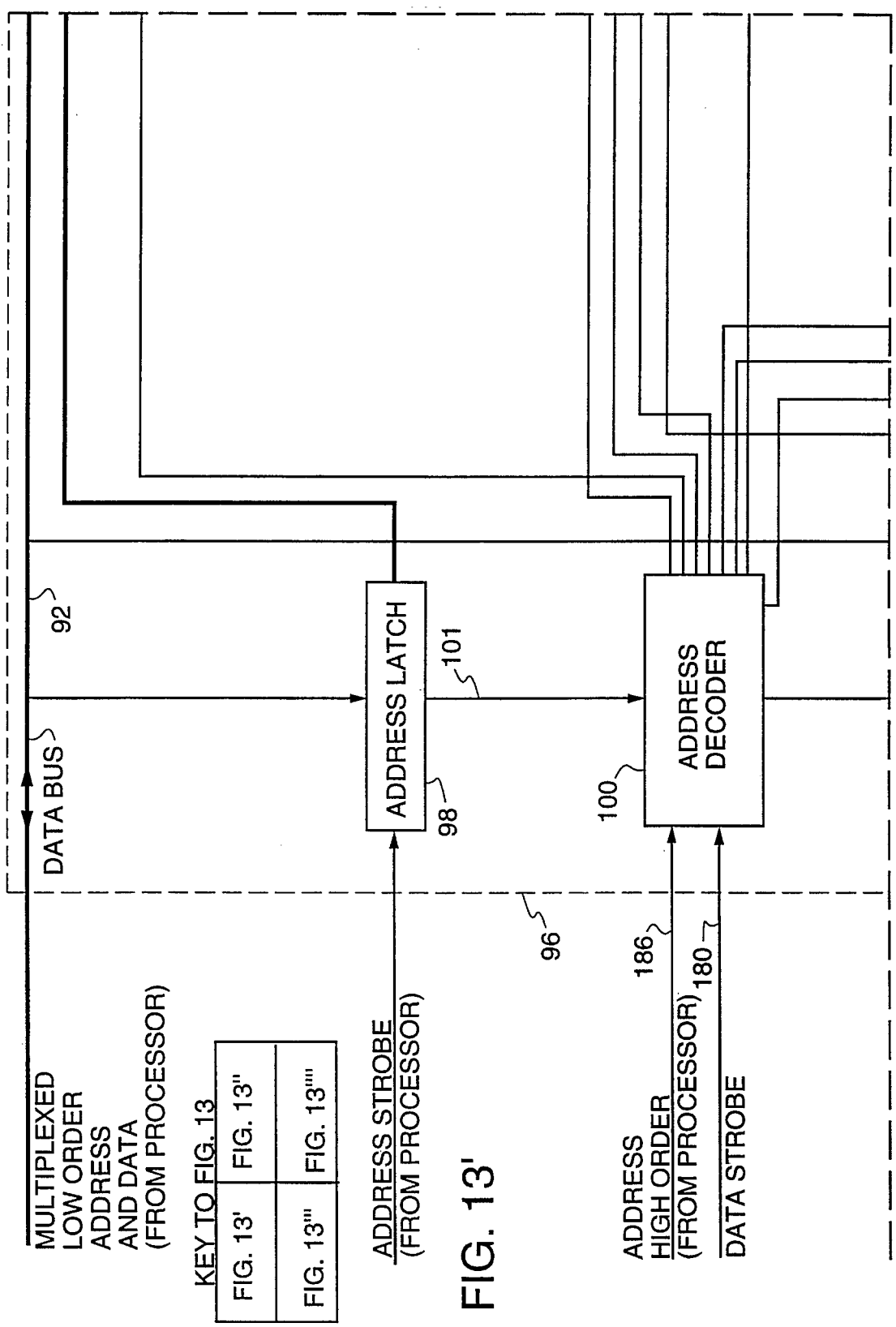

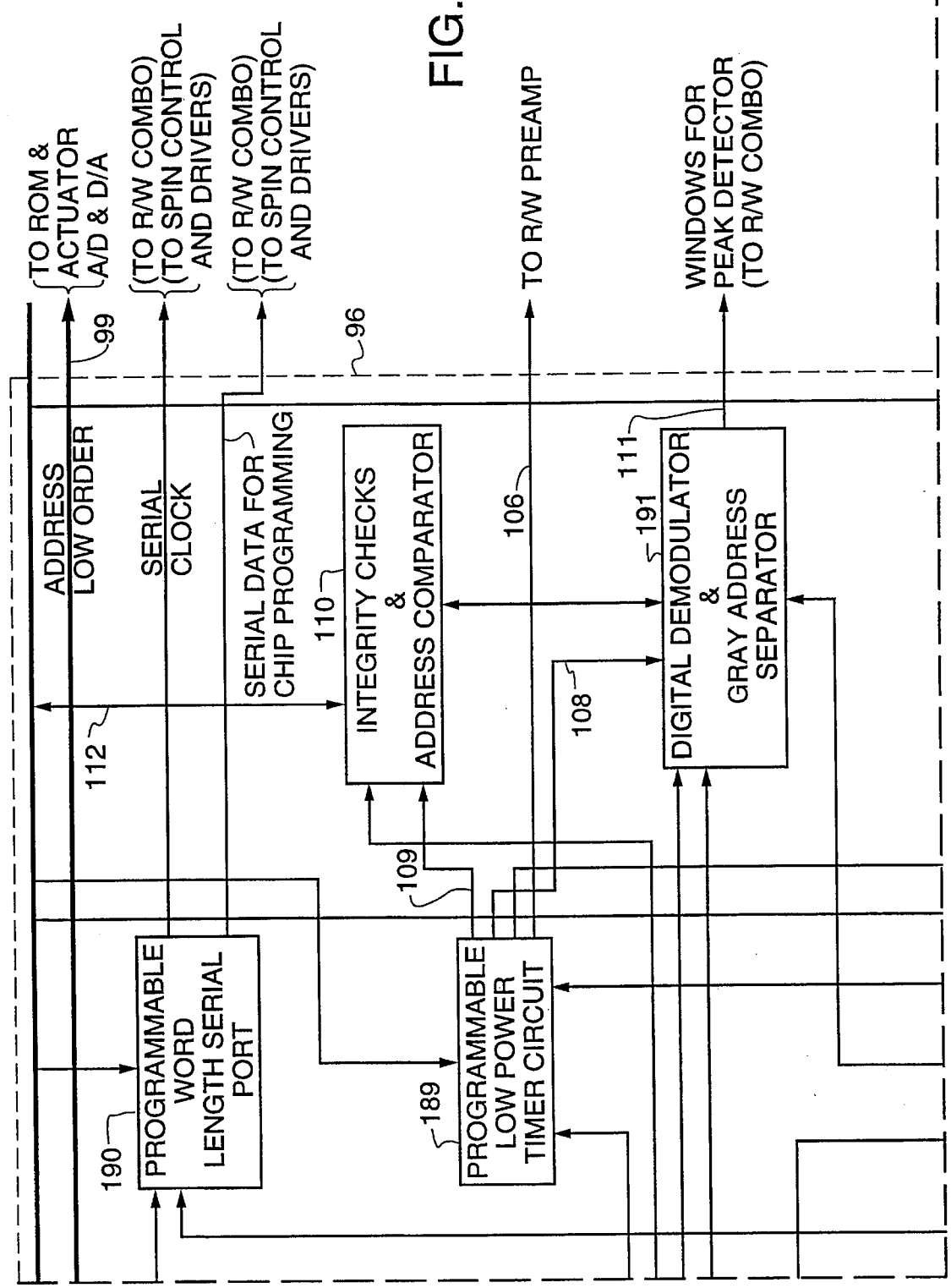

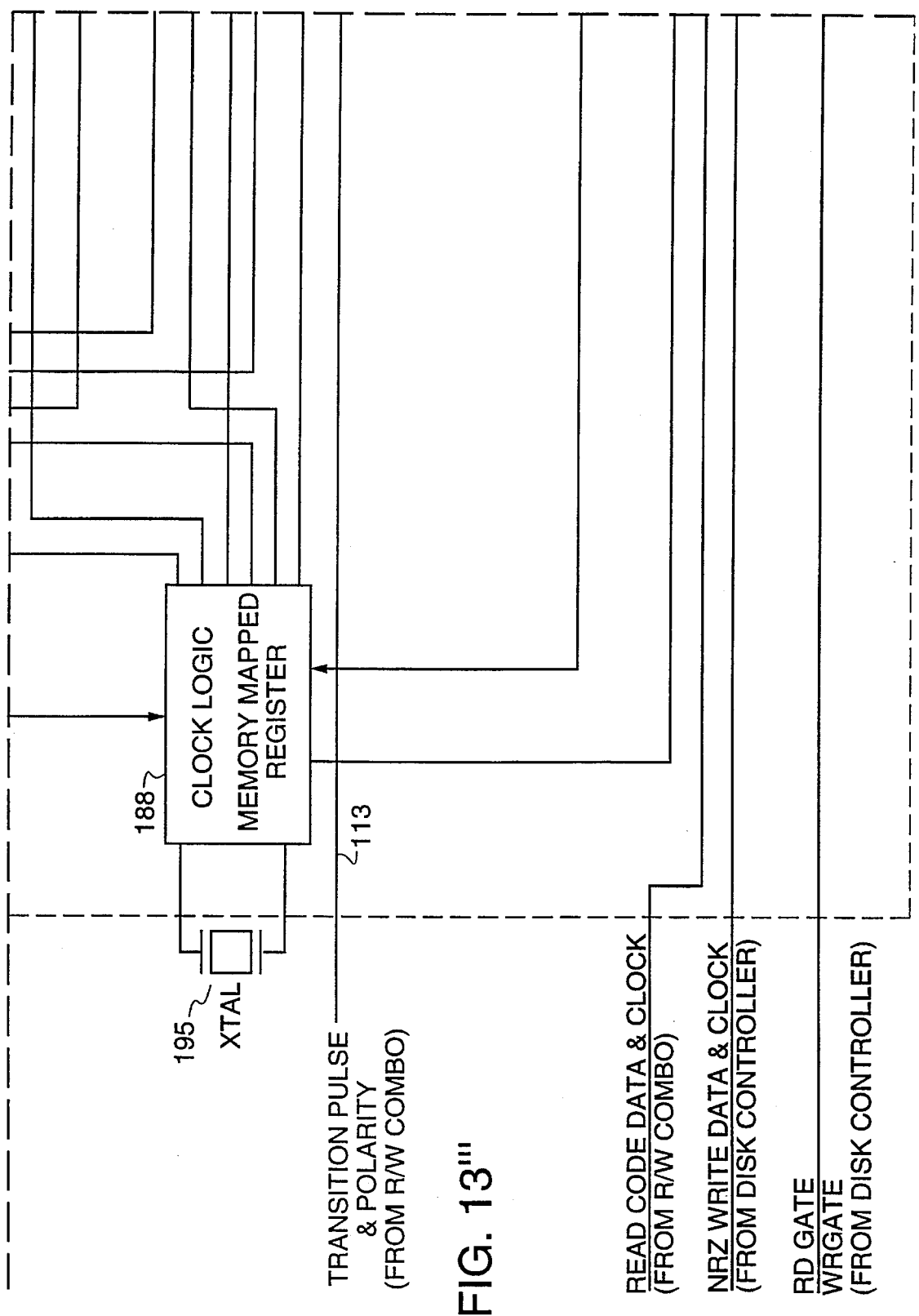

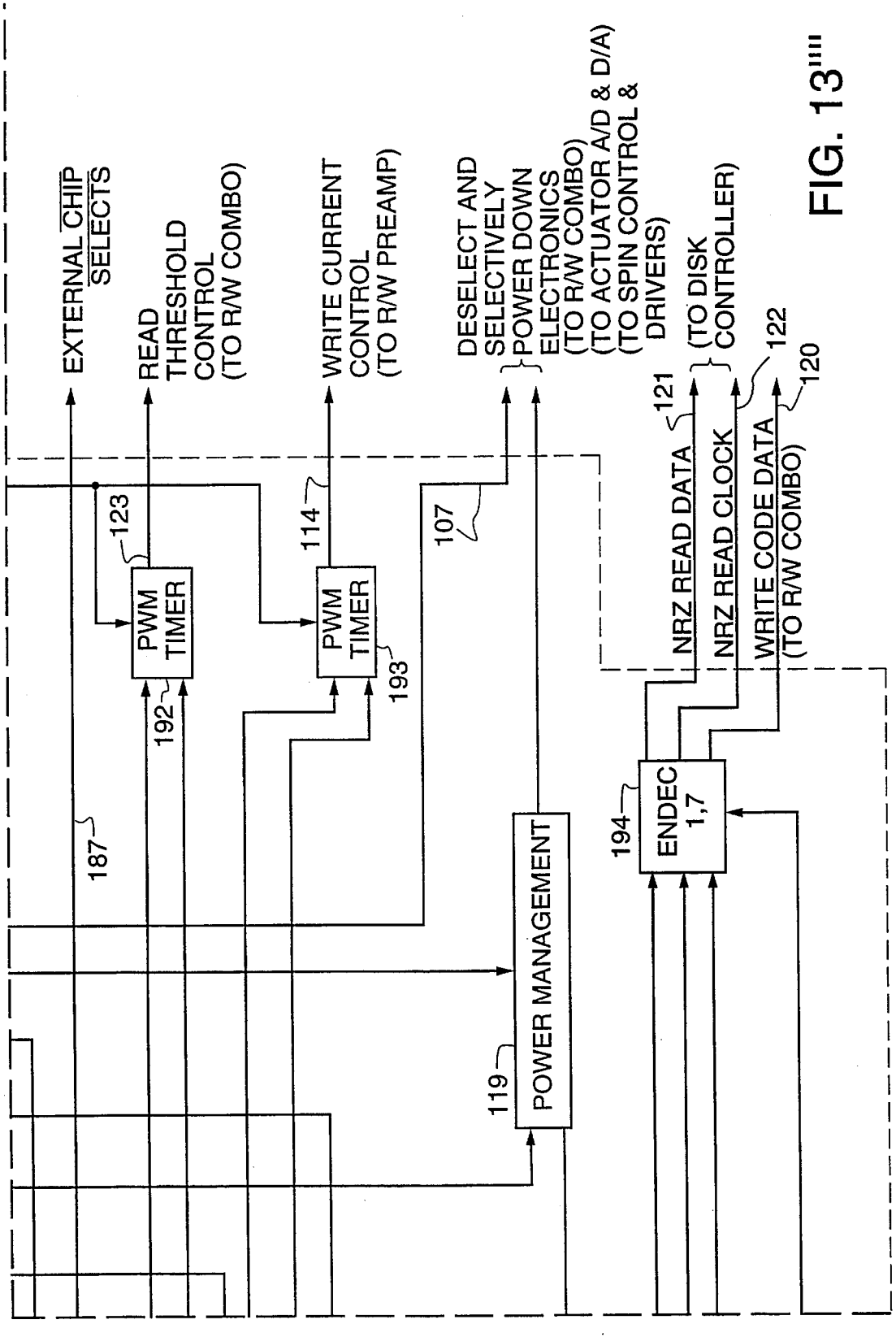

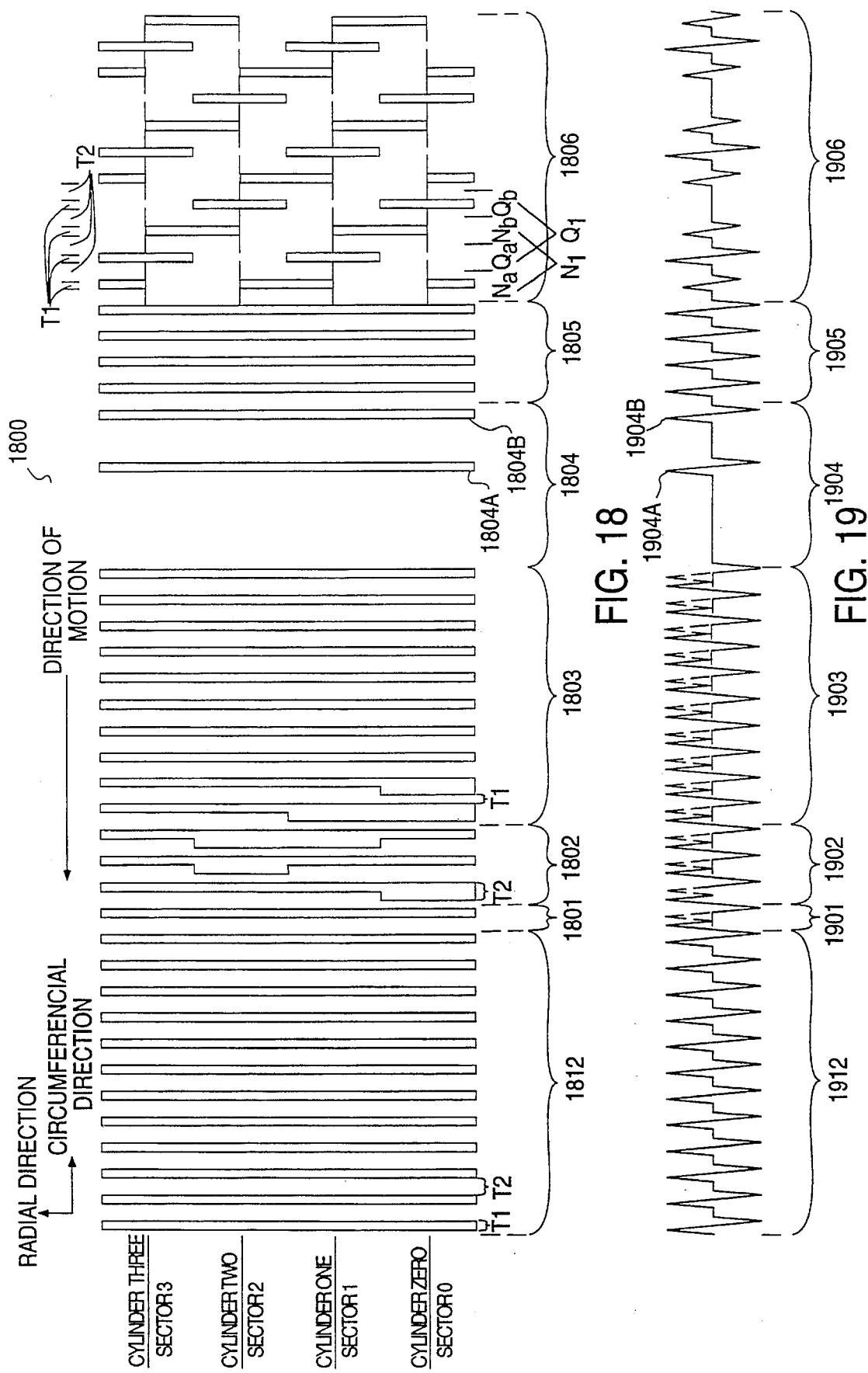

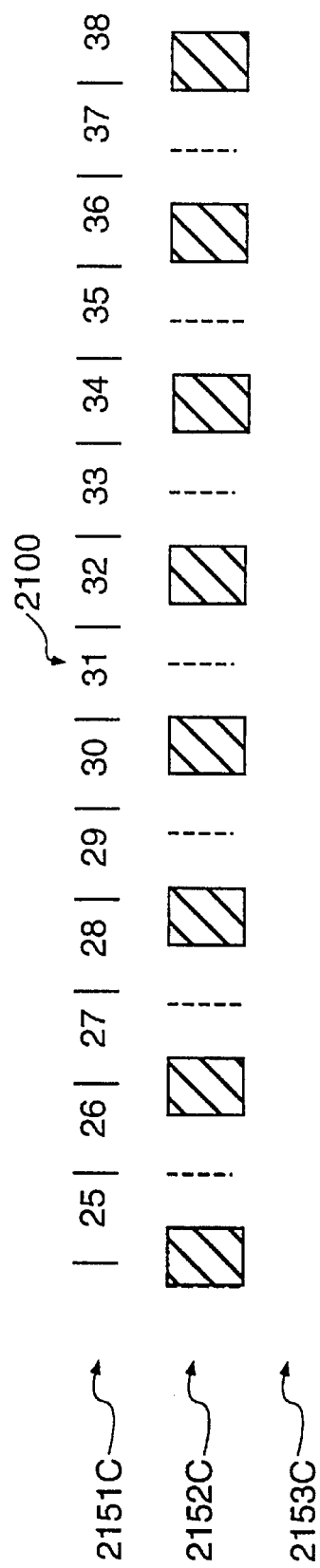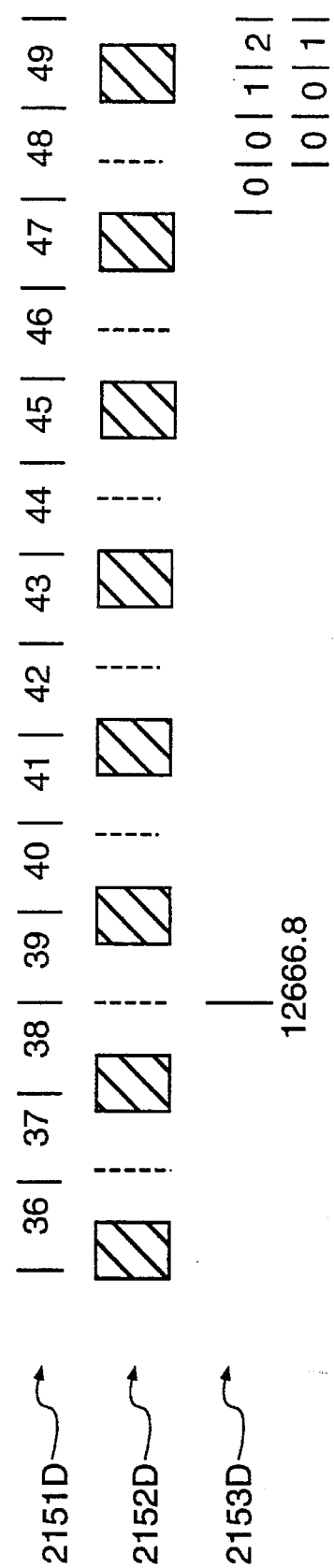

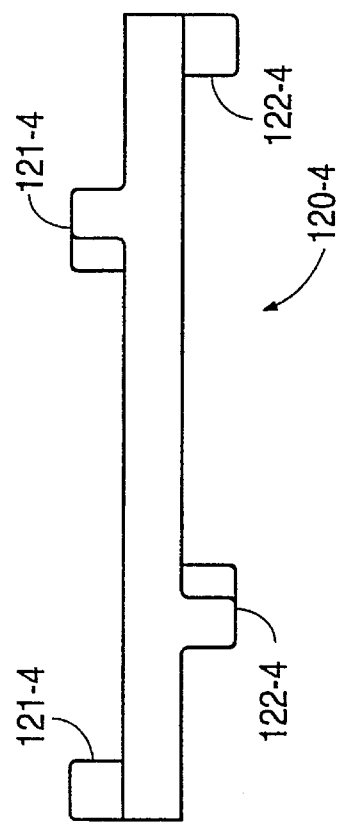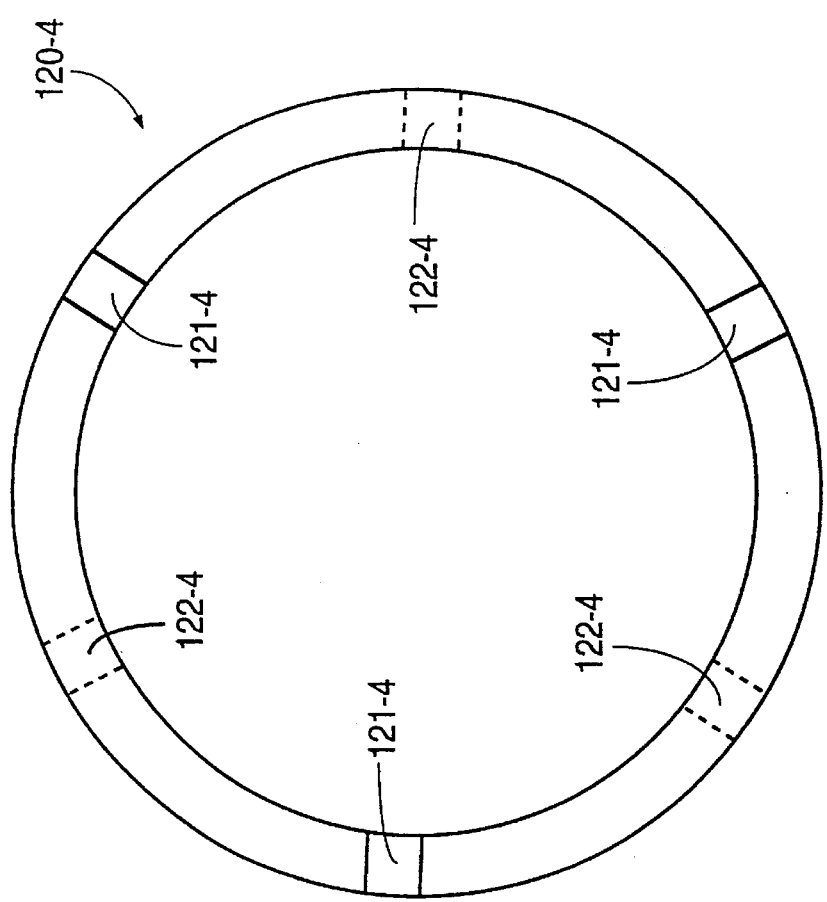

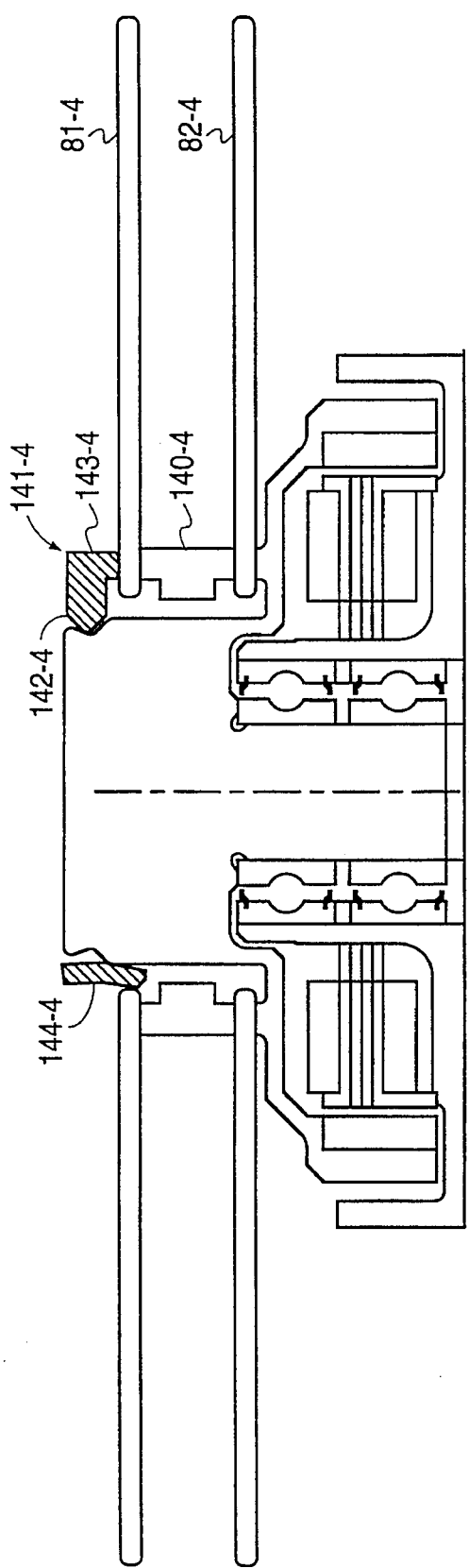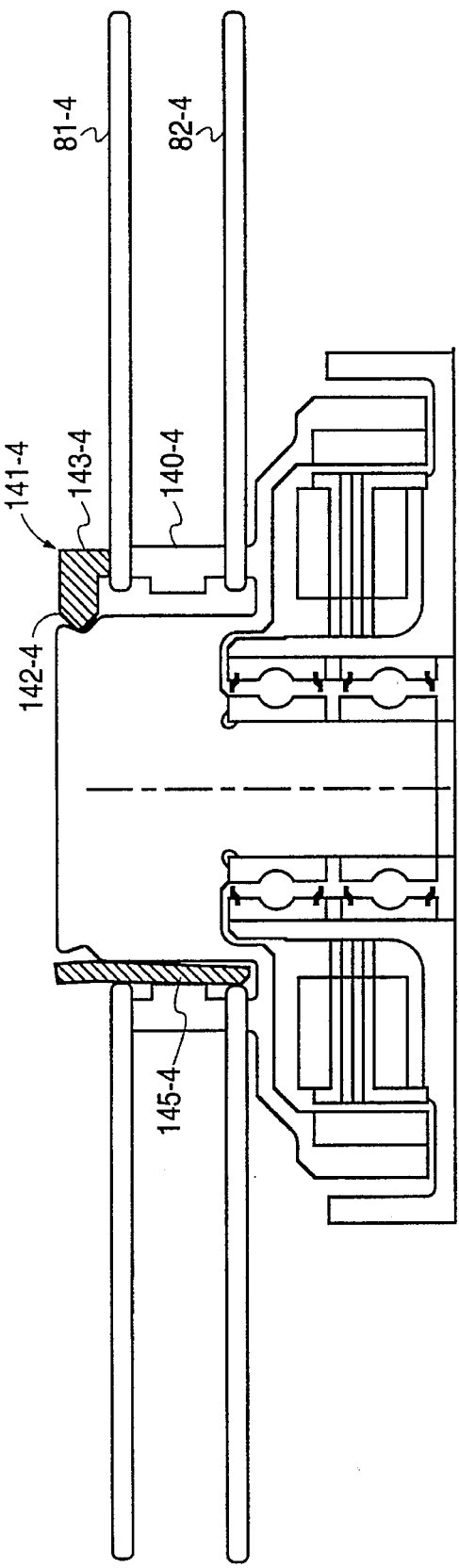
FIG. 42A
FIG. 42B

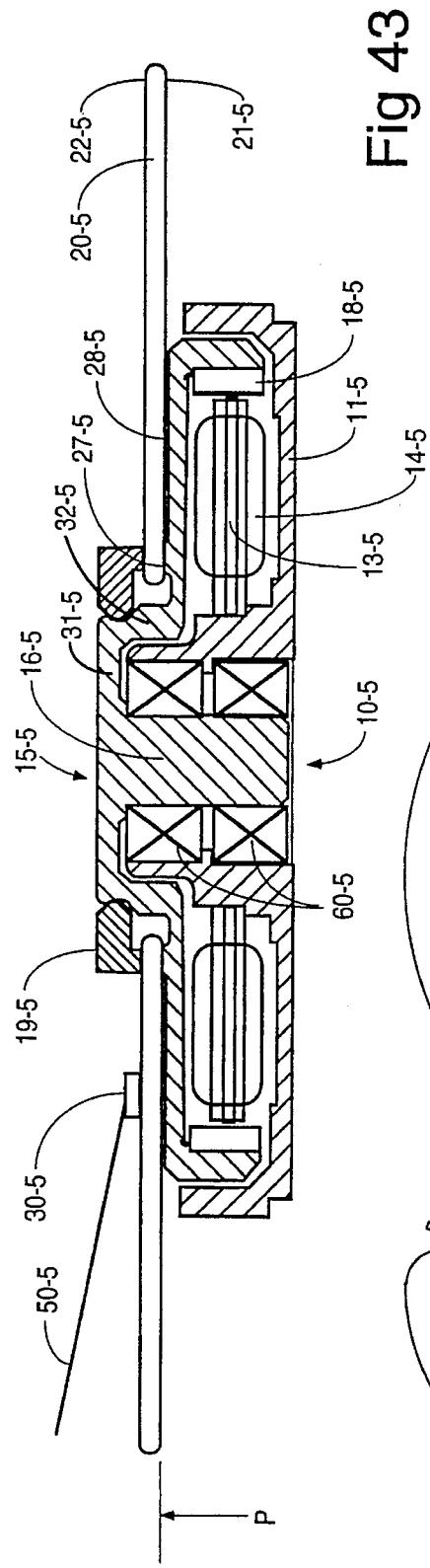
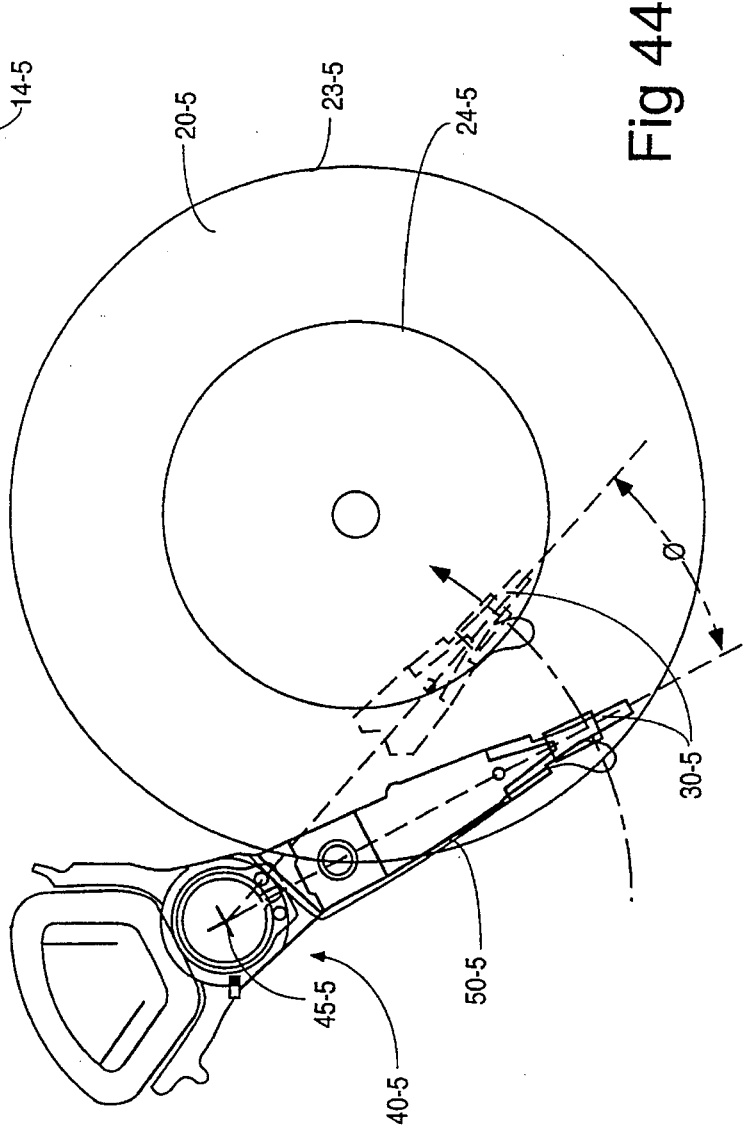
Fig 43
Fig 44

MICROMINIATURE DISK DRIVE WITH CLAMP HAVING FINGERS FOR RADIALLY POSITIONING A PAIR OF DISKS AND A SPINDLE MOTOR PROVIDING A REDUCED DISK DRIVE HEIGHT

This application is a division of application Ser. No. 07/766,480, filed Sep. 25, 1991, U.S. Pat. No. 5,379,171.

BACKGROUND OF THE INVENTION

1. Field of the Invention

This invention relates generally to rigid disk drives, and more particularly to rigid disk drives for pocket, palm-top, and laptop computers.

2. Description of Prior Art

The continuing trend toward smaller portable computers has created the need for a new class of miniature information storage devices. Portable applications for information storage devices have resulted in increasingly severe environmental and physical requirements. Small size, low power consumption, environmental endurance, low cost and light weight are characteristics that must co-exist in these applications; they cannot be met by simple extensions of previous technology.

Many examples of miniaturized reduced "footprint" disk drives have been described in patents such as U.S. Pat. No. 4,568,988 to McGinley, et al, issued Feb. 4, 1986, Reexamination Certificate (953rd), U.S. Pat. No. B14,568,988, certificate issued Nov. 29, 1988, U.S. Pat. No. 4,933,785, issued Jun. 12, 1990 to Morehouse, et al. The rigid magnetic recording disk utilized in the device, described in McGinley, et al., had a diameter of approximately 3.5 inches. In the Morehouse, et al. device described in that patent, the rigid disks utilized in the drive had a nominal diameter of 2.5 inches. The "footprint" (width by length measurement) of the drive described in the above-noted Morehouse, et al. patent was described as being 2.8 inches by 4.3 inches. That is, the housing used to enclose the rigid disk drive was 2.8 inches wide and 4.3 inches long. A rigid disk drive of that size is generally applicable to computers having a size of 8.5 inches by 11 inches by 1 inch. Another patent describing a relatively small diameter disk was issued Jun. 18, 1991 to Stefansky, U.S. Pat. No. 5,025,335. Stefansky describes a 2½" form factor disk drive utilizing a single rigid disk having a diameter of approximately 2.6 inches. However, these products do not provide the combination of features needed for "pocket," "palm-top" and laptop computers.

History has shown that as disk drives become smaller and more efficient, new applications and uses for disk storage become practical. For example, using the disk drive as a circuit board assembly component requires further reduction in the physical size of the storage device as well as unique mounting strategies, issues addressed by this invention.

Use of disk drive storage devices in palm-top computers and small electronic devices, such as removable font cartridges for laser printers, require a level of vibration and shock resistance unobtainable with present large disk drives. These new applications require equipment to survive frequent drop cycles that result in unusually high acceleration and shock. It is well known that the force on an object is directly proportional to its mass, therefore reducing mass is an essential strategy for improving shock resistance.

Portable equipment also makes stringent demands on the durability and stability of the storage equipment under extreme dynamic, static, temperature and humidity stress. A device of small dimensions by its nature experiences less absolute temperature induced physical dimensional displacements. High humidity, especially during storage conditions, can aggravate a phenomenon known as "stiction" that occurs with conventional disk drives; the transducer head clings to the smooth disk surface, which can stall the spin motor and damage the heads.

The greater the power consumption, the larger and heavier the battery pack becomes. Hence, for a given operating time, power consumption is a primary and unavoidable design consideration for portable devices. In fact, the weight of a portable device is dependent on the total energy required to meet operational mission time. For disk drive equipment energy use is especially important during what is known as standby or power-down modes. Low power consumption also reduces parasitic heat, an important consideration in compact electrical equipment. Reducing the diameter and thickness of the information disk(s) can also provide significant reduction in power consumption during spin up. Modern disk drive power management methods use intelligent decision strategies, evaluating disk drive usage patterns to sequence power saving shut down features.

FIG. 24A is a block diagram of a prior art servo field 2400. The servo field 100 is the same length and includes, starting at its leading edge, a write splice sub-field 2401, an automatic gain control (AGC) sub-field 2402, a sector mark sub-field 2403, an index sector identifier 2404, a defect bit 2405, a Gray code track number sub-field 2406, and a track position sub-field 2407 followed by another write splice sub-field. Servo field 2400 is preceded and followed by data regions 2410 and 2411, respectively. As explained more completely below, AGC sub-field 2402 is actually divided into two parts. The first part is a write-to-read transition zone and the second part provides the actual AGC data.

FIG. 24B is a flat view of the magnetic dibits in one servo field in tracks 3 to 6 of the disk. The other servo fields and data fields have the same general structure as illustrated by the block diagram of FIG. 24A. FIG. 24C is the signal pattern generated when the information in track 3 is read.

FIGS. 49A and 49B illustrate two- and three-disk embodiments of HDAs incorporating the prior art low-profile architecture. The spacing between adjacent disks 4920 is approximately two times the space t required for a read/write read, or 3.0 mm, to provide space for the two read/write heads 4930 and 4931 disposed between the adjacent disks. Thus, each additional disk 4920 increases the thickness of the prior art HDA by 3.6 mm (two spaces t and 0.6 mm for the thickness of the additional disk). Therefore, the thickness of the two-disk, four-head HDA of FIG. 49A is approximately 17.2 mm, and the thickness of the three-disk, six-head HDA of FIG. 49B is approximately 20.8 mm. Ferrite shields 4940 are illustrated in both FIGS. 49A and 49B.

SUMMARY OF THE INVENTION

An object of the present invention is to provide a rigid disk drive having reduced physical dimensions, but retaining the storage capacity of larger disk drives, with minimized power consumption and providing extreme resistance to shock and vibration.

A further object of the invention is to provide a disk drive having a 1¼ inch form factor. In accordance with the invention, a rigid disk drive information storage device is provided which has a base and cover, utilizes one or more information storage disks having a diameter of approximately 33.5 mm (1¼ inches) provides an information storage capacity of at least 20 Megabytes.

A disk drive in accordance with one embodiment of the present invention has a length of approximately 51 mm, a width of approximately 35 mm and a height of approximately 10 mm in a stacked configuration with an associated printed circuit board positioned beneath the disk drive. Included is a disk spin motor internal to the housing, and a rotary actuator for positioning read/write transducer elements over the surface of the disk for the recording and play-back of digital information.

In accordance with another feature of the invention, in one embodiment the transducer support arm of the disk storage device includes a lift tab which, when operated with a cam, provides a means to load or unload the head from the spinning surface of the recording disk as described in copending, commonly assigned U.S. patent application Ser. No. 07/629,957 filed Dec. 19, 1990 by James H. Morehouse et al., entitled "Rigid Disk Drive with Dynamic Head Loading Apparatus", which is incorporated herein by reference in its entirety. In addition, a small form factor disk drive may not be able to produce enough torque to overcome stiction because of the low supply voltage and miniature spin motor component, thus making it impossible to start the disk rotating. Other configurations may use conventional contact start-stop head/disk interface methods.

In accordance with yet another feature of the invention, the disk drive includes sampled servo fields pre-recorded on each data track of the disk, which when read back uniquely determine track position and address information as disclosed in U.S. patent application Ser. No. 07/630,475, filed Dec. 19, 1990 by John H. Blagaila et al. entitled "Servo Field Scheme For High Sampling Rate and Reduced Overhead Embedded Servo System in Disk Drives", and assigned to the assignee of present invention and incorporated herein by reference in its entirety. Further, the disk drive in accordance with the present invention incorporates improvements disclosed in co-pending, commonly assigned U.S. patent application (SERVO II) Ser. No. 07/765,348 filed on Sep. 25, 1991 by Stephen Cowen entitled "Embedded Servo System With Reduced Overhead", which serves to increase the number of track following and spin motor servo samples which may be taken per unit time, while allowing increased information storage on a track without increased format overhead. The Cowen application is incorporated herein by reference in its entirety.

A further object of the invention is to incorporate an improved track following servo system to minimize the effect of mechanical resonances while permitting very high track densities. This servo system, which is described in copending and commonly assigned U.S. patent application Ser. No. 07/766,478, filed Sep. 25, 1991, by Thomas B. Andrews entitled "Adaptive Runout Compensation for Miniature Disk Drives", incorporates feed-forward run-out compensation by microprocessor control. This application is incorporated by reference herein in its entirety.

A further object of the invention is to provide a rigid disk storage system which includes an inertia actuated latch mechanism to prevent the actuator and magnetic transducers from being moved from their parked position resulting from subjecting the disk drive to severe non-operating shocks in the plane of the disk. The inertially operated latch described in copending, commonly assigned U.S. patent application Ser. No. 07/629,929, filed Dec. 19, 1990, by James H. Morehouse et al., entitled "Rotary Inertial Latch for Disk Drive Actuator", now U.S. Pat. No. 5,189,576 issued Aug. 21, 1992 or the latch described and claimed in copending, commonly assigned U.S. patent application Ser. No. 07/765,353, filed Sep. 25, 1991, by James H. Morehouse et al., entitled "Rotary Inertial Latch for Disk Drive Actuator", may be utilized. Both of the foregoing applications we hereby incorporated by reference in their entirety.

In accordance with yet another feature of the present invention, the disk drive apparatus has a spin motor which includes a stator having a plurality of windings and a rotor having a plurality of magnetic poles. Stator windings consist of two types, a first type for normal running of the motor and a second winding type used during starting to increase torque and further used during power down sequencing to act as an electromotive force generator providing power to the rotary actuator to unload the transducer elements from the disk surface. When a disk drive operates in a continuous start stop configuration, the electromotive force may be used to park the heads in the landing zone and provide rapid electrodynamic braking of the spin motor to reduce wear and damage to the head disk interface. This feature is disclosed in copending, commonly assigned U.S. patent application Ser. No. 07/630,110, filed Dec. 19, 1990, by James H. Morehouse et al., entitled "Spin Motor For A Hard Disk Assembly", which is incorporated herein in its entirety. An alternative spin motor is described hereinafter in detail.

A further object of the present invention is to provide a disk drive with a spin motor control system that includes a back electromotive force commutation circuit using digital techniques to generate commutation pulses, a start up circuit for starting the spin motor, and a monitor circuit for determining the motor spin direction and making corrections of direction if necessary after a commutation occurs. The spin motor control system preferred for use with the disk drive system described herein is described in copending, commonly assigned U.S. patent application Ser. No. 07/630,470, filed Dec. 19, 1990 by Michael R. Utenick et al., entitled "Spin Motor Control System for a Hard Disk Assembly", which is incorporated herein by reference in its entirety.

Yet another object of the present invention is to provide methods to reduce errors caused by spin motor induced electromagnetic high frequency noise that causes interference with track position sampled data and read back signals.

A further object of the present invention is to provide a low profile rigid disk drive having higher storage capacity per volume of the housing than previously available. This feature is disclosed in copending, commonly assigned U.S. patent application Ser. No. 07/765,352, filed Sep. 25, 1991, by James H. Morehouse et al., entitled "Architecture For Low Profile Rigid Disk Drive", which is incorporated herein in its entirety.

Another object of the present invention is to provide a rigid disk drive with increased packaging density and decreased height by placing electronic circuitry in the interior free-volume of the disk drive housing, not swept by elements of the actuator/transducer assembly.

A further object of the present invention is to reduce the power consumed by the rigid disk drive by operating the disk drive from a single low voltage supply, such as 3.0 volts DC, rather than 5.0 volts or 12 volts, as is customarily required, thereby allowing improved efficiency when used as a battery powered device.

In accordance with another feature of the invention, a digital electronic signal interface is provided for the head disk assembly (HDA) whereby any analog disk drive signals, such as track position servo and read/write signals, are processed within the HDA and converted to digital form, thereby eliminating low level analog signals, minimizing effects of electrical interference and providing an ideal connection means when the disk drive is used as a circuit board component.

Another object of the present invention is to provide a removable disk drive storage system which includes an improved shock mounting means as disclosed in commonly assigned U.S. Pat. No. 5,149,048 issued Sep. 22, 1992, by James H. Morehouse et al., entitled "Shock Absorbent Mounting Arrangement for Disk Drive or Other Component" which is incorporated herein by reference in its entirety.

In accordance with another feature of the present invention, a disk drive is provided which includes an improved disk clamp for retaining the disks securely mounted to the spindle.

BRIEF DESCRIPTION OF THE DRAWINGS

Other objects and advantages of the invention will become apparent from a study of the specification and drawings in which:

FIG. 6A is a plan view of a load beam utilized in the dynamic head-loading version of a disk drive in accordance with the present invention;

FIG. 6B is a view taken along lines 6B—6B in FIG. 6A;

FIG. 6C-1 is a top plan view of a portion of a load beam used in the present invention;

FIG. 6C-2 is a cross sectional view taken along lines 6C-2—6C-2 in FIG. 6C-1;

FIG. 6H is a view taken along lines 6H—6H in FIG. 6G showing the load beam in the loaded position;

FIG. 6I illustrates the load beam in FIG. 6H, but in an unloaded position;

FIG. 12A is an illustration of a typical sector utilized on a magnetic recording disk of the head disk assembly in accordance with one version of the present invention;

FIG. 12B is a timing diagram of the window signals produced by the programmable low-power timer circuit of the gate array illustrated in FIG. 13;

FIG. 12C is a timing diagram of the window signals produced by the digital demodulator & Gray code address separator of the gate array circuit of FIG. 13;

FIG. 13 is a block diagram of a gate array circuit which may be used with one embodiment of the present invention;

FIG. 18 illustrates one embodiment of a magnetization pattern of the servo field according to the principles of this invention.

FIG. 19 illustrates one embodiment of a signal trace generated when the head is positioned over the track centerline of the servo field according to the principles of this invention.

Figures 21E, 21F:
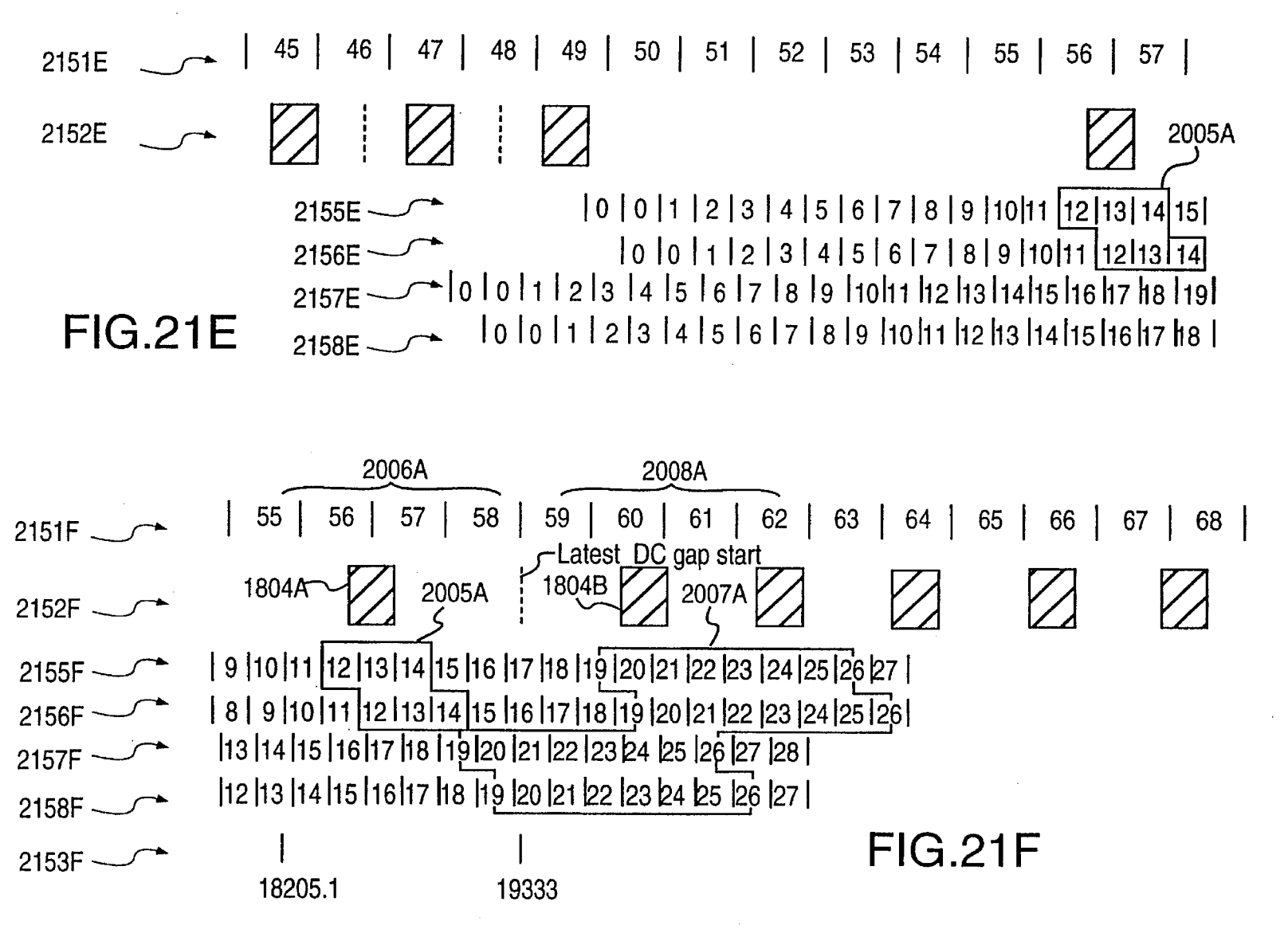

FIG. 21A to 21H are a scale drawing of the magnetization pattern for one servo field of this invention that includes timing information for the various signals used to detect the servo information.

FIGS. 36, 37, 38, 39A, 39B, 39C, 40A, 40B, 40C, 41, 42A and 42B illustrate alternative embodiments according to this invention.

FIG. 43 is a section view of an HDA incorporating an architecture according to the present invention.

FIG. 44 is a plan view of the disk drive device of the present invention.

DETAILED DESCRIPTION OF THE INVENTION

Development and production of miniature laptop and hand held computers is constrained by available disk drives that are either too large, consume excessive battery power (limiting computer operating mission time) or are not rugged enough to withstand the demanding shock and vibration requirements of portable operation. The disk drive described in this invention, combining several unique features, provides a solution to the need for a miniature rigid disk drive information storage device with the performance and capacity previously available only in larger form factors. Present 2½", 3½" or even 1.8" form factor disk drives do not provide the reduced power consumption or the shock and vibration durability of the disk drive described herein.

Figure 1:
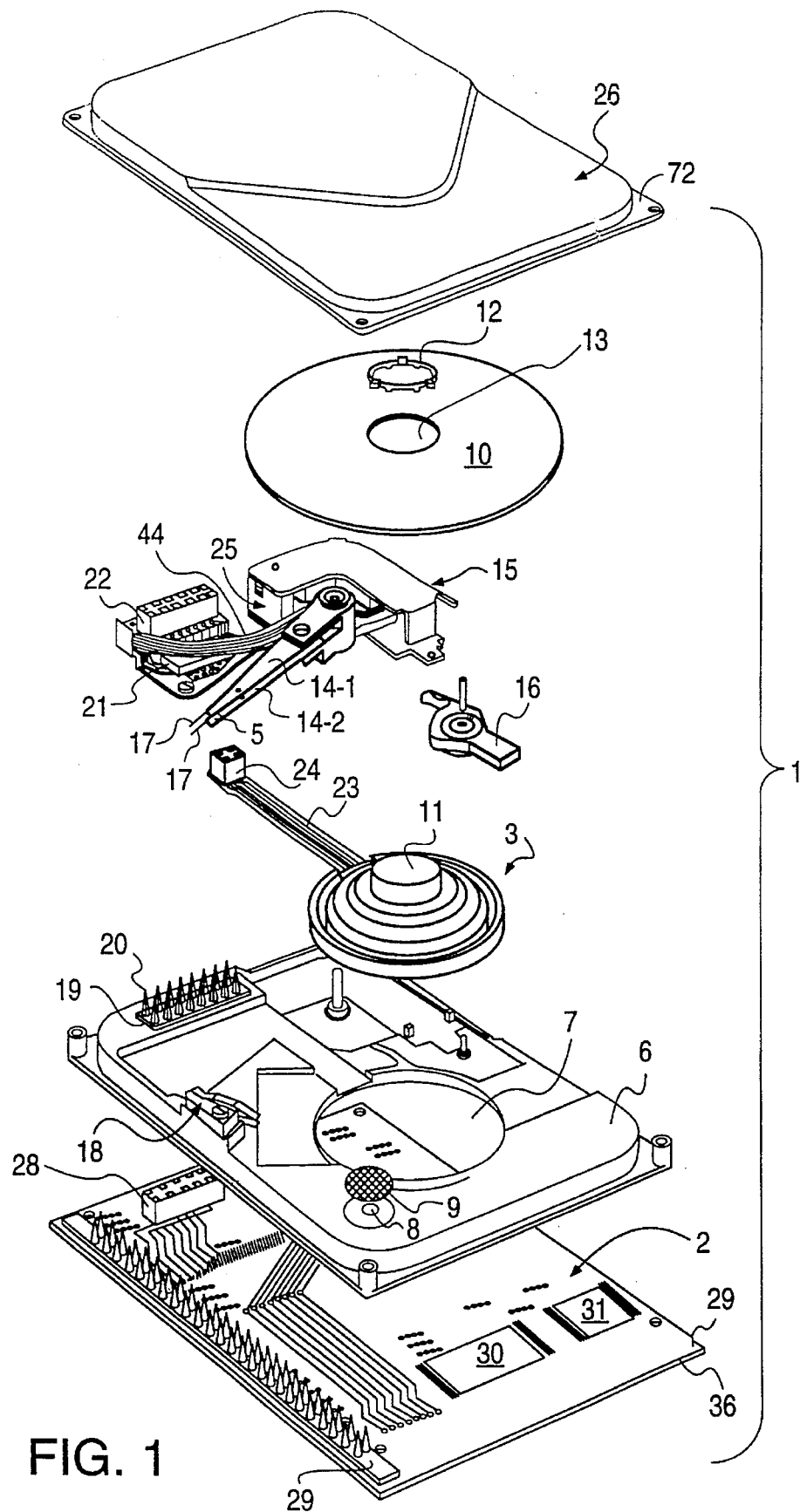
FIG. 1 is an exploded perspective view of a rigid disk drive in accordance with the present invention.
Figure 2B:
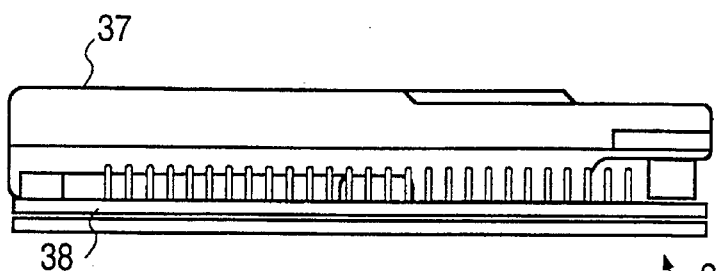
FIG. 2B is a view taken along the lines of 2B—2B in FIG. 2A.
Figure 2A:
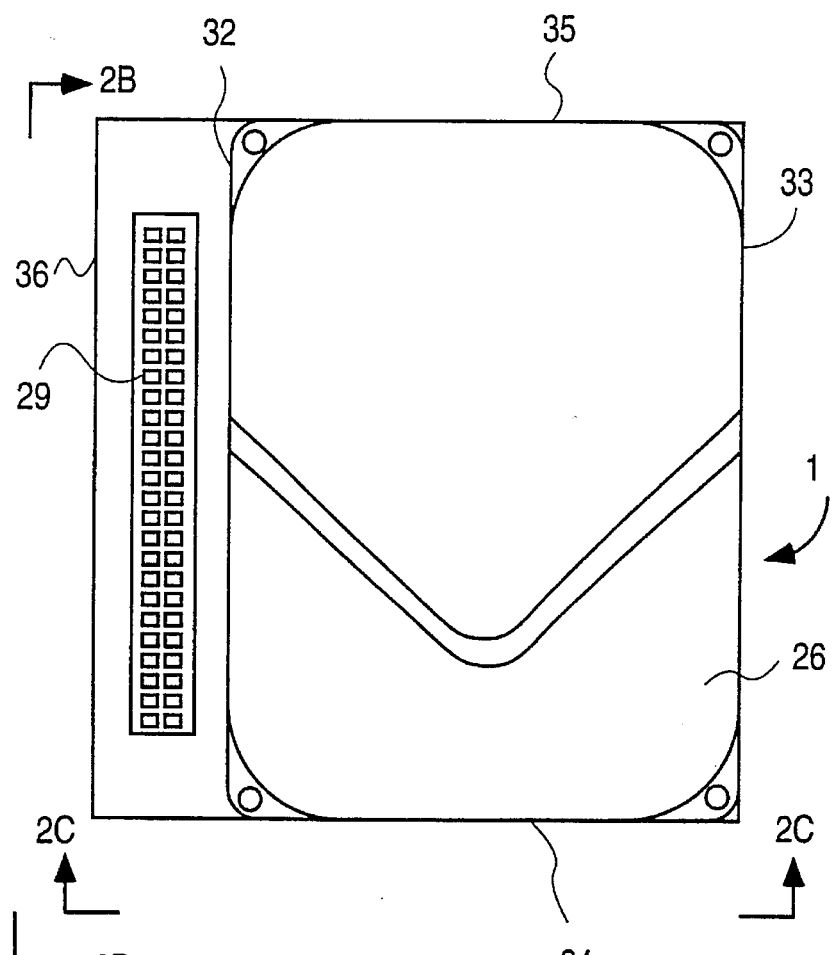
FIG. 2A is a top-plan view of one embodiment of a rigid disk drive in accordance with the present invention.

Microminiature hard disk drive 1 in accordance with one embodiment of the present invention is illustrated in FIGS. 1 and 2A–2C. A portion of the electronics for the rigid disk drive is included internally of the case (or HDA) and a second portion of the electronics is included on the printed circuit board 2, best illustrated in FIG. 1. Referring to FIG. 2A, the approximate width of rigid disk drive 1 is 35 mm (measured from peripheral edge 32 to peripheral edge 33) and the depth of rigid disk drive 1 is approximately 50.8 mm (measured from peripheral edge 34 to peripheral edge 35). Thus, the footprint of rigid disk drive 1 is 35 mm by 50.8 mm. Various heights of the rigid disk drive may be utilized to conform to desired standards, such as, for example, 6.3 mm, 10 mm, 12.7 mm, or 15 mm. Rigid disk drive 1 may be utilized in a stacked configuration with printed circuit board 2, this configuration being illustrated in FIGS. 2A through 2C. In this stacked arrangement, the combined depth from the top of rigid disk drive 1 to the bottom of printed circuit board 2 is approximately 10 mm. The head disk assembly portion of rigid disk drive 1 weighs less than 50 grams, has a sealed conductive housing and cover, enclosing a single (as shown in FIG. 1) or multiple rigid disks clamped to a combined spin motor and spindle bearing assembly. The spin motor uses flexible circuit interconnect means. Also enclosed in the housing is a rotary actuator mechanism comprising a bearing assembly, magnetic read/write transducers mounted on lead beams, a flexible circuit interconnect means, an actuator coil and permanent magnet structure. The disk drive has operating shock limits of 10 G and non-operating shock limits of 200 G.

Table 1 below indicates the specifications for microminiature rigid disk drive 1 in a version utilizing a single platter of magnetic media. The information in parenthesis in the following table are for the translate mode (also known as the emulation mode) for the drive.

TABLE 1

| | | |
|---|---|---|
| Capacity | Per Drive | 21.4 MegaBytes |
| Formatted | Per Track | (8704 Bytes) |
| | Per Sector | 512 Bytes |
| | Sectors Per Track | (17) |
| Functional | Recording Density (BPI) | 65,800 |
| | Flux Density (FCI) | 49,400 |
| | Areal Density (MB/sq in) | 179 |
| | Disks | 1 |
| | Disk Diameter | 33.5 mm |
| | Data Heads | 2(4) |
| | Data Cylinders | (615) |
| | Track Density (TPI) | 2775 |
| | Recording Method | 1,7 RLL Code |
| Performance | Media transfer Rate | 1.61 to 2.56 MB/sec |
| | Interface Transfer Rate | Up to 4.0 MB/sec |
| | Rotational Speed | 3,571 RPM |
| | Latency | 8.5 ms |
| | Average Seek Time | <20 ms |
| | Track to Track Seek Time | 8 ms |
| | Maximum Seek time | 30 ms |
| | Start Time (Typical) | 1.5 sec |
| | Buffer Size | 32 Kbytes |
| | Interface | AT/XT |
| Reliability | MTBF | 100,000 hours |
| | Start/Stops | 1,000,000 |
| | Unrecoverable Data Error Rate | <1 per $10^{13}$ bits read |
| Power | +3 VDC + 5 V ± 5% | |
| | Startup Current | 0.3 Amps |
| | +5 VDC + 5 V ± 5% | |
| | Startup Current | 0.5 Amps |
| | Typical Heat Dissipation | |
| | Spin-up | 2.5 watts |
| | Idle | 0.8 watts |
| | Read/Write/Seek | 1.75 watts |
| | Power Savings Mode | 0.4 watts |
| | Standby Mode | 0.030 watts |
| | Sleep mode | 0.010 watts |
| Environ- | Temperature | |
| mental | Operating | +5° C. to +55° C. |
| | Nonoperating | −40° C. to +70° C. |
| | Relative Humidity | 10% to 90% non-condensing |
| | Maximum Wet Bulb | 30° C. |
| | Shock (11 ms) | |
| | Operating | 10 G |
| | Nonoperating | 200 G |
| | Vibration (0 to peak) | |
| | Operating | 2 G |
| | Nonoperating | 10 G |
| | Altitude | |
| | Operating | −1,000 to 10,000 feet |
| | Nonoperating (maximum) | 40,000 feet |
| Physical | Stacked Configuration (HDA & PCB) | 10 mm × 41 mm × 50.8 mm |
| | Low Profile Configuration: Head Disk Assembly (HDA with one disk) | 6.3 mm × 35 mm × 50.8 mm |
| | Electronics Card (PCBA) | 5 mm × 41 mm × 50.8 mm |
| | Weight | <50 grams |

TABLE 2

| Preliminary Disk Specifications | Substrate Material | Aluminum |
|---|---|---|
| | OD | 33.5 ± .025 mm |
| | ID | 10.00 + .02 mm −00 mm |
| | Thickness | 0.445 ± 0.02 mm |
| | Concentricity | 0.025 mm |
| | Clamp Zone | |
| | IR | 5.3 mm |
| | OR | 6.5 mm |
| | Glide Zone | |
| | IR | 6.8 mm |
| | OR | 15.7 mm |
| | Data Zone | |
| | IR | 9.4 mm |
| | OR | 15.5 mm |
| | Coercivity | 1500 oe |
| | BRT | 10,000 G- μin. |
| | Glide Height | 1.8 μin. |

An inertial latch, which is described and claimed in commonly assigned U.S. Pat. No. 5,189,576, issued Aug. 21, 1992, by J. Morehouse entitled "Rotary Inertial Latch For Disk Drive Actuator", which is incorporated herein by reference in its entirety, is used to prevent the actuator/head assembly from becoming dislodged while parked due to high in-plane shock and vibrational forces. This latch provides a locking mechanism that does not increase actuator frictional forces or require additional power to maintain the actuator in the parked position.

Hard disk drive 1 operates with a single supply voltage of 3.0 volts or 5.0 volts, with the following 3 volt power specifications:

| | |
|---|---|
| Spin-up | 2.5 watts |
| Idle | 0.8 watts |
| Read/Write/Seek | 1.75 watts |
| Power Saving Mode | 0.4 watts |
| Standby Mode | 0.030 watts |
| Sleep Mode | 0.010 watts |

Referring to FIG. 1, spin motor 3 is of a low power design, and is optimized for low voltage operation. A major problem that must be solved relates to voltage head-room, which is defined as: V_headroom=(V_supply−RPM×Ke) where Ke is in units of Volts/1000 RPM. In practice V_supply is less than the power supply voltage because of intrinsic and irreducible switching transistor voltage losses and other parasitic voltage drops, and required RPM is an independent variable, given by elements related to information transfer rates, access time and acceptable power dissipation considerations. Since the only available element design variable is Ke, motor optimization must concentrate on this element. Disk drive 1 employs spin motor 3 that incorporates a stator having two sets of windings. The first set is used in normal running and is optimized to have maximum operating efficiency with the available voltage overhead. The second set of windings is used for two purposes, first to obtain sufficient starting torque with the limited voltage overhead, the second winding is operated in parallel with the first allowing the effective ampere-turns to be increased without increasing Ke, allowing rapid spin up from power saving sleep mode. In the second configuration the first and second coils are connected in series, to provide a back EMF generator during power down to unload the magnetic heads from the surface of the disk and latch the actuator in the parked position. Spin motor 3 may take the form of the spin motor described and claimed in co-pending and commonly assigned U.S. patent application Ser. No. 07/630,110 of J. Morehouse et al. filed Dec. 19, 1990, entitled "Spin Motor for a Hard Disk Assembly", which is incorporated herein by reference in its entirety. A spin motor control system as illustrated and described in co-pending and commonly assigned U.S. patent application Ser. No. 07/630,470 of M. Utenick et al. filed Dec. 19, 1990 entitled "Spin Motor Control System for a Hard Disk Assembly", which is also incorporated herein by reference in its entirety is desirably used in conjunction with the above-described spin motor. The complex motor switching task is incorporated in a unique motor commutating integrated circuit. Further motor optimization can be accomplished by increasing the diameter of the rotors and stator which allows reducing the motor thickness as well as achieving lower stator coil resistance.

Close proximity of the spin motor to the read-write heads is inevitable because of the small dimensions of the disk drive. Switching noise generated by the commutating of the windings is a major source of high frequency interference. When induced into the transducer heads, this noise results in servo and information errors by interfering with demodulation of the servo and information read signals. This problem is partially addressed by using ferrite shielding members, having high permeability in the region of servo and read signal frequencies, employed on the transducer heads and at critical locations in the HDA. Other methods such as sine wave excitation, synchronous commutation and variable slew rate excitation and synchronous servo demodulation with precisely timed commutation also can be used to minimize the generation unwanted noise spikes.

Jitter, or rotational speed variation, is an important design consideration caused by the reduced angular momentum of the miniaturized recording disk. To minimize cogging the number of motor phases can be increased to greater than three or the number of poles can be increased, to 16 rather than 12 for example. Other methods for reducing jitter include closing the spin motor control loop with signals derived from track following sampled sector servo data.

Methods which require increased servo sample rates are undesirable if they reduce the disk drive formatted capacity, significantly increase the complexity of the sampling system or require the microprocessor controller to operate beyond its available bandwidth. This invention employs an innovative servo system, described in detail below, which increases the number of samples per second, providing improved error immunity without increasing the servo overhead.

Reducing spin motor power consumption is a complex problem. Three factors affect motor power efficiency. First, the motor spindle bearing assembly must have very low non-repeatable run-out, this generally requires the use of a pre-loaded ball bearing cartridge. Friction in this type of bearing is dependent on the amount of pre-load and the type of non-migrating lubricant used. A second element of power consumption is due to electrical losses in the motor. These losses can be minimized by using of high energy, rare earth, magnets and a low loss magnet and pole structure along with low resistance stator windings. A third type of power loss is due to windage losses caused by the spinning disk itself resulting in heat generation by the Joule effect. This source of loss can be minimized by using a single disk of reduced diameter, such as about 1¼" disk instead of a 2.5" disk, rotating at the lowest practical speed.

Another method to reduce motor starting torque requirements is to implement a method of dynamic loading and unloading the magnetic transducers from the surface of the rotating disk whereby friction due to head disk contact, found in conventional contact start-stop disk drives, is eliminated. A further advantage of this method is elimination of head disk "stiction" that can occur when the heads cling to the disk surface stalling the spin motor or causing damage to the head disk interface. Further, in order to minimize battery power in portable computing equipment, disk drives are subject to many more power-down and parking cycles are experienced than is typically expected in larger systems. Dynamic head loading and unloading provides increased longevity of the head/disk interface by allowing more than 1 million power down cycles without degradation due to friction and wear of the transducers and disk information surface, compared with 20 thousand cycles for conventional contact start-stop configurations. Rigid disk drive 1 may utilize the dynamic head load/unload structure of the type described and claimed in co-pending and commonly assigned U.S. patent application Ser. No. 07/629,957 of J. Morehouse et al. filed Dec. 19, 1990 entitled "Rigid Disk Drive With Dynamic Head Loading Apparatus", which is incorporated herein by reference in its entirety. An alternative dynamic head loading structure, which is fully described hereinafter in FIGS. 6A through 6I, may also be utilized in hard disk drive 1.

In an alternative embodiment of the present invention, microminiature hard disk drive 4 (illustrated in top plan view in FIG. 3B) utilizes the contact start/stop technique in which the heads are parked on a portion of the disk surface, which ideally is not used for information storage, and which also may be textured in order to minimize the clinging of the heads to the disk. Implementations of this type are known as contact start/stop operation whereby the transducer heads land, take off and are parked on the disk surface as previously mentioned.

Rigid disk drives 1 (FIGS. 1 and 3A) and 4 (FIG. 3B) utilize embedded servo and a track following sampled servo system designed to withstand increased shock and vibration while making possible increased information track densities, for example 3,000 tracks per inch, required to obtain the information storage capacity found in larger disk drives. Further, while more servo samples per second are required to improve servo performance, increased servo overhead cannot be allowed to significantly reduce usable storage capacity. As previously mentioned, an improved servo pre-recorded pattern and demodulation scheme is employed that increases the number of servo fields and information sectors from 48 to 72 per revolution without increasing the relative overhead. These and other improvements are possible by using unique multi-function servo field mapping used in an embedded servo system, which is described and claimed in portions of the servo pattern layout illustrated herein in FIGS. 12D. The entire servo system is described and claimed in the above-mentioned U.S. patent application Ser. No. 07/765,348, which is co-pending and commonly assigned, which application is incorporated by reference in its entirety.

Figure 16:
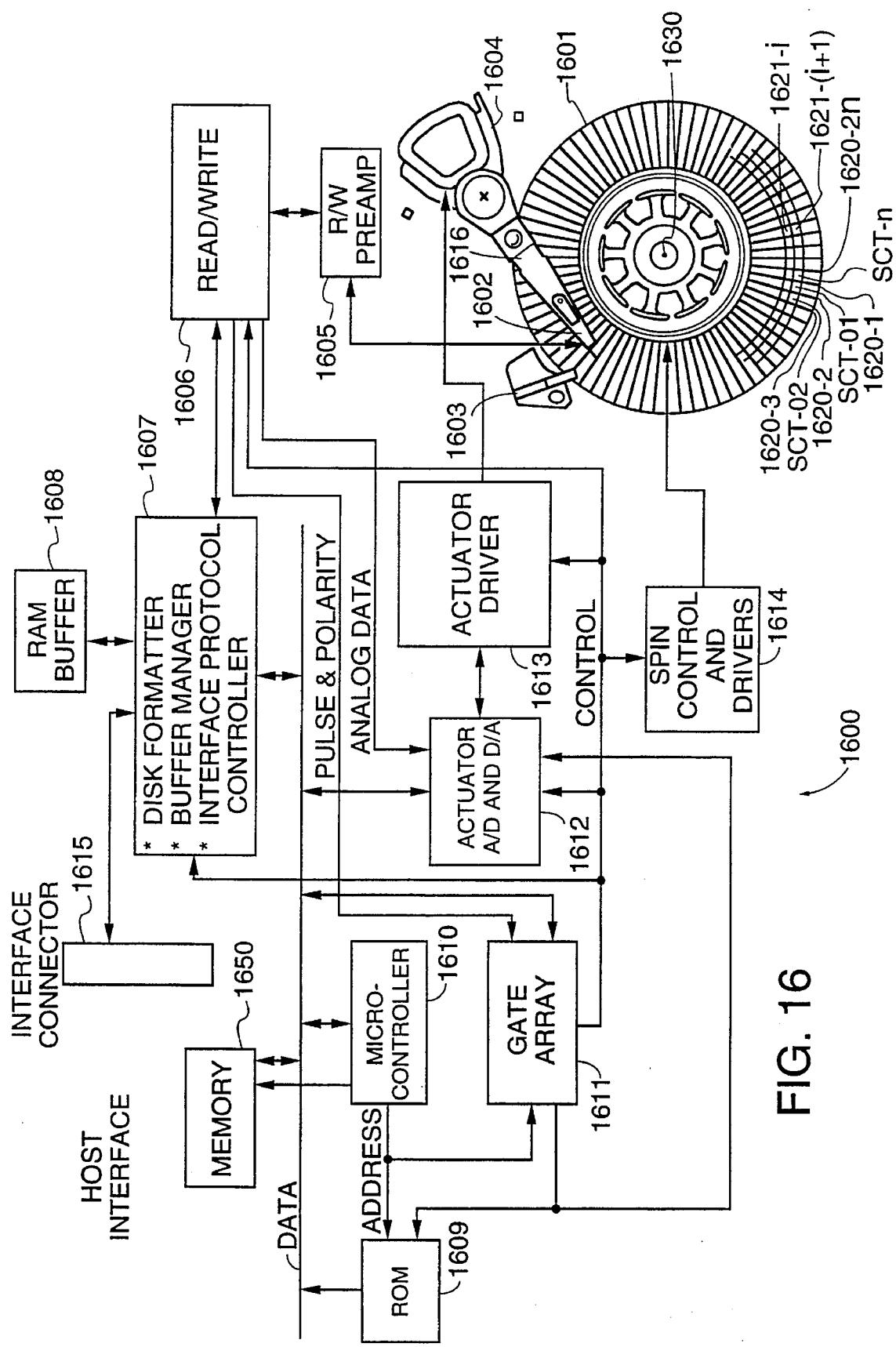
FIG. 16 illustrates a disk drive that includes a disk having the embedded servo system of this invention.

According to the principles of this invention, a novel embedded servo system is used in a disk drive 1600 (FIG. 16). The interface of a disk drive with a computer system and in particular the electronics required in conjunction with an embedded servo system to read and write data on disks 1601 in response to signals from a disk controller to interface connection 1615 are known to those skilled in the art.

As illustrated in FIG. 16, disk drive 1600 contains one or more circular planar disks 1601. Each disk is coated on at least one side with a magnetic medium as on the prior art disk. Data are recorded by read/write head 1602 in concentric circular tracks on the disk, e.g. tracks 1621-i and 1621-(i+1). Corresponding tracks on different disk surfaces are approximately cylindrically aligned.

Each track is segmented into one or more sectors SCT-01, SCT-02, . . . , SCT-n by prerecorded information in embedded servo field regions 1620-1 through 1620-n. Each servo field region 1620-j where j=1, 2, . . . , n, includes m servo fields, where m is the number of concentric circular data tracks on disk, i.e., one servo field in each data track at position j for a total of nm servo fields per surface. In one embodiment, as described more completely below, disks 1601 are 1.89 inches (48 mm) in diameter and have 632 data tracks.

Unlike the prior art embedded servo systems where each data field had a write-to-read transition region and each prerecorded servo field had only one AGC sub-field, the prerecorded embedded servo fields of this invention have substantially enhanced the amount of AGC data available without either increasing the servo field overhead or decreasing the seek and track following performance of the disk drive. This is accomplished by using various sub-fields within the servo field of this invention for two functions concurrently, as described more completely below.

Briefly, a first sub-field provides data for positioning the read/write head and the first sub-field is simultaneously used as an AGC field for a second sub-field. Thus, the first sub-field performs two servo functions simultaneously. Further, in one embodiment of the servo field of this invention, the cylinder address sub-field and the position sub-field are no longer adjacent to one another in contrast to the prior art servo fields.

Figure 17:
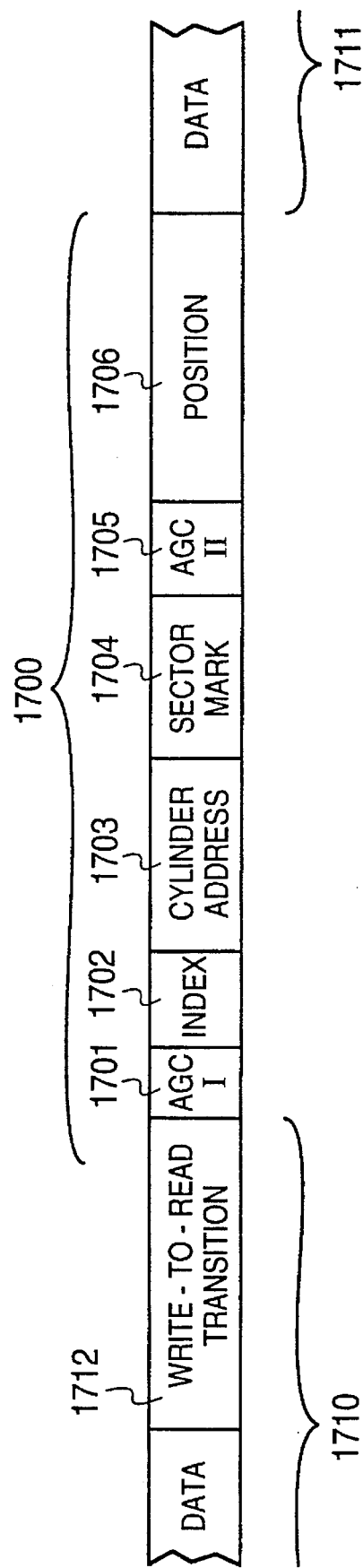
FIG. 17 is a linear representation of one embodiment of the embedded servo field according to the principles of this invention.

Servo field 1700, shown in FIG. 17, of this invention is a full track address servo field. In a preferred embodiment, servo field 1700 includes, in one embodiment, six sub-fields which are: 1) a first automatic gain control recovery sub-field 1700; 2) an index/AGC sub-field 1702; 3) a cylinder address/AGC sub-field 1703; 4) a sector mark sub-field 1704; 5) a second automatic gain control sub-field 1705; and 6) a position sub-field 1706.

A typical magnetization pattern 1800 for each of the sub-fields of servo field 1700 is illustrated in FIG. 18. In FIG. 18, the direction of rotation of the disk is shown and four arbitrary tracks are shown and arbitrarily labeled as "cylinder 0" to "cylinder 3." The polarity of the magnetization pattern in FIG. 18 is illustrative only of one embodiment of the invention and is not intended to limit the polarity to that shown. As is well-known to those skilled in the art, the magnetization pattern works equally well in either polarity. A detailed expansion for one track of magnetization pattern 1800 is illustrated in FIGS. 21A to 21H, which are drawn to scale and described more completely below.

FIG. 19 illustrates a typical waveform 1900 generated by magnetization pattern 1800 for servo field 1700 when the read/write head is precisely on the track centerline. Waveform 1900 is also explained more completely below. FIGS. 18 and 19 illustrate several important aspects of this invention. First, the magnetization pattern is continuous between tracks. The continuity provides reliable AGC data during seeks when the read/write head is off a track centerline.

Second, all patterns that provide AGC data and position sub-field 1706 have two time periods, i.e., time period T1 and time period T2, where time period T1 is defined as the time interval from a peak of a first polarity to a peak of a second polarity. Time period T2 is an integer multiple of time period T1. If two peaks occur in the first time period, e.g., the signal trace goes from a positive peak to a negative peak, the negative peak is used to generate a clock pulse. Following a clock pulse, data is recorded in a second time period. The second time period is T2. Thus, the combination of a clock pulse and a data bit is repeated in the pattern with a period of period T1 plus period T2. In this embodiment, clock pulses are negative pulses and data pulses are positive pulses. The polarity of the clock and data pulses is arbitrary and either polarity will work so long as the clock pulses and the data pulses are of opposite polarity.

The trace of the data pulse within second period T2 determines whether the data represents a logic one or a logic zero. Specifically, the location of the positive peak within period T2 determines whether the data is a one or a zero. If the positive peak occurs before three quarters of period T2, the data is a one. One data pulses are indicated by the solid line waveform in sub-fields 1902 and 1903 in FIG. 19. Conversely, if the positive peak occurs at or after three-quarters of period T2, the data is a zero. Zero data pulses are indicated by the broken line waveform in sub-fields 1902 and 1903 in FIG. 19.

In addition to the novel servo field of this invention, the write-to-read recovery field at the end of each data region is utilized for additional AGC data in all modes of operation except following a write, as described more completely below. The use of the write-to-read recovery field for AGC data aids in providing additional AGC margin without increasing the servo field overhead. While the prior art servo field 2400 included AGC data in the write-to-read recovery field, the AGC data was not utilized. Consequently, the prior art failed to recognize the advantages gained through the use of the write-to-read recovery field for AGC. AGC sub-field 1701 (FIG. 17) is in this embodiment four bits in length where one bit corresponds to the first time period T1. Hereinafter, a reference to the length of a servo pattern sub-field in bits means a time period equal to time period T1. The "bit" used in defining the sub-field length should not be confused with a data bit. As explained more completely below, index/AGC sub-field 1702 and cylinder address/AGC sub-field 1703 provide both index and cylinder address information concurrently with AGC data. First AGC sub-field 1701 provides additional AGC margin. In another embodiment, first AGC sub-field 1701 is not utilized and AGC depends solely on sub-fields 1702 and 1703. FIG. 19 illustrates waveform 1901 generated by magnetic pattern 1801 in first AGC sub-field 1701.

Index/AGC sub-field 1702 is 9 bits in length in this embodiment. Index/AGC sub-field 1702 contains three bits of data. Unlike prior art index sub-fields that were used to identify only one sector in each track, according to the principles of this invention, index/AGC sub-field 1702 is used to uniquely identify each sector in the track, as explained more completely below.

When the index is lost, index/AGC sub-field 1702 is used to reestablish the index as each subsequent index/AGC sub-field 1702 passes under read/write head 1602. Therefore, the index is typically established after at most three sectors and usually only two sectors have passed under read/write head 1602. If the track has 72 sectors, this means that the index is established on the average within about 1/32 of a revolution of the disk.

Prior art systems required waiting on the average for one-half revolution of the disk until the sector with the index mark passed under the read/write head. Therefore, index/AGC sub-field 1702 enhances the capture of the index reference and thereby reduces the rotational latency, i.e., the time spent waiting to re-establish index, over the prior art index sub-field.

Further, index/AGC sub-field 1702 provides a uniquely identifiable field for each track sector so that sub-field 1702 is used for a servo pattern integrity check during seeks, as explained more completely below. Waveform 1902 is an example of the signal generated by magnetic pattern 1802 in index/AGC sub-field 1702.

Cylinder address/AGC sub-field 1703 includes a Gray code full track address. In this embodiment, cylinder address/AGC sub-field is thirty bits in length. The use of Gray code track addresses is fundamentally the same as in the prior art systems. However, as explained more completely below, the Grey code sequence is frequency modulated and this modulation is an important aspect of this invention because the Gray code is used for AGC as well as for determining the track address. Waveform 1903 illustrates the possible signals generated by magnetic pattern 1803 in cylinder address/AGC sub-field 1703.

Sector mark sub-field 1704 is 18 bits in length. As the name suggests, sector mark sub-field 1704 is used to precisely identify, i.e., mark, the circumferential location of each sector in the track. The first eleven bits in sub-field 1704 are a fully DC erased gap. The important aspect of the fully DC erased gap length is that the length is longer than the longest gap in cylinder address/AGC sub-field 1703 when the longest gap is bounded on either side by a single bit error.

The fully DC erased gap in sector mark sub-field 1704 is used to provide a readily identifiable region for (i) initiation of synchronization and (ii) capturing the track address in the electronic circuitry. Therefore, failure to provide a DC erased gap of sufficient length introduces problems whenever a single bit error occurs in cylinder address/AGC sub-field 1703 next to the longest gap in sub-field 1703. As illustrated in FIG. 19, the signal generated by this gap is a null signal.

Following the DC erased gap in sector mark sub-field 1704 is a first synchronization bit 1804A that generates a first synchronization pulse 1904A. The first synchronization bit is followed by a second DC erased region of about five bits in length. A second synchronization bit 1804B follows the second DC erased region. The length of the second DC erased region is selected to allow sufficient time between the generation of two synchronization pulses 1904A and 1904B so that the two pulses can be distinguished under the timing variations that may result either from the loss of a clock pulse or the loss of a data pulse in cylinder address sub-field 1703.

As explained more completely below, a novel detection method is used so that if first synchronization (sync) pulse 1904A is missed, sync timing is obtained from second sync pulse 1904B. The ability to obtain sync timing from either pulse in sector mark sub-field 1704 enhances the performance of this disk drive over disk drives with prior art embedded servo systems that utilized a single sync pulse.

After sync timing is obtained, only position sub-field 1706 is needed to complete the servo operations. Reading of position sub-field 1706 requires the most accuracy in AGC. As explained more completely below, the AGC level obtained from sub-fields 1702 and 1703 should be adequate for precisely reading position sub-field 1706. Nevertheless, to assure precision, second AGC sub-field 1705 is provided, which is twelve bits long in this embodiment. Waveform 1905 is generated by magnetic pattern 1805 in second AGC sub-field 1705.

Position sub-field 1706 is used to precisely center the read/write head on the track. Thus, cylinder address/AGC sub-field 1703 is a course indication of radial position of the read/write head and position sub-field 1706 is a fine radial position indicator. In this embodiment, position sub-field 1706 includes an equal number of normal and quadrature frame pairs with the frame pairs interleaved. The peak amplitudes in position sub-field 1706 are sampled and held by the disk drive electronics in a manner similar to prior art disk drives. The peak amplitudes are electronically averaged to obtain a radial positioning error signal.

Herein, a normal frame refers to a frame that is recorded in half-track positions and a pair of normal frames include one frame with the region above the center line of the track recorded and another frame with the region below the center line of the track recorded. A frame is an arbitrary unit of measure and is simply used to define the various portions of position sub-field 1706 which is 39 bits in length. The two frames in a normal pair of frames need not be directly adjacent to each other. For example, a quadrature frame may be interposed between the two frames that constitute the pair of normal frames. To assure that the difference of the readback signals gives position information relative to the track centerline, the normal frames change polarity in adjacent tracks.

A quadrature frame is a frame in which the information is recorded in the on-track position and is either present or missing, in this embodiment. A pair of quadrature frames include one frame with the on-track position magnetized and another frame with the on-track position unmagnetized. The two frames in a quadrature pair of frames are preferably separated by a normal frame. Also, the quadrature frame polarity is opposite in adjacent tracks.

FIG. 18 illustrates a magnetization pattern for one embodiment of position sub-field 1706 that consists of an equal number of normal and quadrature servo frame pairs. A first normal frame Na is followed by a first quadrature frame Qa. Quadrature frame Qa is followed by a second normal frame Nb which in turn is followed by a second quadrature frame Qb. The four frames Na, Qa, Nb, Qb form a cell that is repeated two more times to form a three cell position sub-field 1706 with a total of twelve frames. The twelve frames include three pairs of normal frames N1, N2, N3, and three pairs of quadrature frames Q1, Q2, Q3. Each frame includes either a pulse pair or no pulses.

The disk drive electronic circuitry inverts the negative pulses in the normal frames Na and Nb and adds them together. The electronic circuitry samples the height of the resulting positive peak from the normal frames and the height of the positive peak from the quadrature frames. The average of the three peaks from the three cells is used to generate the position error signal in a matter well known to those skilled in the art.

An important aspect of this invention is that the position data in position sub-field 1706 contains frequencies common to the sub-fields used to obtain the AGC level. Specifically, pulse pairs are written with period T1 and are spaced apart from each other by at least period T2. The frequency content of position sub-field 1706 closely matches that of the AGC sub-fields and provides increased margin for the separation and proper detection of Quadrature and Normal position pulse information. If position pulses are separated by at least period T2, the effects of intersymbol interference are minimized.

Signal 2009 (FIG. 20) is timed from the sync pulse of the current sector and is used to capture each Quadrature and Normal position pulse. The window, i.e., the low portion of signal 2009, has a width of time T2 and the time between windows is time T1. Position sub-field 1706 provides highly accurate track following information.

Position sub-field 1706 is only illustrative of one embodiment of a position sub-field suitable for use in the servo field of this invention and is not intended to limit the invention to the particular embodiment described. Other position sub-fields suitable for use in this invention are described in the copending and commonly assigned U.S. patent application Ser. No. 07/630,475 entitled "Servo Field Scheme for High Sampling Rate and Reduced Overhead Embedded Servo Systems in Disk Drives," of John H. Blagaila et al. filed on Dec. 19, 1990, which is incorporated herein by reference.

A summary of the length for servo field 1700 of this invention is given in Table 1.1. For comparison, the length of servo field 2400 is also estimated. The unit of measure chosen for comparison is a bit as defined above, i.e., the period of time from a peak of one polarity to a peak of a second polarity.

TABLE 1.1

| Prior Art Servo Field 2400 Sub-field | Length | Servo Field 1700 Sub-field | Length |
| --- | --- | --- | --- |
| Write-to-Read | ~27 | Write-to-Read | 37 |
| AGC | ~36 | | |
| Sector Mark | ~21 | AGC I | 4 |
| Index 1 | ~2 | Index/AGC | 9 |
| Defect | ~2 | Cylinder Address/AGC | 30 |
| Cylinder Address | ~25 | Sector Mark | 18 |
| Index 2 | ~2 | AGC II | 12 |
| Position | ~28 | Position | 39 |
| TOTAL | ~143 | TOTAL | 149 |
| % AGC (36/143) | 25 | % AGC (w write/read) | 62 |
| | | (w/o write/read) | 37 |

The ratio of the length of AGC data to the total servo field length is significantly greater according to the principles of this invention even though the total servo field length is substantially the same as the prior art servo field. As explained above, the enhancement in the amount of AGC data is achieved by using several sub-fields for two servo functions concurrently.

In this embodiment, the frequencies of the information in the servo sub-fields used for AGC and another function concurrently are preferably selected from within a bandwidth of frequencies that are common, or as near to common as possible to every data region on the disk. For example in one embodiment, the slowest data frequencies correspond to periods in the range of 144 nanoseconds to 576 nanoseconds while the fastest data frequencies correspond to periods in the range of 92 nanoseconds to 384 nanoseconds. Thus, the two zones have a common range of 144 to 384 nanoseconds. For this range, first time period T1 was selected as 208 nanoseconds and second time period T2 was selected as 416 nanoseconds. This range of periods trades better resolution for slightly poorer AGC control. Further, period T1 is common to the periods in both data zones.

As indicated above, index/AGC sub-field 1702 and cylinder address/AGC sub-field 1703 are used as AGC data for position sub-field 1706. Use of cylinder address/AGC sub-field 1703 as both an AGC sub-field and a cylinder address sub-field concurrently requires that the gain transition from data region 1710 to cylinder address/AGC sub-field 1703 is small so that only a small AGC adjustment is at most necessary for reading the cylinder address. Accordingly, the frequencies for the Gray code in cylinder address/AGC sub-field 1703 have been chosen so that the frequencies are very similar to the frequencies of data region 1710, i.e., periods T1 and T2 are used in cylinder address/AGC sub-field 1707. Similarly, index/AGC sub-field 1702 is also written using these periods so that the three data bits can be read and stored even though sub-field 1702 occurs almost immediately at the start of servo field 1700.

Also as explained above, clock pulses have a first polarity, e.g., negative, and data pulses have a second polarity that is different from the first polarity, e.g., positive. To read and save the index and cylinder address, the signal from read/write head 1602 is first demodulated.

Since the data is written in a frequency modulation format, as described above, any common frequency demodulation circuit may be used. In addition, the data on disk 1601 and consequently the data provided to or from read/write head 1602 is serial data. However, the data is preferably supplied to disk drive microcontroller 1610 as parallel data. Consequently, the serial data signal from read/write head 1601 for servo field 1700 is deserialized with a shift register that contains two more bits than the number of data bits in cylinder address/AGC sub-field 1703 and the index/AGC sub-field 1702.

The shift register is enabled prior to the start of index sub-field 1702. The precise time that the shift register is enabled is not important so long as the shift register is enabled early enough to allow for any timing variations so that no data bits of the index and cylinder data are lost. In this embodiment, the signals from read/write head 1601 are applied to the shift register at about 6,667 nanoseconds after the start of write-to-read recovery area 1712. (See FIG. 21B).

The serial data signal from read/write head 1601 is first demodulated by the frequency demodulator circuit. The output signal from the frequency demodulator circuit is the input signal to the shift register.

Since index sub-field 1702 and cylinder address sub-field 1703 are both written with frequency modulation that begins with a negative pulse and is followed by a positive data pulse, i.e., a pulse pair, the negative pulse is used as a clock bit so that servo pattern 1700 in these sub-fields is self-synchronizing. Thus, the negative pulses (clock pulses) are used to initiate a clock signal that clocks the index and cylinder data through the shift register. This clock signal is resynchronized after every clock pulse generated by servo field 1700. The period of the clock signal is period T1 plus period T2.

Each data bit is clocked into the shift register and then serially shifted through the shift register. When a data bit reaches the end of the shift register, the data bit is shifted out of the register. Consequently, when DC erased gap is reached, the shift register contains the track address and index.

Since index/AGC sub-field 1702 and cylinder address/AGC sub-field 1703 are self-synchronizing, a data bit would normally be lost if either a clock bit or a data bit is dropped when reading these sub-fields. In this embodiment, when a data bit is missed, the subsequent clock bit is also lost. However, the shift register clock signal is allowed to run for one cycle without receiving a clock pulse from servo field 1700. Specifically, the previous clock pulse from servo field 1700 is used as a reference. However, if a second consecutive clock pulse from servo field 1700 is missed, the shift register clock signal is shut down.

The free running clock signal provides some timing robustness because the missed data bit had a fifty percent probability of being a zero. Thus, clocking a zero through the shift register in response to a missing data bit or clock bit in servo field 1700 results in eliminating an error fifty percent of the time on the average.

When the DC erased gap begins, the shift register clock signal continues for two extra cycles and then stops. The shift register contains two extra bits so that the last bits clocked in by the two extra clock cycles are ignored. The other bits in the shift register contain the index and track address. After the DC erased gap is detected, the data is held in the shift register and the clock signal is disabled. The index and gray code read circuitry is turned off and the thirteen bits for the index and track address read from servo field 1700 are stored.

The three index bits represent a number between 0 and 7. The sequence of index numbers in the sectors is used as a course indicator of the circumferential position of the read/write head. In this embodiment, the sequence of index numbers are the same for each track on the disk and are stored in firmware that is used by the disk drive microprocessor. In one embodiment, the sequence is given in Table 2.1.

TABLE 2.1

| Sector | Index |
|---|---|
| 0 | 0 |
| 1 | 1 |
| 2 | 0 |
| 3 | 2 |
| 4 | 2 |
| 5 | 0 |
| 6 | 3 |
| 7 | 0 |
| 8 | 4 |
| 9 | 4 |
| 10 | 0 |
| 11 | 5 |
| 12 | 0 |
| 13 | 6 |
| 14 | 0 |
| 15 | 7 |
| 16 | 1 |
| 17 | 2 |
| 18 | 2 |
| 19 | 1 |
| 20 | 3 |
| 21 | 1 |
| 22 | 4 |
| 23 | 4 |
| 24 | 1 |
| 25 | 5 |
| 26 | 1 |
| 27 | 6 |
| 28 | 1 |
| 29 | 7 |
| 30 | 2 |
| 31 | 2 |
| 32 | 3 |
| 33 | 2 |
| 34 | 2 |
| 35 | 4 |
| 36 | 2 |
| 37 | 2 |
| 38 | 5 |
| 39 | 2 |
| 40 | 2 |
| 41 | 6 |
| 42 | 2 |
| 43 | 2 |
| 44 | 7 |
| 45 | 3 |
| 46 | 4 |
| 47 | 4 |
| 48 | 3 |

TABLE 2.1-continued

| Sector | Index |
|---|---|
| 49 | 5 |
| 50 | 3 |
| 51 | 6 |
| 52 | 3 |
| 53 | 7 |
| 54 | 4 |
| 55 | 4 |
| 56 | 5 |
| 57 | 4 |
| 58 | 4 |
| 59 | 6 |
| 60 | 4 |
| 61 | 4 |
| 62 | 7 |
| 63 | 5 |
| 64 | 6 |
| 65 | 6 |
| 66 | 5 |
| 67 | 7 |
| 68 | 7 |
| 69 | 6 |
| 70 | 6 |
| 71 | 7 |

After an index is stored in the shift register, the microprocessor saves the index. After the microprocessor saves the index for the adjacent sector, the microprocessor can determine the circumferential position 76% of the time from the two index numbers. Specifically, the microprocessor compares the two index numbers with the data in Table 2.1 to ascertain the sector number. However, if the two stored index numbers are the same, a third index number is required to identify the coarse-circumferential position of the read/write head. Thus, on the average 2.24 sector reads are required to determine sector location. Hence, establishing index does not require waiting for one predetermined sector to pass under the read/write head as in the prior art but rather, index is always established within three sector reads.

In addition, index data provides an integrity check on the servo pattern during seeks in addition to those described more completely below. Herein, an "integrity check" means a check to establish that the servo pattern is read correctly. If for some reason the servo timing is lost or perhaps a data bit is dropped, the servo pattern may be read incorrectly.

For example, during a seek read/write head 1601 may jump a variable number of tracks between servo sectors. Thus, the microprocessor only knows that the cylinder address should be within some range of tracks, but this is not sufficient for an accurate servo pattern integrity check. In contrast, the index of this invention provides an integrity check after reading at most three servo sectors.

Specifically, the microprocessor reads the index for two servo sectors and uses Table 2.1 to project the index for the next servo sector if the two sector index values are different. If the two sector index values are the same, a third index value is read and Table 2.1 is then used to project the index for the next servo sector. The microprocessor compares the projected index with the next index read. If the next index read and the projected index are the same, the first integrity check of the servo field pattern has been verified. Using this process during seeks, enhances the seek performance of the disk drive by providing a warning of a potentially bad servo pattern. Thus, the index from index/AGC sub-field 1702 serves a dual function, i.e., coarse circumferential positioning and servo field integrity check. The use of sub-field 1702 for these two functions, plus the AGC function provides a significant amount of data without increasing the servo overhead.

In prior art systems, a dedicated set of bits were sometimes used as an integrity check but these bits provided neither any information about individual sectors nor AGC level. The dedicated set of integrity bits was often times the only qualifier of a good servo field. Consequently, a single bit error in the prior art dedicated set of integrity bits caused an increase in servo field sync loss or error rate.

According to the principles of this invention, the integrity check of index/AGC sub-field 1702 is only one of several integrity checks. Thus, if the index integrity check is bad, the additional servo zone integrity checks, described below, determine whether the servo information should be used or only a part of it should be used. Mother important point is that the loss of any one integrity check does not result in the loss of sync, whether it be the sector address (index), or cylinder address, sync1 missing, or sector window misalignment, that are described more completely below. A single bad integrity check only generates a warning that the servo pattern is not pristine and should be treated accordingly.

For example, the write operation is the most dangerous mode of operation in the instance of an erroneous servo sector. Thus, in performing writes if any one of servo integrity checks fails, typically, the write operation should stop immediately and report an error so that a reread of the servo field and a rewrite may be attempted. Conversely, in idle mode, if any one of the integrity checks fail, no additional action is typically taken except perhaps some additional monitoring to see if the error repeats excessively in which case the sector may be flagged as a bad sector.

Since the index/AGC and cylinder address AGC sub-fields 1702, 1703 are self-clocking and therefore do not require a synchronization (sync) pulse for timing, these sub-fields may be positioned before sector mark sub-field 1704. As described above, sub-fields 1702, 1703 function as index and cylinder address sub-fields as well as an AGC sub-field. However, additional AGC margin is provided by supplying first AGC sub-field 1701.

First AGC sub-field 1701 along with index mark sub-field 1702 and cylinder address sub-field 1703 is sufficient AGC data for accurate reading of both sector mark sub-field 1704 and position sub-field 1706. Note, as explained above, second AGC sub-field 1705 is provided, in one embodiment, to provide additional AGC margin for position sub-field 1706.

The index bits are only needed (i) in the early stages of the disk drive initialization, (ii) for servo field integrity checks during seeks, or (iii) when the index is lost, i.e., the index bits are required only when the index is being established or verified. In each of these cases, the disk drive is not in a write mode, and so write-to-read recovery field 1712 at the end of the data region 1710 is not needed for write-to-read recovery and thus can be used for AGC data for reading the index bits. In write mode, sectors are counted to keep track of sector number and cylinder addresses are read so as to insure that data is written in the proper location.

Consequently, additional AGC data for index sub-field 1702 is provided in write-to-read recovery field 1712. To protect the bits residing in write-to-read recovery field 1712, a servo field write protect signal 2001 goes active at about one microsecond after the start of the write-to-read recovery region and remains high until the next data region begins.

Figure 20:
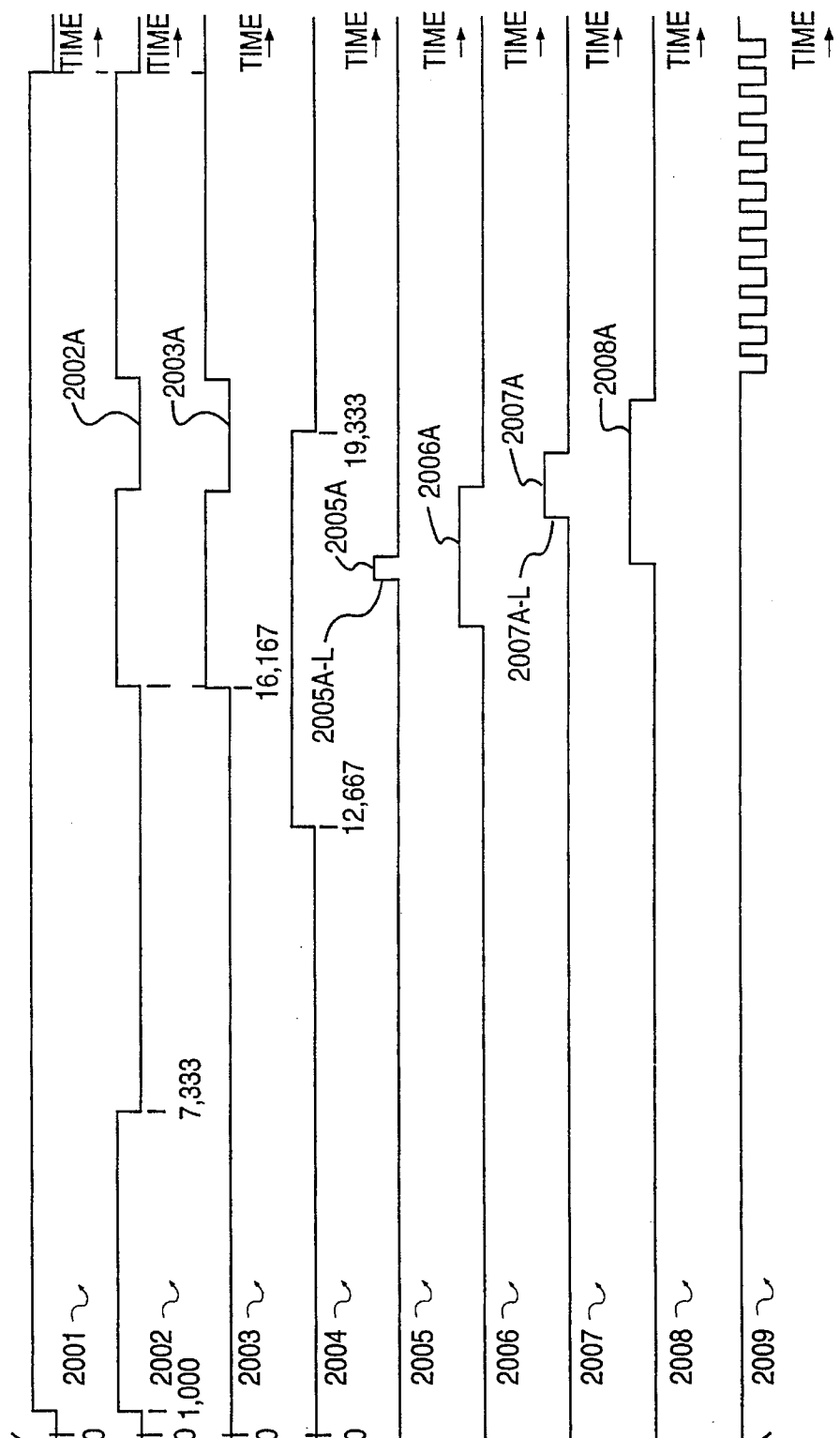
FIG. 20 is a timing diagram for signals used in conjunction with the servo field of this invention.
Figure 21A:
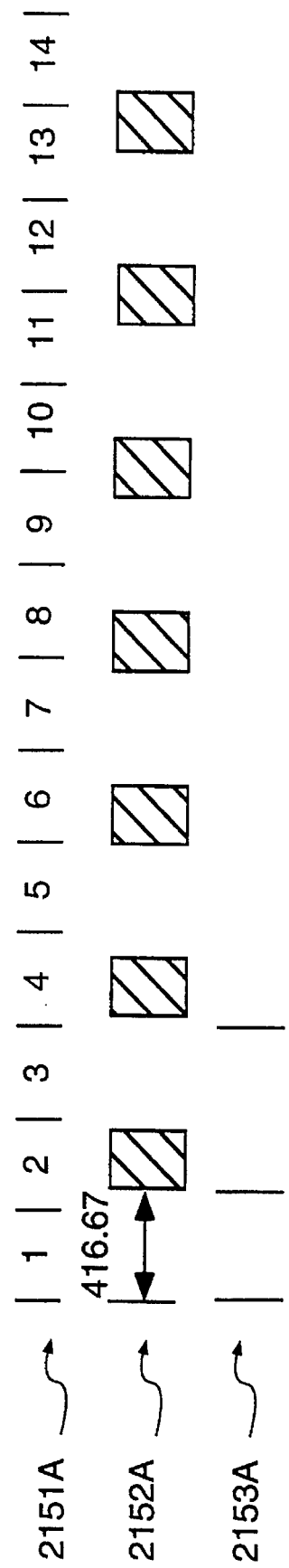
Figure 21B:
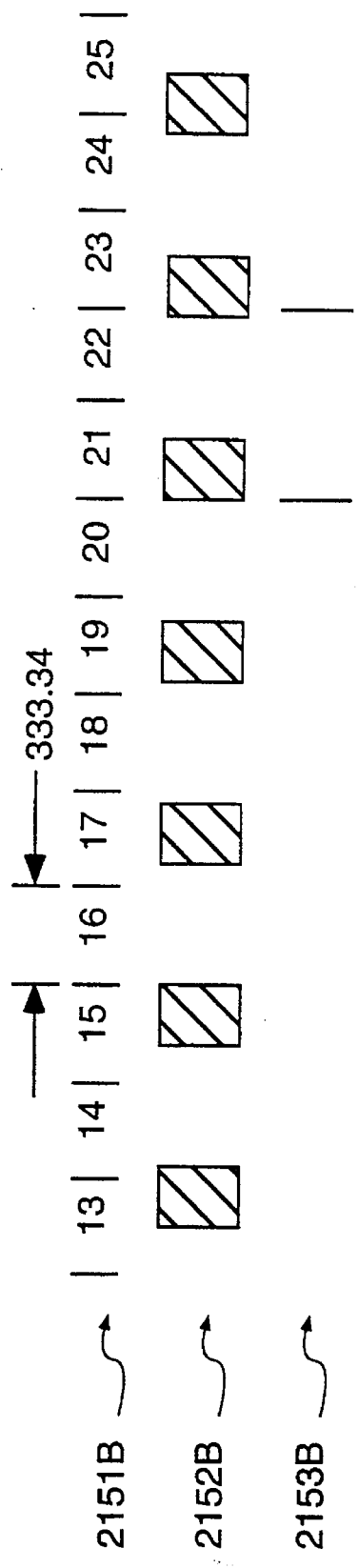
Figure 21G:
Figure 21H:

In FIG. 20, servo field write protect signal 2001, write mode AGC hold signal 2002, AGC hold except for write mode signal 2003, sync1 sector reference window 2006 and sync2 sector reference window 2008 are timed, typically using counters, from the synchronization pulse generated by sector mark sub-field 1704 in the previous servo sector field 1700. AGC hold signals, after sync is established in the current sector, are timed from the current sector. Of course, this applies only to AGC sub-field 1705, which is not used if sync is not established, i.e., the sector is not found. Specifically, windows 2002A and 2003A are timed for sync in the current sector so as to capture the AGC data in AGC sub-field 1705.

The time length of each of the servo sub-fields, the data region, and the write-to-read recovery region are known. Accordingly, the delay time after the previous sector synchronization pulse until a particular signal changes state is easily determined by simply counting the time that has passed since the previous sector synchronization pulse.

Since the integrity of the write-to-read recovery field 1712 is protected by servo zone write protect signal 2001, this field is available for AGC whenever the disk drive is not in write mode. There are at least three instances when the AGC data in write-to-read recovery field 1712 is used. These include (i) when the index bits are read to establish the index; (ii) in pulse power mode, i.e., disabling the read channel over the data regions, where the AGC value is lost between servo fields; and (iii) in a seek, where there are no data under the read/write head.

Another important aspect of servo field 1700 of this invention is that data are ordered from the least correct AGC level needed to the most correct AGC level needed to assure accurate reading of the servo data. Consequently, the servo pattern starts with bits that do not contain data, followed by index bits, which are read with the use of the write-to-read recovery field for AGC, the Gray code in cylinder address sub-field 1703, sector mark sub-field 1704, and position sub-field 1706. This ordering of sub-fields assures that each sub-field is read with the necessary AGC level to assure reliable operation.

Signals 2002 and 2003 (FIG. 20) indicate the AGC hold signal for the write mode and all other modes, respectively. While the AGC hold signal is active, e.g. high, the current AGC level is held. When the AGC hold signal is inactive, e.g., low, the data being read is used to adjust the AGC level. Signals 2002 and 2003 show that sub-fields 1702, 1703 and 1705 are used for AGC data as well as write-to-read recovery area 1712 except in write mode. Time zero in FIG. 20 is about 188 microseconds after the first sync pulse in the previous servo field. The adjustment of AGC level based upon AGC data is known to those skilled in the art.

After obtaining a good AGC level from write-to-read recovery region 1712 in all cases except following a write and from sub-fields 1701 to 1703, the disk drive read channel is prepared to detect the first synchronization (sync1) pulse 1904A and second synchronization (sync2) pulse 1904B generated by sector mark sub-field 1704.

If one of sync1 pulse 1904A and sync pulse 1904B is miscaptured, servo information following sector mark sub-field 1704 is either lost or corrupt. It is important therefore to have immunity to errors in detecting the sync pulse and a method of detecting an incorrect sync pulse. Servo field 1700 of this invention has immunity to erroneous sync pulse generation or capture as well as a means for detecting an incorrect sync pulse.

With respect to error immunity, there are two types of servo field read errors, missing bits and extra bits. Immunity to a single bit error is an important aspect of this invention. If the sync pattern in sector mark sub-field 1704 is susceptible to single bit errors, the sync pattern can be expected to be lost at the error rate inherent to the technology used. In disk drives, this error rate is typically 1 in $10^{10}$.

If it is possible to design a sync pattern, i.e., a sector mark sub-field, that is only susceptible to errors of two or more bits then the immunity to errors increases dramatically. In disk drives, the error rate for two independent errors is the square of the single bit error rate. Using 1 in $10^{10}$ for the error rate of a single bit, a sync pattern that requires two independent bit errors results in an error rate of 1 in $10^{20}$ (since the errors are independent events their probabilities multiply). Thus, if the sync pattern is immune to two independent bit errors, errors occur 10 billion times less frequently.

To obtain sync to the disk, an area prior to the actual sync bit location must be identified so that the hardware that triggers on the sync pulse can be set up. The area that is identified is the DC erased gap in sector mark sub-field 1704. Specifically, the distance between pulses in servo field 1700 is monitored and when no pulses are detected for a predetermined period of time, typically about two microseconds in this embodiment, hardware is enabled to detect the sync pulse.

Consequently, the DC erased gap must be neither falsely identified by the occurrence of a missing bit in cylinder address sub-field 1703, nor missed due to an extra pulse in the DC erased gap in sector mark sub-field 1704. To permit larger spin speed variations without losing the sync timing, i.e., miscapturing the sync bit, the hardware that detects the DC gap is energized early in cylinder address/AGC sub-field 1703.

Specifically, DC gap search window signal 2004 goes active at about 13 microseconds after the start of write-to-read recovery region 1712. (See also FIG. 21D). DC gap search window 2004 remains active until about 19 microseconds to account for spin speed variations. The DC erased gap length must be chosen to be longer than any naturally occurring DC erased gap bounded by a single missing bit error, as described more completely below.

Since DC erased gap detection is started in cylinder address/AGC sub-field 1703, it is important that the qualification length for the DC erased gap is longer than any normally occurring DC erased gap within the Gray code track address. In addition for missing bit immunity, the DC erased gap must be longer than the longest normally occurring DC erased gap that can be produced in the Gray code by the occurrence of one missing bit, i.e., longer than the longest normally occurring DC erased gap that can be produced by the occurrence of one missing bit in the servo sub-field immediately preceding the DC erased gap. Consequently, the DC erased gap is in the range of 3*TDC to 36*TDC and is preferably about 10*TDC where time TDC is 166.667 nanoseconds in this embodiment and is the length of the clock cycle used to increment the DC gap counter. Notice that period TDC is eight-tenths of period T1.

After the Gray code address is read, the DC erased gap must not be corrupted by an extra pulse that effectively hides the DC erased gap. The DC erased gap begins with the last negative pulse of the Gray code address and ends a predetermined time following the absence of negative pulses. Positive pulses are ignored.

The read channel only permits positive pulses to follow negative pulses and so if an error occurs, the read channel permits only a positive error pulse to propagate through after the last negative pulse of the cylinder address field. Since positive pulses are not detected when measuring the DC gap, a positive error pulse has no effect. Thus, the DC gap is immune to single bit errors that generate a positive pulse following the last negative pulse in cylinder sub-field 1703.

After the DC erased gap is detected, one of two sync pulses 1904A and 1904B must be accurately detected. As explained above, the sync pulse identifies the precise circumferential location of the sector on the track. If a spurious pulse is qualified as the sync pulse, subsequent servo, read, and writing timing signals are likely to be erroneous. Consequently, a part of the servo field may be overwritten by a write operation and this would ruin the disk drive until the disk embedded servo pattern was reconstructed at the factory.

Thus, according to the principles of this invention, a novel method that compensates for (i) a single bit error in the magnetization pattern, (ii) spin motor speed variations and (iii) normal sampling variations is used to qualify the synchronization pulse. Briefly, first synchronization pulse 1904A must be located within a first window 2005A referenced to the start of the DC erased gap, referred to as the sync1 DC reference window, and a first window 2006A referenced to the synchronization pulse for the immediately preceding sector, referred to as the sync1 sector reference window.

If first sync pulse 1904A is coincident with both windows 2005A, 2006A, first sync pulse 1904A is qualified and used. If the first synchronization pulse 1904A is coincident with window 2005A, but not with window 2006A the first sync pulse 1904A is still qualified and used. However, an error is reported which implies a error in spin speed or a possible erroneous sync1 pulse.

If first sync pulse 1904A does not align with either window 2005A, 2006A, it is ignored and synchronization may still be established with second synchronization pulse 1904B using substantially the same criteria for windows 2007A and 2008A that was described above for sync1 pulse 1904A with regard to windows 2005A and 2006A.

Synchronization may be achieved with either first or second synchronization pulses 1904A, 1904B. If first sync pulse 1904A is qualified, second sync pulse 1904B is ignored. To further explain the novel synchronization method, the criteria for locating the various windows, the width of the windows, and the elimination of spurious or missing pulses is described more completely below using FIGS. 21A to 21H. Herein, a reference to a window being open refers to the width of the window.

In FIGS. 21A to 21H, similar features have the same base reference numeral followed by a letter corresponding to the letter designating the figure. Rows 2152A to 2252H are one continuous radial magnetization pattern for a representative servo field 2700 of this invention. Servo field magnetization pattern 2252A to 2252H is broken into several pieces for ease of presentation only. Rows 2252A to 2152H represent a period of time equal to 333.3333 nanoseconds (8*41.66667) nanoseconds. Thus, the end of period 24 in row 2252B corresponds to about 8000 nanoseconds. Rows 2155E to 2258E and 2155F to 2158F represent clock interval TDC used to increment the DC gap counter. In this embodiment, each clock interval TDC is one-half the time period in row 2152. The reference numerals in the six hundreds in FIGS. 21A to 21H represent the time of the corresponding edge or feature in FIG. 20.

The use of a particular time in the Figures is illustrative only of one embodiment of the invention. The important aspect is not the actual time values, but as explained more completely below, the relative relationship of the various regions in the servo field and timing of the signals used to capture the information in the servo field.

Leading edge 2005A–L of sync1 DC reference window 2005A is selected assuming that the last bit in the Grey code cylinder address is properly read. As illustrated in FIG. 22E, the DC gap counter is reset by the negative pulse with a peak at the end of time period 49 in row 2151E. The DC gap counter is incremented by each of the clock ticks corresponding to the periods in row 2155E. When the DC gap counter reaches the count "11", as explained above, the DC erased gap is qualified and so hardware to generate sync1 DC reference window 2005A is enabled. On the next clock edge, i.e., the start of period 12 in row 2155E, leading edge 605A–L is triggered. Hence, sync1 DC reference window 2005A starts immediately, i.e., opens, after the DC erased gap is qualified.

The width of sync1 DC reference window 2005A is selected to assure proper reading of the position data in position sub-field 1706 if sync1 pulse 1904A falls within window 2005A, i.e, sync1 pulse 1904A occurs while window 2005A is open. As explained above, each pulse pair in position sub-field 1706 has a period of T1 and pulse pairs are spaced apart from each other by a period of T2, where periods T1 and T2 were defined above and period T2 is twice period T1. Hence, in this embodiment, if sync1 pulse 1904A falls within a window that is about 3*T1 in width, the position pulses in sub-field 306 are still correctly detected. Since period T1 is 208 nanoseconds, sync1 DC reference window 2005A is preferably less than 624 nanoseconds in width. Thus, the width of sync1 DC reference window 2005A was selected as 500 nanoseconds, i.e., three DC gap counter clock periods TDC wide, as shown in row 2155E.

In addition to assuring proper detection of the position data, this width window also compensates for normal variations in sampling the start of the DC erased gap. There may be up to one clock pulse delay in sampling the start of the DC erased gap in which case the DC gap counter would be incremented as shown in row 2156E. In this case, sync1 DC reference window 2005A would start one DC gap clock cycle later, but window 2005A is still three clock periods TDC wide. Hence, as shown in FIG. 21E, first sync mark 1804A falls within the window that is enclosed in box 2005A.

Thus, the first requirement for qualification of first sync pulse 1904A is that the pulse occur with a first predetermined time after a selected reference point in the servo field, i.e., the start of the DC erased gap. However, another qualification is also used to assure that proper timing is achieved.

The second qualification is derived from the previous synchronization pulse. As indicated above, the distance between synchronization pulses is a precise circumferential distance so that the time period between sync pulses is known. Thus, a counter could simply be started and when the counter reached the time interval between synchronization pulses, circuitry is enabled to capture the next sync pulse. However, this assumes that the spin speed of the disk is an unvarying constant. In fact, the spin speed varies about the specified speed "S" by an amount ±V. Thus, to allow for spin speed variation, a window with a width W2 is selected where width W2 is given by:

$$W2=(120/S)*(1/(\text{No. of sectors/track}))*(V/100)$$

where

S is the spin motor speed in revolutions per minute

V is allowed variation in spin motor speed expressed in percent.

In this embodiment, speed S is 3571 rpm. The number of sectors per track is seventy-two and speed variation V is ±0.2%. For these values, window width W2 is calculated as 0.93 microseconds. Hence, the width of window 2006A and 2008A was selected as one microsecond which is substantially equal to width W2. Window width W2 is centered about the point where the synchronization pulse would be located if the spin motor speed was in fact a constant, i.e., about 233 microseconds after the previous synchronization pulse.

As illustrated in FIG. 21F, the negative sync1 pulse starts at synchronization mark 1804A which is 56.25 time periods (row 2151F) after the start of write-to-read recovery region 1712. Therefore, first sync1 sector reference window is centered about this point and so starts at 55.75 time periods and ends 58.75 time periods after the start of write-to-read recovery region 1712, where the time period is 333.33 nanoseconds.

First sync1 pulse 1904A is not accepted unless it falls within sync1 DC gap reference window 2005A. An error is reported if it does not also fall within sync1 sector reference window 2006A. For example, if an error causes the DC erased gap to be prematurely detected, sync1 pulse 1904A would still be within sync1 sector reference window 2006A, but not within sync1 DC gap reference window 2005A which would have occurred at a much earlier time. Consequently, sync is not established in this case by sync1 pulse 1904A.

Even when sync is not established on sync1 pulse 1904A, sync may still be established with sync2 pulse 1904B. As explained above, to obtain sync from sync2 pulse 1904B, pulse 1904B must be coincident with sync2 DC gap reference window 2007A. The location and width of sync2 sector reference window 2008A are chosen in the same manner as described above for sync1 sector reference window except the window is centered about second sync mark 1804B which is about 233 microseconds after the second sync mark in the previous sector.

The leading edge and width of sync2 DC gap reference window 2007A are selected by considering the reasons why first sync pulse 1904A may be missed. If the last bit in the Gray code cylinder address is dropped or missing, the DC gap counter is started as shown in row 2157E, or in row 2158E with a sampling error. Consequently, sync1 DC gap reference window 2005A occurs to early. To capture sync2 pulse 1904B, the tolerances on sync2 DC gap reference window 2007A are greatly relaxed.

In this embodiment, window 2007A is started so that when the last Grey code bit is lost, window 2007A overlaps with the sync1 DC gap reference window 2005A when a sampling error occurs in determining the start of the DC erased gap as illustrated in rows 2156F and 2157F. Thus, as illustrated in FIG. 21F, the leading edge of the window is at 18.5*TDC which in this embodiment is about 3,083 nanoseconds after the start of the DC erased gap. In one embodiment, the DC gap counter is used to generate a signal at 18*TDC that in turn generates window 2007A.

The width of window 2007A is selected so that sync2 DC gap reference window 2007A extends at least one clock period TDC after the peak of sync2 pulse 1904B when the last bit in the Grey code cylinder address is lost. Thus, as shown in FIG. 21F, the window extends from 18.5*TDC seconds to 25.5*TDC after the start of the DC erased gap when the last bit in the Gray code cylinder address is dropped or missing as shown in row 2157E. Thus, sync2 DC gap reference window 2007A is 7*TDC seconds wide, e.g., about 1,167 nanoseconds.

Row 2155F illustrates the location of sync2 DC gap reference window 2007A when the start of the DC erased gap is detected normally. Row 2156F illustrates the location of sync2 DC gap reference window 2007A when the start of the DC erased gap is detected following a sampling error and row 2158F illustrates the location of sync2 DC gap reference window when the start of the DC erased gap is detected following a sampling error and when the last bit in the Gray code cylinder address is dropped or missing. In each of these cases, sync2 pulse 1904B falls within sync2 DC gap reference window 2007A.

When sync2 pulse 1904B falls within sync2 sector reference window 2008A and sync2 DC gap reference window 2007, sync is established. However, since a error must occur to not sync on sync1 pulse 1904A, an error is flagged and the write mode of operation is inhibited in one embodiment. If sync is obtained on sync1 pulse 1904A in the next sector, operation continues normally. However, after a predetermined number of consecutive syncs on sync2 pulse 1904B, typically three or four, a problem clearly exists and the disk drive must be resynchronized.

In prior art systems, if sync was lost on the sync1 pulse, resynchronization was necessary. However, the use of the novel method described above maintains sync even when sync on sync1 pulse 1904A is lost. Consequently, this method enhances operation of the disk drive over prior art systems. Specifically, FIGS. 22A to 22C illustrate in more detail the robustness of sync operation using the method of this invention.

Figure 22A:
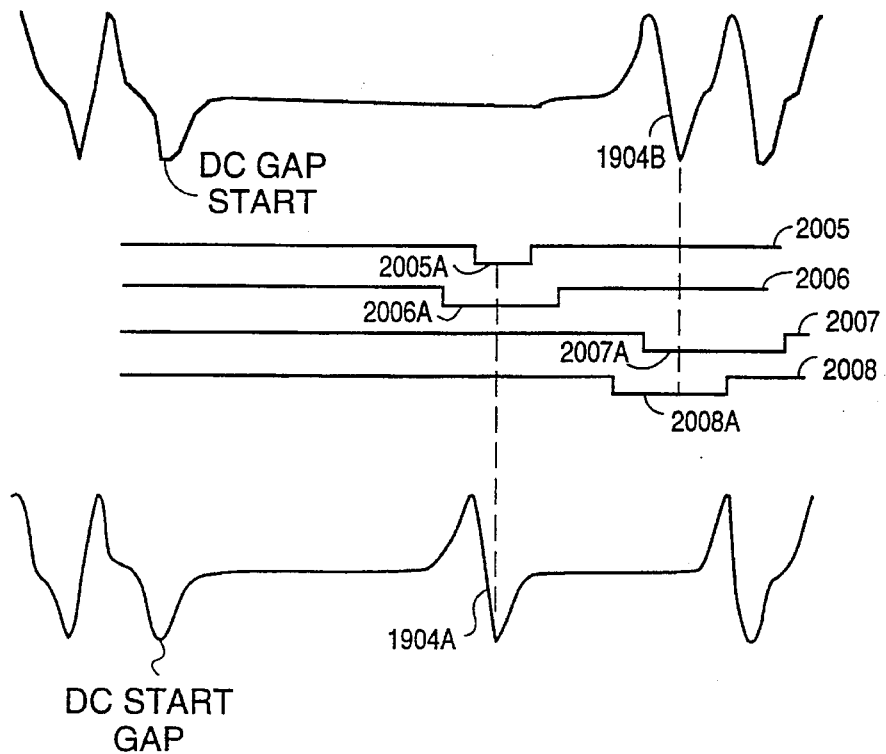
FIG. 22A to 22C illustrate the error immunity obtained in synchronization using the principles of this invention.

In FIG. 22A, sync1 pulse 1904A is missing. However, sync2 pulse 1904B is coincident with sycn2 DC gap reference window 2007A and sync2 sector reference window 2008A. Thus, sync is obtained with sync2 pulse 1904B. When sync is obtained from sync2 pulse 1904B, processing is transferred to a point in hardware so as to compensate for the time difference between sync1 pulse 1904A and sync2 pulse 1904B.

Figure 22B:
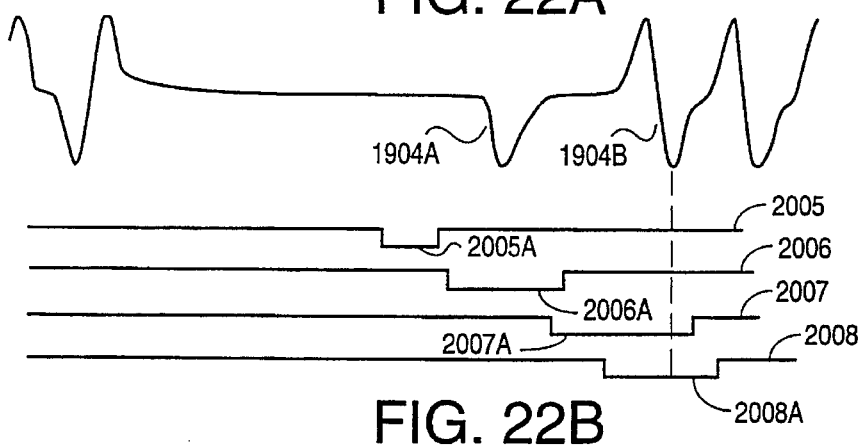

In FIG. 22B, the last bit in the Gray code cylinder address is missing and so the DC erased gap is qualified prematurely. Consequently, sync1 DC gap reference window 2005A occurs early and coincidence is not obtained between sync1 pulse 1904A and the two windows 2005A and 2006A. However, sync is maintained by capture of sync2 pulse 1904B.

Figure 22C:
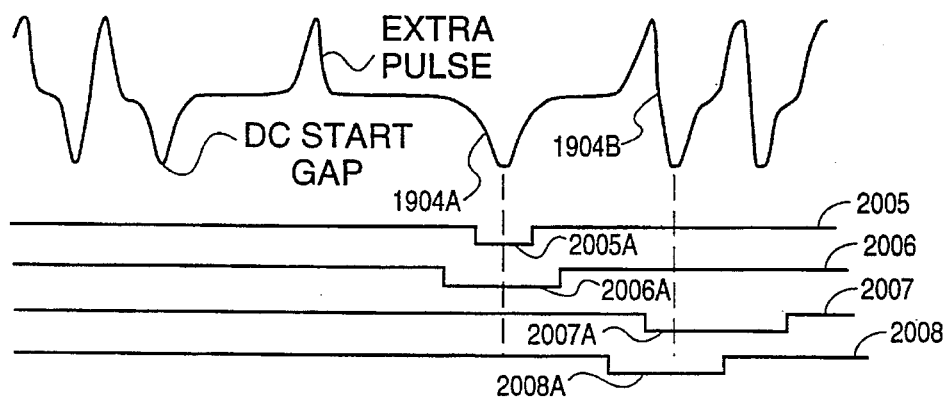

FIG. 22C illustrates an extraneous positive pulse which has no affect on the windows. Consequently, sync is obtained from sync1 pulse 1904A.

Another qualification of the sync timing is a measure of the accuracy with which the index and cylinder addresses are read sector to sector. If the index or gray code data bits are determined incorrect, the sync is suspect and appropriate action taken, e.g., a flag is set to indicate that if errors persist in subsequent sectors reading the index and gray code data bits, corrective action is required.

The use of the two windows in synchronization provides an easy means to provide further power reduction for a disk drive and maintain synchronization. Specifically, either the counter used for the sync DC gap reference window or the counter used for the sync sector reference window may be programmed to count for two sectors rather than one so that sync is established only for every other sector. This would permit the read channel to remain inactive over the servo field for the skipped over sector and thereby reduce power consumption. The extension to skipping 2, 3, 4, or even an arbitrary number of sectors follows the same principle and requires only an appropriate adjustment of the counters used. Hence, only a subset of the servo fields in a track are read thereby reducing power consumption when the disk drive is idle.

Figure 23:
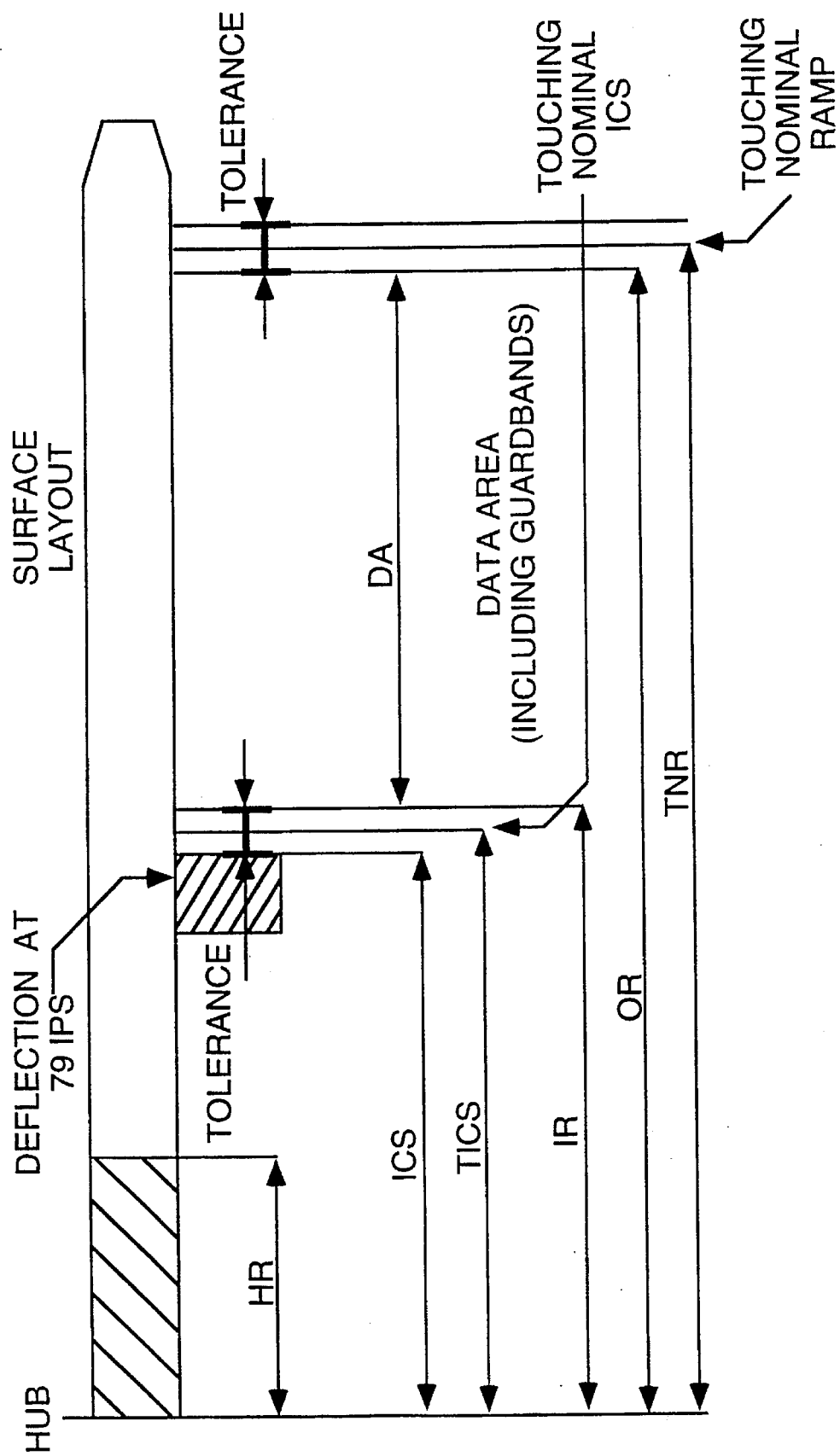
FIG. 23 is a cross-sectional view of one disk on which the prerecorded interleaved embedded servo system of this invention is used.
Figure 24:
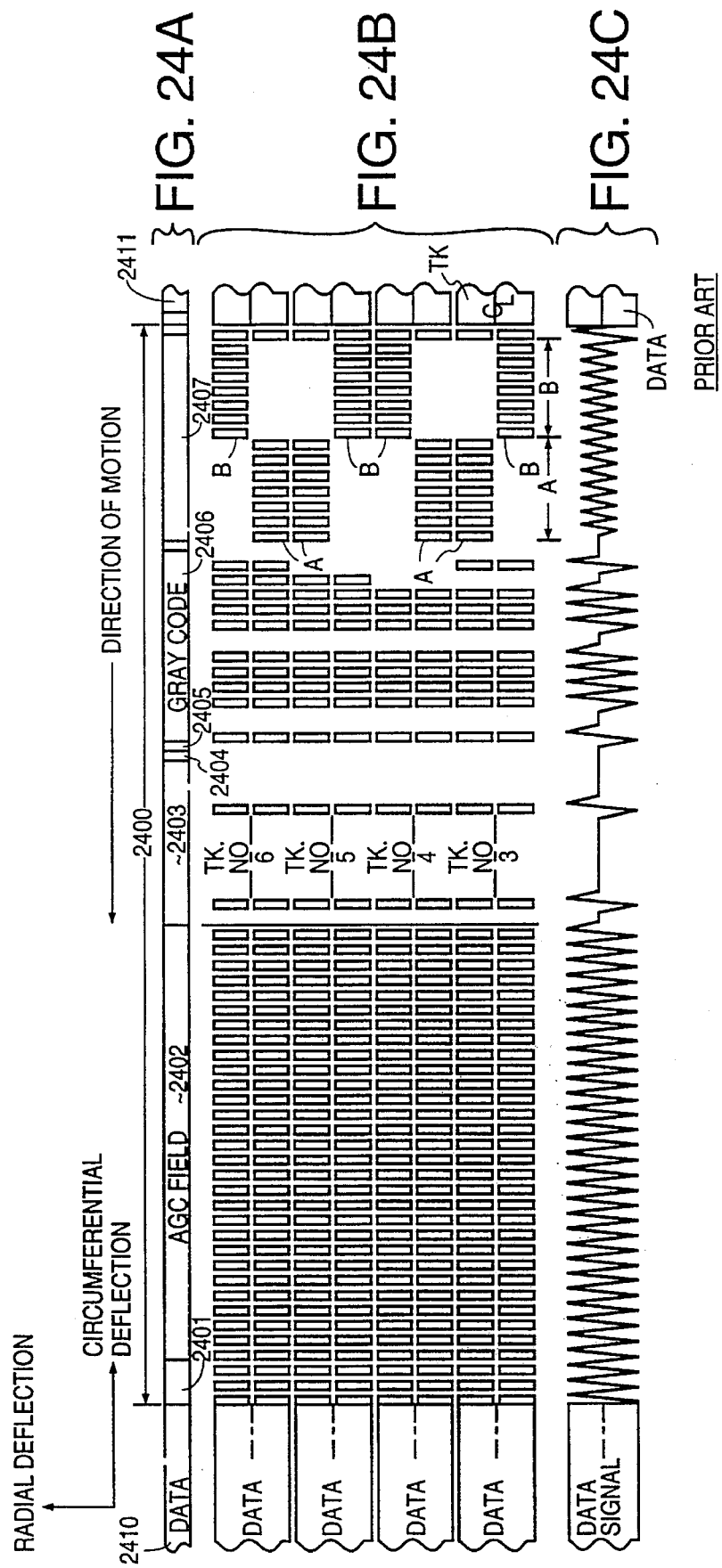
FIG. 24A is a linear representation of a prior art servo field.
FIG. 24B illustrates a typical magnetization pattern for the prior art servo field of FIG. 1A.
FIG. 24C is the signal trace associated with the magnetization pattern for track 3 in FIG. 1B.

FIG. 23 is a cross-sectional view of a disk on which the prerecorded embedded servo system of this invention is used in one embodiment. Inter radius IR of the disk data is about 13.4 mm and outer radius OR of the data area is about 22.1 mm. Hence, the data area DA of the disk including guard bands at the inner and outer radii is about 8.7 mm. The disk has a density of about 40,000 bpi and 1550 tracks per inch. The disk is mounted on a hub with a radius HR of about 6 mm. Inner crash stop ICS is at about a radius of 12.7 mm and is nominally touched at a radius ICS of about 13.1 mm. Loading/unloading ramp 1603 (FIG. 16) is nominally touched at a radius TNR of about 22.7 mm.

Alternatively, the servo system described and claimed in co-pending and commonly assigned U.S. patent application Ser. No. 07/630,475 of J. Blagaila et al. filed Dec. 19, 1990 entitled "Servo Field Scheme For High Sampling Rate", which is also incorporated herein by reference in its entirety, may be utilized in practicing the present invention.

Another problem with track following servo systems employed in high density disk drives is what is known as settling time, defined as the time after arrival on track when the transducer head position is centered on the track. Common practice has been to use a fixed timer to delay the onset of writing until a time greater than the worst case settling time has elapsed. Since many track seeking operations use short seeks resulting in rapid servo settling time, unnecessary delays can occur when reading or writing information. This problem is particularly severe when the disk drive is subjected to severe shock while reading or writing information resulting in unacceptably slow recovery time. This problem is addressed by incorporation of an adaptive method whereby the servo system determines, by way of preset limit conditions, if the transducer is on-track and settled within acceptable limits. Further advantages of this method are that the position servo stiffness, which is determined by the servo gain and bandwidth, can be reduced in order to avoid excitation of mechanical resonances that occur in conventional systems. Other adaptive means to improve track following without requiring increased servo bandwidth and sample rate are run-out and thermal compensation by microprocessor control.

Disk drives that employ an embedded sampled servo system cannot read or respond to track position information while writing contiguous sectors of information without significant overhead. The present invention incorporates staggered servo patterns, a dual read channel, and provisions for a head on another disk surface to read and supply data to the track following servo system. This method results in improved track following accuracy, noise immunity and spin motor velocity control.

According to the principles of this invention, a novel disk runout compensation system, which is described more completely below, is used in a miniature disk drive 1600 (FIG. 16). Disk drive 1600 contains one or more circular planar disks 1601. Each disk is coated on at least one side with a magnetic medium as in the prior art disk. Data are recorded by read/write head 1602 in concentric circular tracks on the disk, e.g. tracks 1621-i and 1621-(i+1). Corresponding tracks on different disk surfaces are approximately cylindrically aligned.

Each track is segmented into one or more sectors SCT-01, SCT-02, . . . , SCT-n by prerecorded information in embedded servo field regions 1620-1 through 1620-n. Each servo field region 1620-j where j=1, 2, . . . , n, includes m servo fields, where m is the number of concentric circular data tracks on disk, i.e., one servo field in each data track at position j for a total of nm servo fields per surface. In one embodiment, as described more completely below, disks 1601 are 1.89 inches (48 mm) in diameter and have 632 data tracks.

The interface of disk drive 1600 with a computer system and the electronics required in conjunction with an embedded servo system to read and write data on disk 1601 in response to signals from a disk controller to interface connection 1615 are known to those skilled in the art. The radial and circumferential positioning of read/write head 1602 using embedded servo data and a servo system is also well known. In this particular system, the servo system includes R/W preamp 1605, combined read/write circuit 1606, actuator A/D and D/A circuit 1612, actuator driver circuit 1613, gate array 1611, and microcontroller 1610.

In addition, microcontroller 1610 has access to memory 1650 for storing and retrieving data. Upon power-up of disk drive 1600, firmware for a proportional integral difference (PID) servo compensator, seek control, and a secondary servo compensator of this invention in ROM 1609 is loaded into microcontroller 1610. In this embodiment microcontroller 1610 is a 46100(HPC+) microprocessor supplied by National Semiconductor of Santa Clara, Calif.

The servo compensator in microcontroller 1610 receives a digital position error signal for a sector in the track and determines the position correction needed to position read/write head 1602 over the centerline of the track for that sector. The position correction is used to generate a servo compensation signal for that sector. The servo compensator applies a gain factor to the servo compensation signal to create a digital actuator position adjustment signal for that sector.

Microcontroller 1610 sends the digital actuator position adjustment signal to a D/A converter that resides in actuator A/D and D/A circuit 1612. The actuator position adjustment signal is processed and applied to the actuator in a conventional fashion. This process is sequentially repeated for each sector in a track.

Disk 1601 is clamped to the disk drive as described in copending, commonly assigned and concurrently filed herewith, U.S. patent application No. 07/765,358, entitled "Clamp for Information Storage Disk," of James Dunckley, which is incorporated herein by reference in its entirety. The disk clamp does not apply sufficient pressure on disk 1601 to hold it rigidly in place about the center of rotation 1630 of disk drive 1600. Therefore, if disk drive 1600 is subjected to vibration or shock, disk 1601 is likely to be radially displaced and the center of the disk will be displaced from true center of rotation 1630. As explained above, the servo system can not reliably position read/write head 1602 in these circumstances.

Figure 25:
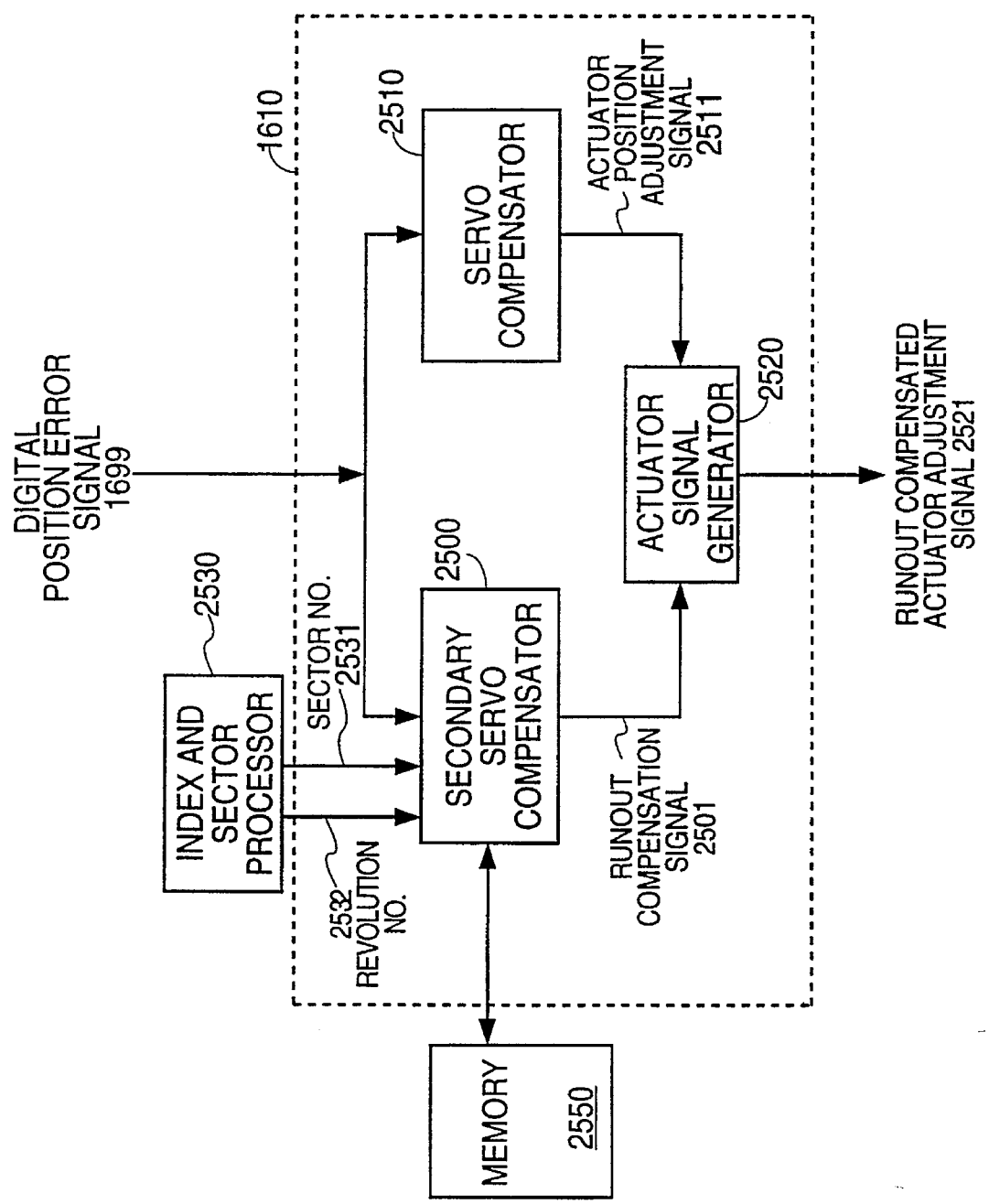
FIG. 25 is a block diagram of the adaptive runout compensation system of this invention that illustrates its relationship with the servo compensator of the disk drive.

Thus, according to the principles of this invention, a secondary servo compensator 2500 (FIG. 25) is provided in microcontroller 1610. Secondary servo compensator 2500 functions independently of servo compensator 2510 and provides on-line real-time compensation for disk runout that occurs during operation of disk drive 1600. Specifically, servo compensator 2510 receives position error signal 1699 and generates actuator position adjustment signal 2511, as described above. Simultaneously, secondary servo compensator 2500 receives position error signal 1699, and as described more completely below, analyzes the disk runout and simultaneously generates a runout compensation signal 2501 during operation of disk drive 1600, i.e., while disk drive 1600 is idle, reading, or writing.

Actuator signal generator 2520 combines actuator adjustment signal 2511 that is generated using position error signal 1699 from sector "i" and runout compensation signal 2501 that is generated using position error signal 1699 for sector "i–1" to create a runout compensated actuator signal 2521 for sector "i". Here "i" is a sector number. Hence, the runout compensation is fed forward when microcontroller 1610 provides runout compensated actuator adjustment signal 2521 to the servo system. The servo system, using the information from servo compensator 2510 and secondary servo compensator 2500, continuously maintains read/write head 1602 over the desired track centerline independent of the offset of the center of disk 1601 from true center of rotation 1630.

Unlike prior art systems, that required multiple revolutions to generate a runout correction and was useful only upon start-up of the disk drive before a read or a write was performed, secondary servo compensator 2500 continuously monitors the position of disk 1601 relative to true center of rotation 1630 and generates runout compensation signal 2501 while disk 1601 is being used. Since runout compensation signal 2501 is generated during operation of miniature disk drive 1600, the adaptive runout compensation is transparent to the user.

Index and sector processor 2530 provides secondary servo compensator 2500 sector number 2531 over which read/write head 1602 is positioned and a revolution number 2532. One embodiment for encoding the index and sector data in the embedded servo field for uniquely identifying each sector and rapidly establishing index is disclosed in copending, commonly assigned, and concurrently filed herewith U.S. patent application No. 07/765,348 entitled "An Embedded Servo System For Low Power Disk Drives" of Stephen Cowen, which is incorporated herein by reference in its entirety.

Figure 26:
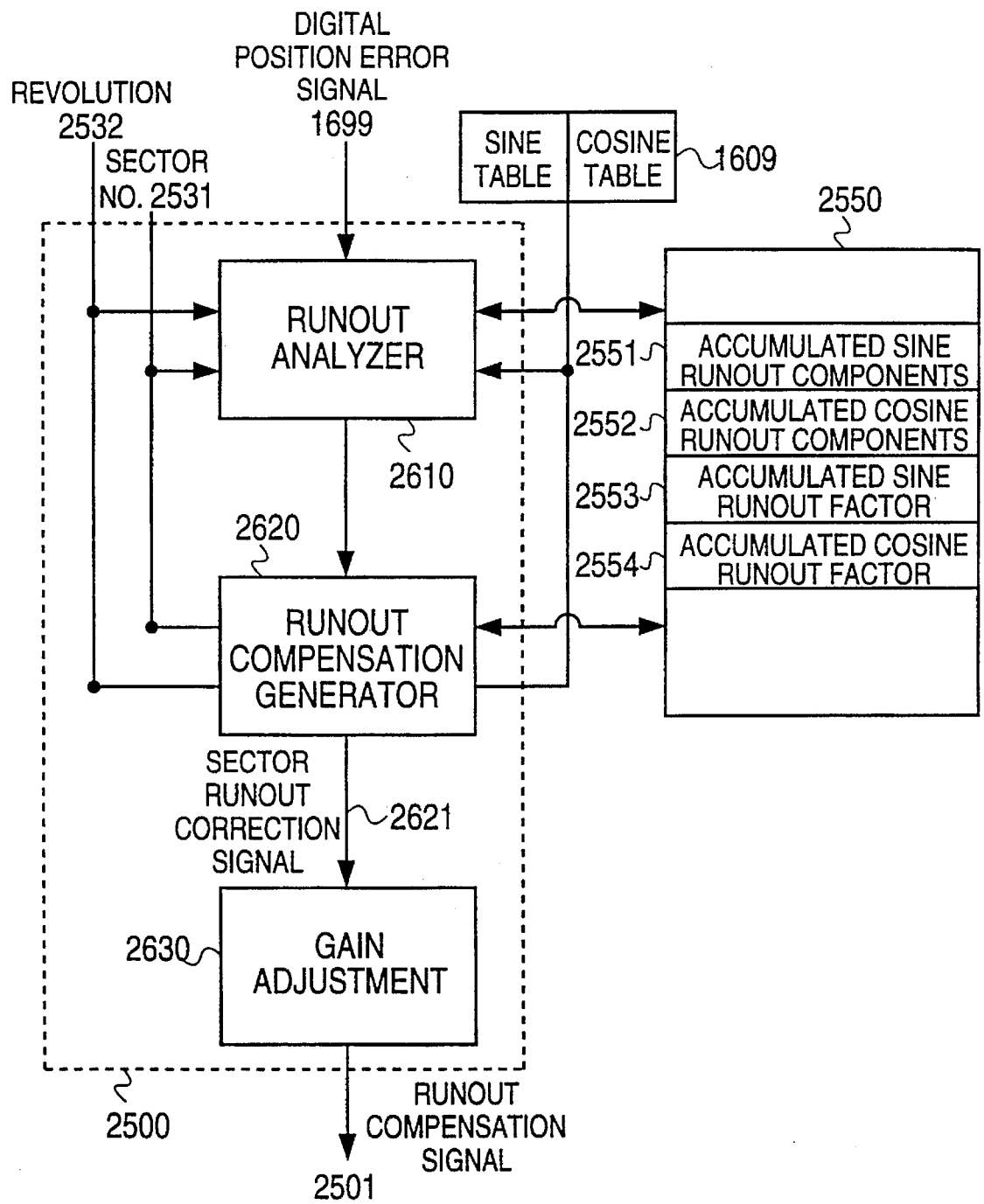
FIG. 26 is a detailed block diagram of the secondary servo compensator of this invention.
Figure 27A:
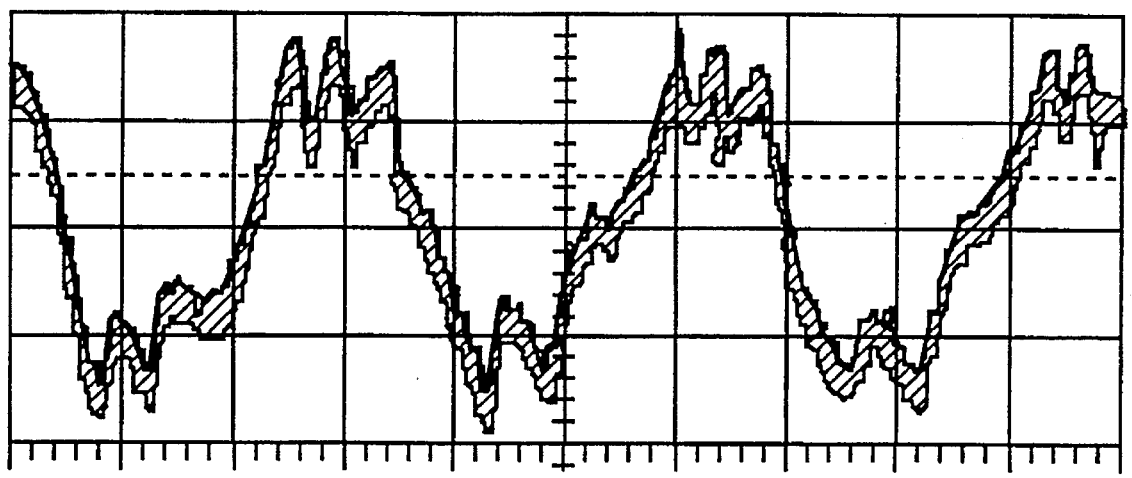
FIG. 27A is an example of a position error signal.

FIG. 26 is a more detailed block diagram of secondary servo compensator 2500. Secondary servo compensator 2500 includes a runout analyzer 2610 and a runout compensation generator 2620 that each receive sector number 2531 and revolution number 2532 from index and sector processor 2530. Runout analyzer 2610 sequentially receives digital position error signal 1699 for each sector in a track, i.e., for each sector in a revolution of disk 1601. Position error signal 1699 contains many harmonic and non-repetitive components for disturbances other than runout, such as windage, bearing noise and servo settling transients. For example, FIG. 27A illustrates a typical position error signal 1699. Runout analyzer 2610 filters position error signal 1699 to obtain the fundamental runout frequency sector by sector.

The filtering process in runout analyzer 2610 preferably starts with the index sector and proceeds for each sector in a track. The filtering process separates the sector runout component from the position error signal during the sector period. The sector runout component for each sector in a predetermined number of analysis revolutions n of disk 1601 are accumulated in memory 2550, i.e., each sector runout component is added to the sum of sector runout components stored in memory 2550.

After all the sectors in the predetermined number of analysis revolutions n are processed, runout analyzer 2610 produces an averaged value of the sector runout components accumulated in memory 2550. The averaged value is a runout factor that is also stored in memory 2550. As explained more completely below, during the predetermined number of analysis revolutions n, runout compensation generator 2620 is continuously generating, sector by sector, runout compensation signal 2501.

As the next revolution of disk 1601 starts after the predetermined number of analysis revolutions n, the sector runout components from runout analyzer 2610 are not accumulated in memory 2510 and are simply ignored. As runout compensation generator 2620 receives the sector number for each sector in the next revolution of disk 1601, generator 2620 uses the runout factor stored in memory 2550 to generate a sector runout correction signal 2621 for that sector.

Sector runout correction signal 2621 is provided to gain adjustment means 2630. In one embodiment, gain adjustment means 2630 multiplies the sector runout correction signal 2621 by the same gain factor that is used in servo compensator 2510 to generate runout compensation signal 2501. However, the gain factor used in gain adjustment means 2630 may be equal or less than the gain factor in servo compensator 2510. In some servo systems, the gain factor used in gain adjustment means 2630 is less than the gain factor used in servo compensator 2510 to maintain stability of the servo system.

Since runout analyzer 2610 and runout compensation generator 2620 require about one sector period to produce the runout compensation, runout compensation signal 2501 is fed forward to the next sector. Hence, runout compensation signal 2501 for sector "i−1" is combined with actuator position adjustment signal 2511 for sector "i" by actuator signal generator 2520 as described above, where sector "i" is adjacent to and follows sector "i−1" in a revolution.

The output from runout analyzer 2610 is not used in this revolution to permit settling of the servo system. While a single settling revolution is described herein, the important factor is to provide sufficient revolutions for the servo system to settle before further adjusting the runout compensation.

After the servo settling revolution, runout analyzer 2610 and runout compensator generator 2620 are both utilized on the next revolution of disk 1601 to maintain read/write head 1602 properly positioned. Runout compensation generator 2620 continues to generate sector by sector runout compensation signal 2501 as just described, i.e., using the runout factor from the prior runout analysis that is stored in memory 2550. Simultaneously, runout analyzer 2610 produces a new runout factor for the predetermined number of analysis revolutions n. Thus, secondary servo compensator 2500 is updating the runout error data at the same time as it is compensating for runout.

After all the sectors in the predetermined number of analysis revolutions n are processed, a new runout factor is produced for the n revolutions. The new runout factor is added to the runout factor stored in memory 2550 and the accumulated runout factor is then stored in memory 2550, i.e., the runout factor is updated. Thus, runout analyzer 2610 includes a means for accumulating the runout factor during operation of disk drive 1600.

After the runout factor is updated, the output from runout analyzer 2610 is ignored during the next revolution of disk 1601 and runout generator 2620 operates using the accumulated runout factor in memory 2550. This sequence of (i) generating a runout compensation signal and simultaneously analyzing the runout sector by sector for a predetermined number of revolutions, and (ii) generating a runout compensation signal for a single revolution to allow the servo system to settle is repeated continuously.

Thus, memory 2550 contains a runout factor that is a summation over time of averaged sector by sector runout components. As is known to those skilled in the art, such a summation tends to smooth the response of a system and ameliorate problems associated with short transients. Also, the accumulation of runout factors over time prevents discontinuities and assures that read/write head 1602 is maintained over the track centerline. Secondary servo compensator 2500 provides a reliable continuous on-line real time runout compensation signal so that data is not overwritten as a consequence of disk slippage that occurs during operation. Hence, secondary servo compensator 2500 provides adaptive runout compensation for miniature disk drives.

A more detailed description of one embodiment of the adaptive runout compensation system of this invention is given below. This embodiment is illustrative only of a preferred embodiment of the invention and is not intended to limit the invention to the particular embodiment described.

In this embodiment, the filtering process used in runout analyzer 2610 is a discrete Fourier transform. As is known to those skilled in the art, the Fourier transform decomposes periodic waves forms into sine and cosine components. Here, only one frequency, disk runout, is of interest. The discrete Fourier transform separates the disk runout from the position error signal and gives a cosine runout component and a sine runout component, i.e., the runout component has two parts in this embodiment.

To create a period for the sine and cosine functions used in the discrete Fourier transform, one revolution of disk 1601 is taken as the period. Thus, the sine and cosine functions are evaluated for each sector in the track where the sectors are numbered from zero to (m−1) and where in this embodiment m is 72.

The discrete Fourier transform generates two runout transform terms, sometimes referred to as runout components. The first runout component is given by:

$$\text{SineRunout}_S = PES \cdot \sin\left[\frac{2\cdot\pi}{(\text{Tot}\cdot\text{Sectors})} \cdot S\right] \quad (1)$$

where

S=sector number being analyzed where S=0, 1, . . . ,((Tot. Sectors)−1);

Tot. Sectors=total number of sectors per disk revolution; and

PES=the position error signal

Similarly, the second runout component is given by:

$$\text{CosineRunout}_S = PES \cdot \cos\left[\frac{2\cdot\pi}{(\text{Tot}\cdot\text{Sectors})} \cdot S\right] \quad (2)$$

where

S=number of sector being analyzed where S=0, 1, . . . ,((Tot. Sectors)−1);

Tot. Sectors=total number of sectors per disk revolution; and

PES=the position error signal.

In this embodiment, second runout components "CosineRunout$_S$" and first runout components "SineRunout$_S$" are each accumulated in memory 2550 for the predetermined number of analysis revolutions n. Secondary servo compensator 2500 runs in real time and so the runout must be analyzed and runout compensation generated within a sector period. Hence, to speed operation of secondary servo compensator 2500, the cosine term in second runout component "CosineRunout$_S$" and the sine term in first runout component "SineRunout$_S$" are not repeatedly calculated. Rather, a table of the cosine terms for each sector and a table of the sine terms for each sector are accessed in ROM 1609. Of course, microcontroller 1610 could be used to generate the sine and cosine terms once upon power-up of the disk driven and the resulting tables could be stored in memory 2550.

The representational values used in one embodiment of the sine table and the cosine table are given in Tables 1.2 and 2.2 respectively. The values given are in decimal. These numbers are mapped to byte values, i.e., seven data bits plus a sign bit.

TABLE 1.2

SINE TERM TABLE

| Sector No. | Sine Term |
|---|---|
| 0 | 0 |
| 1 | −11 |
| 2 | −22 |
| 3 | −33 |
| 4 | −43 |
| 5 | −54 |
| 6 | −64 |
| 7 | −73 |
| 8 | −82 |
| 9 | −90 |
| 10 | −97 |
| 11 | −104 |
| 12 | −110 |
| 13 | −115 |
| 14 | −119 |
| 15 | −123 |
| 16 | −125 |
| 17 | −127 |
| 18 | −127 |
| 19 | −127 |
| 20 | −125 |
| 21 | −123 |
| 22 | −119 |
| 23 | −115 |
| 24 | −110 |
| 25 | −104 |
| 26 | −97 |
| 27 | −90 |
| 28 | −82 |
| 29 | −73 |
| 30 | −63 |
| 31 | −54 |
| 32 | −43 |
| 33 | −33 |
| 34 | −22 |
| 35 | −11 |
| 36 | 0 |
| 37 | 11 |
| 38 | 22 |
| 39 | 33 |
| 40 | 43 |
| 41 | 54 |
| 42 | 64 |
| 43 | 73 |
| 44 | 82 |
| 45 | 90 |
| 46 | 97 |
| 47 | 104 |
| 48 | 110 |
| 49 | 115 |
| 50 | 119 |
| 51 | 123 |
| 52 | 125 |
| 53 | 127 |
| 54 | 127 |
| 55 | 127 |
| 56 | 125 |
| 57 | 123 |
| 58 | 119 |
| 59 | 115 |
| 60 | 110 |
| 61 | 104 |
| 62 | 97 |
| 63 | 90 |
| 64 | 82 |
| 65 | 73 |
| 66 | 63 |
| 67 | 54 |
| 68 | 43 |

TABLE 1.2-continued

SINE TERM TABLE

| Sector No. | Sine Term |
|---|---|
| 69 | 33 |
| 70 | 22 |
| 71 | 11 |

TABLE 2.2

COSINE TERM TABLE

| Sector No. | Cosine Term |
|---|---|
| 0 | 127 |
| 1 | 125 |
| 2 | 123 |
| 3 | 119 |
| 4 | 115 |
| 5 | 110 |
| 6 | 104 |
| 7 | 97 |
| 8 | 90 |
| 9 | 82 |
| 10 | 73 |
| 11 | 63 |
| 12 | 54 |
| 13 | 43 |
| 14 | 33 |
| 15 | 22 |
| 16 | 11 |
| 17 | 0 |
| 18 | −11 |
| 19 | −22 |
| 20 | −33 |
| 21 | −43 |
| 22 | −54 |
| 23 | −64 |
| 24 | −73 |
| 25 | −82 |
| 26 | −90 |
| 27 | −97 |
| 28 | −104 |
| 29 | −110 |
| 30 | −115 |
| 31 | −119 |
| 32 | −123 |
| 33 | −125 |
| 34 | −127 |
| 35 | −127 |
| 36 | −127 |
| 37 | −125 |
| 38 | −123 |
| 39 | −119 |
| 40 | −115 |
| 41 | −110 |
| 42 | −104 |
| 43 | −97 |
| 44 | −90 |
| 45 | −82 |
| 46 | −73 |
| 47 | −63 |
| 48 | −54 |
| 49 | −43 |
| 50 | −33 |
| 51 | −22 |
| 52 | −11 |
| 53 | 0 |
| 54 | 11 |
| 55 | 22 |
| 56 | 33 |
| 57 | 43 |
| 58 | 54 |
| 59 | 64 |

TABLE 2.2-continued

COSINE TERM TABLE

| Sector No. | Cosine Term |
|---|---|
| 60 | 73 |
| 61 | 82 |
| 62 | 90 |
| 63 | 97 |
| 64 | 104 |
| 65 | 110 |
| 66 | 115 |
| 67 | 119 |
| 68 | 123 |
| 69 | 125 |
| 70 | 127 |
| 71 | 127 |

Prior to considering the use of the discrete Fourier transform in runout analyzer 2610, the predetermined number of revolutions n used by runout analyzer 2610 must be defined. The minimum number of predetermined revolutions is one. However, to obtain better sampling, a larger number of revolutions is preferred. The maximum number of revolutions is limited by the word length used to store the accumulated runout factor in memory 2550 and the maximum radial displacement of disk 1601.

If the accumulated runout factor overflows for the maximum displacement, the runout compensation becomes meaningless. In this embodiment, the word length is 16 bits and considering the maximum radial displacement of disk 1601, four revolutions were selected as the predetermined number of analysis revolutions.

Figure 28:
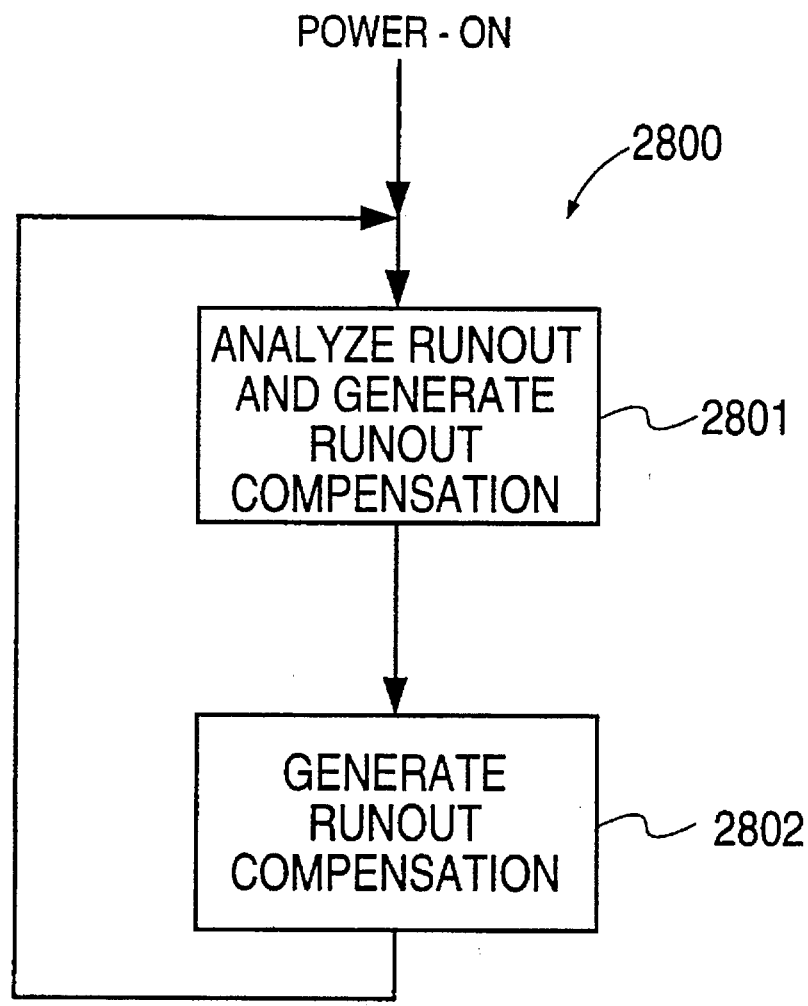
FIG. 28 is a flow diagram of the adaptive runout compensation method of this invention.

The first step in adaptive compensation method 2800 of this invention is analyze runout and simultaneously generate runout compensation 2801 (FIG. 28). Upon power-up of disk drive 1600, memory locations in memory 2550 that are used by secondary servo compensator 2500 are zeroed. When the disk reaches a valid spin speed, secondary servo compensator 2500 is started.

Runout compensation generator 2620 generates a null signal for runout compensation during the first predetermined number of analysis revolutions n after a valid spin speed is reached. As explained above, runout compensation generator 2620 uses the runout factor stored in memory 2550 to generate runout correction signal 2621. Since initially the stored runout factor is zero, sector runout correction signal 2621 for each sector in a revolution is also zero, and consequently runout compensation signal 2501 is zero.

For each sector for the predetermined number of analysis revolutions n, runout analyzer 2610 retrieves the sine term from the sine table (TABLE 1.2 above) in ROM 1609 for sector number 2531 received from index and sector processor 2530. Runout analyzer 2610 multiplies the sine term by position error signal 1699 for sector number 2531 to obtain first runout component "SineRunout$_S$" for that sector. First sector runout components "SineRunout$_S$" are accumulated in location 2551 in memory 2550. Specifically, each sector runout component "SineRunout$_S$" is added to the accumulated sum of first sector runout components stored in location 2551 and the new accumulated sum is saved in location 2551.

Similarly, for each sector for the predetermined number of analysis revolutions n, runout analyzer 2610 retrieves the cosine term from the cosine table (TABLE 2.2 above) in ROM 1609 for sector number 2531 received from index and sector processor 2530 and multiplies the cosine term by position error signal 1699 to obtain second sector runout component "CosineRunout$_S$". The second sector runout components are accumulated in memory 2550 at location 2552.

Thus, the value at location 2551 in memory 2550 after the n analysis revolutions is:

$$\text{Accumulated SineRunout} = \sum_{F=0}^{n-1} \sum_{S=0}^{m-1} \text{SineRunout}_S \quad (3)$$

where

S=sector number being analyzed where S=0, 1, . . . ,(m−1);

m=total number of sectors per disk revolution;

F=revolution number being analyzed where F=0, 1, . . . , (n−1); and n=predetermined number of analysis revolutions.

and the value at location 2552 in memory 2550 after the n analysis revolutions is:

$$\text{Accumulated CosineRunout} = \sum_{F=0}^{n-1} \sum_{S=0}^{m-1} \text{CosineRunout}_S \quad (4)$$

where

S=sector number being analyzed where S=0, 1, . . . , (m−1);

m=total number of sectors per disk revolution;

F=revolution number being analyzed where F=0, 1, . . . , (n−1); and n=predetermined number of analysis revolutions.

Recall that runout analyzer 2610 produces a runout factor using the accumulated sector runout component stored in memory 2550. Since the accumulated sector runout component is separated into accumulated sine runout components and accumulated cosine runout components in this embodiment, the runout factor is also separated into a sine runout factor and a cosine runout factor. Hence, after each sector in the predetermined number of analysis revolutions n has been processed, runout analyzer 2610 forms a sine runout factor, "SineFactor", that is an averaged value of the accumulated sine runout components. Specifically, the sine runout factor is:

$$\text{SineFactor} = 2 \cdot \frac{[\text{Accumulated SineRunout}]}{m \cdot n} \quad (5)$$

where n=predetermined number of analysis revolutions; and m=total number of sectors per disk revolution;

The cosine runout factor, i.e., the averaged value of the cosine runout components, is:

$$\text{CosineFactor} = 2 \cdot \frac{[\text{Accumulated CosineRunout}]}{m \cdot n} \quad (6)$$

where n=predetermined number of analysis revolutions m=total number of sectors per disk revolution;

The sine runout factor and the cosine runout factor are stored in memory 2550 at locations 2553 and 2554, respectively. As explained above, in this embodiment, locations 2553 and 2554 are each 16 bits in length. This completes step 2801 of adaptive runout compensation method 2800 of this invention.

In generate runout compensation step 2802 of adaptive runout compensation method 2800, which begins on the next revolution of disk 1601 following the predetermined number of analysis revolutions n in step 2801, the two runout components from runout analyzer 2610 for each sector are not accumulated in memory 2550. For each sector, as indicated by sector number 2531, runout compensation generator 2620 first retrieves the appropriate sine term from the sine table (TABLE 1.2 above) in ROM 1609 for the sector number and then multiplies the sine term by the sine runout factor retrieved from memory location 2553 to form an inverse sine transform term.

Similarly, runout compensation generator 2620 retrieves the appropriate cosine term from the cosine table (TABLE 2.2 above) in ROM 1609 for the sector number and multiplies the cosine term by the cosine runout factor retrieved from memory location 2554 to form an inverse cosine transform term. The inverse cosine transform term and the inverse sine transform term are summed by runout compensation generator 2620 to generate sector runout correction signal 2621 for that sector. Specifically,:

$$\text{Sine Compensation}_S = \text{SineFactor} \cdot (\text{Sine Term})_S \quad (7)$$

where $$(\text{Sine Term})_S = \text{value in Table 1.2 for sector S;}$$

and $$\text{Cosine Compensation}_S = \text{CosineFactor} \cdot (\text{Cosine Term})_S \quad (8)$$

where $$(\text{Cosine Term})_S = \text{value in Table 2.2 for sector S.}$$

$$\text{Runout Correction Signal}_S = \text{Sine Compensation}_S + \text{Cosine Compensation}_S \quad (9)$$

Gain adjustment means 2630 multiplies sector runout correction signal 2621 by the gain factor, as described above, to generate runout compensation signal 2501. In this embodiment, actuator signal generator 2520 sums runout compensation signal 2501 for sector "i−1" with actuator adjustment signal 2511 for sector "i" to generate runout compensated actuator signal 2521 for sector "i", as explained above.

Also, as described above, the generation of actuator position adjustment signal 2511 is well-known to those skilled in the art. Similarly, conversion of digital runout compensated actuator adjustment signal 2521 to an analog signal and use of the analog signal to position read/write head 1602 are well-known because the process is identical to the process that was previously used for the uncompensated actuator position adjustment signal.

After each sector in the track is processed in generate runout compensation step 2802 of adaptive runout compensation method 2800, processing returns to analyze runout and generate runout compensation step 2801. In this step, the runout analysis and runout generation are again simultaneously performed.

For each of the predetermined number of analysis revolutions n in this step, runout compensator 2620 uses the runout factors at locations 2553 and 2554 respectively to generate runout compensation signal 2501 for each sector. Similarly, the accumulation of sine runout components and cosine runout components for the n analysis revolutions is started over. After each sector in the predetermined number of analysis revolutions n has been processed, runout analyzer 2610 forms a new sine runout factor "SineFactor" using the new accumulated sine runout components in location 2551 for the n analysis revolutions and a new cosine runout factor "CosineFactor" using the new accumulated cosine runout components in location 2552 for the n analysis revolutions.

The new sine runout factor is added to the sine runout factor "SineFactor" in location 2553 and the new cosine runout factor is added to the cosine runout factor "CosineFactor" in location 2554 by runout analyzer 2601. Thus, the two runout factors are accumulated over time while disk drive 1600 is operating. This completes step 2801 and processing transfers to step 2802.

Figure 27B:
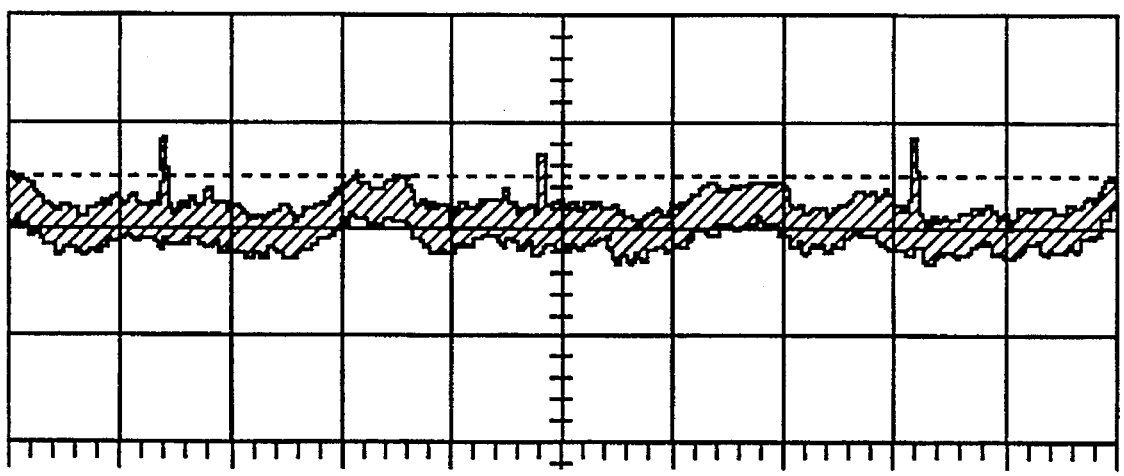
FIG. 27B illustrates the position error signal after the adaptive runout compensation method of this invention is used to process the signal of FIG. 27A.

FIG. 27B illustrates the position error signal after the position error signal of FIG. 27A is processed by adaptive runout compensation method 2800 of this invention. Notice that the large harmonic oscillations are eliminated so that read/write head 1602 is following the track centerline even though the center of disk 1601 is displaced from the center of rotation 1630.

The sampling provided by analyzing the runout for a predetermined number of revolutions reduces the effects of spurious noise and enhances the runout correlation. Similarly, the accumulation of the runout factors over time provides stability and assures that the runout compensation accurately follows the disk runout. If track position is lost due to a shock or any other reason, secondary servo compensator 2500 is disabled until track position is reestablished.

Rigid disk drives 1 and 4 utilize miniature read/write transducers 5, known as 50% heads, which have mean dimensions approximately one-half those of the previously known thin-film heads. Read/write transducers 5 may be ferrite monolithic or composite type devices employing various writing and reading gap structures such as metal-in-gap (MIG). Other types of heads such as thin-film ring or magneto-resistive types may be employed. Advantages of 50% sliders are decreased foot print, allowing more information tracks to be placed on a disk, lower susceptibility to EMI, and less than one-eighth the mass of conventional sized heads proportionately reducing displacement forces when accelerations due to external shocks and impacts are encountered. In order to maintain high recording density from inner to outer tracks, heads with nearly constant flying height are used, employing modified air-bearing designs such as TPC, cross slot designs and negative pressure methods, allowing mapping of additional information sectors at outer radii to achieve increased areal storage efficiency. Read/write transducers 5 are illustrated in FIGS. 1, 5A, 5B, 6H, 6I, 6K and 6B.

Improvements in VLSI semiconductor technology, combined with other benefits derived from using a disk having a diameter of about 33.5 mm (1¼ inches), have reduced component count and power requirements. This has made it possible for servo, read/write and spin motor control electronics to be incorporated within the housing of rigid disk drives 1 and 4 as part of the internal disk drive assembly flexible circuit interconnect. Using TAB or COB (Chip On circuit Board) techniques automated assembly methods and higher circuit densities are practical at reduced cost. Increasing the number of electronic components in the disk drive assembly housing reduces the number of external components, resulting in greater effective volumetric packaging density, reduced spin motor noise pickup, shielding of critical analog circuits from interference from external noise sources, and reduction in the required number of external interconnects. This feature is described in detail in conjunction with FIG. 7B. An important object of this feature is to eliminate external analog signals by digital signal processing within the disk drive enclosure, thereby providing for an all digital interface between the components within the disk drive enclosure and the disk drive components which are external of the disk drive housing.

The computer system interface to disk drives 1 and 4 may be any of a number of industry standard types such as low power SCSI or AT Bus. One implementation of the digital disk drive assembly interface such as illustrated in FIG. 7b allows direct circuit board interconnection to the host computer, providing smaller disk drive package volume, fewer electrical interconnections, and reduced power consumption by the elimination of complex bus interface. System physical interconnect means for such a small disk drive have become a major problem as the size of available connectors approaches that of the disk drive. One solution is to use flexible circuit connection means, where the terminating end is either soldered directly to the host or to a zero insertion force flex circuit connector.

As disk drives have been reduced in size their physical mounting has become a problem. Present methods require special mounting hardware, such as the miniature screws employed in making watches, which are impractical to use in mass produced electronic assemblies. This invention anticipates methods such as clam-shell or trapped mounting thereby entirely eliminating the need for conventional mounting means. This invention also incorporates features described and claimed in commonly assigned U.S. Pat. No. 5,161,770 of J. Morehouse et al. issued Nov. 10, 1992, entitled "Shock Absorbent Mounting Arrangement For Disk Drive or Other Component", which is incorporated herein by reference in its entirety.

Referring to FIG. 1, microminiature hard disk drive 1 is illustrated in exploded perspective in view, along with printed circuit board 2 which is positioned beneath hard disk drive 1. Rigid disk drive 1 includes baseplate 6 which may be comprised of cast aluminum material. Baseplate 6 is a solid unitary structure which it includes an opening 7 which is, after assembly, closed by the mounting of spin motor 3, the peripheral edge of which extends slightly beyond the edge of opening 7. In addition to opening 7, an opening 8 is provided to permit air flow between the interior of the enclosure and the exterior. A suitable air filter 9, having an external diameter larger than the internal diameter of opening 8 is sealed to baseplate 6 to filter the air which enters the enclosure to prevent contaminating the interior of the disk drive. A substantially flat magnetic disk 10 is supported on spindle 11 for rotation. Magnetic disk 10 is suitably attached to spindle 11 to the use of a disk clamp 12. Although various forms of clamping mechanisms may be utilized to securely attach magnetic disk 10 to spindle 11 of spin motor 3, a particularly advantageous disk clamp is described and claimed in copending and commonly assigned U.S. patent application Ser. No. 07/765,358 of James Dunckley, filed Sep. 25, 1991, entitled "Clamp for Data Storage Disk", which is incorporated herein by reference in its entirety. Spin motor 3 may take the form of, for example, the spin motor which is described and claimed in copending and commonly assigned U.S. patent application Ser. No. 07/630,110, filed Dec. 19, 1990, further details of which are described above.

Figure 29C:
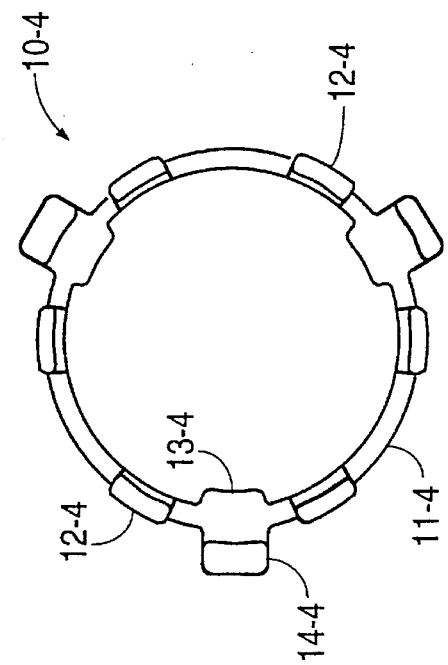
FIGS. 29A, 29B and 29C are top plan, bottom plan and side elevational views, respectively, of an embodiment of a clamp in accordance with the invention.
Figure 29B:
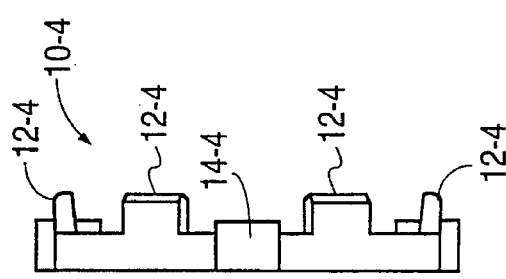
Figure 29A:
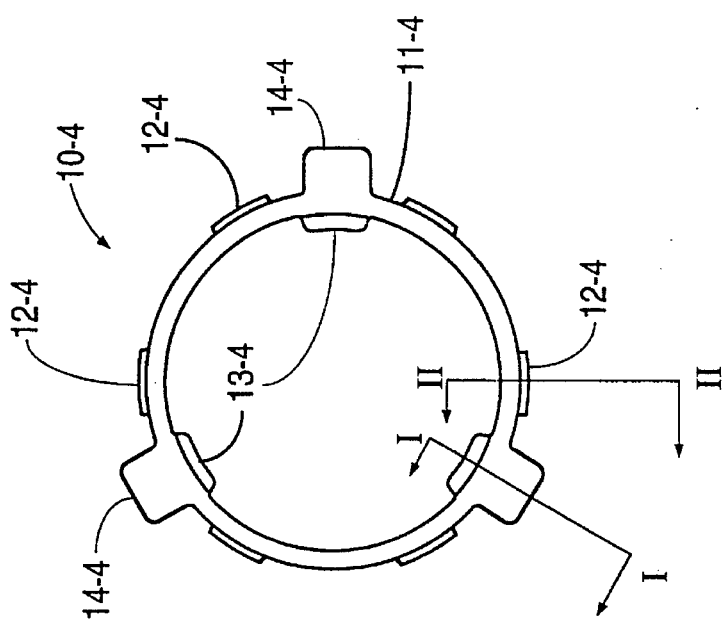

FIGS. 29A, 29B and 29C are top plan, bottom plan and side elevational views of a clamp 10-4 in accordance with the invention. Clamp 10-4 includes a basic annular ring 11-4 around which are integrally formed fingers 12-4, nubs 13-4 and L-shaped legs 14-4. As can be seen from FIG. 29C, fingers 12-4 extend in the same direction from annular ring 11-4 and are inclined slightly outwardly. The shape of nubs 13-4 and L-shaped legs 14-4 can best be seen from FIGS. 30 and 31.

Figure 30:
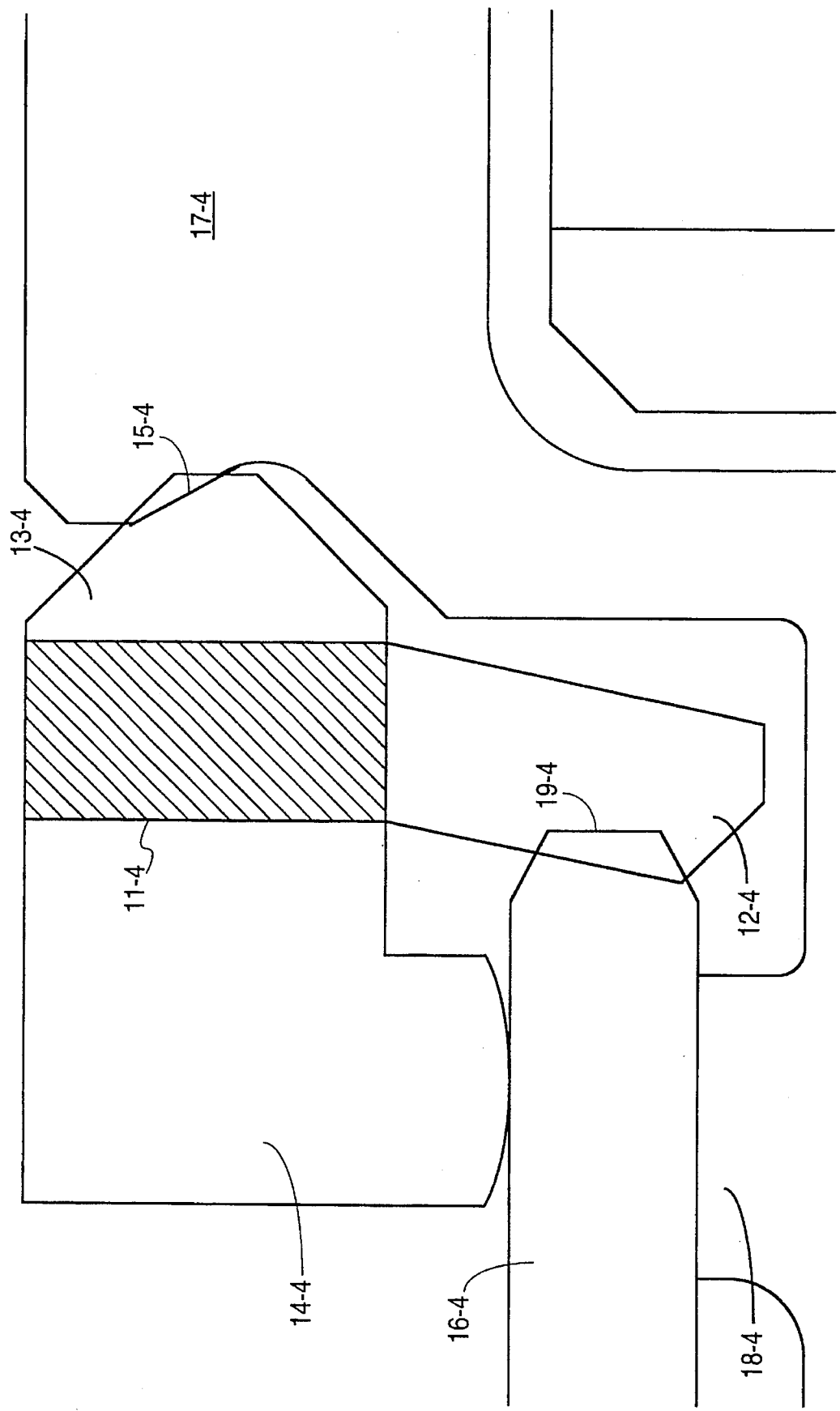
FIG. 30 is a detailed view of the fingers, nubs and L-shaped legs in relation to a disk and a hub, when the clamp is in an unstressed condition.
Figure 31:
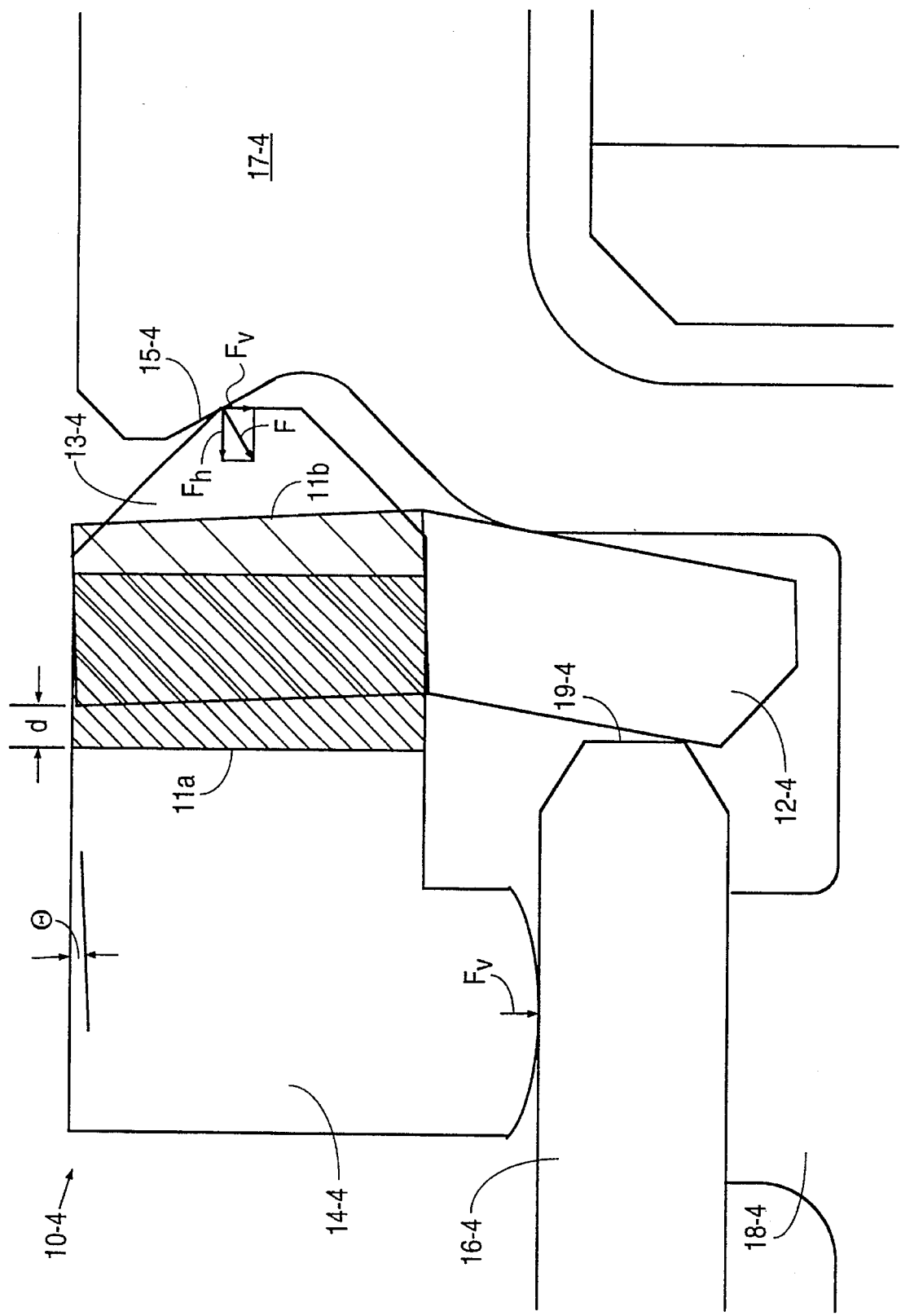
FIGS. 31 and 32A and 32B are detailed views of the fingers, nubs and L-shaped legs in relation to a disk and a hub, when the clamp is in a stressed condition.

In this preferred embodiment, clamp 10-4 is made of a plastic material which is deformed or stressed slightly when it is placed in use. FIGS. 30 and 31 show clamp 10-4 in an unstressed and stressed condition, respectively. FIGS. 30 and 31 are composite views which show nubs 13-1 and L-shaped legs 14-1 taken through cross section I—I, shown in FIG. 29A, and fingers 12-4 taken through cross section II—II, shown in FIG. 29A. The cross section of unstressed annular ring 11-4 is shown in FIG. 30, and the cross sections of stressed annular ring 11-4 are shown as 11a and 11b in FIG. 31. 11a represents the position of annular ring 11-4 at cross section I—I in FIG. 29A; 11b represents the position of annular ring 11-4 at cross section II—II in FIG. 29A.

As can be seen from FIGS. 30 and 31, nub 13-4 makes contact with an inclined (conical) surface 15-4 of a hub 17-4 which tends to force nub 13-4 (and L-shaped leg 14-4) downward-and outward (to the left in FIGS. 30 and 31). That is, the force vector F imposed on nub 13-4 is essentially normal to inclined surface 15-4, as shown by the arrow in FIG. 31. The vertical component $F_v$ of the force vector F causes L-shaped leg 14-4 to apply an axial force $F_v$ against a disk 16-4, thereby forcing it against a flat portion 18-4 of hub 17-4. The horizontal component $F_h$ of the force vector F causes annular ring 11-4 to be deformed outwardly, as reflected by cross section 11a.

Figure 32A:
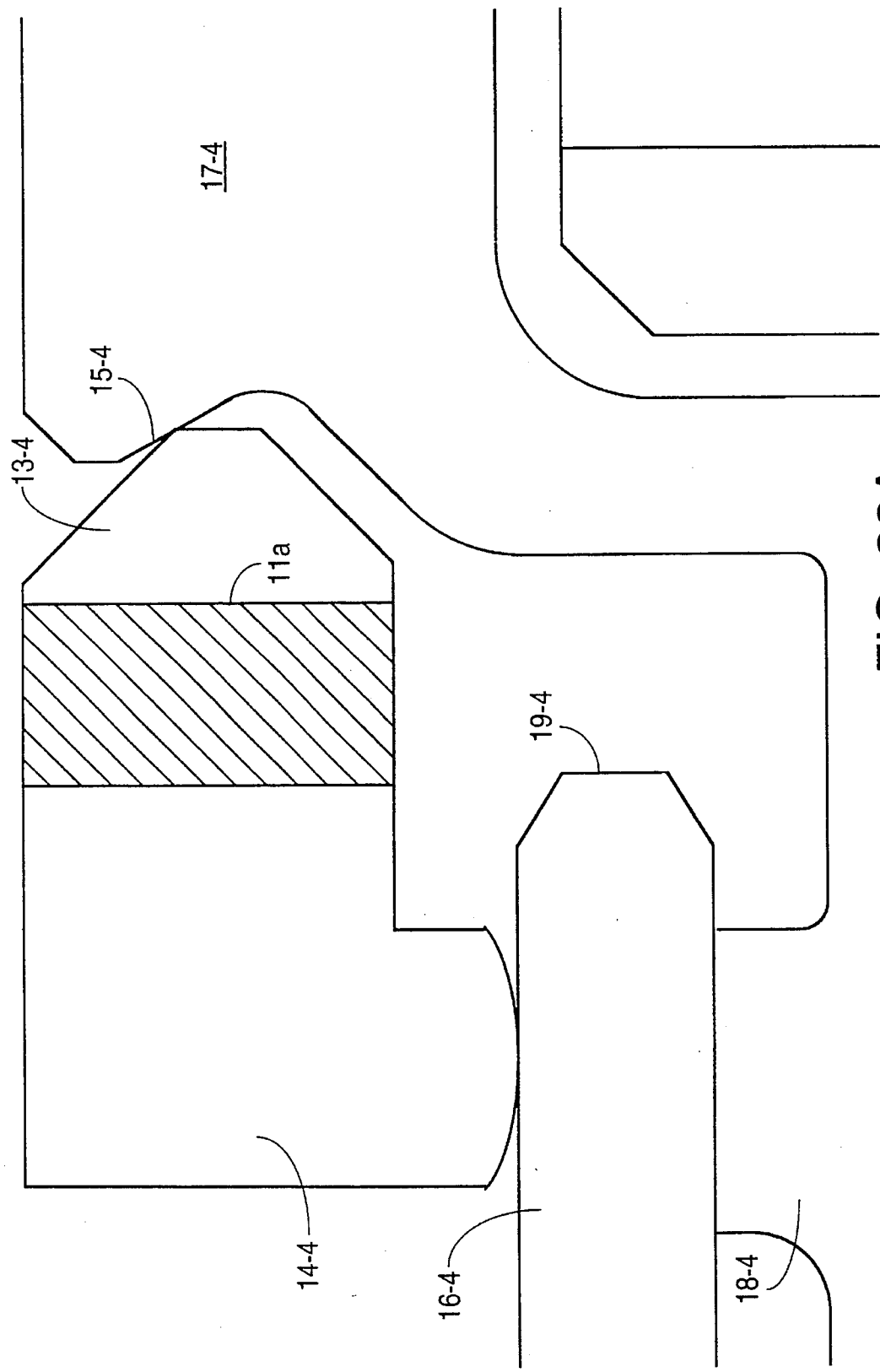
Figure 32B:
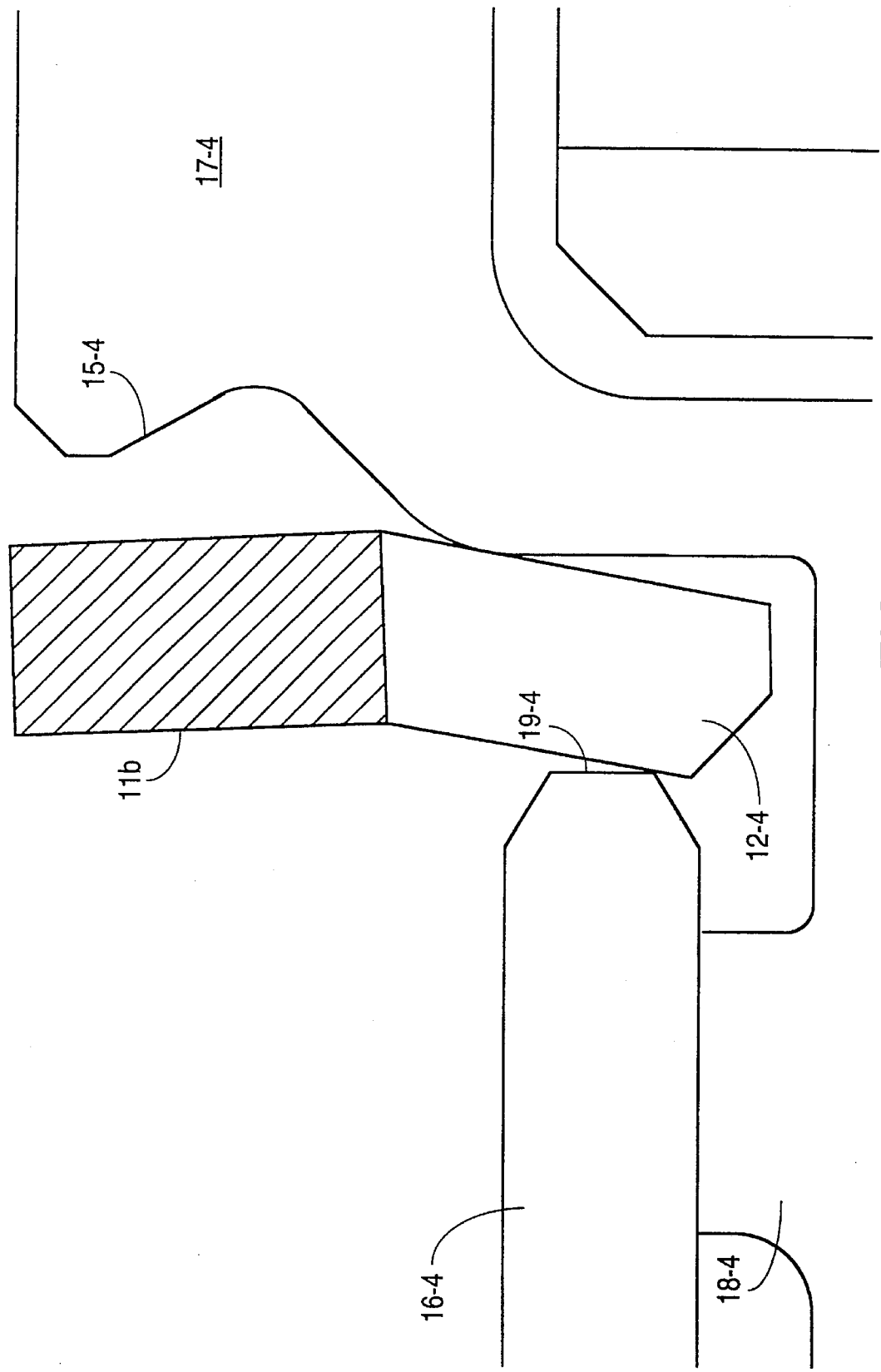

FIGS. 32A and 32B are similar to FIG. 31, but show separate views taken at cross sections I—I and II—II, respectively, of FIG. 29A.

Figure 33:
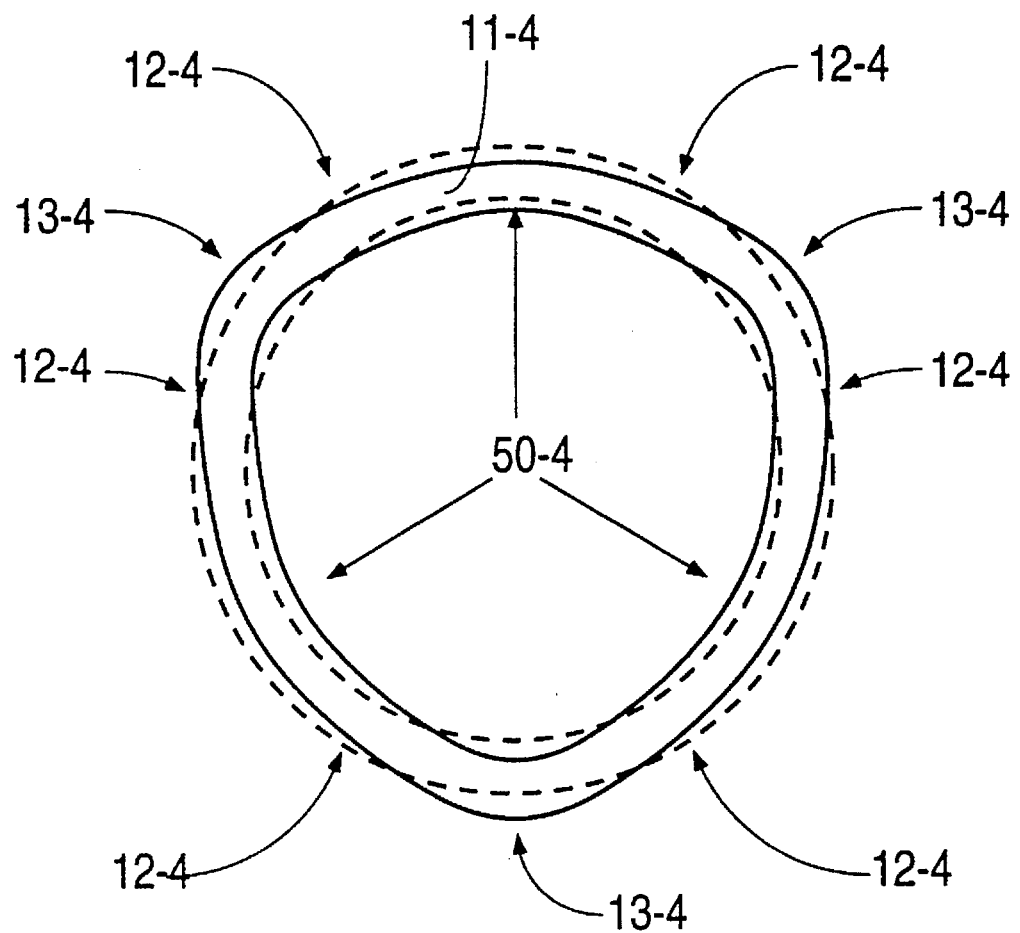
FIG. 33 is a top view of the annular ring of the clamp in a stressed and unstressed condition.

The deflection of annular ring 11-4 as a result of the horizontal force component $F_h$ is illustrated (in a somewhat exaggerated fashion) in FIG. 33. The unstressed shape of annular ring 11-4 is shown in hatched lines. The stressed shape of annular ring 11-4 is shown in solid lines. The positions of nubs 13-4 have been pushed radially outward while the midpoints 50-4 between nubs 13-4 have been drawn radially inward. It will be noted that the positions of the fingers 12-4 are approximately the same in the stressed and unstressed conditions.

Referring again to FIGS. 30 and 31, it is apparent that in the stressed condition finger 12-4 applies an outward radial force against an edge 19-4 of disk 16-4. This outward radial force, which is critical in clamping disk 16-4, is the sum total of three components: (i) the bending or deflection of annular ring 15-4 in the horizontal plane, represented by the distance d in FIG. 31; (ii) the twisting or torsion of annular ring 15-4, represented by the angle θ in FIG. 31; and (iii) the bending or flexure of finger 12-4. In the embodiment shown, components (i) and (ii) are of greater significance than component (iii).

The magnitude of components (i) and (ii) is a function of stiffness of the material of which annular ring 11-4 is made as well as the size and shape of the cross section of annular ring 11-4. The magnitude of component (iii) is a function of the same factors with respect to fingers 12-4.

Figure 34:
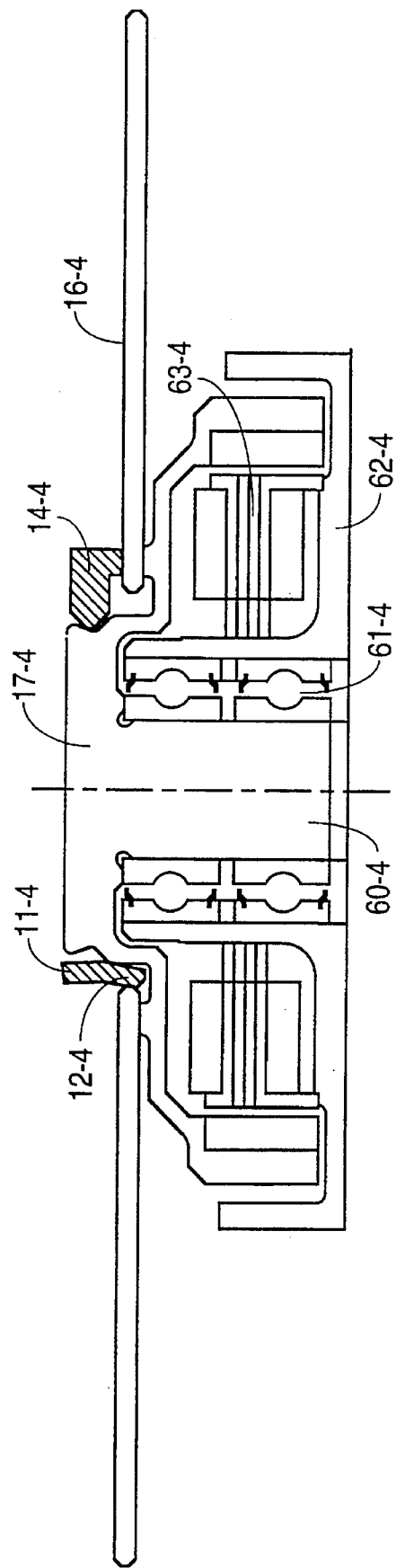
FIG. 34 is an overall cross-sectional view showing how a disk is mounted with the clamp of this invention.

An overall cross-sectional view showing the manner in which disk 16-4 is clamped to hub 17-4 is shown in FIG. 34. Included are a central shaft 60-4 which rotates by means of bearings 61-4 within a stationary base 62-4. Hub 17-4 is driven by a wound stator 63-4.

The arithmetic sum of the radial forces applied by fingers 12-4 (i.e., the sum of the absolute magnitude of those forces) is substantially greater than the sum of the downward (axial) forces applied to disk 16-4 by L-shaped legs 14-4. The axial forces are just sufficient to seat disk 16-4 against the flat portion 18-4 of hub 17-4 and not enough to cause warpage in disk 16-4. The radial forces provided by fingers 12-4 are strong enough to produce a static frictional force tangential to edge 19-4 at the location of each finger 12-4 so as to prevent disk 16-4 from slipping when it is accelerated or decelerated in a rotational direction.

Figure 35:
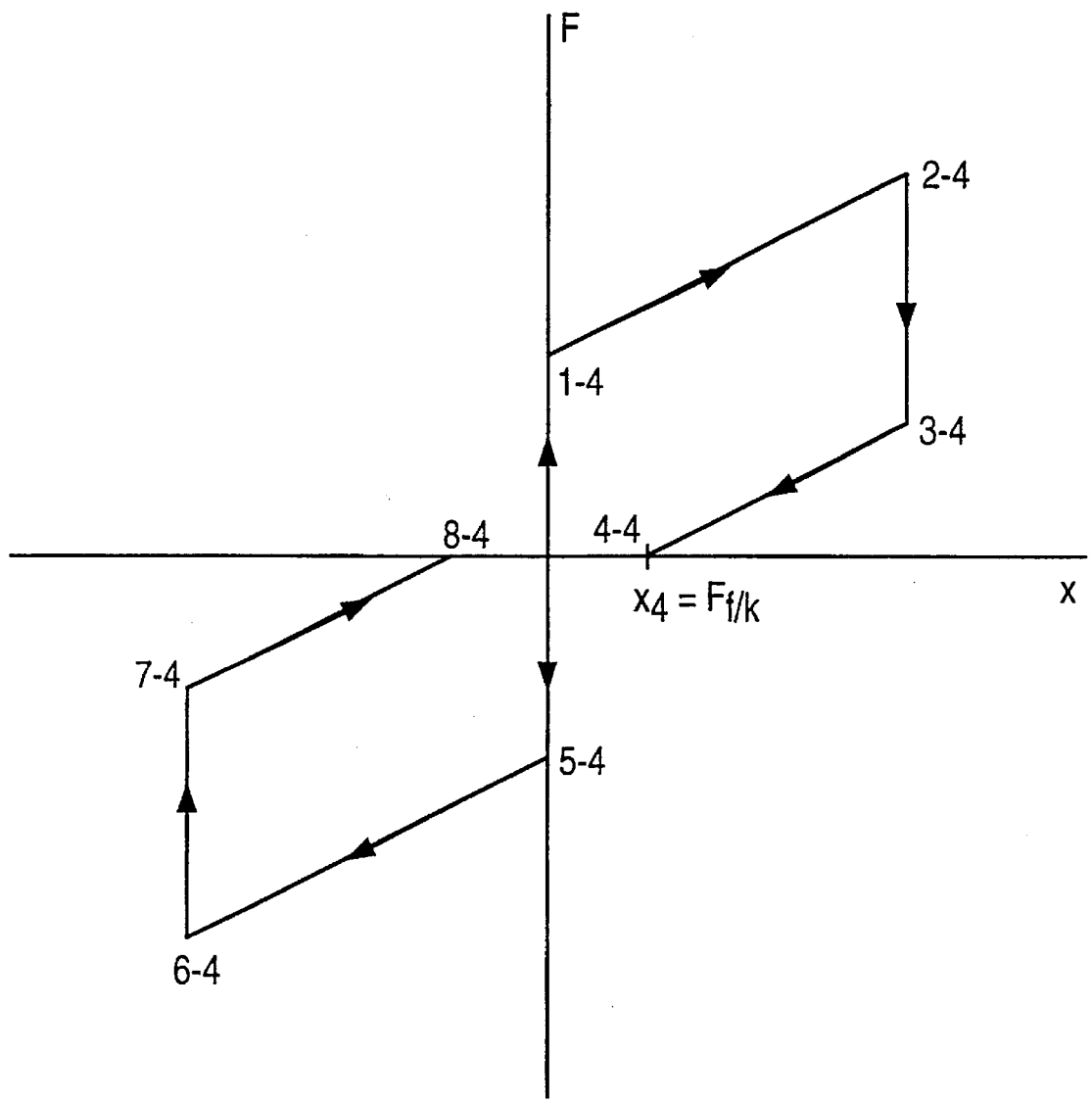
FIG. 35 is a graph illustrating the behavior of a clamp according to this invention when subjected to a shock force.

The behavior of disk 16-4 in the presence of an inertial shock force can be approximated by reference to the graph shown in FIG. 35, the horizontal axis of which represents the horizontal displacement of disk 16-4 from center (the origin), and the vertical axis which represents the horizontal component of a shock force imposed on disk 16-4.

For purposes of this analysis, it is assumed that essentially two types of forces are imposed on disk 16-4 as a result of its interaction with clamp 10-4 and hub 17-4: (i) a dynamic force $F_d$, which increases linearly with the displacement of disk 16-4 from the origin, and (ii) a static frictional force $F_f$, which results from the contact of disk 16-4 with clamp 10-4 and hub 17-4. The dynamic force $F_d$ can be represented as:

$$F_d = kx \quad (1)$$

where k is the stiffness of clamp 10-4 and x is the horizontal displacement of disk 16-4. k is a function of the stiffness of the material of which clamp 10-4 is made and represents the combined effect of the three elements described above, namely, the bending or deflection of annular ring 15-4, the twisting or torsion of annular ring 15-4, and the bending or flexure of fingers 12-4.

The frictional force $F_f$ is approximated by the following formula:

$$F_f = 3F_n\mu_{cd} + 3F_n\mu_{hd} + 2F_{finger}\mu_{cd} \quad (2)$$

where $F_f$ is the total frictional force on disk 16-4, $F_n$ is the normal force imposed on disk 16-4 by each of L-shaped legs 14-4, $F_{finger}$ is the radial force imposed on disk 16-4 by each of fingers 12-4, and $\mu_{cd}$ and $\mu_{hd}$ are the coefficients of friction between the clamp and disk and the hub and disk, respectively. The formula thus sums the frictional forces at each of the points of contact between disk 16-4 and L-shaped legs 14-4, flat portions 18-4, and fingers 12-4. It is assumed that two fingers 12-4 are displaced 90° from the direction of the shock force and a frictional force arises from the contact of these fingers 12-4 and inside edge 19-4 of disk 16-4.

Referring again to FIG. 35, when the disk is centered it is held in place by the frictional force $F_f$. It will remain centered unless the shock force imposed on it exceeds $F_f$. This region is represented by the line from the origin to point 1-4 in FIG. 35.

If the shock force exceeds $F_f$, the disk will be displaced until the sum of $F_f$ and the dynamic force $F_d$ imposed by clamp 10-4 matches the magnitude of the shock force, as represented by point 2-4. Point 2-4 is not an equilibrium point, however, because the frictional force which opposed the displacement of disk 16-4 disappears as soon as disk 16-4 comes to a halt. This is represented by point 3-4, which also takes into account that disk 16-4 experiences an outward frictional force as soon as it begins to return to the origin. Disk 16-4 thus returns to point 4-4, where the frictional force is equal to the dynamic force imposed by clamp 10-4. At point 4-4, $$F_f = F_d = kx$$

thus, the abscissa $x_4$ of point 4-4 is equal to $$x_4 = F_f/k$$

If disk 16-4 is subjected to a shock force in the opposite direction, it will pass through points 5-4, 6-4 and 7-4 in the same manner and end up at point 8-4. It should be noted that points 4-4 and 8-4 are worst cases; shock forces often occur in groups and may result in the disk coming to rest somewhere on the x axis between points 4-4 and 8-4.

In designing clamp 10-4, it is desirable to minimize the final displacement of disk 16-4 ($F_f/k$). This can be accomplished either by increasing the stiffness k or reducing the normal force $F_n$ on disk 16-4, which determines the frictional force $F_f$. Reducing the frictional force $F_f$ is not desirable, however, because this force provides the initial "stickiness" which prevents disk 16-4 from being displaced at all when it is subjected to minimal shock forces (i.e., shock forces located along the line from the origin to point 1-4 in FIG. 35). The alternative is to increase the stiffness of clamp 10-4. This can be accomplished by: (i) making clamp 10-4 from a material with a higher Young's modulus, (ii) increasing the thickness of annular ring 15-4, or (iii) reducing the preload dimensions of clamp 10-4. The problem with making clamp 10-4 from a material with a higher Young's modulus (e.g., a metal or reinforced plastic material) is that these materials may not be able to withstand the distortion required to install disk 16-4 on clamp 10-4. Increasing the thickness of annular ring 15 may also result in problems resulting from installation distortion.

As an example, assume that the normal force $F_n$ imposed by each of L-shaped legs 14-4 is 49.6 gmf, the radial force $F_{finger}$ imposed by each of fingers 12-4 is 174 gmf, and $\mu_{cd}$ and $\mu_{hd}$ are each 0.3. Equation (2) yields an $F_f$ equal to 193.7 gmf. If the mass of disk 16-4 is 3 gm, the external "G" shock necessary to shift disk 16-4 is: 193.7 gmf/3 gm=64.6 G. This is substantially above typical operating shock specifications which are in the range of 10–20 G.

A clamp 10-4 made of polycarbonate has a k of 4108 gmf/mm. Applying equation (1), this yields equilibrium displacement $x_4$=193.7 gmf/4108 gmf/mm=0.047 mm=0.001856 in. If the data are written at 2000 tracks per inch, this represents a displacement of 3.7 tracks. This error is within the range that can be corrected by once-around servo compensation schemes such as the one disclosed in U.S. patent application Ser. No. 07/766,478, entitled "Adaptive Runout Compensation System for Miniature Disk Drive", by Thomas L. Andrews, Jr., co-owned, commonly assigned, and filed concurrently herewith.

Temperature variations are another possible cause of eccentricities in disk drives. The hubs are normally manufactured of steel and the disks are manufactured of aluminum, which have different coefficients of thermal expansion. Using axial clamping, it is virtually impossible to restrain all relative motion between the disk and hub as the temperature changes. What normally happens is that the clamp has a maximum clamping force at one point on the disk. This point becomes a "sticking point" and the disk and hub will slide with respect to one another in an area opposite the sticking point, thereby producing an eccentricity. Every temperature change has the potential of producing another unpredictable and non-repeatable eccentricity.

With the clamp of the this invention, the principal clamping force is radial, and the disk and hub are free to move relative to each other while the clamp maintains them in a concentric relationship. Thus, temperature changes should not produce eccentricities like those generated in axial clamping schemes.

In this embodiment, clamp 10-4 is manufactured of polycarbonate, but other plastics and spring-like materials are also suitable for this purpose. One such material is a liquid crystal polymer known as Vectra™ manufactured by Hoechst-Celanese Corporation of Chatham, N.J. The most important characteristic of the material is that it be spring-like, i.e., that it have a linear stress-to-strain curve.

While the embodiment described above includes three nubs 13-4 and L-shaped legs 14-4 and six fingers 12-4, these numbers are not critical. Other clamps according to this invention may include a fewer or greater number of nubs, L-shaped legs and fingers. Similarly, while nubs 13-4 are lined up with L-shaped legs 14-4 in this embodiment, this need not be the case.

Figure 36:
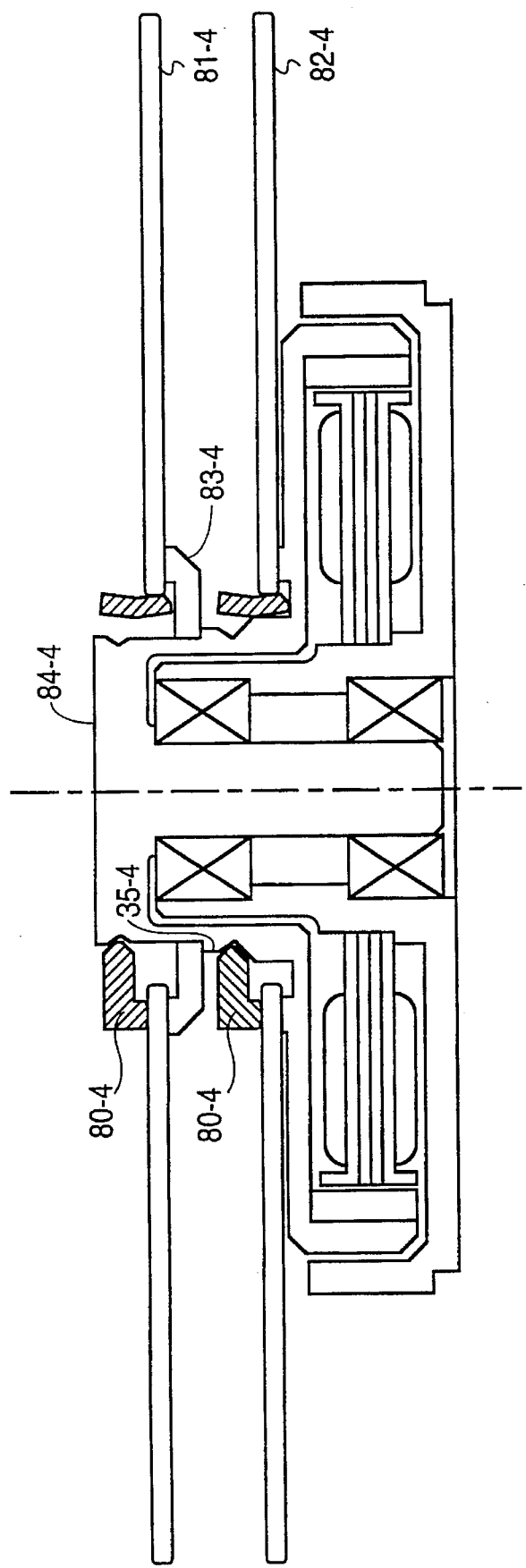

FIGS. 36, 37, 38, 39A, 39B, 39C, 40A, 40B, 40C, 41, 42A and 42B illustrate a number of alternative embodiments in accordance with the invention. FIG. 36 shows a two-disk arrangement in which two clamps 80-4 are used to mount disks 81-4 and 82-4, respectively. Clamps 80-4 are substantially similar to clamp 10-4. An annular flange 82-4 slips over hub 83-4 and rests on a circular step 84-4 formed in hub 83-4.

Figure 37:
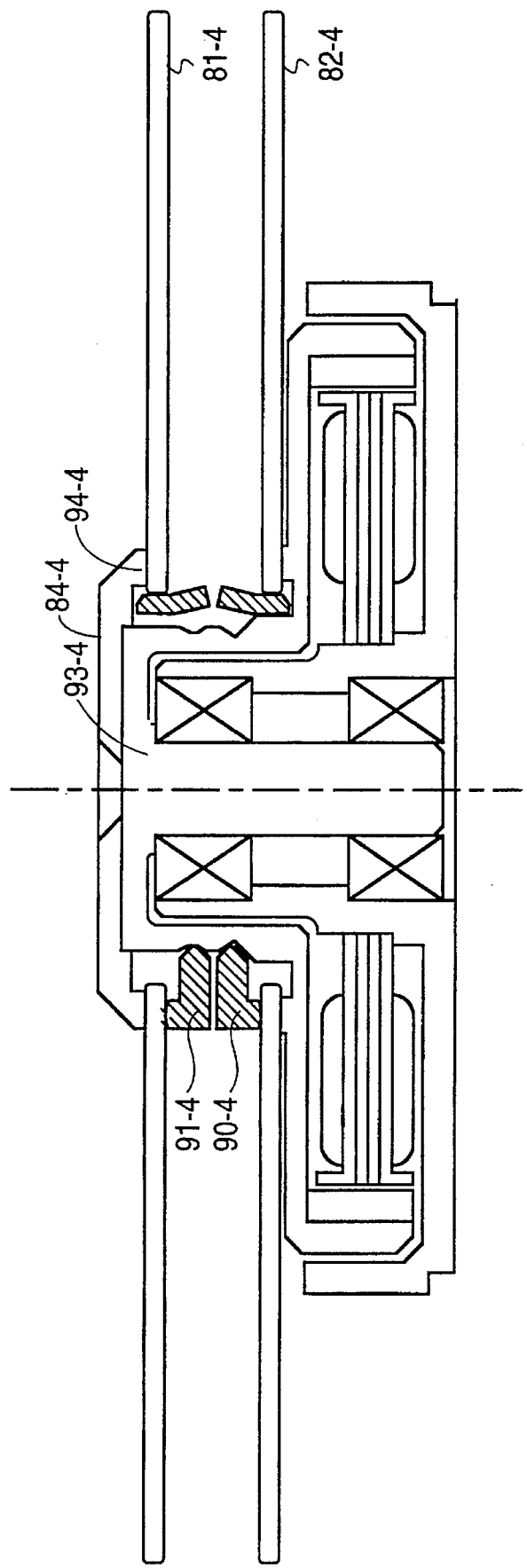

FIG. 37 illustrates an alternative two-disk arrangement in which the upper clamp 91-4 is inverted. Again, clamps 90-4 and 91-4 are substantially similar to clamp 10-4. A circular flange 92-4 is screwed concentrically to the top of hub 93-4 and has an annular surface 94-4 against which disk 81-4 is pressed by clamp 91-4.

Figure 38:
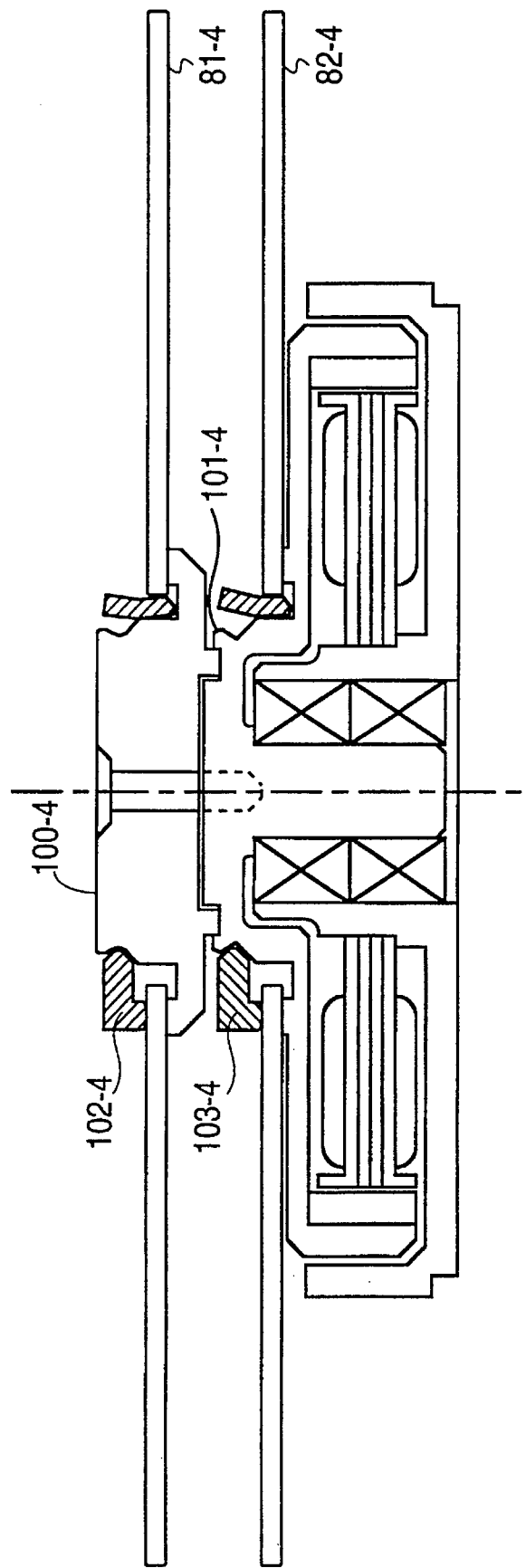

FIG. 38 illustrates a two-disk arrangement in which a secondary hub 100-4 is screwed onto a primary hub 101-4. Clamps 102-4 and 103-4 are substantially similar to clamp 10-4.

Figure 39A:
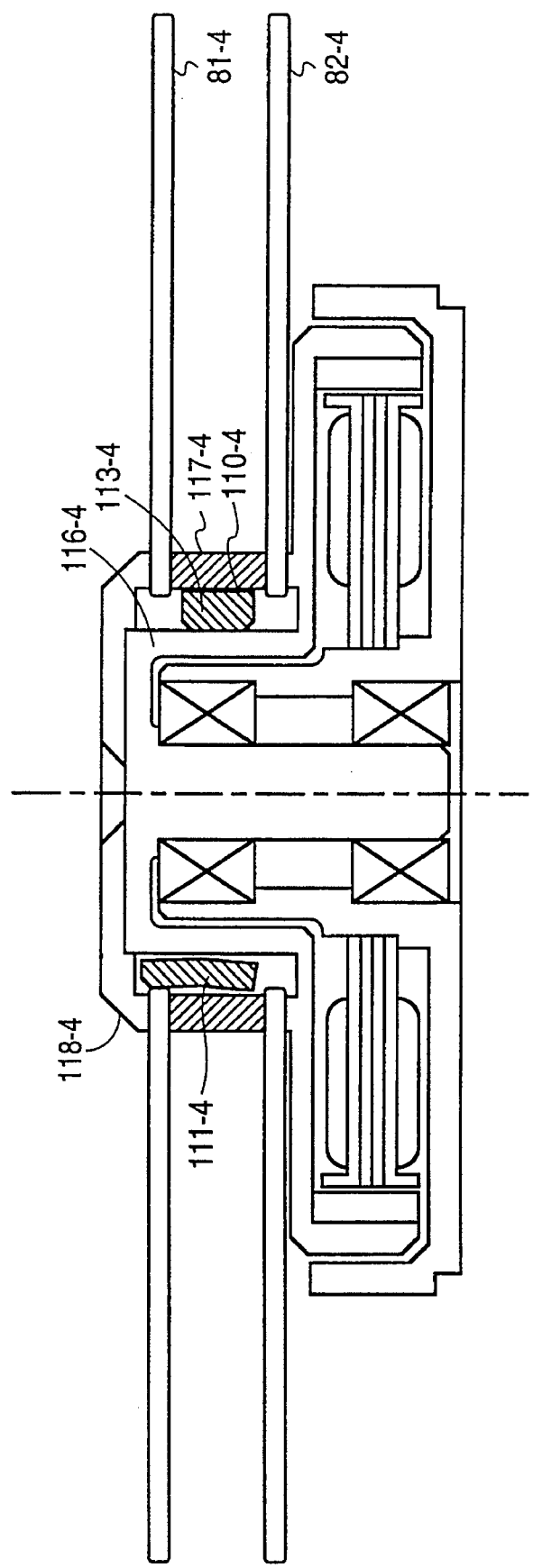
Figure 39B:
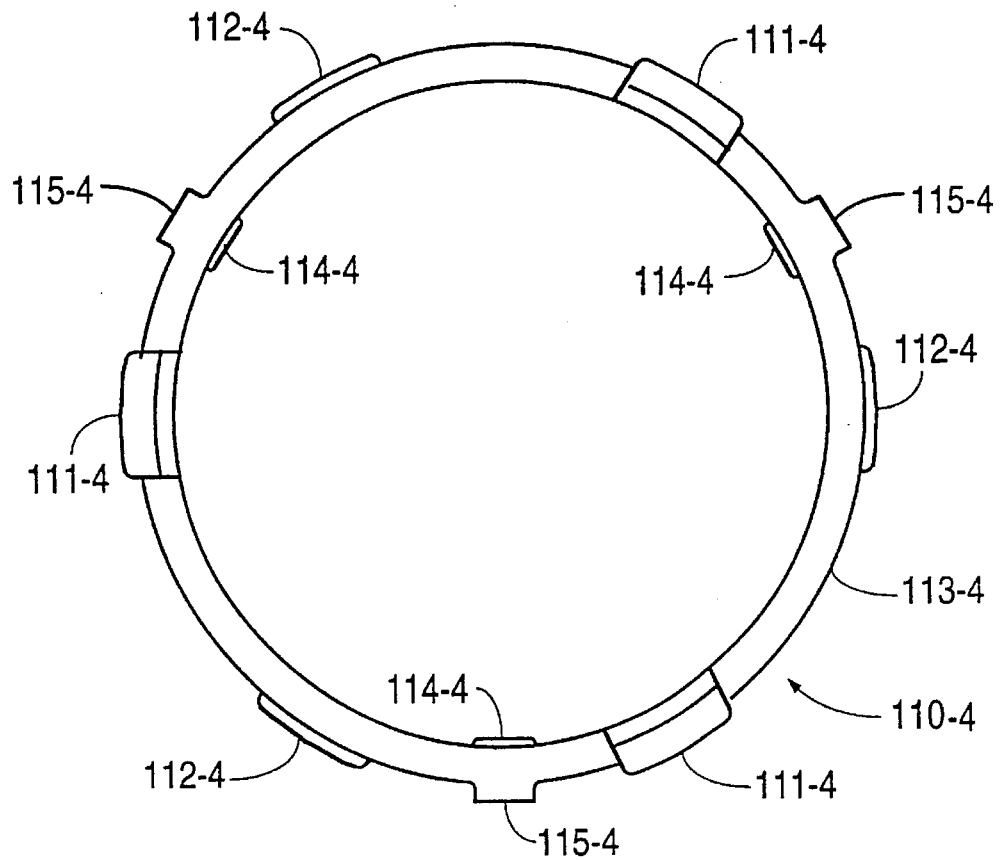
Figure 39C:
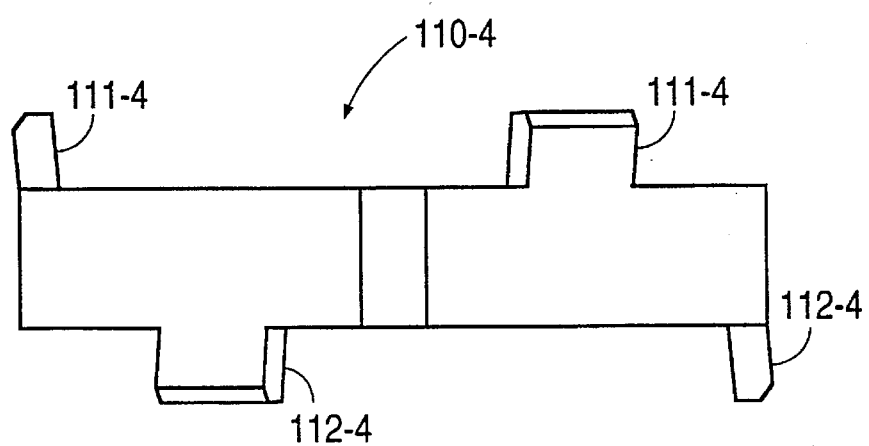

FIGS. 39A, 39B and 39C illustrate a substantially different radial clamp 110-4 which has three upwardly projecting fingers 111-4 and three downwardly projecting fingers 112-4. On the inside circumference of annular ring 113-4, three contact surfaces 114-4 are located and opposite them, projecting outwardly,, are three locating surfaces 115-4. Radial clamp 110-4 does not include elements comparable to the hubs 13-4 or L-shaped legs 14-4 of clamp 10-4.

Clamp 110-4 is press-fitted over a hub 116-4, with the actual contact being at contact surfaces 114-4. Upper disk 81-4 is held in position radially by fingers 111-4 and lower disk 82-4 is held in position by fingers 112-4. A solid annular spacer 117-4 fits around radial clamp 110-4, coming into contact with locating surfaces 115-4, and separates disks 81-4 and 82-4. An upper flange 118-4 is screwed into hub 116-4 and tightened sufficiently to provide a proper axial force (approximately 0.5 pounds) against disks 81-4 and 82-4. This axial force is transmitted from disk 81-4 to disk 82-4 by means of spacer 117-4. Spacer 117-4 and upper flange 118-4 can be made of plastic or metal. If desired, radial clamp 110-4 can be split into two annular pieces, one piece carrying upwardly projecting fingers 111-4 and the, other piece carrying downwardly projecting fingers 112-4. This may allow the addition of more radial fingers and simplify the design of the mold for manufacturing the clamps.

Figure 40A:
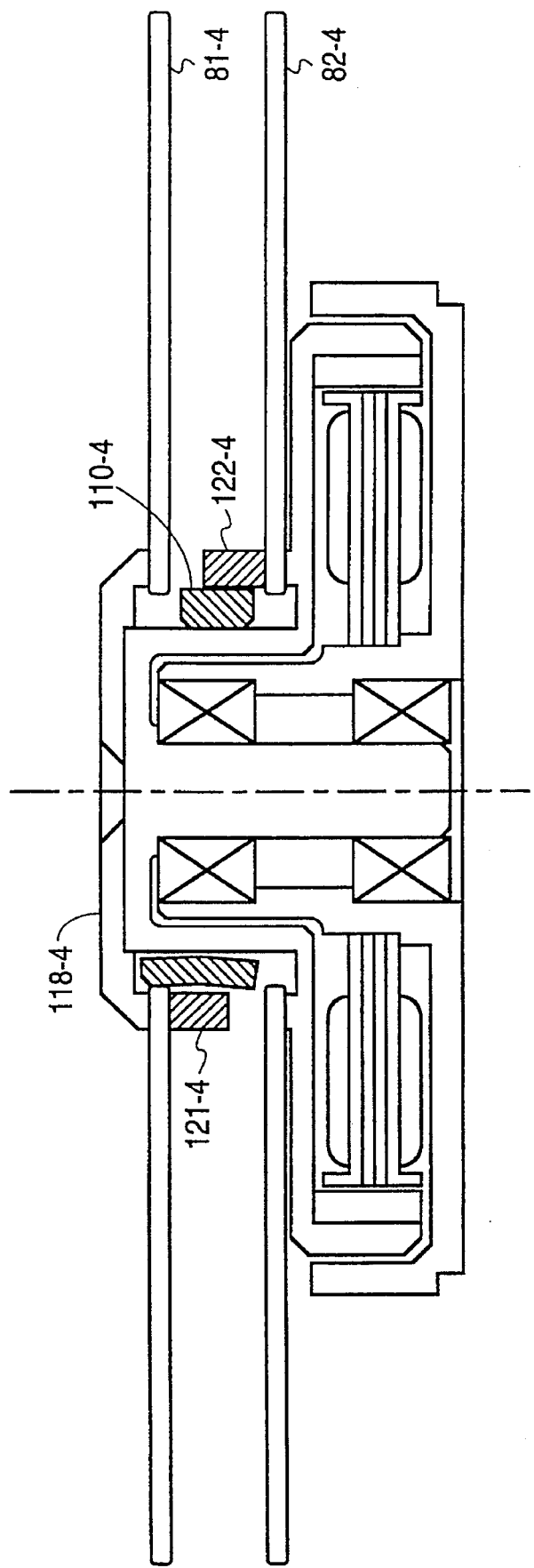

The embodiment of FIG. 40A, 40B, and 4C are similar to that of FIG. 39A, 39B, and 39C, except that solid spacer 117-4 has been replaced by an axial spring 120-4. Axial spring 120-4, which is pictured in FIGS. 40B and 40C, is made of a plastic material and contains three upward projections 121-4 and three downward projections 122-4. Axial spring 120-4 is sized such that when flange 118-4 is tightened a proper axial force is imposed on disks 81-4 and 82-4 by projections 121-4 and 122-4, respectively. Clamp 110-4 imposes only a radial force on disks 81-4 and 82-4.

Figure 41:
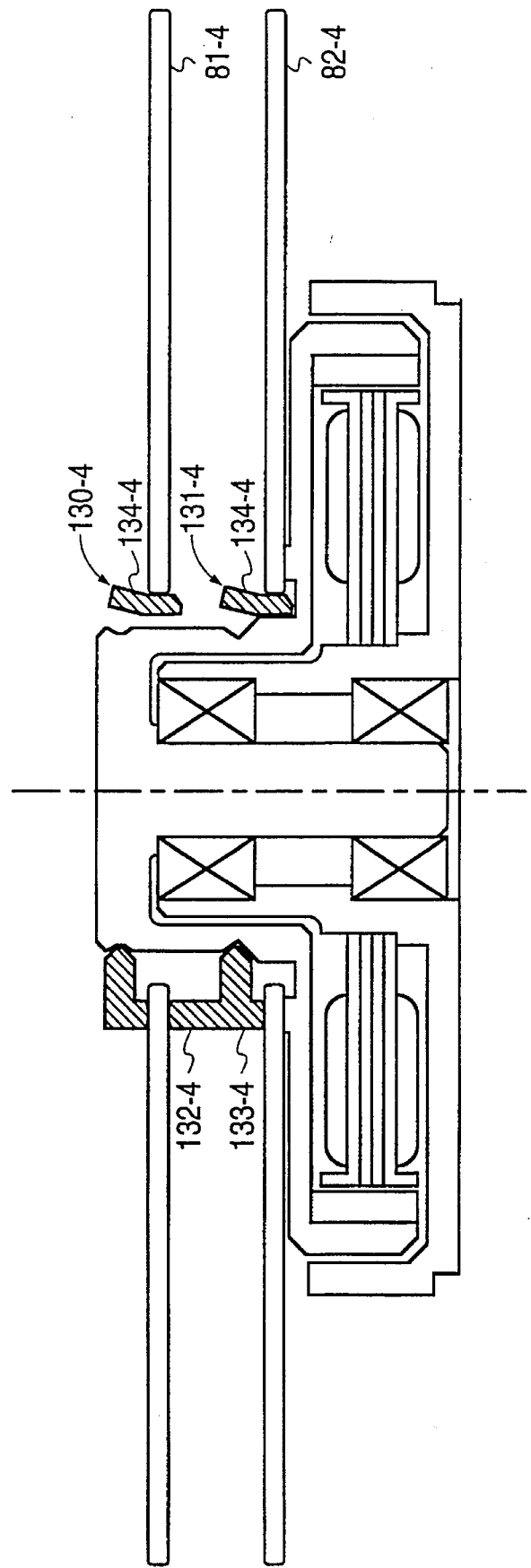

FIG. 41 shows another embodiment of a two-disk arrangement. Upper clamp 130-4 is similar to clamp 10-4. Lower clamp 131-4 is also similar to clamp 10-4, except that a projection 132-4 extends upward from each of L-shaped legs 133-4. Upper disk 81-4 is supported by projections 132-4. Fingers 134-4 on clamps 130-4 and 131-4 are substantially similar to fingers 12-4 on clamp 10-4.

FIG. 42A and 42B illustrate a two-disk arrangement in which disks 81-4 and 82-4 are separated by a spacer 140-4. Clamp 141-4 has nubs 142-4 and L-shaped legs 143-4, which are similar to those in clamp 10-4 and provide an axial force against disk 81-4 and (via spacer 140-4) against disk 82-4. Clamp 141-4 contains two sets of fingers. Three shorter fingers 144-4 contact the inside edge of disk 81-4, and three longer fingers 145-4 contact the inside edge of disk 82-4. Shorter fingers 144-4 and longer fingers 145-4 apply radial forces to disks 81-4 and 82-4, respectively, and provide a radial clamping function similar to fingers 12-4 in clamp 10-4. If desired, the number of fingers 144-4 and 145-4 may be increased.

Magnetic recording disk 10 comprises a thin film surface, with coercivity greater than 1500 Oe, coated with materials such as Co-Ni or Co-Cr-Ta alloys, applied to both sides of a rigid substrate by methods such as RF sputtering or plating. The substrate used with magnetic recording disk 10 is preferably about 0.445 mm thick, with very flat, smooth, surfaces and with good mechanical rigidity. Examples of suitable substrate materials are aluminum alloys, glass and ceramic materials. Disk 10 has an outer diameter of about 33.5 mm, a center hole 13 with a diameter of about 10 mm. The data zone utilized is positioned between the radii of 9.4 mm and 15.5 mm.

Magnetic read/write transducers 5, one supported on load beam 14-1 and one on 14-2, are positioned above the recording and playback surface of rigid disk 10 utilizing rotary actuator assembly 15, which will be described more fully during the detailed description of that assembly in connection with the drawing FIG. 5A. A rotary inertial latch assembly as described and claimed in U.S. Pat. No. 5,189,576 issued Aug. 21, 1992, more fully identified above, may be utilized to prevent the unwanted movement of the magnetic heads across the surface of the disk when the drive is bumped or jarred. In FIG. 1, an alternate construction of an inertial latch mechanism is illustrated. Inertial latch assembly 16 in FIG. 1 will be more fully described and illustrated in connection with other figures. Rotary inertial latch assembly 16 is fully described in U.S. patent application Ser. No. 07/765,353 referred to above.

Figure 50:
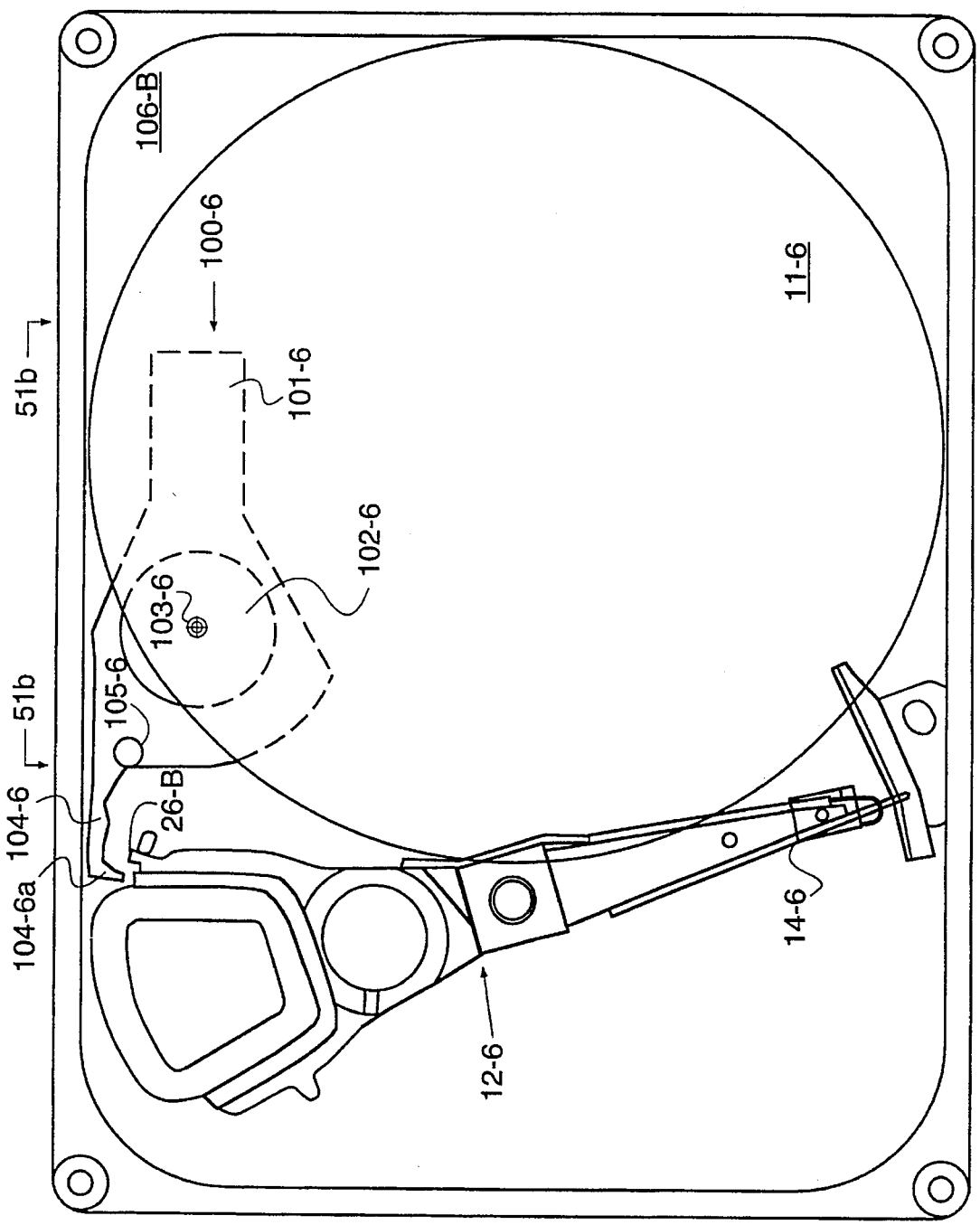
FIG. 50 illustrates a second embodiment of the invention.

An embodiment in accordance with the invention is shown in FIG. 50. Inertial latch 100-6 includes an inertial body 101-6 and a sleeve 102-6. A shaft 103-6 is journaled into sleeve 102-6 so as to allow inertial latch 100-6 to rotate in either direction. The other end of shaft 103-6 is press fitted into body 10-6B. Shaft 103-6 may also be screwed or bonded into body 10-6B. Inertial latch 100-6 is retained on shaft 103-6 by means of a retaining ring (e.g., an "E"-clip) (not shown).

Inertial body 101-6 is formed at one end in the shape of a pawl 104-6 which terminates in a hook 104-6a, and shaft 103-6 is positioned on body 10-6B so that hook 104-6a is able to engage finger 26-6 of actuator 12-6. A pin 105-6 extends upward from the top surface of inertial body 101-6. While inertial body 101-6 and sleeve 102-6 are shown as separate components, they could be combined. As indicated by the hatched lines, inertial latch 100-6 is mounted beneath disk 11-6.

Sleeve 102-6 is preferably made of Teflon™ filled polycarbonate and is press-fitted into inertial body 101-6. Inertial body 101-6 is manufactured of bronze (85% by mass) filled Nylon II™.

Figure 51A:
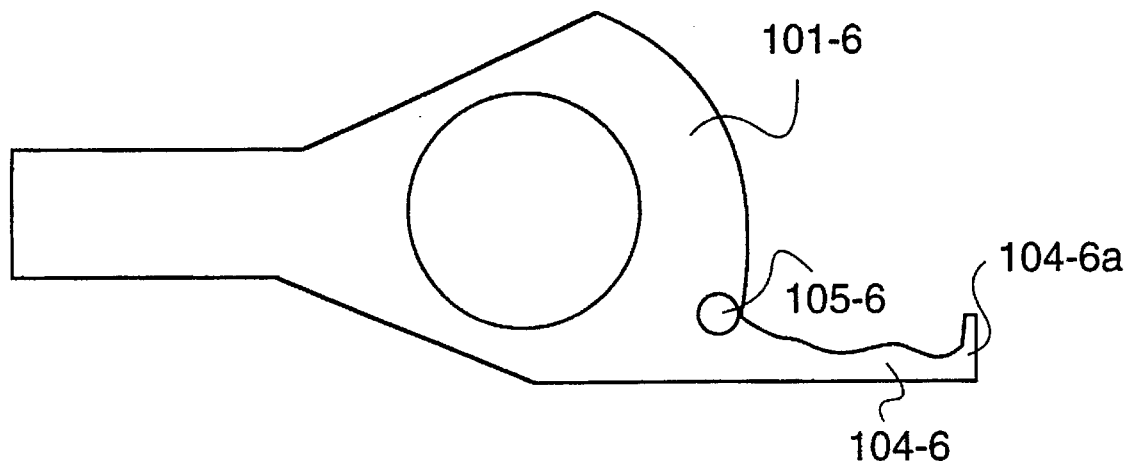
FIG. 51A and 51B illustrate top and side elevational views, respectively, of the inertial body in the embodiment of FIG. 50.
Figure 51B:
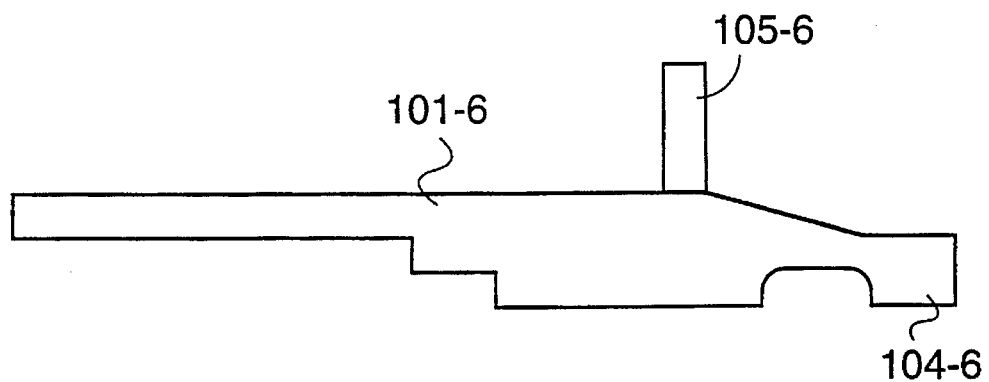

FIG. 51A shows a top view of inertial body 101-6, and FIG. 51B shows a side elevational view of inertial body 101-6 taken from the direction 51B shown in FIG. 50.

Figure 52:
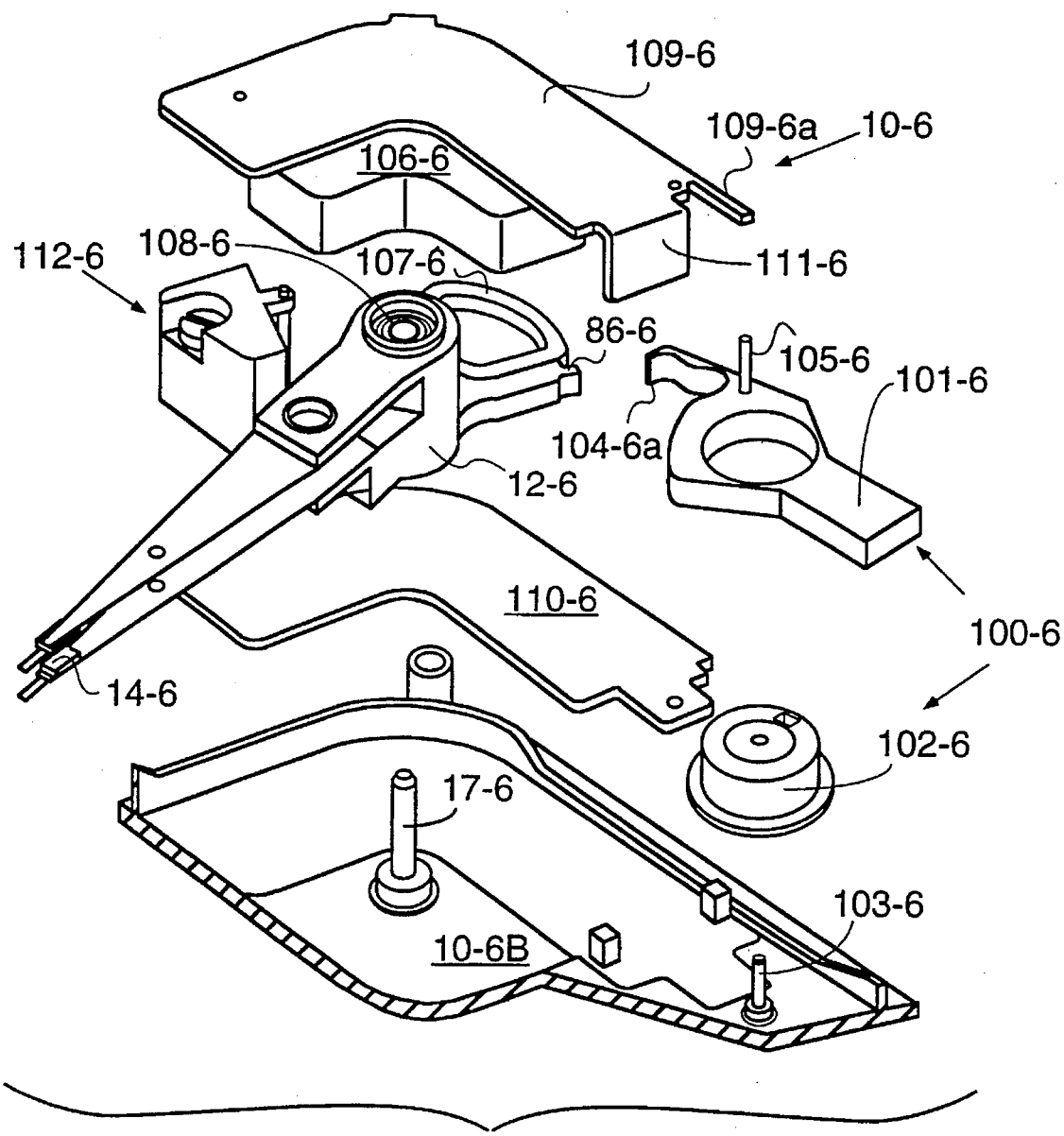
FIG. 52 is an exploded view showing how the inertial latch of FIG. 50 is mounted on a disk drive.

FIG. 52 is an exploded view of the corner portion of disk drive 10-6 where rotary actuator 12-6 and inertial latch 100-6 are positioned. Rotary actuator 12-6 is of the moving coil type, that is, a magnet 106-6 is maintained in a stationary position and the movable portion of the actuator 12-6 includes a coil 107-6. Included in actuator 12-6 is a bearing assembly 108-6 for rotatably supporting actuator 12-6 about pivot shaft 17-6 which is connected to body 10-6B. The flux field is established through actuator coil 107-6 through the use of magnet 106-6, which is supported on a top plate 109-6 to position the magnet 106-6 above the top surface of actuator 12-6. A lower plate 110-6 of the magnet assembly provides the lower portion of the flux path in conjunction with the down turned portion 111-6 of top plate 109-6. A tab 109-6a of top plate 109-6 serves as a stop for pin 105-6, thereby preventing inertial latch 100-6 from rotating too far in a clockwise direction. Inner crash stop assembly 112-6 is positioned between top plate 109-6 and lower plate 110-6. Inner crash stop assembly 112-6 prevents the rotation of actuator 12-6 beyond a predetermined inner travel to prevent the read/write transducer heads from leaving the surface of the disk or hitting other HDA components.

Figure 53B:
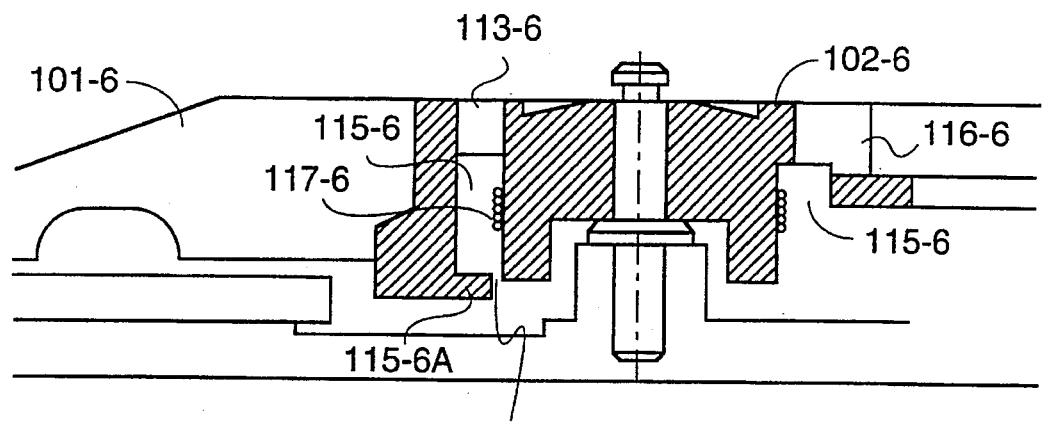
FIGS. 53A and 53B are top and side elevational views of the sleeve in the inertial latch of FIG. 50.
Figure 53A:
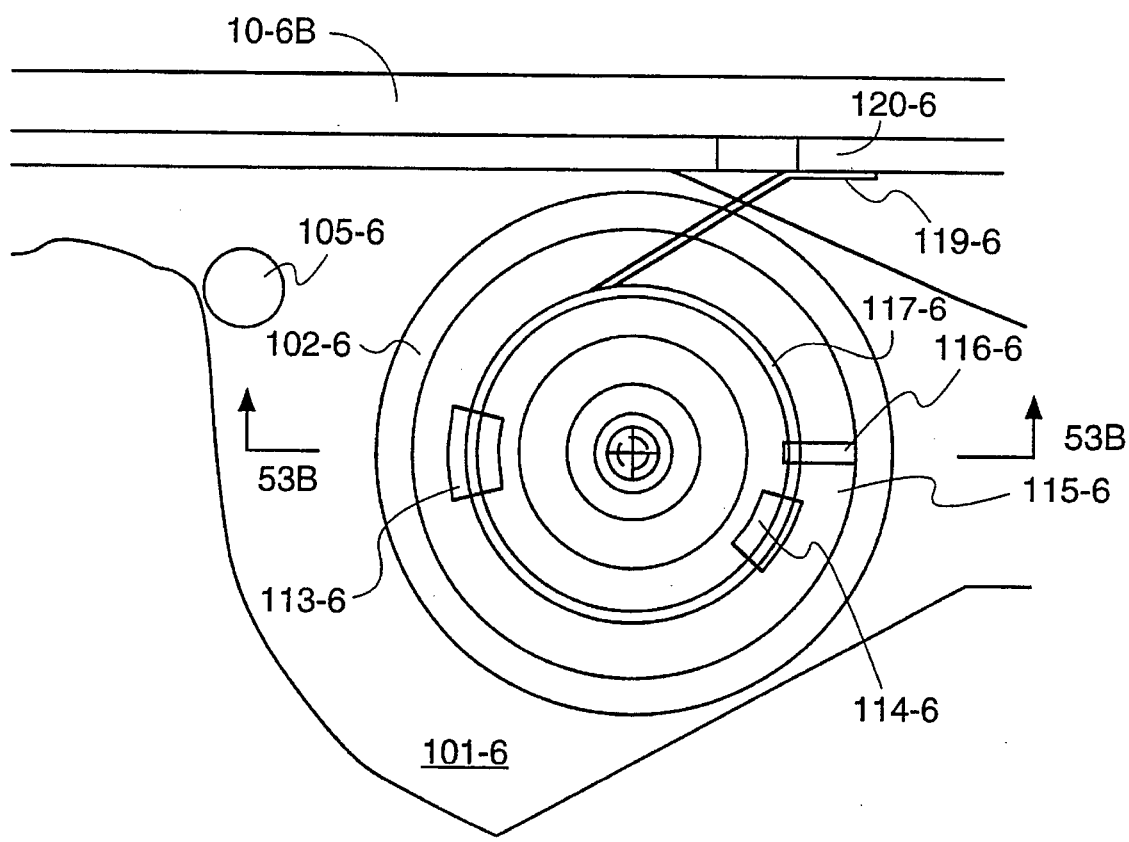

FIGS. 53A and 53B illustrate top and cross-sectional views, respectively, of sleeve 102-6. FIG. 53B is taken through section 53B as indicated in FIG. 53A.

Figure 54A:
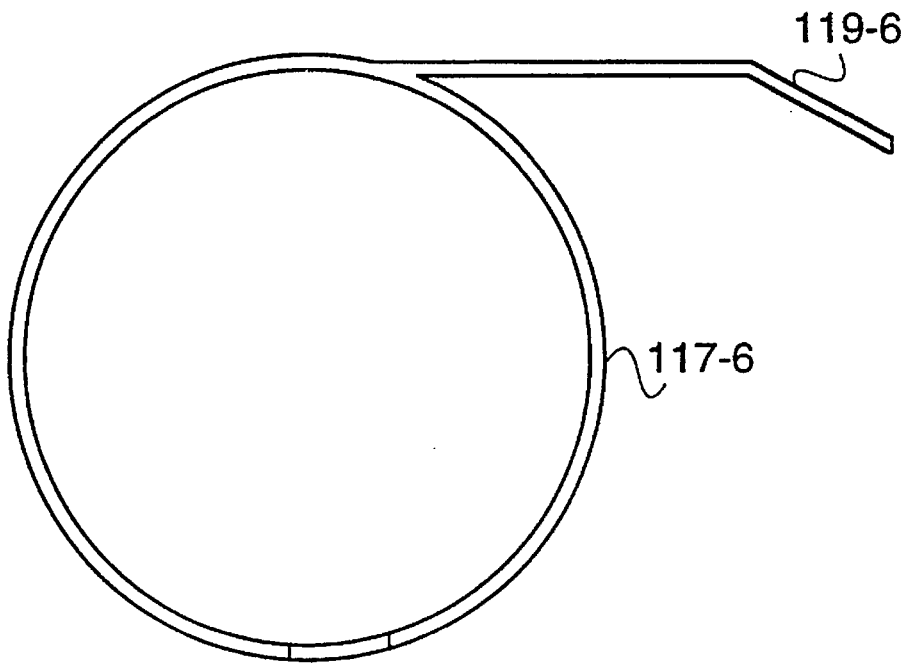
FIGS. 54A and 54B are top and side elevational views of the spring in the inertial latch of FIG. 50.
Figure 54B:
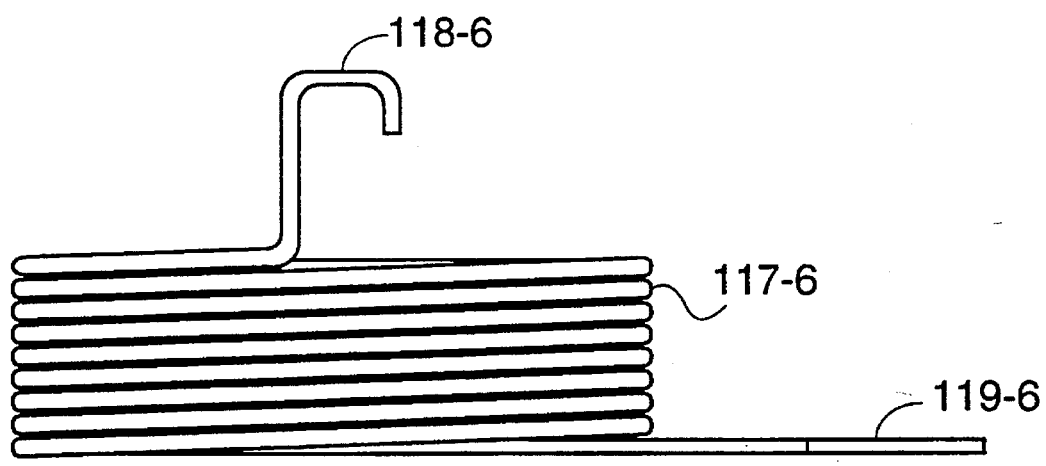

Sleeve 102-6 has formed in it two vertical channels 113-6 and 114-6, respectively, which extend from the top surface of sleeve 102-6 to a circular channel 115-6 which is formed in the interior of sleeve 102-6. Sleeve 102-6 also has a radial slot 116-6 formed in its top surface. A circular spring 117-6 is inserted into circular channel 115-6. Circular spring 117-6, as shown in FIGS. 54A and 54B, has at one end a hook 118-6 and at the other end a lateral arm 119-6.

When circular spring 117-6 is inserted into circular channel 115-6, hook 118-6 extends up through vertical channel 114-6 and the end of hook 118-6 is placed in radial slot 116-6, thereby securing circular spring 117-6 within sleeve 102-6. A finger 115-6a defines a narrow gap 115-6b and keeps spring 117-6 from slipping out of channel 115-6.

As shown in FIG. 53A, lateral arm 119-6 engages a wall 120-6 of body 10-6B. Thus, as inertial latch 100-6 is rotated in a counterclockwise direction, circular spring 117-6 is placed in tension and exerts a clockwise torque on inertial latch 100-6.

When disk drive 10-6 incurs a clockwise rotational shock, in the manner described above the rotational inertia of inertial latch 100-6 overcomes the torque of circular spring 117-6 and causes inertial latch 100-6 to rotate in a counterclockwise direction with respect to body 10-6B. Hook 104-6A therefore engages finger 26-6 of actuator 12-6 and prevents actuator 12-6 from rotating so as to bring magnetic head 14-6 into contact with disk 11-6. When the shock has passed, circular spring 117-6 takes over and brings inertial latch 100-6 back to its normal position, where pin 105-6 engages tab 109-6A (see FIG. 52).

Figure 55:
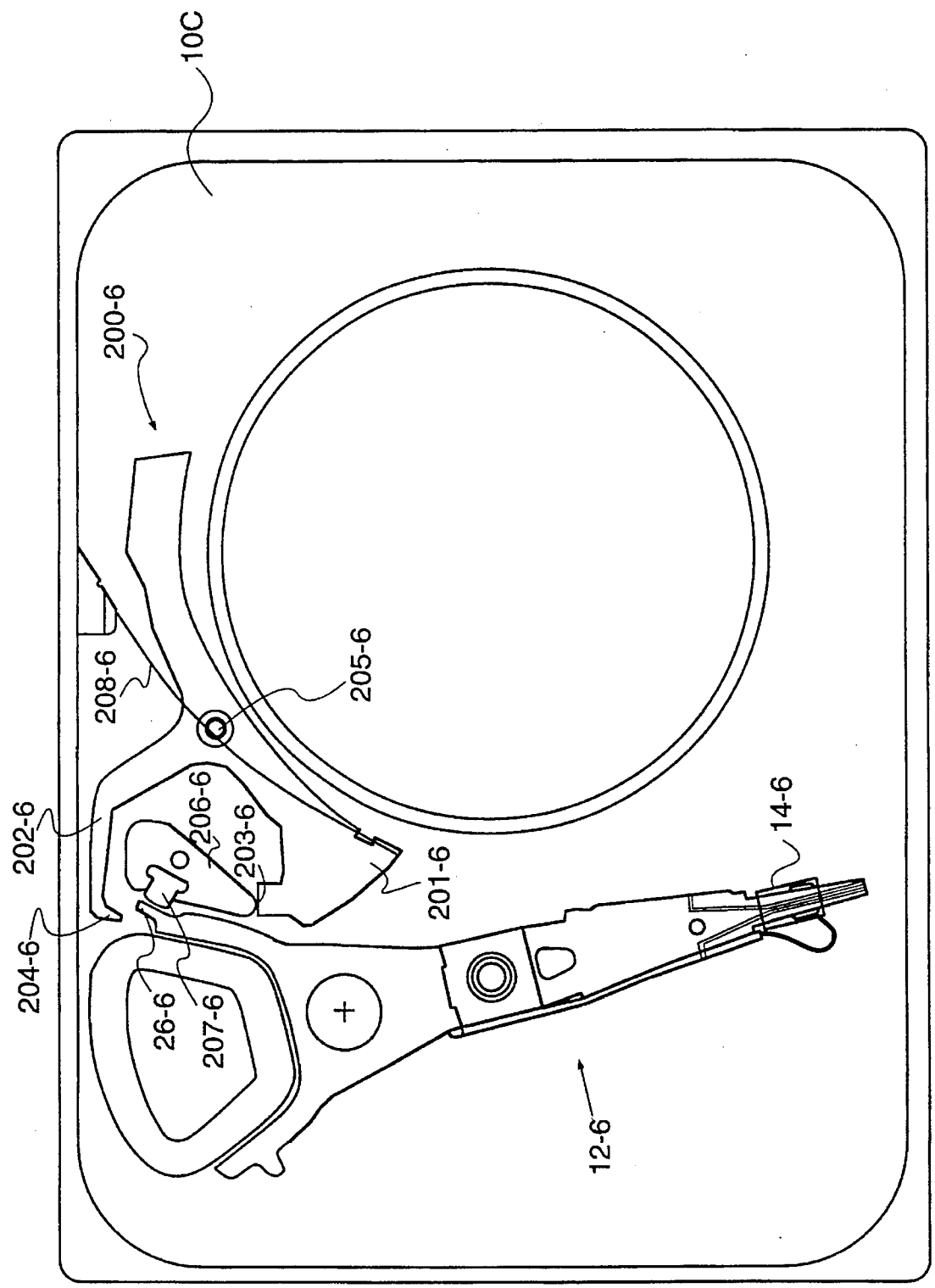
FIG. 55 illustrates a third embodiment of the invention.

A second embodiment in accordance with the invention is shown in FIG. 55. Inertial latch 200-6 has an arm 201-6 and a pawl 202-6. Arm 201-6 ends in a contact surface 203-6, and pawl 202-6 ends in a hook 204-6. Inertial latch 200-6 is rotatably mounted on a shaft 205-6, which is pressed into body 10-6C. Shaft 205-6 may also be screwed or bonded into body 10-6C. An outer crash stop block 206-6 is pinned to body 10-6C in a position between arm 201-6 and pawl 202-6. Outer crash stop block 206-6 has attached to it an outer crash stop 207-6, which is positioned opposite finger 26-6 so as to prevent actuator 12-6 from rotating too far in a clockwise direction.

Figure 56A:
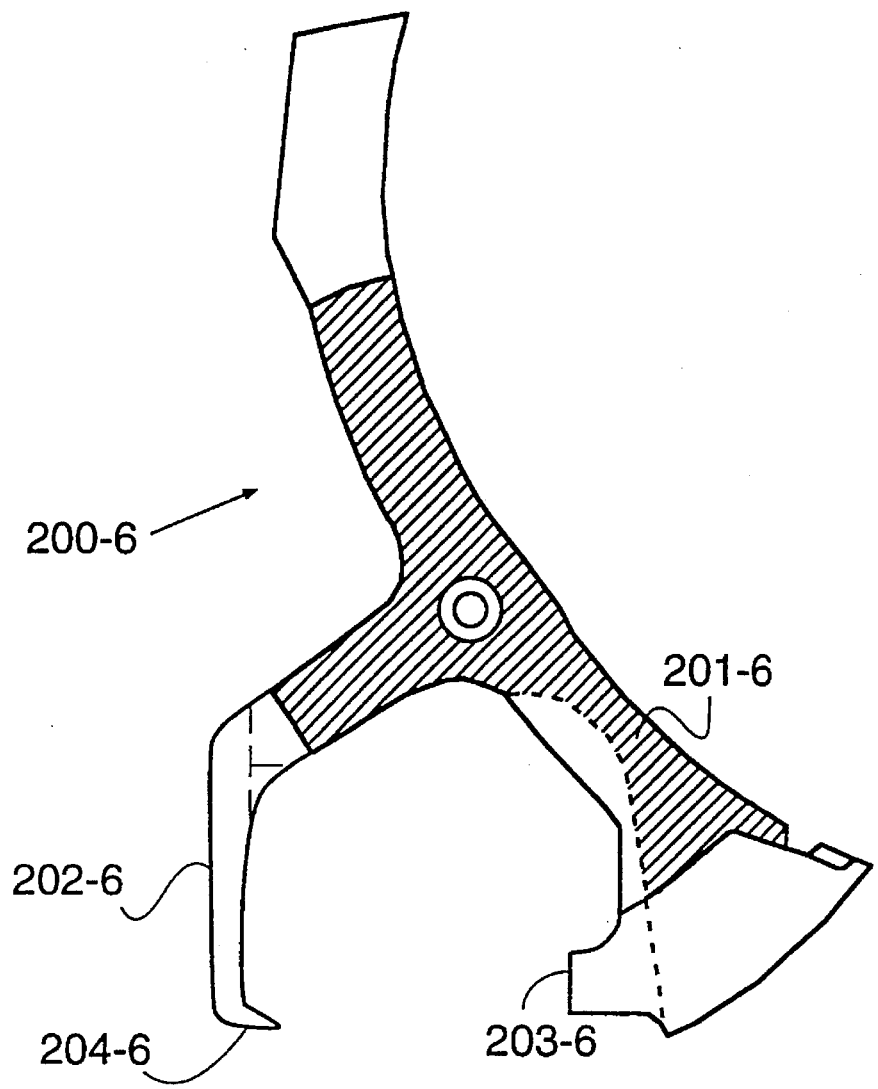
FIGS. 56A and 56B illustrate top and side elevational views, respectively, of the inertial latch of FIG. 55.
Figure 56B:
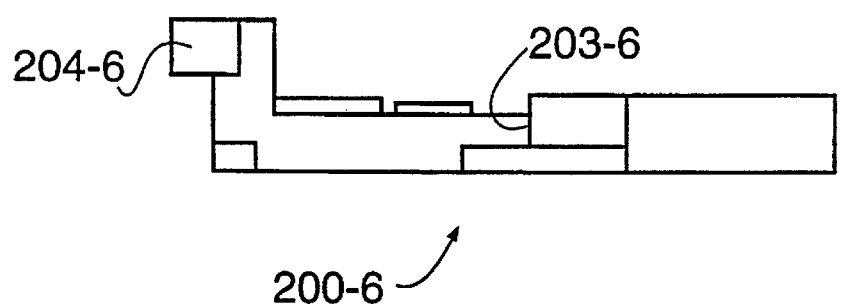

FIGS. 66A and 66B show top and side elevational views, respectively, of inertial latch 200-6. To maximize the rotational inertia of inertial latch 200-6 while minimizing its total mass, the central area of inertial latch 200-6 (shown by the cross hatching in FIG. 56A) has a reduced thickness as compared with the outer areas.

Figure 57:
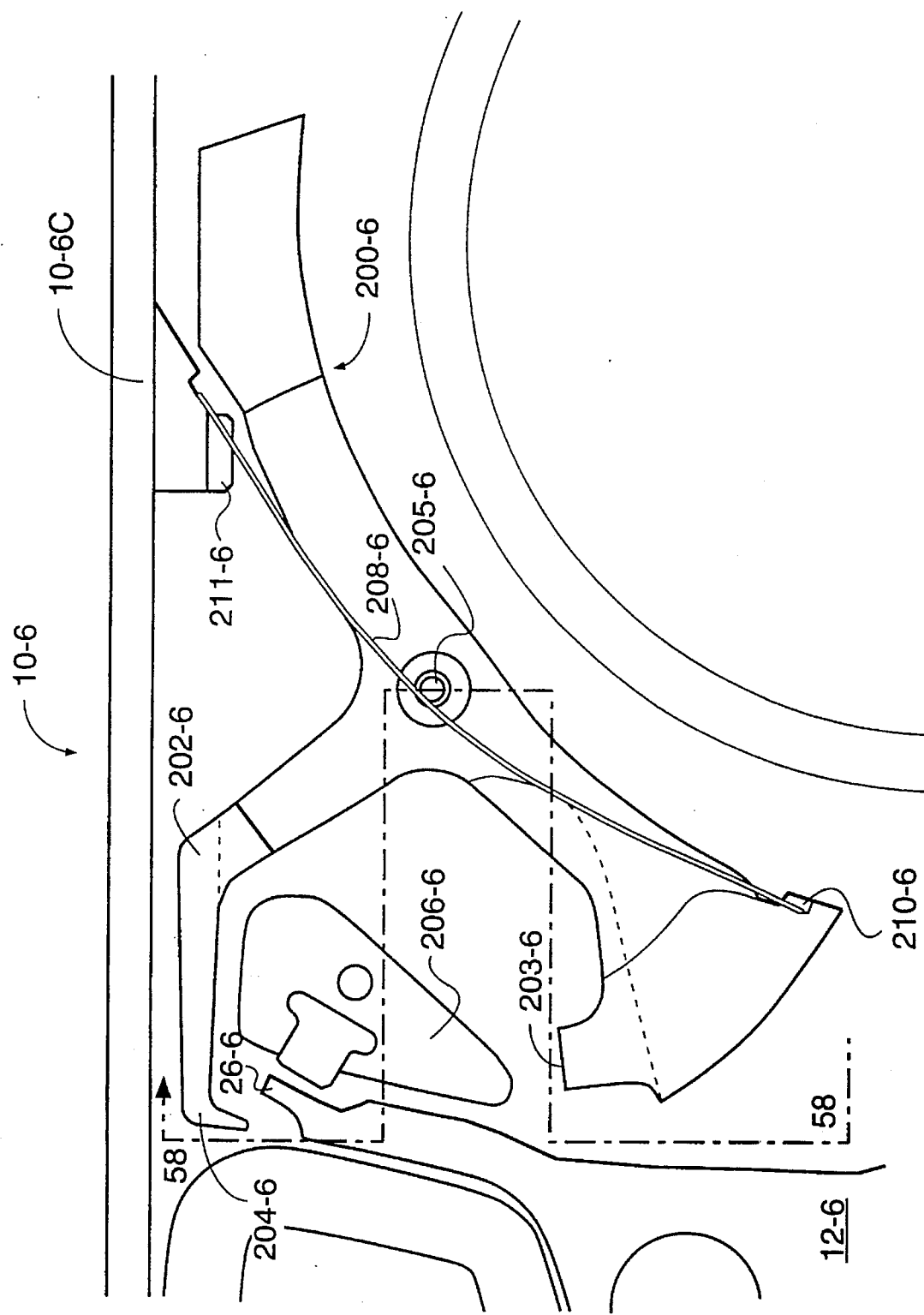
FIG. 57 is a detailed view showing how the inertial latch of FIG. 55 is mounted in a disk drive.
Figure 58:
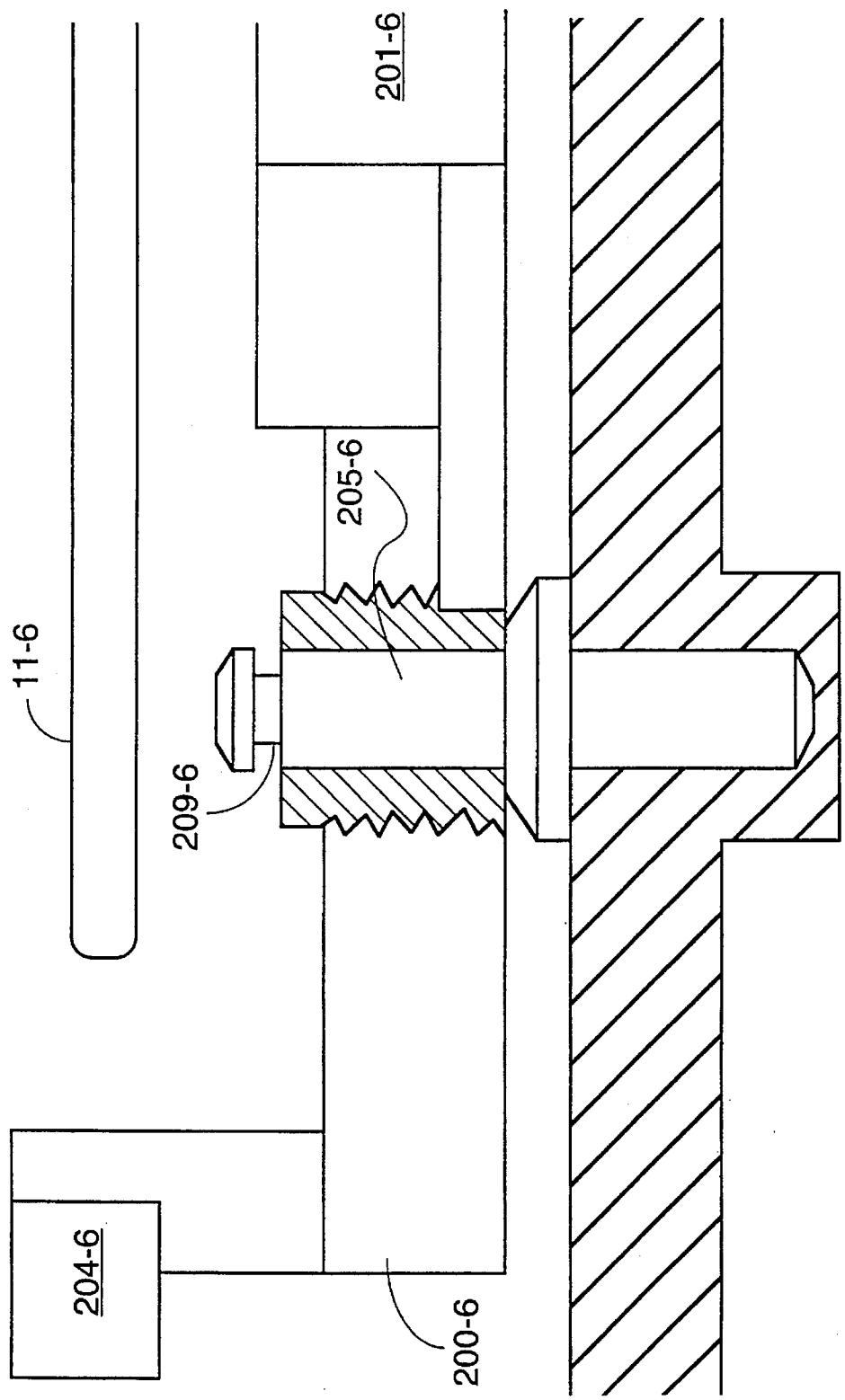
FIG. 58 is a detailed elevational view of the inertial latch of FIG. 55.

FIG. 57 illustrates a detailed top view of inertial latch 200-6 as mounted. A whisker spring 208-6 is placed on top of inertial latch 200-6. In the embodiment shown, whisker spring 208-6 has a circular cross section 0.005 inches in diameter, but it need not have a circular cross section. A leaf spring may be substituted for whisker spring 208-6. Whisker spring 208-6 fits into a groove 209-6 near the top of shaft 205-6. This is shown in FIG. 58, which is a side elevational view of inertial latch 200-6 taken through cross section 58 shown in FIG. 57. One end of whisker spring 208-6 is fitted into a cored area 210-6 in inertial latch 200-6. The other end of whisker spring 208-6 is inserted into a slot 211-6 of which is machined into body 10-6C. The relative positions of cored area 210-6, shaft 205-6 and slot 211-6 are arranged such that whisker spring is pretensioned and urges inertial latch 200-6 in a clockwise direction, bringing contact surface 203-6 into contact with outer crash stop block 206-6. The seating of whisker spring 208-6 in groove 209-6 retains inertial latch 200-6 on shaft 205-6. Inertial latch 200-6 may also be retained on shaft 205-6 by means of a retaining ring (e.g., an "E"-clip).

Figure 59:
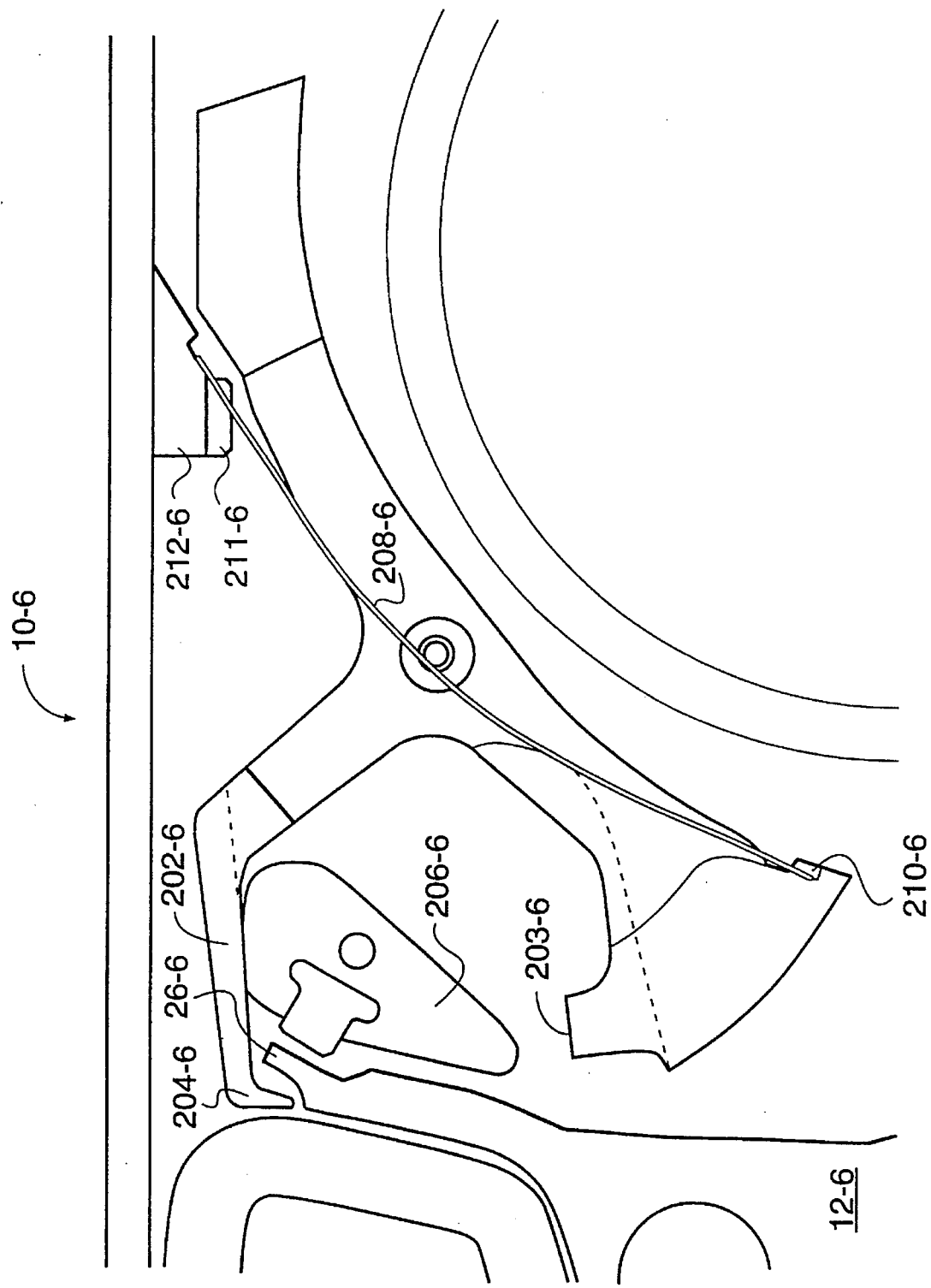
FIG. 59 illustrates the inertial latch of FIG. 55 in a locked position.

Inertial latch 200-6 is normally in the position shown in FIG. 57. When disk drive 10-6 experiences a clockwise rotational shock, inertial latch 200-6 rotates in a counterclockwise direction until the inner edge of pawl 202-6 comes into contact with a surface of outer crash stop block 206 (see FIG. 59). In this position hook 204-6 will engage finger 26-6 so as to prevent actuator 12-6 from rotating. Once the shock has passed, whisker spring 208-6 will urge inertial latch 200-6 towards its normal position, where surface 203-6 makes contact with outer crash stop block 206-6. The placement of whisker spring 208-6 on top of inertial latch 200-6 minimizes friction and thereby maximizes the response speed of inertial latch 200-6 to a rotational shock.

Figure 60:
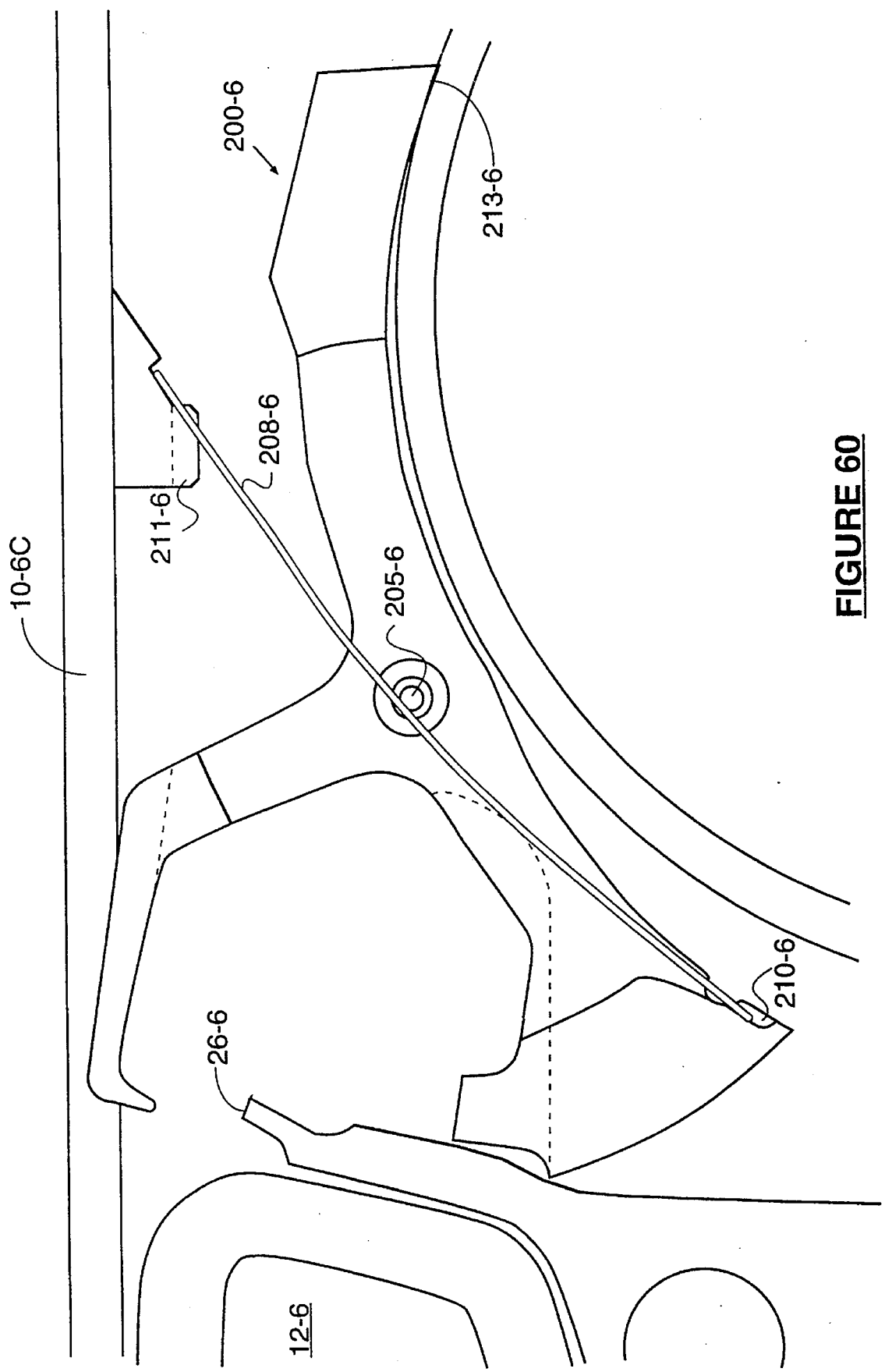
FIG. 60 illustrates the manner of mounting the inertial latch of FIG. 55.

The ease of assembling this embodiment makes it particularly attractive. As shown in FIG. 60, inertial latch 200-6 is simply fitted onto shaft 205-6 and whisker spring 208-6 is fitted into cored area 210-6, groove 209-6 and slot 211-6. Inertial latch 200-6 is preferably installed before outer crash stop block 206-6, and a surface 213-6 of body 10-6C acts as a stop for inertial latch 200-6 during installation. Installing inertial latch 200-6 in this sequence may make it easier to install actuator 12-6.

Read/write transducers 5 which are supported on the ends of load beams 14-1 and 14-2 are dynamically loaded and unloaded from the surfaces of magnetic disk 10 through the use of a lift tab 17 which is integrally formed at the free end of load beams 14-1 and 14-2. The details of load beams 14-1 and 14-2 and lift tab 17 are described more fully hereinafter in connection with FIGS. 6A–6I. Cam assembly 18, in conjunction with load tab 17, on each of the load beams provide for the dynamic loading and unloading of write/read transducers 5. As pointed out above, an alternative to the dynamic head loading illustrated in the figures herein is the use of the dynamic head load structure in the above described U.S. patent application Ser. No. 07/629,957, as well as using contact start stop techniques.

Feedthrough connector 19 mounted on baseplate 6 includes a plurality of terminals 20 which extend through baseplate 6 and provide connection between the electronics internal of the HDA portion of disk drive 1 and those external to the HDA. For example, printed circuit board 2 includes various electrical circuitry, which will be more specifically described hereinafter in connection with FIGS. 7A and 7B. Within the housing of microminiature hard disk drive 1, read/write preamp circuitry is included on read/write integrated circuit chip 21, and the signals to and from read/write preamp IC chip 21 are provided to the external portion of hard disk drive 1 utilizing connector 22 which interfaces with pins 20 on feedthrough connector 19. Signals to and from spin motor 3 are provided via flat cable 23, one end of which is connected to spin motor 3 and the other end of which connected to connector 24. Connector 24 plugs onto some of pins 20 of feedthrough connector 19 to pass signals to and from the exterior of the housing of miniature hard disk drive 1.

Included in rotary actuator assembly 15 is an inner crash stop assembly 25 which provides the crash stop function to prevent read/write transducer heads 5 from crashing into the inner portion of the rotary disk and spindle and thereby damaging the heads and/or the magnetic recording surface. Inner crash stop assembly 25 is illustrated in detail in FIG. 3C which will be described later herein.

The interior of hard disk drive 1 is enclosed utilizing top cover 26, a suitable gasket (not shown in FIG. 1). Top cover 26, which is composed of die cast aluminum, is held securely in place on baseplate 6 utilizing suitable mounting screws, not shown. In a stacked configuration, printed circuit board 2 is supported beneath baseplate 6 utilizing suitable fastening means (not shown). Gasket 27 is illustrated in the cross-sectional view of microminiature hard disk drive 4, shown in FIG. 4.

Female connector 28 on printed circuit board 2 is positioned directly beneath the lower portions (not shown) of pins 20 to couple signals from the interior of hard disk drive 1 to the printed circuit board 2. Male connector 29 provides direct connection from the HDA of disk drive 1 and the electronics located on printed circuit board 2 to the system with which rigid disk drive 1 and its associated electronics are connected. The interface between hard disk drive 1 and the system in which it will be used may take various forms, such as SCSI, microchannel or AT Bus. In FIG. 1, integrated circuits 30 and 31 on printed circuit board 2, as well as others not shown, implement the external drive electronics which is illustrated in block diagram form in FIG. 7B.

Referring to FIG. 2A, a top plan view of hard disk drive 1 stacked above printed circuit board 2 is illustrated. The width of hard disk drive 1 is measured from peripheral edge 32 to peripheral edge 33 is approximately 35 mm. The length of hard disk drive 1, as measured from peripheral edge 34 to rear peripheral edge 35 is approximately 50.8 mm. In FIG. 2A, hard disk drive and its associated printed circuit board 2 are illustrated in a stacked configuration in which printed circuit board 2 is directly beneath hard disk drive 1. As pointed out earlier herein, the side to side rear dimensions in the stacked version, as measured from rear peripheral edge 33 of hard disk drive 1 to left edge 36 of printed circuit board 2 is approximately 41 mm.

FIG. 2B is a view taken along lines 2B—2B of FIG. 2A. The height of hard disk drive 1 and printed circuit board 2 mounted in the stacked relationship, with the height measured from top surface 37 of hard disk drive 1 to the lower surface 38 of printed circuit board 2 is approximately 6.3 mm. Tall electrical components can be placed on printed circuit board 2 to take advantage of cavities or pockets in baseplate 6, thereby facilitating the low profile packaging.

Figure 2C:
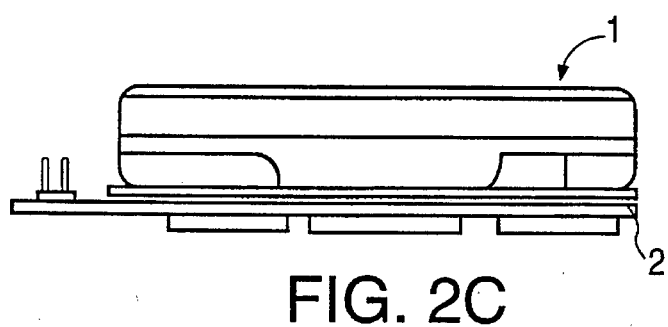
FIG. 2C is a view taken along the lines of 2C—2C of FIG. 2A.

FIG. 2C is a view taken along lines 2C—2C of FIG. 2A.

Figure 2D:
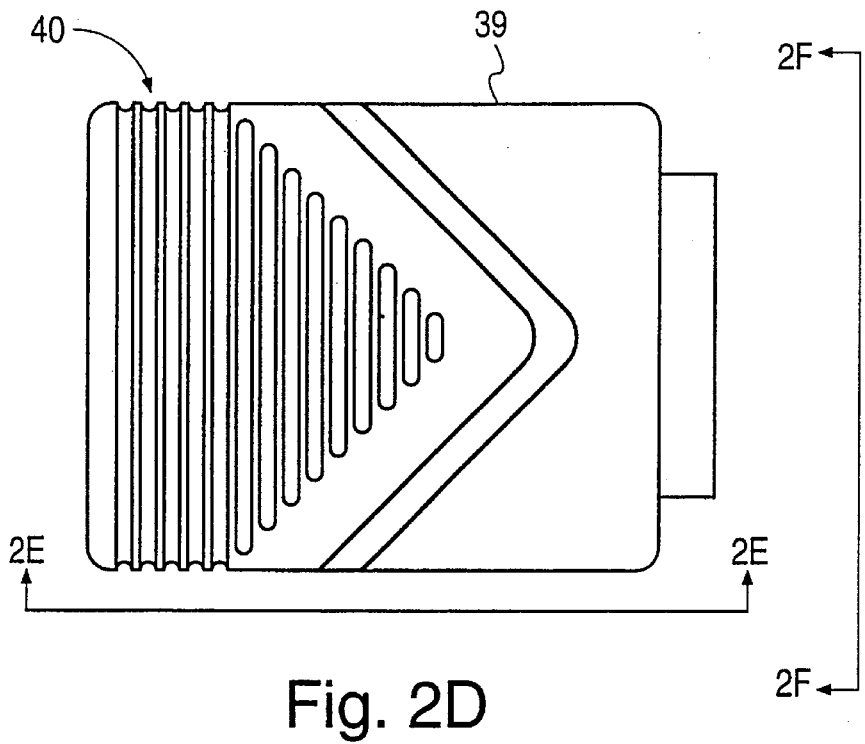
FIG. 2D is a top-plan view of an alternative embodiment of a rigid disk in accordance with the present invention which utilizes a resilient cover and a pluggable connector.

Referring to FIG. 2D, a top plan view of an alternative embodiment of the present invention is illustrated. In FIG. 2D, a disk drive in accordance with the present invention is enclosed within a resilient cover 39 which encases and provides shock mount protection for the hard disk drive included within resilient cover 39. Resilient cover 39 includes gripping surface 40 to facilitate easy insertion and removal of the package into a plug relationship with a host computing device. For example, as illustrated in FIG. 2F, which is a view taken along lines 2F—2F in FIG. 2D, electrical connector 41 which includes a plurality of pins, and extends from one edge of the disk drive included within resilient cover 39, provides electrical connection between the hard disk drive included within the cover and the host computing device which communicates with the removable disk drive enclosed within cover 39.

Figure 2E:
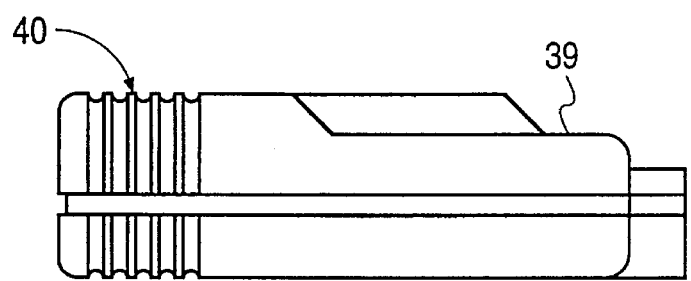
FIG. 2E is a view taken along the lines 2E—2E of FIG. 2D.
Figure 2F:
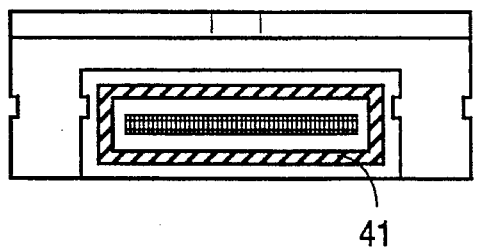
FIG. 2F is a view taken along the lines 2F—2F of FIG. 2D.

FIG. 2E is a view taken along lines 2E—2E of FIG. 2D, and illustrates in side view the hard disk drive which is enclosed within cover 39. The resilient cover 39 and the pluggable feature of the disk drive are described and claimed in U.S. patent application Ser. No. 07/765,349 of J. Morehouse et al. filed Sep. 25, 1991, issued Sep. 27, 1992 as U.S. Pat. No. 5,149,048 and entitled "Shock Absorbent Mounting Arrangement For Disk Drive Or Other Component", which is incorporated herein by reference in its entirety.

Referring to FIGS. 43 and 44, an architecture of the present invention incorporates a head-disk assembly (HDA) which comprises a spindle motor 10-5, an information bearing disk 20-5, and one or more read/write heads 30-5 which are disposed on an actuator 50-5 to read from or write to the disk 20-5.

The read/write head 30-5 is disposed on arm 50-5 which is fixedly disposed on an actuator 40-5. The actuator 40-5 pivots about a shaft 45-5 to move the read/write head 30-5 over a sweep angle $\phi$ between an outer periphery 23-5 and an inner periphery 24-5 of the disk 20-5.

The spindle motor 10-5 is preferably a low-profile DC brushless motor as shown in FIG. 43. The spindle motor 10-5 is comprised of a motor housing 11-5 within which is disposed a stator. The stator comprises magnetic laminations 13-5 and coil windings 14-5. A rotor 15-5 includes a rotor shaft 16-5 which is rotatably disposed on the spindle motor 10-5 by means of spindle bearings 60-5. The rotor 15-5 includes a cap 31-5 connected to one end of the rotor shaft 16-5, a cylindrical portion 32-5 connected at a first end to cap 31-5, the cylindrical portion 32-5 being coaxial with the rotor shaft 16-5, and a disk-shaped portion connected to a second end of the cylindrical portion 32-5. Disposed on the outer periphery of the disk shaped portion of the rotor 15-5 are rotor magnets 18-5. On an upper surface 28-5 of the disk-shaped portion of the rotor 15-5 is machined a disk mounting surface 27-5. The disk mounting surface 27-5 provides a relief for machining purposes for precisely positioning the disk 20-5 relative to the read write head 30-5 and for applying a uniform force on a lower (first) surface 21-5 of the disk 20-5. The disk mounting surface 27-5 separates the lower surface 21-5 of the disk 20-5 from the upper surface 28-5 of the disk-shaped portion of the rotor 15-5 by a minimal distance of approximately 0.13 mm. Therefore, the disk 20-5 substantially abuts the disk-shaped portion of rotor 15-5.

Disposed on the disk mounting surface 27-5 is the disk 20-5, the disk 20-5 being held against the disk mounting surface 27-5 by means of a clamp 19-5 having a second diameter. Similar to the mounting surface 27-5, the clamp 19-5 has a precision surface to apply a uniform clamping force on an upper (second) surface 22-5 of the disk 20-5.

The architecture of the present invention is characterized in that the lower surface 21-5 of the disk 20-5 substantially abuts the upper surface 28-5 of the rotor 15-5. In addition, the architecture of the present invention is characterized in that the lower surface 21-5 of the disk 20-5 is not used for information storage; that is, the read/write head 30-5 incorporated into a disk drive device incorporating the architecture of the present invention are located above a plane P defined by the lower surface 21-5 of the disk 20-5. Finally, the architecture of the present invention is characterized in that the disk 20-5 is used as a shield for information read from or written to the upper surface 22-5 of the disk 20-5 and neither a ferrite nor other shield is required.

The architecture of the present invention facilitates modifications to the spindle motor 10-5 which result in a low-profile design well-suited for disk drive devices incorporating disks having an outer diameter of 1.8 inches or less. There is essentially no space, similar to the space t (discussed in the Background) between the upper surface 28-5 of the rotor 15-5 and the lower surface 21-5 of the disk 20-5, as is required in the prior art low-profile architecture. Instead, the flat upper surface 28-5 of the rotor 15-5 substantially abuts the lower surface 21-5 of the disk 20-5. In addition, the outer diameter of the spindle motor 10-5 is not limited as in the prior art low-profile architecture. Since motor power is substantially related to motor volume, the spindle motor may be made with a larger diameter and lower profile without sacrificing power. For use with a 1.8 inch disk, the spindle motor diameter may be approximately 31 mm, the thickness reduced to approximately 5.0 mm. Because there is essentially no space between the disk 20-5 and the motor 10-5, the minimum thickness of a single disk, one-head HDA incorporating the present architecture is approximately 7.1 mm (adding 1.5 mm for the necessary read/write head clearance). This is approximately one half of the 13.6 mm thickness of a typical prior art one-disk, two-head HDA.

In addition a spindle motor with a larger diameter and thinner profile is superior to smaller diameter motors in that they produce a larger torque constant, lower rotational jitter, increased inertia and allow the motor bearings to be placed inside the stator to further reduce HDA height.

In addition to the lower profile, an HDA incorporating the architecture of the present invention provides an additional advantage over the prior art low-profile architecture in that the read/write head 30-5 disposed over the upper surface 22-5 is capable of accessing information tracks closer to the rotor shaft 16-5. The accessible disk storage space is increased over the prior art low-profile in that the sweep angle ϕ is not restricted by the lower surface 21-5 of the disk 20-5, as in the prior art. The amount of additional information track storage space per disk surface accessed by the read/write head 30-5 is approximately 40% greater than the storage space accessed using the preferred motor size of the prior art low-profile architecture and disks having the same size and density. Therefore, a greater storage capacity per disk surface is achieved.

Also characteristic of the present architecture is a reduction of the number of read/write heads 30-5 needed to access substantially the same or more information surface on the disk 20-5 and any additional disk mounted above the disk 20-5. The reduction in the number of read/write heads also reduces the spindle motor starting torque in the case of a contact start-stop head/disk interface, thereby conserving battery power in portable applications. A similar advantage is achieved in the case of dynamic loaded heads where the actuator load/unload torque is also proportionally reduced.

Also characteristic of the present architecture is that the rotor 15-5 acts as shielding member for electrical and magnetic fields emanating from the spindle motor 10-5 (FIG. 44). The disk 20-5 acts as a further shielding member for the upper surface 22-5, which is used for information storage, by means of the magnetic disk coating on the lower surface 21-5 and eddy current shielding due to the conductive disk substrate. Therefore, no ferrite shield is necessary as in the typical prior art architecture.

Comparison between the HDA of FIG. 43 and the one typical disk, two head prior art HDA yields the following results. First, as discussed above, the height of the HDA of FIG. 43 is approximately one-half the height of the prior art HDA. Second, because the rotor 15-5 and disk 20-5 act as shields, it is less likely a read/write error will occur in the HDA of FIG. 43 than in the prior art HDA. Finally, because the read/write head 30-5 accesses 40% more storage area per disk, the single-head HDA of FIG. 43 provides approximately 70% of the information storage capacity of the two-head HDA. Given the lower-profile and greater shielding provided with the present invention, a 30% decrease in storage capacity is an acceptable trade-off in some situations.

Figure 45:
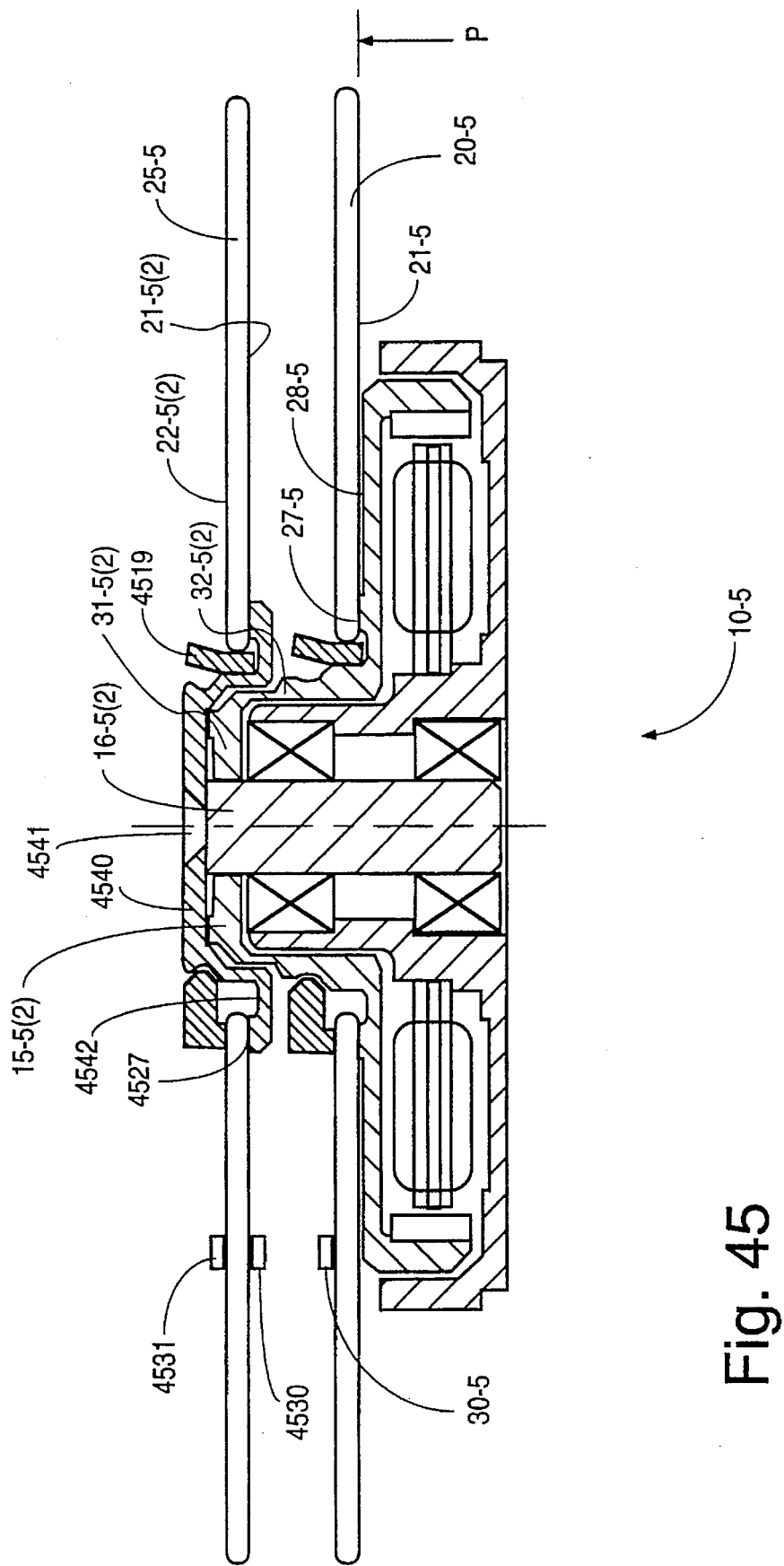
FIG. 45 is a section view of a two-disk HDA according to the present invention.

A two-disk HDA according to the present invention is shown in FIG. 45. The two-disk HDA comprises a motor 10-5 incorporating an extended rotor shaft 16-5(2). A modified rotor 15-5(2) is press-fitted onto the rotor shaft 16-5(2). The modified rotor 15-5(2) includes a cap 31-5(2) connected to one end of the rotor shaft 16-5(2), a cylindrical portion 32-5(2) connected at a first end to cap 31-5(2), the cylindrical portion 32-5(2) being coaxial with the rotor shaft 16-5(2), and a disk-shaped portion connected to a second end of the cylindrical portion 32-5(2). A first disk 20-5 is clamped to the upper surface 28-5 of the disk-shaped portion of the rotor 15-5(2) as in the single-disk embodiment shown in FIG. 43. In addition, a top cap 4540 is mounted by means of a screw 4541 to the top of the rotor shaft 16-5(2). The top cap 4540 has a depending portion 4542 which defines a second mounting surface 4527. A second disk 25-5 is clamped to the second mounting surface 4527 by means of a second clamp 4519. Second and third read/write heads 4530 and 4531 are mounted to arms (not shown) of the actuator (not shown) and disposed adjacent the lower surface 21-5(2) and upper surface 22-5(2) of second disk 25-5. In a similar manner, one or more additional disks may be mounted to the rotor of FIG. 45.

Since both sides of the one or more additional disks are used for information storage, the architecture of the two-disk HDA of FIG. 45 is characterized in that, if the number of information bearing disks mounted on the spindle motor is designated as n, the number of read/write heads used is defined by the equation $2n-1$.

Figure 46:
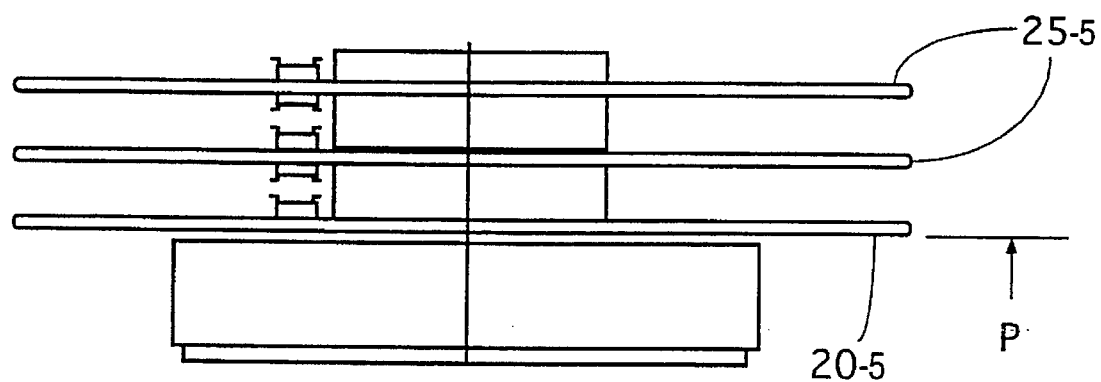
FIG. 46 is a simplified side view of a three-disk HDA according to the present invention.

The architecture of the two-disk HDA of FIG. 45 is further characterized in that, where first disk 20-5 and the one or more additional disks 25-5 are incorporated into an HDA with the first disk 20-5 disposed adjacent the spindle motor 10-5, the lower surface 21-5 of the first disk 20-5 defining a plane P (shown in side view in FIGS. 45 and 46), one read/write head 30-5 being disposed adjacent the first disk 20-5, and two read/write heads 4530 and 4531 being disposed adjacent each of the one or more second disks 25-5, all of the read/write heads are disposed only on a side of the plane P opposite to a side containing the spindle motor 10-5.

Assuming the thickness of the motor 10-5 shown in FIG. 45 is approximately 5 mm, as measured from a bottom surface of the motor 10-5 to the upper surface 28-5, the height of the two-disk embodiment is calculated as follows. The distance between the upper surface 22-5 of the first disk 20-5 and the lower surface 21-5(2) of the second disk is approximately two times the space t, or approximately 3.0 mm. An additional 1.5 mm is necessary above the second disk 25-5 for disposing the read/write head 4531. Finally, assuming the disk thickness is 0.6 mm, the height of the two-disk HDA of FIG. 45 is approximately 10.7 mm.

Figure 49A:
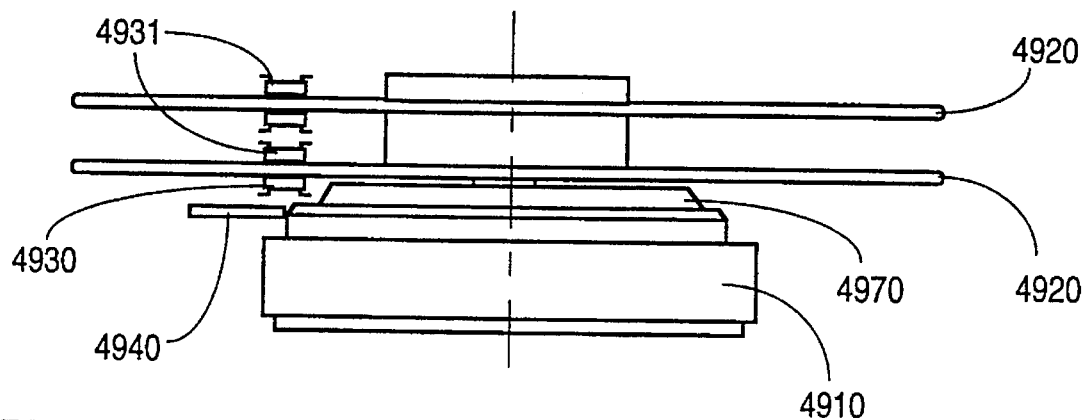
FIGS. 49A and 49B are side views of two- and three-disk embodiments of HDAs incorporating a prior art low-profile motor architecture.

The two-disk HDA of FIG. 45 yields significant advantages over the two-disk, four-head prior art HDA shown in FIG. 49A. The reduction of motor height by approximately one-half and the elimination of the space between the motor and the lower disk 20-5 yields an approximate 6.5 mm reduction in thickness over the prior art HDA of FIG. 49A. Moreover, because the read/write head 30-5 accesses information tracks closer to the rotor shaft 16-5(2), the sweep angle $\phi$ (shown in FIG. 44) of the two-disk HDA of FIG. 45 is significantly larger than the sweep angle $\theta$ of the prior art embodiment of FIG. 49A. Accordingly, a read/write head accesses 40% more disk surface area in the HDA of FIG. 45 over the HDA of FIG. 9A. Therefore, the HDA of FIG. 45 has 1.4 times the information storage capacity per disk surface over the prior art HDA of FIG. 49A. Accordingly, the three disk surfaces of the HDA of FIG. 45 provide a storage capacity which is approximately 4% greater than the four disk surfaces of the prior art HDA of FIG. 49A.

The comparison between the HDA of FIG. 45 and prior art HDA of FIG. 49A is summarized in the following table:

|  | Prior Art Two-Disk Architecture (FIG. 49A) | Two-Disk Present Architecture (FIG. 45) |
| --- | --- | --- |
| Disk Storage Area Outer Data Radius; | 21.56 mm | 21.56 mm |
| Inner Data Radius; | 14.80 mm | 11.11 mm |
| Relative Data Capacity per Disk Surface; | 1.0 | 1.39 |
| Number of Disks: | 2 | 2 |
| Number of Available Data Surfaces: | 4 | 3 |
| Total Relative Storage Capacity: | 4.0 | 4.17 |
| Capactiy Ratio: | 1.0 | 1.0425 |
| HDA Thickness Motor Thickness | 10 mm | 5 mm |
| Total Disk Thickness (Approximately 0.6 mm per disk) | 1.2 mm | 1.2 mm |
| Number of Heads | 4 | 3 |
| Total Space needed for heads (Approximately 1.5 mm per head) | 6 mm | 4.5 mm |
| Approx. HDA thickness: | 17.2 mm | 10.7 mm |

Figure 49B:
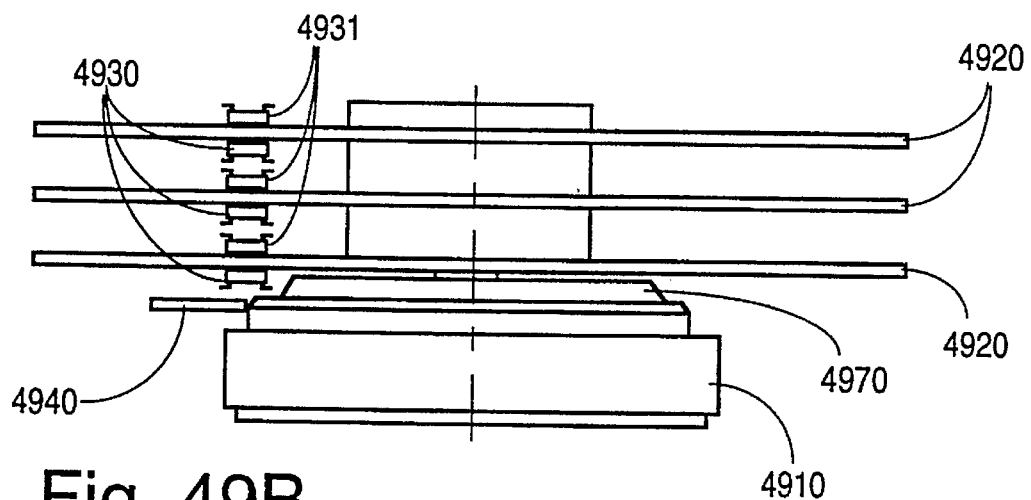

Because of the approximate reduction in thickness of one-third and the slight increase in storage capacity, the embodiment shown in FIG. 45 is preferable to the prior art HDA of FIG. 49A. In addition, further increases in storage capacity are achieved with the three-disk, five-head HDA shown in FIG. 46, as compared with the three-disk, six head prior art HDA of FIG. 49B.

Figure 47A:
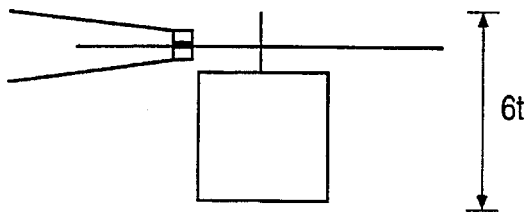
FIGS. 47A–47H are simplified side views of a various prior art and present HDA embodiments.
Figure 47B:
Figure 47C:
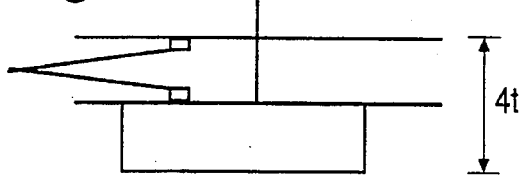
Figure 47D:
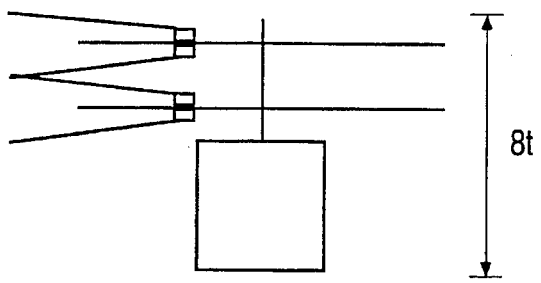
Figure 47E:
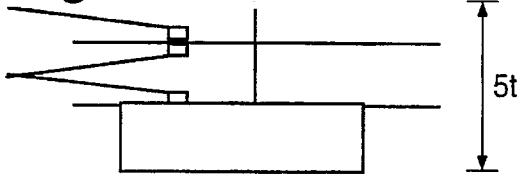
Figure 47G:
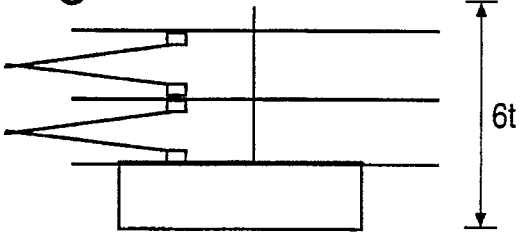
Figure 47F:
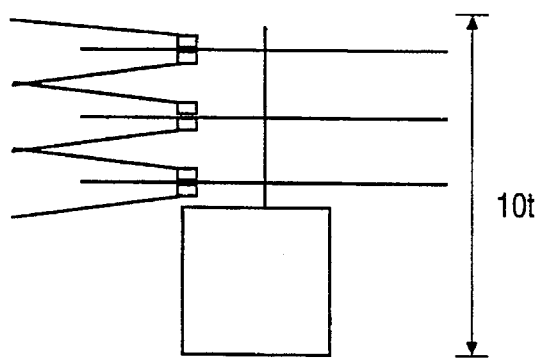
Figure 47H:
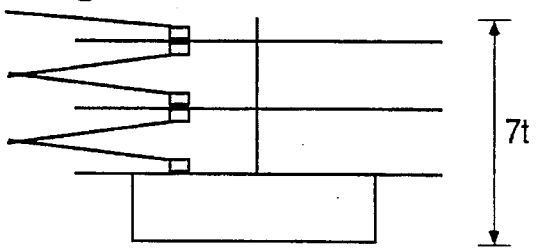

FIGS. 47A–47H illustrate various simplified HDAs according to the present invention and the prior art architecture. FIGS. 47A–47H, in conjunction with the below table, are provided to better illustrate the advantages of the present architecture over the prior art low-profile architecture. In addition, FIGS. 47C and 47G illustrate two other possible embodiments according to the architecture of the present invention. For simplification purposes., the height of the prior art motors in FIGS. 47A, 47D and 47F are assumed to be four times the space t, or 6 mm. The motors of the present embodiments shown in FIGS. 47B, 47C, 47E, 47G and 47H are all assumed to be two times the space t, or 3 mm. In addition, the space taken up by the thickness of the disks is disregarded. Finally, the storage capacity per disk surface accessed by the read/write heads of the present embodiments is assumed to be 1.4 times the storage capacity per disk surface accessed in the prior art HDAs.

With the above assumptions, comparisons between the prior art HDAs and the HDAs according to the present invention are listed in the below table. Note that the height ratio is the thickness of the "HDA2" divided by the thickness of "HDA1". Similarly, the capacity ratio is the capacity of "HDA2" divided by the capacity of "HDA1".

| Comparison HDA1 vs. HDA2 | Thickness HDA1 | Capacity HDA1 | Thickness HDA2 | Capacity HDA2 | Height Ratio | Capacity Ratio |
| --- | --- | --- | --- | --- | --- | --- |
| 47A vs. 47B | 6t | 2 × 1 = 2 | 3t | 1 × 1.4 = 1.4 | 1/2 | 0.7 |
| 47A vs. 47C | 6t | 2 | 4t | 2.8 | 2/3 | 1.4 |
| 47D vs. 47E | 8t | 4 | 5t | 4.2 | 5/8 | 1.05 |
| 47D vs. 47G | 8t | 4 | 6t | 5.6 | 3/4 | 1.4 |
| 47F vs. 47H | 10t | 6 | 7t | 7.0 | 7/10 | 1.16 |

As noted from the above table, comparison between two-head prior art HDA of FIG. 47A and the two-head HDA of FIG. 47C yields an increase in storage capacity of approximately 40%, while requiring one-third less HDA thickness. Similarly, a comparison between four-head prior art HDA of FIG. 47D and the four-head HDA of FIG. 47G yields an increase in storage capacity of approximately 40%, while requiring one-fourth less HDA thickness.

Figure 48A:
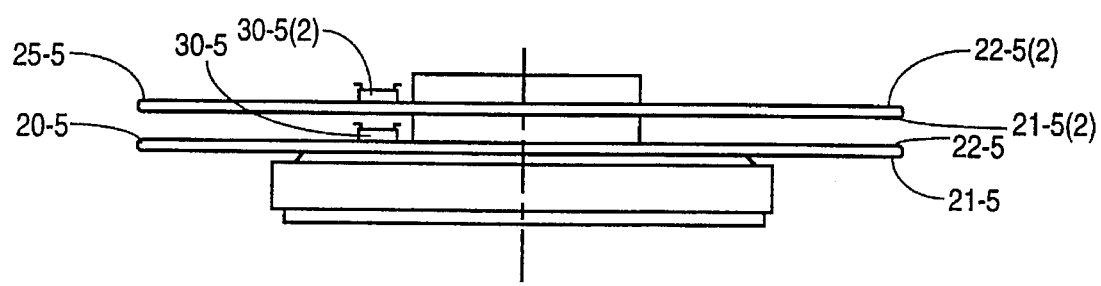
FIGS. 48A and 48B are side views of alternative embodiments of the present invention incorporating two- and three-disk structures.
Figure 48B:
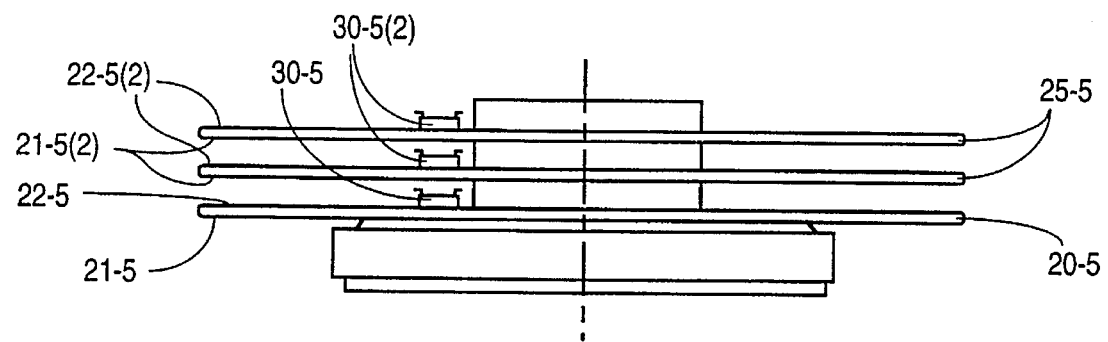

One skilled in the art would recognize from the embodiments shown in FIGS. 47A–47H that many variations are possible in the number of heads versus the number of disks in order to meet specific requirements. For instance, the HDAs of FIGS. 48A and 48B illustrate a two-disk, two-head HDA, and a three-disk, three-head HDA, respectively, according to the present invention. Each of these HDAs would provide approximately 70% of the storage capacity of the two- and three-disk HDAs of FIGS. 49A and 49B, but would require much less HDA thickness.

Figure 3A:
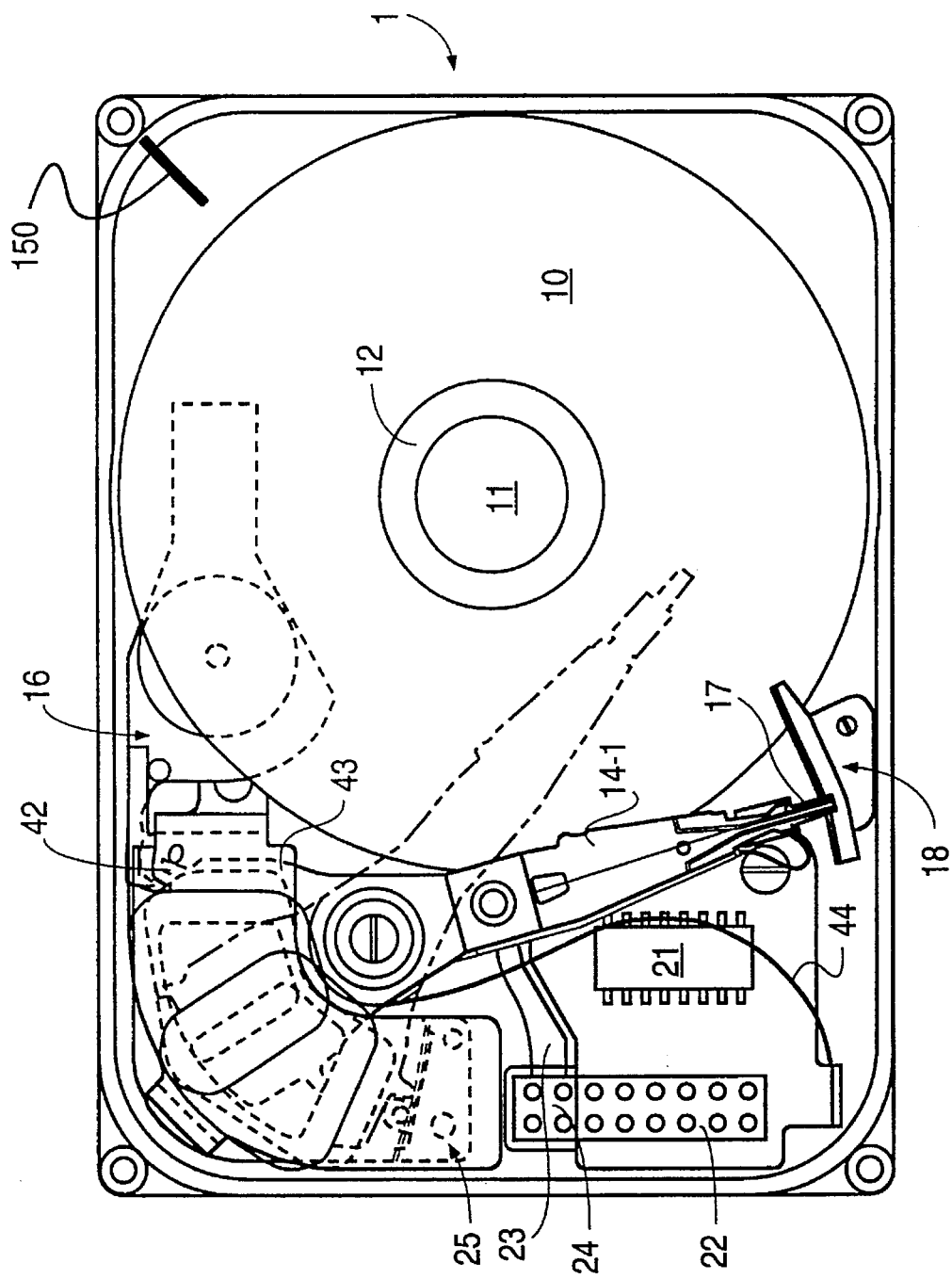
FIG. 3A is a top-plan view of a dynamic head loading version of a disk drive in the course of the present invention.

Microminiature hard disk drive 1 is illustrated in FIG. 3A in the top plan view, with the top cover 26 removed for illustration of the components. In FIG. 3A, load beam 14-1 and its associated read/write transducer is illustrated in a parked position off the disk and in its innermost position of travel. In the hard disk drive 1 structure dynamic head loading is utilized and therefore when the disk drive is powered down and, i.e., not rotating, load beams 14 and 14-1 and 14-2 (not shown) one moved to the position illustrated where lift tab 17 is in a parked position on cam assembly 18 to prevent the read/write transducer heads from interfering with or damaging the disk surface. As will be appreciated by referring to the drawing, when the actuator has moved the heads to the unloaded position, projection 42 from coil support extension 43 is positioned for engagement with the free end of inertial latch 16' in the event of a shock to the drive. In the event of a shock, inertial latch 16' will move such that its free end will engage with projection 42 on actuator coil support extension 43 and prevent the-actuator, and accordingly the read/write heads, from moving across the surface of the disk. The details of the rotary actuator and body are described and disclosed more fully hereinafter with respect to FIG. 5A for the dynamic head loading version and FIG. 5B for the contact start/stop version of the drive. It will also be appreciated by viewing FIG. 3A that inner crash stop assembly 25 (which will be described fully hereinafter in the explanation of FIG. 3C) prevents the actuator from moving more fully then the most inwardly disclosed position in FIG. 3A. Also illustrated in FIG. 3A is read/write analog integrated circuit 21 and connector 22 which is positioned over feed through connector 19 (not shown since it is beneath connector 22). In the same general area, it will also be recognized that flat cable 23 and connector 24, which provides electrical connection from the spin motor to the pins on feed through connector 19, is also illustrated. Flex cable 44 is utilized to transmit the signals from the read/write recording head to read/write preamp chip 21 is illustrated in the lower left-hand corner of drive 1. Also included in the HDA housing is recirculating filter 150 to filter the air within the interior of the housing.

Figure 5A:
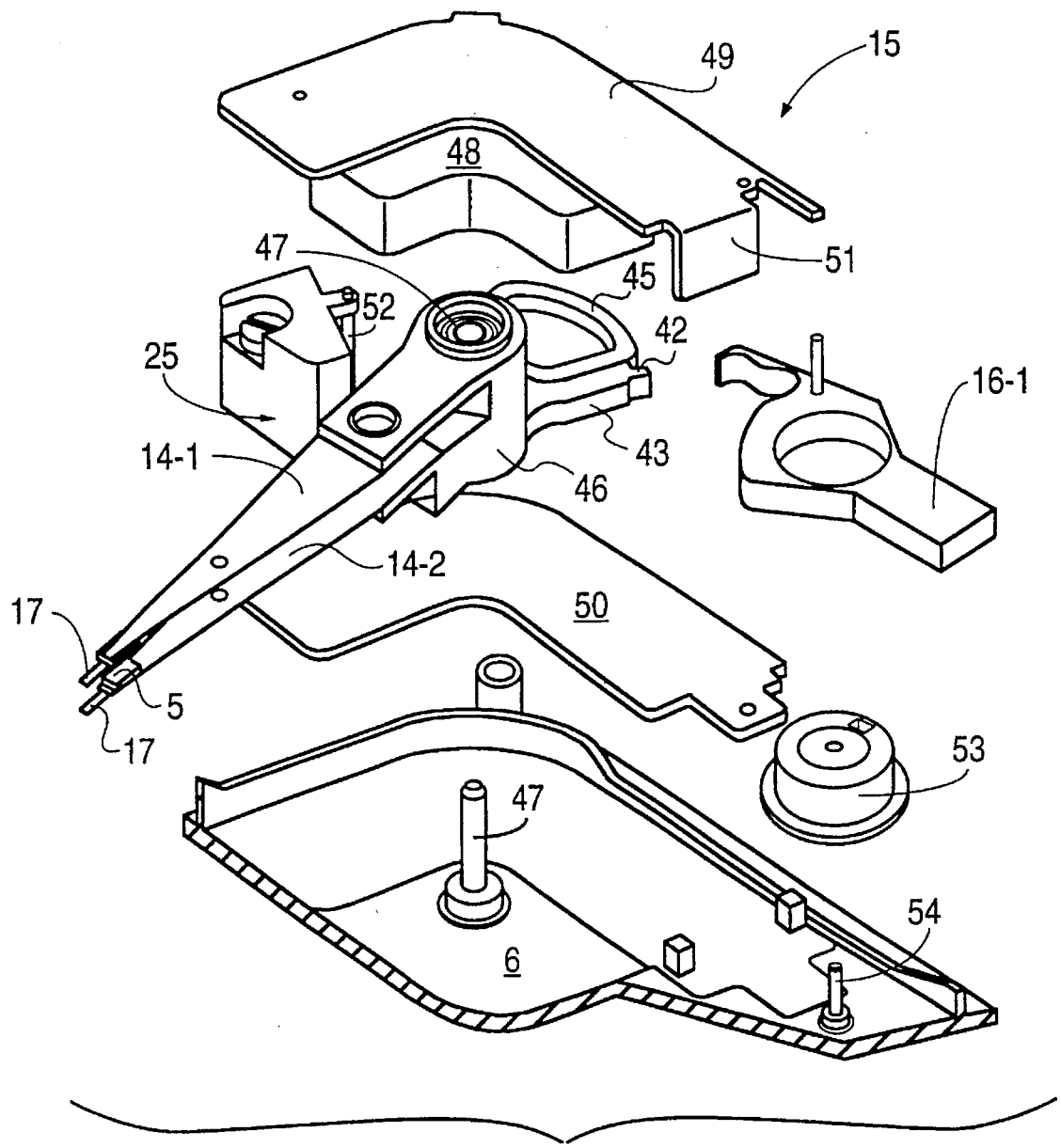
FIG. 5A is an exploded perspective view of the rotary actuator portion of a version of the disk drive in accordance with the present invention which utilizes dynamic loading and unloading and includes an inertial latch.

Details of the rotary actuator mechanism will best be appreciated by reference to FIG. 5A which is an exploded view of the corner portion of hard disk drive 1 where the rotary actuator is positioned. Rotary actuator assembly 15 is of the moving coil type, that is a magnet is maintained in a stationary position and the movable portion of the actuator includes coil 45 which is supported on coil support extension 43 of actuator body 46. Included in actuator body 46 is a bearing assembly 47 for rotatably supporting actuator body 46 about pin 47 which is connected to base plate 6. Also illustrated in FIG. 5A is upper load beam 14-1 and lower load beam 14-2 which are rigidly supported on actuator body 46 for rotation and positioning of read/write transducers 5 above the surface of disk 10. It will also be noted that lift tabs 17 extend from the free ends of load beams 14-1 and 14-2. The flux field is established through actuator coil 45 through-the use of magnet 48, which is supported on top plate 49 to position the magnet 48 above the top surface of actuator 45. Lower plate 50 of the magnet assembly provides the lower portion of the flux path in conjunction with the down turned portion 51 of top plate 49. Inner crash stop assembly 25 with preload pin 52 is positioned between top plate 49 and lower plate 50. As pointed out above, the inner crash stop prevents the rotation of rotary actuator beyond a predetermined inner travel to prevent the read/write transducer heads from travelling into an unburnished portion of the disk surface or hitting HDA components. Inertial latch 16' is supported for rotation on base plate 6 by inertial lock sleeve 53, the inner portion of which is supported on pin 54 and the outer portion of which is fitted within the aperture of inertial latch 16'. Further details of the rotary latch mechanism are found in the above-identified U.S. Pat. No. 5,189,576 of Morehouse et al. issued Feb. 23, 1993, and U.S. patent application Ser. No. 07/765,353.

Figure 5C:
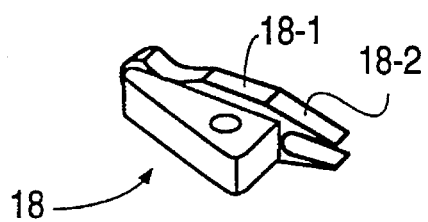
FIG. 5C is a perspective view of cam assembly 18.

Better appreciation of the cam assembly 18 will be gained by reference to FIG. 5C. Referring concurrently to FIGS. 3A and FIG. 5C, it will be appreciated that lift tabs 17 in cooperation with cam surface 18-1 cooperate to move the load beams, and accordingly the read/write transducer heads, above the surface of the disk when the rotary actuator is moved into the unloaded position as illustrated in FIG. 3A where lift tab 17 is at a rest position above surface 18-1 of cam assembly 18. The lower cam surface (not shown) of cam assembly 18 is substantially identical to the upper cam surface 18-1, and therefore in cooperation with lift tab 17 on load beam 14-2 moves the lower read/write transducer away from the lower surface of disk 10.

Figure 3B:
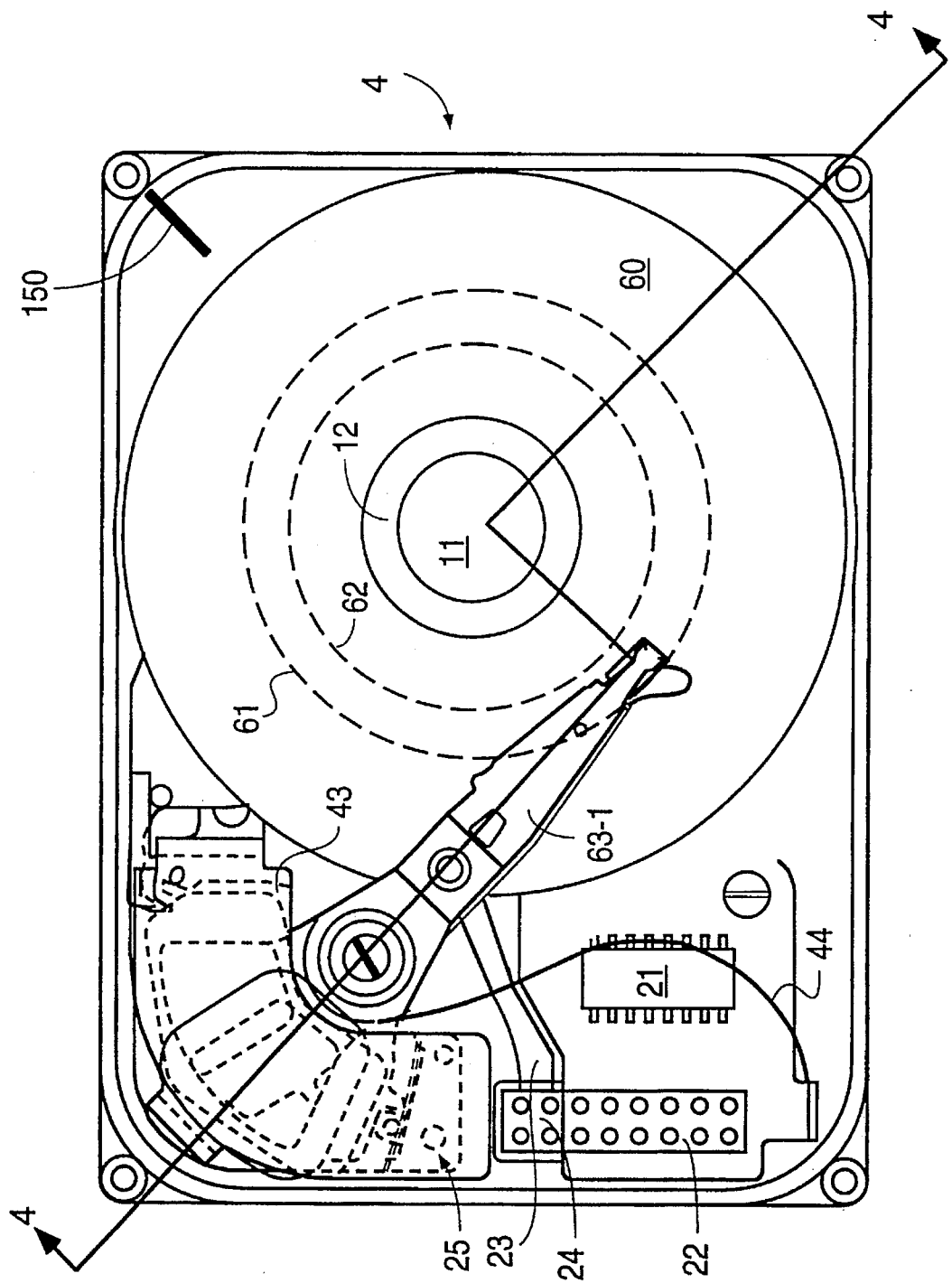
FIG. 3B is a top-plan view of a contact start-stop version of a rigid disk drive in accordance with the present invention.
Figure 3C:
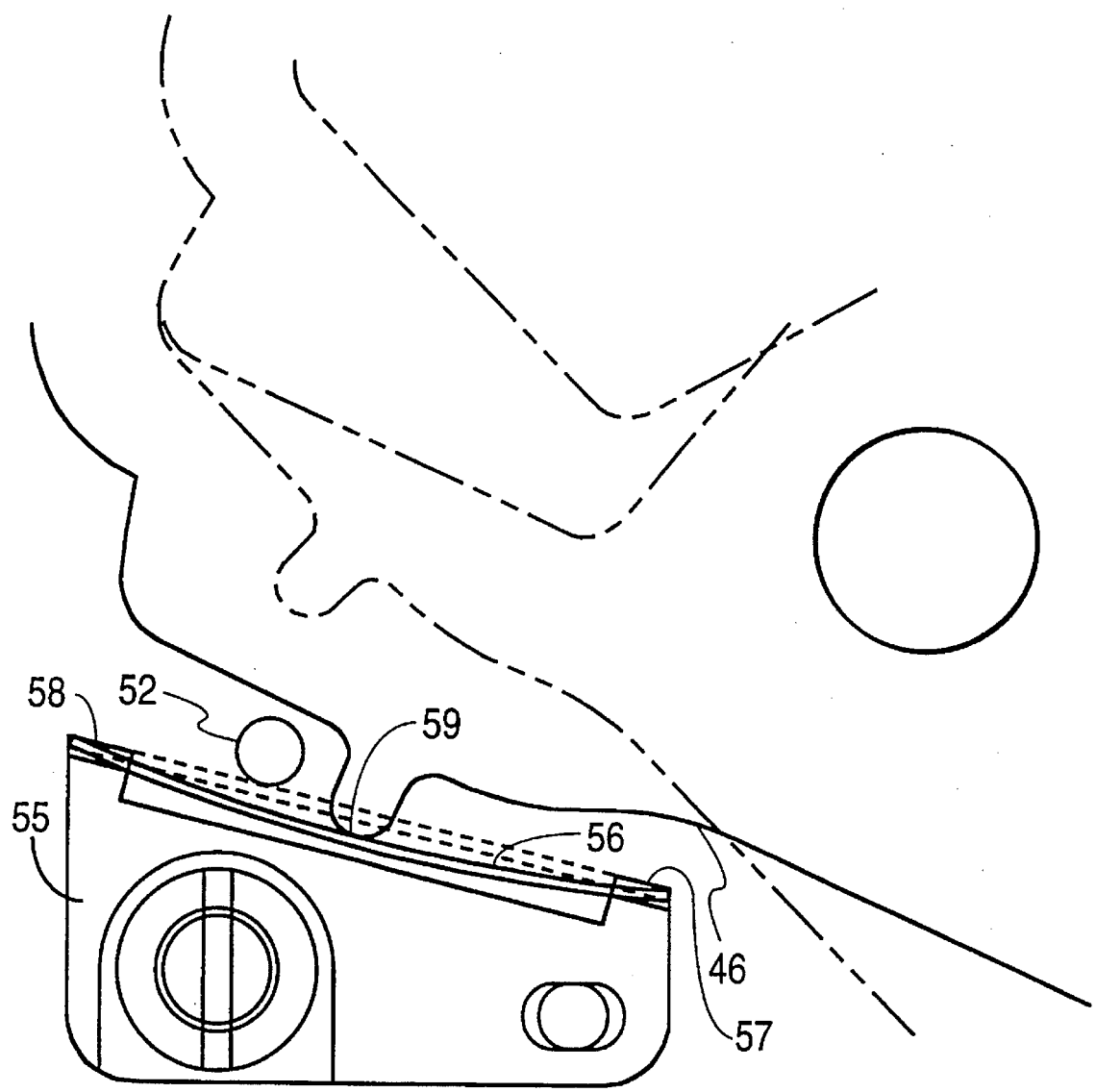
FIG. 3C is a top-plan, highly enlarged view of the inner crash stop for a rigid disk drive in accordance with the present invention.

Inner crash stop assembly 25 is illustrated in a highly enlarged scale drawing in FIG. 3C. For this illustration, top plate 49 is not shown in FIG. 3C, and additionally a portion of the top of inner crash stop block 55 has been removed. Inner crash stop assembly 25 includes inner crash stop spring 56 which is positioned between legs 57 and 58 of inner crash stop block 55 and the inner peripheral surface of preload pin 52. As will be appreciated by reference to FIG. 3C, inner crash stop spring 56 is preloaded by the inner peripheral surface of pin 52 in combination with legs 57 and 58. As illustrated in FIG. 3C, actuator body 46 includes inner crash stop contact tab 59 which extends from the edge of actuator body 46 and as illustrated by the arrows in FIG. 3C comes into contact with contact inner crash stop spring 57 when the actuator is moved to position the heads toward the innermost portion of magnetic disk 10. The contact between inner crash stop contact tab 59 and inner crash stop spring 56 cushions and stops the inner travel of the actuator to prevent the heads from hitting other HDA structural elements.

Referring to FIG. 3B, microminiature hard disk drive 4, which is implemented in the contact start/stop version, is illustrated in top plan view. By comparing FIG. 3B with 3A, it will be appreciated that a number of common structural elements exist in the dynamic head loading version illustrated in FIG. 3A and the contact start/stop version illustrated in FIG. 3B. Of course, in contact start/stop version the lift tabs in the cam assembly is not required since the read/write transducers take off and land on the surface of a recording disk 60. Recording disk 60 differs from recording disk 10 used in hard disk drive 1 in that a take off and landing zone, bounded by dashed lines 64 and 62 (3B) on the surface of recording disk 60 is provided. Other portions of hard disk drive 4 which are also commonly used in hard disk drive 1 includes inner crash stop assembly 25, flat cable 23 which is coupled between connector 24 in the spin motor, connector 22 and read/write pre-amp integrated circuit chip 21. Also illustrated in flex cable 44. A rotary latch may also be utilized with this embodiment, although one is not shown in this figure.

Figure 5B:
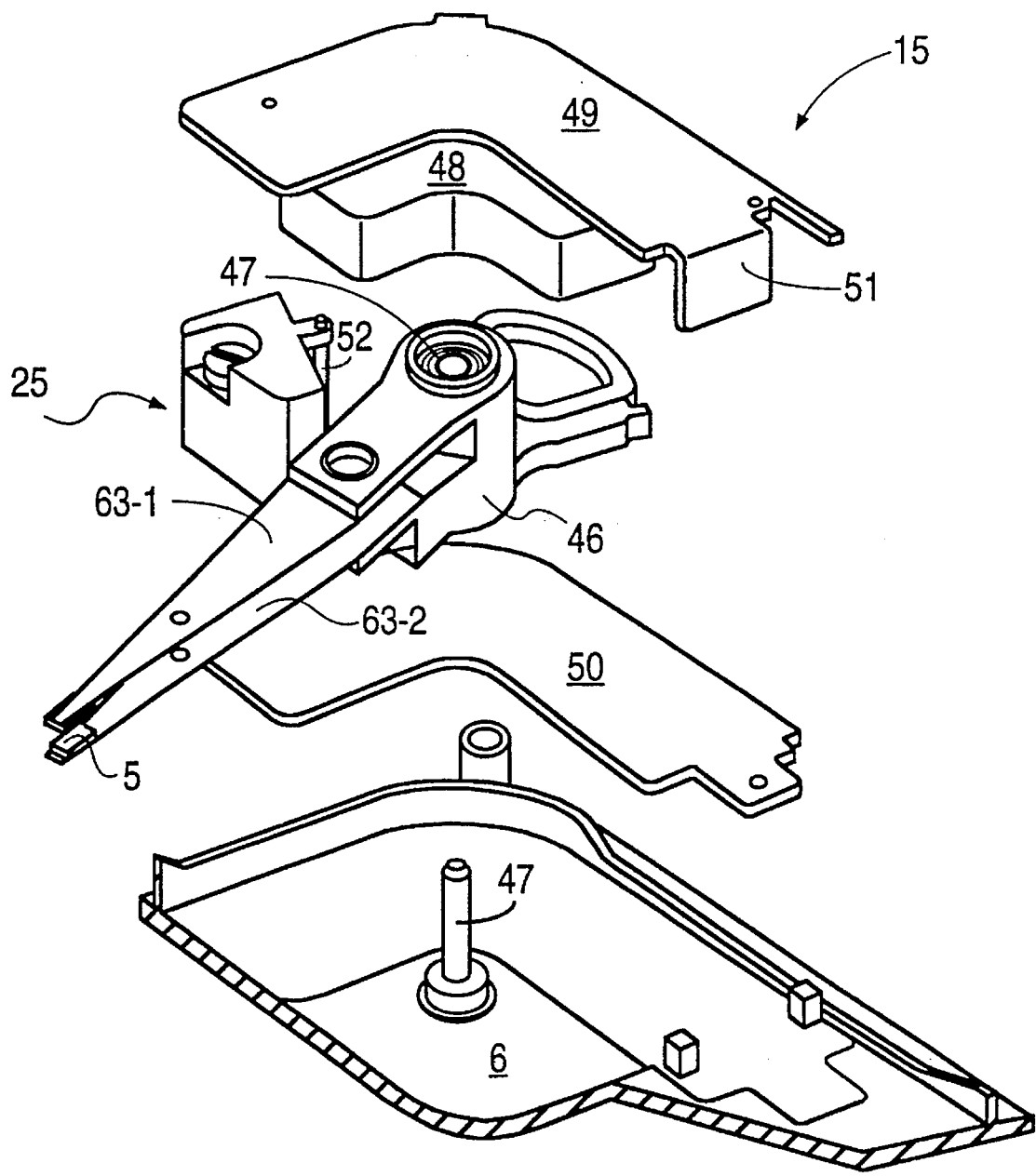
FIG. 5B is an exploded, enlarged perspective view of the rotary actuator portion of a rigid disk drive which utilizes the contact start/stop head technology.

In FIG. 5B a highly exploded and enlarged view of the actuator assembly 15 used in microminiature hard disk drive 4 is illustrated. As will be appreciated by reference to the figure, various common elements are used in this actuator assembly which are in common with actuator assembly illustrated in FIG. 5A for the dynamic headload versions. Common structural elements are indicated by the same reference characters as used in previous figures. By reference to FIG. 5B, it will of course be appreciated that upper load beam 63-1 and lower load beam 63-2 do not include loading tabs since none are required for the contact start-stop version. Lift tabs may be used in the contact start-stop version during initial assembly head loading operation. However, the read/write recording heads 5 could be different than those utilized in the dynamic head loading version.

Figure 4:
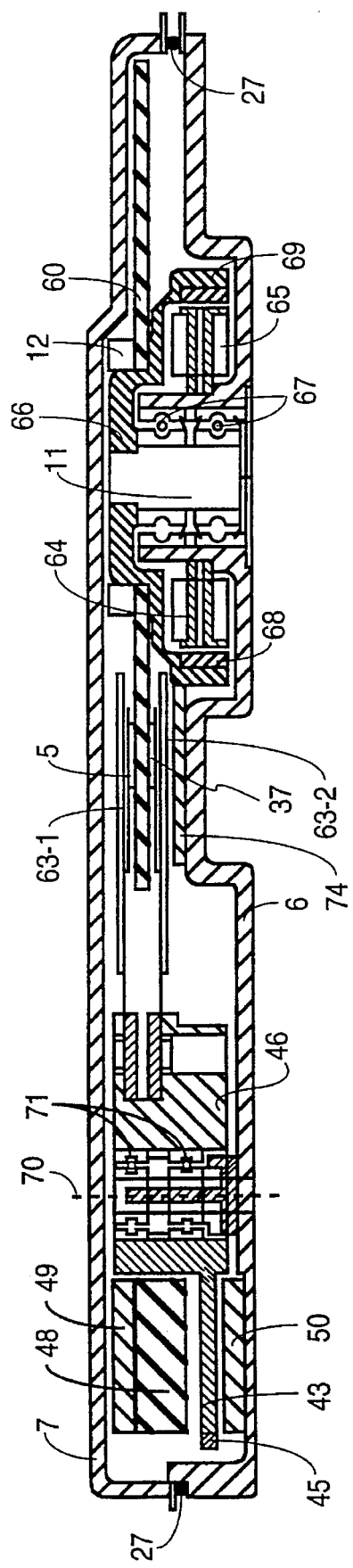
FIG. 4 is a cross-sectional view taken along the lines 4—4 of FIG. 3B.

To better appreciate the explanation of the structural characteristics of hard disk drive 4, concurrent reference with FIG. 3B and FIG. 4 (which is a cross-sectional view of hard disk drive 4 taken along the lines 4—4 in FIG. 3B) will be helpful. Rigid disk 60 is supported for rotation in baseplate 6 by a brushless DC spin motor. A detailed description of one brushless DC spin motor suitable for use with this disk drive is included in copending above-described U.S. patent application Ser. No. 07/630,110. Portions of this motor will also be described herein for the purposes of illustration with regard to hard disk drive 4. Referring to FIGS. 3B and 4, the brushless DC motor includes a stator portion having three lamination portions 64, each of which has windings 65. The stator portion is supported on baseplate 6. Rotor 66 is rigidly affixed to shaft 11 which is supported in baseplate 6 utilizing a bearing assembly, the bearings of which are indicated at 67. Permanent magnet ring 68 is supported in operative relationship to the plurality of lamination portions 64 and windings 65, with permanent magnet ring 68 being supported on lower portion 69 of rotor 66. Rigid disk 60 is supported on rotor 11 for rotation therewith by clamp ring 12 which is pressfit onto rotor 11. The details of the start-up commutation as well as direction detection for the spin motor fully described in the above referenced U.S. patent application Ser. No. 07/630,470.

Load beams 63-1 and 63-2 of actuator assembly 65 pivots about center of rotation 70. Load beam 63-1 supports at its free end, adjacent to disk 60, in this Figure, read/write transducer 5.

Referring to FIG. 4, this cross-sectional view illustrates the utilization of down load beam 63-1 which supports read/write transducer 5 which is positioned above the upper surface of hard disk 60. Also illustrated in FIG. 4 is up load beam 63-2 which supports read/write transducer 5 which is positioned adjacent to the lower surface of rigid disk 60. The respective terms "up" and "down" with regard to the load beams are utilized to indicate the operative orientation of the read/write transducer associated with the load beam. For example, down load beam 63-1 is so named because the read/write transducer associated with that load beam is facing downwardly as viewed from the position of hard disk drive 4 in FIG. 3B. Similarly, up load beam 63-2 is so denominated because the read write transducer included on up load beam 63-2 is facing upwardly.

As is best illustrated in FIG. 4, upper load beam 63-1 and lower load beam 63-2 are supported for rotation about center of rotation 70 by actuator body 46. Actuator body 46 is rotatably supported on baseplate 6 by a suitable bearing assembly 47 which includes actuator bearings 71. It will of course be recognized by those skilled in the art that the head positioning mechanism used in hard disk drive 4 is of the moving coil rotary actuator type. Actuator coil 45 is provided with appropriate driving signals to position the read-write recording elements over the appropriate track based on commands received from actuator driver circuits which will be described hereinafter. Permanent magnet 48 in conjunction with lower plate 50 and upper plate 49 provide a magnetic flux field across actuator coil 45. To reduce the height of head disk assembly 1, a single permanent magnet (permanent magnet 48) is utilized in conjunction with upper plate 49 and return plate 50. The physical size and shape of actuator coil 45 is determined in part by the available clearance and space within baseplate 6, and will be appreciated by reference to FIGS. 3B, 4 and 5B. From an electrical standpoint, the number of turns and the gauge of the wire used in actuator coil 45 are provided such that the resistance of actuator coil 45 is approximately the same as the resistance of the spin motor. It is important that this relationship be established since during power down the back EMF of the spin motor in dynamic head load-unload version of hard disk drive 1 is used to drive the actuator coil and move the head gimbal assembly into the unloaded position as illustrated in FIG. 3A. This equal resistance relationship is also important because for a given coil geometry the unload torque generated is at a maximum when the wire size and number of turns produces a coil resistance equal to the resistance of the series combination of the two spin motor windings plus circuit and trace resistances.

Figure 8:
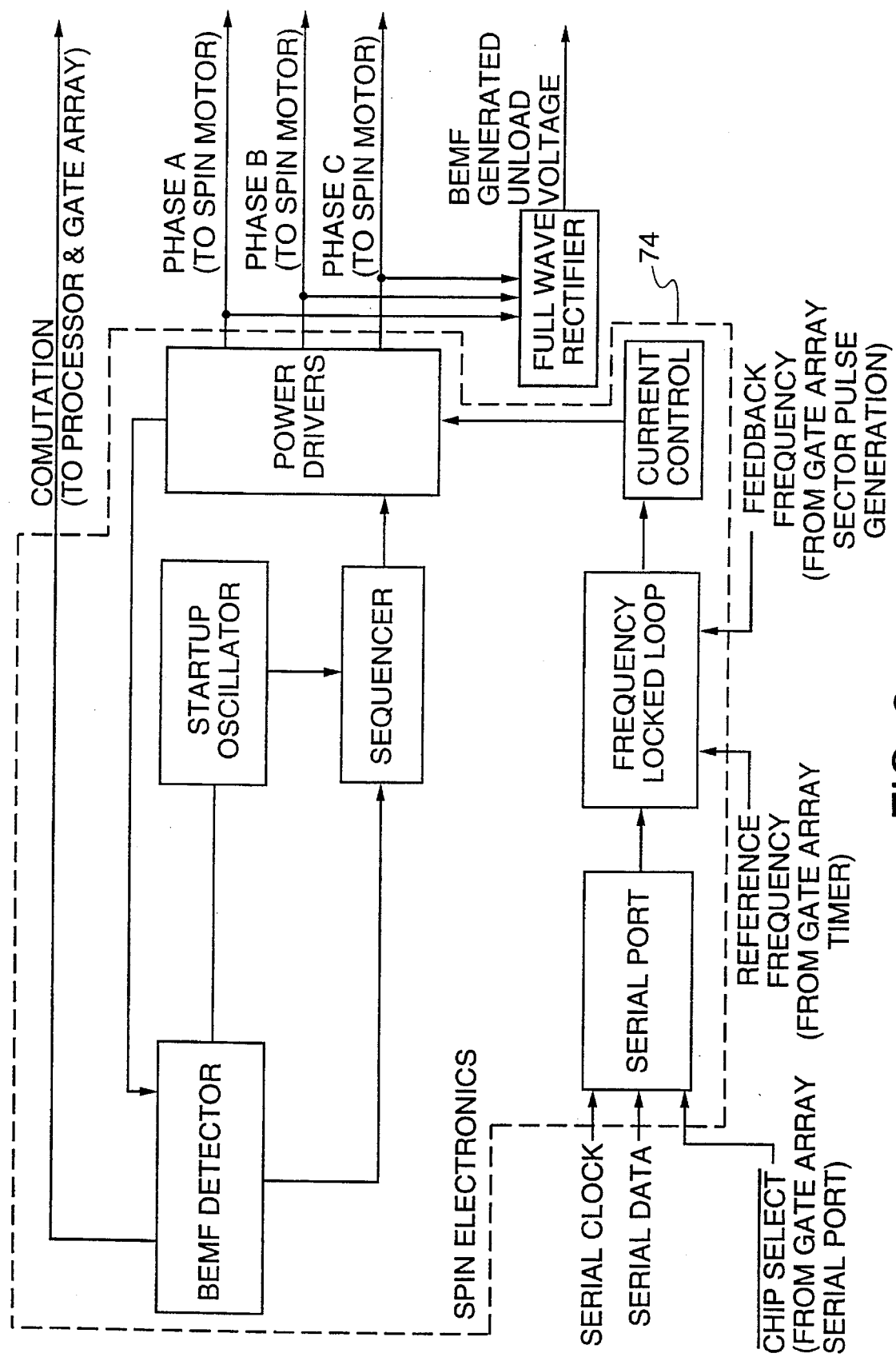
FIG. 8 is a block diagram level circuit for the spin control and drivers.

To protect the components in hard disk drive 1 and hard disk drive 4 from contamination by particles which could among other things, cause a head crash, top cover 26 is sealed to baseplate 6 by providing appropriate interfitting relationship between top cover 26, baseplate 6 and the utilization of a resilient gasket 27 (FIG. 4). Gasket 27 extends around the periphery of baseplate 6 as illustrated in FIGS. 6 and 8. Referring to FIG. 4, it will be noted that peripheral edge 72 of top cover 26 extends around the periphery at top cover 26 fits with peripheral edge 73 of baseplate 6. To reduce the electrical interference from spin motor 3 to lower read/write transducer, shield 74 is positioned on baseplate 6 as illustrated in FIG. 4. Shield 74 is preferably composed of a high permeability ferrite material which shunts the EMI at the frequency of the pass band of the recording channel. Cover 7 is secured to baseplate 6 using suitable fastening means.

The above-described spin motor is controlled by spin control and driver circuit 74 which is illustrated in block diagram form in FIG. 8. Spin control and driver circuit 74 may be implemented an Allegro Micro Systems Inc., part number ULM 8902 denominated "three phase brushless DC motor drive with back-EMF sensing", which is illustrated in FIG. 8 in block diagram form. Alternately, the spin control and driver circuit 74 may be implemented as described in copending and commonly assigned U.S. patent application Ser. No. 07/630,470 filed Dec. 19, 1990.

Figure 9:
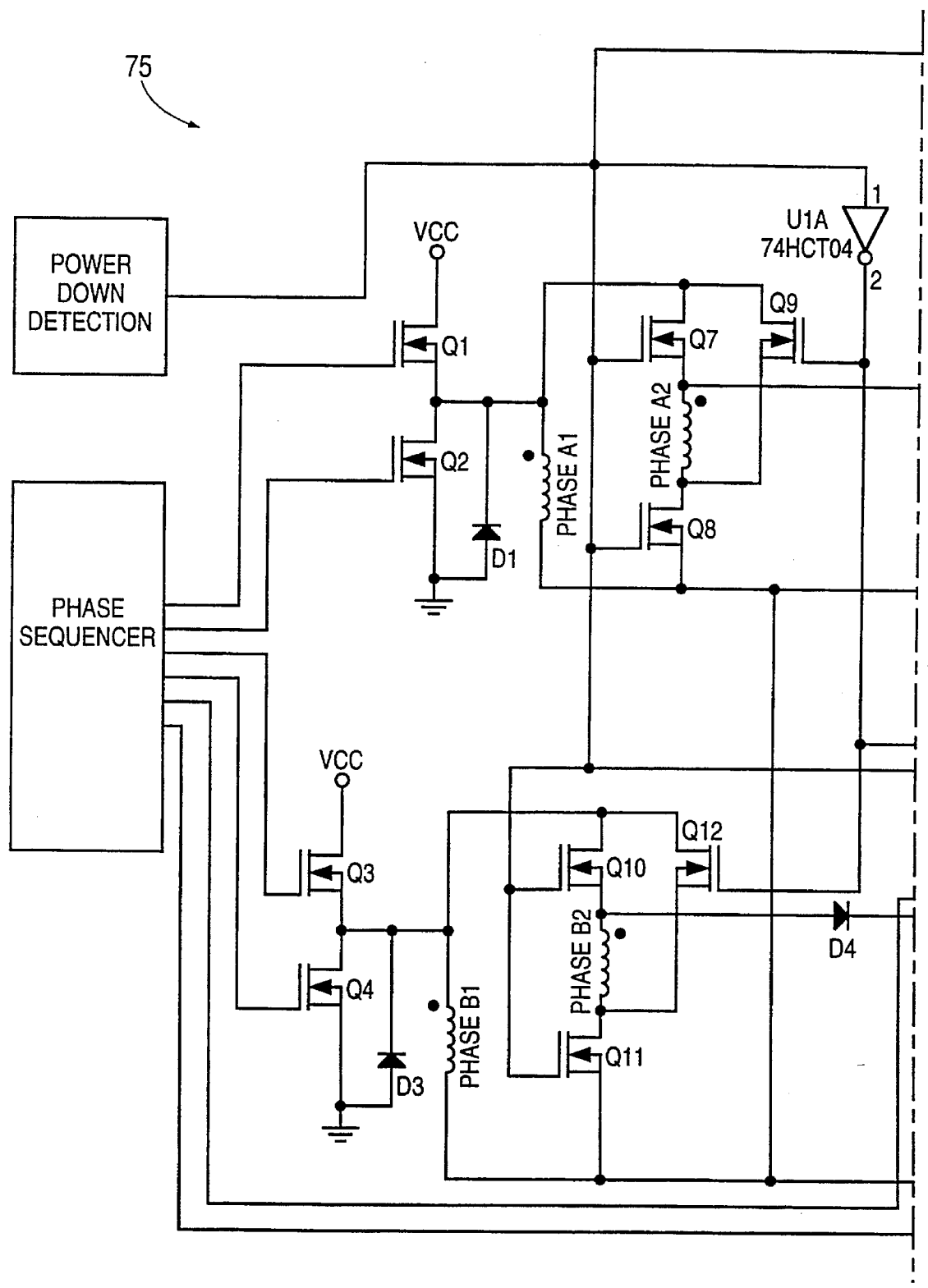
FIG. 9 is a circuit diagram of a spin motor drive circuit utilized with one version of the present invention.

As an alternative to the spin motor described in the above-identified patent application, a parallel wound spin motor may be utilized. In a parallel wound spin motor there are two windings on the stator, both wound in the same direction. With the parallel wound motor, spin motor drive circuit 75, illustrated in FIG. 9, is utilized to start and run the motor. A description of the operation of spin motor drive circuit 75 is as follows.

START MODE

During start mode more torque is required. The six motor windings are connected such that 3 motor phases are made with each phase having two windings in parallel. Also, bipolar drive is used so that two phases are energized at one time. If desired unipolar drive can be used.

Bipolar Mode:

In start mode transistors Q7,8,10,11,13,14 are conducting. This places motor windings Phase A1, A2 in parallel, Phase B1,B2 in parallel and Phase C1,C2 in parallel. Transistors Q9,12,15,16,17,18 are non-conducting. Transistors Q1,2,3, 4,5 and 6 are toggled in the normal six step sequence to rotate the motor.

The sequence is:

Step 1: Q1 and Q4 are conducting while Q2,3,5 and 6 are non-conducting. Current flows from $V_{cc}$ through Q1, Phase A1,A2, Phase B1,B2 and Q4 causing a positive torque to be generated.

Step 2: Q1 and Q6 are conducting while Q2,3,4 and 5 are non-conducting. Current flows from $V_{cc}$ through Q1, Phase A1,A2, Phase C1,C2 and Q6 causing a positive torque to be generated.

Step 3: Q3 and Q6 are conducting while Q1,2,4 and 5 are non-conducting. Current flows from $V_{cc}$ through Q3, Phase A1,A2, Phase C1,C2 and Q6 causing a positive torque to be generated.

Step 4: Q3 and Q2 are conducting while Q1,3,4 and 6 are non-conducting. Current flows from $V_{cc}$ through Q3, Phase A1,A2, Phase C1,C2 and Q2 causing a positive torque to be generated.

Step 5: Q5 and Q2 are conducting while Q1,3,4 and 6 are non-conducting. Current flows from $V_{cc}$ through Q5, Phase A1,A2, Phase C1,C2 and Q2 causing a positive torque to be generated.

Step 6: Q5 and Q4 are conducting while Q1,2,3 and 6 are non-conducting. Current flows from $V_{cc}$ through Q5, Phase A1,A2, Phase C1,C2 and Q4 causing a positive torque to be generated.

This sequence is used 6 times per revolution.

Unipolar Mode:

In start mode transistors Q7,8,10,11,13,14 and 16 are conducting. This places motor windings Phase A1,A2 in parallel, Phase B1,B2 in parallel and Phase C1,C2 in parallel. Transistors Q2,4,6,9,12,15,17,18 are non-conducting. Transistors Q1,3 and 5 are toggled in the normal three step sequence to rotate the motor. The sequence is:

Step 1: Q1 and Q16 are conducting while Q3 and 5 are non-conducting. Current flows from $V_{cc}$ through Q1,Phase A1,A2, Phase B1,B2 and Q16 causing a positive torque to be generated.

Step 2: Q5 and Q16 are conducting while Q1 and 3 are non-conducting. Current flows from $V_{cc}$ through Q5, Phase A1,A2, Phase C1,C2 and Q16 causing a positive torque to be generated.

Step 3: Q3 and Q16 are conducting while Q1 and 5 are non-conducting. Current flows from $V_{cc}$ through Q3, Phase A1, A2, Phase C1,C2 and Q16 causing a positive torque to be generated.

This sequence is repeated six times per revolution.

RUN MODE

During run mode very little torque is required to run the motor. Only one winding is used per phase. Since little torque is used, very little back EMF is generated thus allowing 3 volts to drive the motor with adequate headroom.

Phase A2,B2 and C2 are not used to deliver torque to the motor. They are, however, connected in series so that a back EMF voltage greater than that generated by a single winding is developed. Thus transistors Q7,8,10,11,13,14, 16,17 and 18 are off during normal operation. Transistors Q9, 12 and 15 are on all the time. Thus A1 and A2 are connected in series, B1 and B2 are connected in series and C1 and C2 are connected in series.

Bipolar Mode:

Step 1: Transistors Q1 and Q4 are conducting while Q2,3,5 and 6 are non-conducting. Current flows from $V_{cc}$ through Q1, Phase A1, Phase B1 and Q4 causing a positive torque to be generated.

Step 2: Transistors Q1 and Q6 are conducting while Q2,3,4 and 5 are non-conducting. Current flows from $V_{cc}$ through Q1, Phase A1, Phase C1 and Q6 causing a positive torque to be generated.

Step 3: Transistors Q3 and Q6 are conducting while Q1,2,4 and 5 are non-conducting. Current flows from $V_{cc}$ through Q3, Phase A1, Phase C1 and Q6 causing a positive torque to be generated.

Step 4: Transistors Q3 and Q2 are conducting while Q1,3,4 and 6 are non-conducting. Current flows from $V_{cc}$ through Q3, Phase A1, Phase C1 and Q2 causing a positive torque to be generated.

Step 5: Transistors Q5 and Q2 are conducting while Q1,3,4 and 6 are non-conducting. Current flows from $V_{cc}$ through Q5, Phase A1, Phase C1 and Q2 causing a positive torque to be generated.

Step 6: Transistors Q5 and Q4 are conducting while Q1,2,3 and 6 are non-conducting. Current flows from $V_{cc}$ through Q5, Phase A1, Phase C1 and Q4 causing a positive torque to be generated.

This sequence is used 6 times per revolution.

Unipolar Mode:

Step 1: Transistors Q1 and Q16 are conducting while Q3 and 5 are non-conducting. Current flows from $V_{cc}$ through Q1, Phase A1,A2, Phase B1,B2 and Q16 causing a positive torque to be generated.

Step 2: Transistors Q5 and Q16 are conducting while Q1 and 3 are non-conducting. Current flows from $V_{cc}$ through Q5, Phase A1,A2, Phase C1,C2 and Q16 causing a positive torque to be generated.

Step 3: Transistors Q3 and Q16 are conducting while Q1 and 5 are non-conducting. Current flows from $V_{cc}$ through Q3, Phase A1,A2, Phase C1,C2 and Q16 causing a positive torque to be generated.

This sequence is repeated six times per revolution.

Power Down Unload Mode:

During power down with the disk spinning and the data still on the disk, the spindle motor must furnish the power to drive the actuator which unloads the heads.

Transistor Q1,2,3,4,5,6,7,8,10,11,13,14,16 are turned off by the power down detection circuitry. Transistors Q9,12,15 are turned on so that Phase A1,A2 are in series, B1,B2 are in series and C1,C2 are in series so that a greater back EMF voltage is generated than is possible with single winding (because of headroom considerations). Diodes D1,2,3,4,5 and 6 form a fullwave bridge rectifier. The full potential of the rectified voltage appears at the cathodes of D2,4, and 6. Q17 and 18 are also turned on and the rectified voltage is applied to the actuator, which causes the heads to unload from the disk.

Figure 6F:
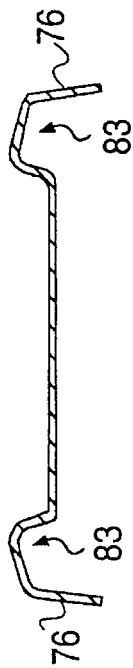
FIG. 6F is a cross-sectional view taken along lines 6F—6F in FIG. 6A.
Figure 6E:
FIG. 6E is a cross-sectional view taken along lines 6E—6E in FIG. 6A.
Figure 6C:
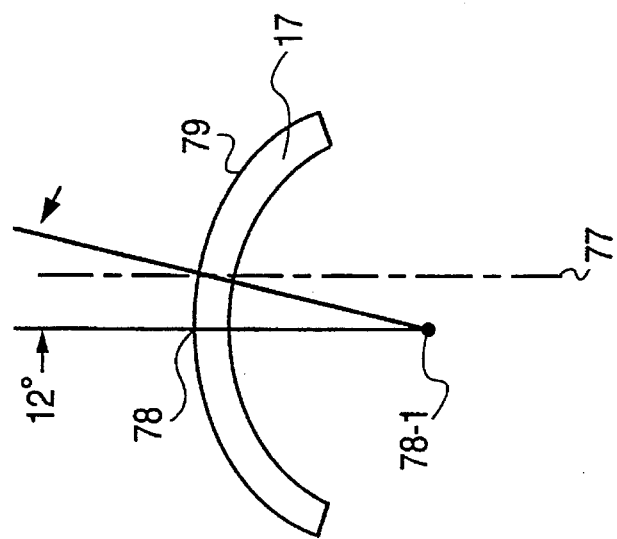
FIG. 6C is a view taken along lines 6C—6C in FIG. 6A.
Figures 1, 6C:
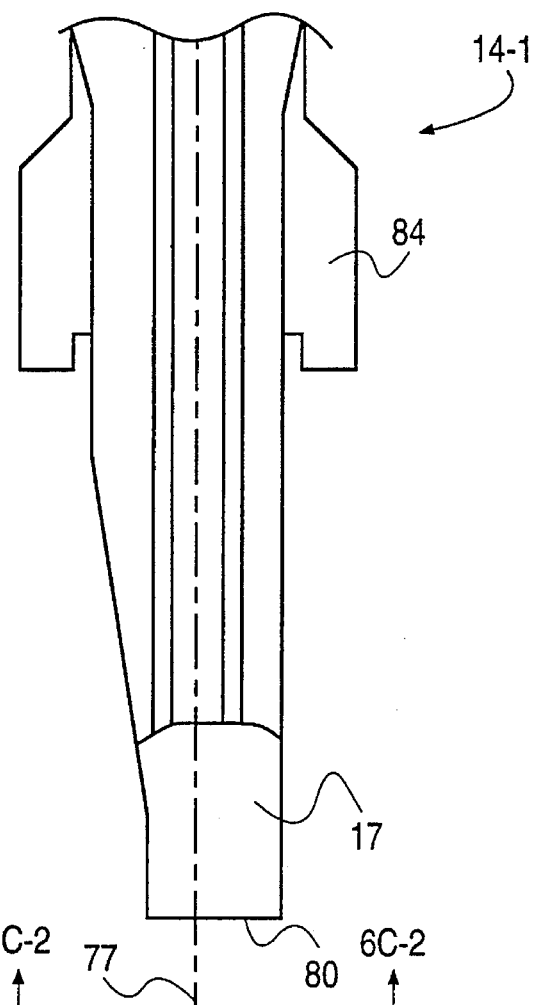
Figures 2, 6C:
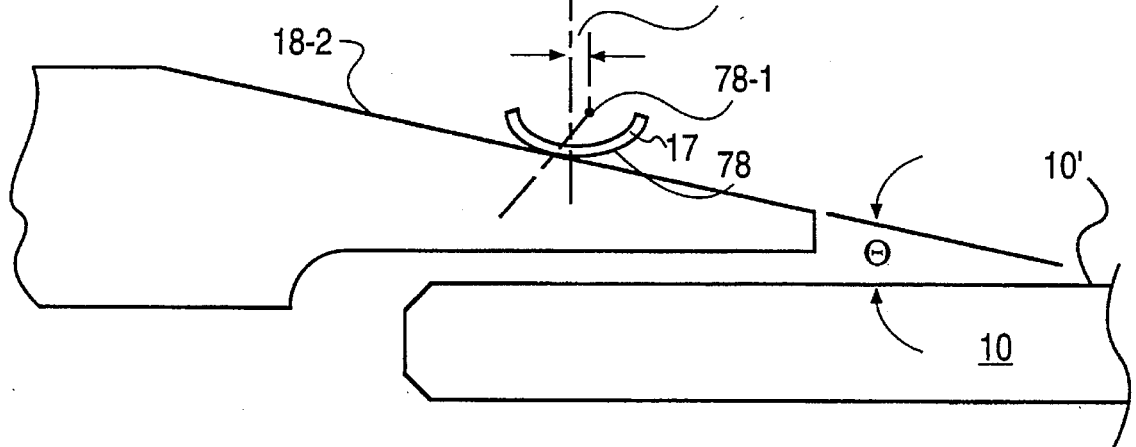

A better appreciation of the construction of the load beams utilized in the dynamic head load version and the contact short stop versions of the drives of the present invention would be obtained by reference to FIGS. 6A–6L. Referring to FIG. 6A, load beam 14-1 is shown in plan view with the underside, that is the side on which the read/write recording transducer will be mounted, facing upward in this figure. Load beam 14-1 is referred to as the down load beam. Load beam 14-1 is unitary in construction and is preferably made from Type 302 non-magnetic stainless steel, having a thickness of approximately 0.0025 inches. As illustrated in FIG. 6A, load beam 14-1 includes lift tab 17 which is semicircular in cross section at its free end 80 as will be appreciated by reference to FIGS. 6C and 6C". FIG. 6B illustrates load beam 14-1 in a side view taken along lines 6B—6B of FIG. 6A. In the view of FIG. 6B, the load beam 14-1 is shown in a flat and unloaded orientation. Tabs, denominated 76, are utilized to secure the electrical wiring which extends to the free end of the load beam for connection to the read/write transducer head to be mounted at that location. The cross-section of load beam 14-1 taken along lines 6E–6E is illustrated in FIG. 6E, The hat-shaped configuration of load beam 14-1 illustrated in FIG. 6E provides stiffening to the load beam. The configuration of load beam 14-1 changes from a generally flat orientation (with the exception of tabs 76 and stiffening channels 83 along the outer edge of the load beam) as shown in FIG. 6F, the cross-section taken along lines 6F—6F, to the configuration illustrated in FIG. 6E, and near the free end of load beam 14-1 the lift tab 17 is generally semi-circular as is illustrated in FIG. 6C which shows the view of load beam 14-1 taken along the line 6C—6C in FIG. 6A. As will be appreciated by a reference to FIG. 6A, the center line of load beam 14-1 is at the position indicated by the dashed line denominated 77. It will also be appreciated by reference to FIG. 6A that the curved end portion of lift tab 17 is not symmetrical with respect to center line 77. This is also further illustrated in FIG. 6C where the center line of load beam 14-1 is indicated by dashed line denominated 77. The lowest point on lift tab 17 as measured from the center of radius 78' is indicated in FIG. 6C by reference line 78 which extends to the lower surface 79 of lift tab 17.

A better appreciation of the offset relationship between the free end of lift tab 17 and the centerline 77 of down load beam 14-1 will be obtained by reference to FIGS. 6C' and 6C''. FIG. 6C' is a top plan view of down load 14-1 showing the end portion thereof and a portion of flexure 84. For simplicity, cam assembly 18 and disk 10 are not shown in FIG. 6C'. In FIG. 6C'', which is a view taken along 6C''-6C'', it will be appreciated that the centerline 77 of load beam 14-1 is to the left of the lowest point of tab 17 (indicated by 78) to provide an offset distance 77/78. The free end of lift tab 17 is offset toward the center of disk 10 to provide symmetrical lifting of load beam 14-1 as it contacts cam surface 18-2. In FIG. 6C'', lift tab 17 is illustrated at the position where first contact is made with cam surface 18-2. The amount of the offset 77/78 is determined based on the angular slope θ, which is measured between cam surface 18-2 and surface 10' of disk 10, along with the radius of lift tab 17, the radius being measured from center of radius 78' and the lower surface 79. The lowest point of tab 17 is indicated at 78. The centerline offset may be calculated by the formula $$\text{Centerline Offset} = R \sin \theta$$

where

θ=angle between disk surface and cam surface

R=radius of curvature of lift tab contacting the cam surface

With this offset, the lifting force on load beam 14-1 will be applied symmetrically along the centerline of load beam 14-1. In the preferred embodiment, the angle θ is 12°, and the radius of lift tab 17 at the point of contact with cam surface 18-2 is 0.46 mm. This results in offset 77/78 being 0.095 mm. Similarly, the up load beams have their tab ends offset, also toward the center of the disk, thereby ensuring that the first surface of the lift tab to contact its corresponding cam surface does so along the center line of the load beam. This centerline contact eliminates any twisting forces on the load beam.

Figure 6D:
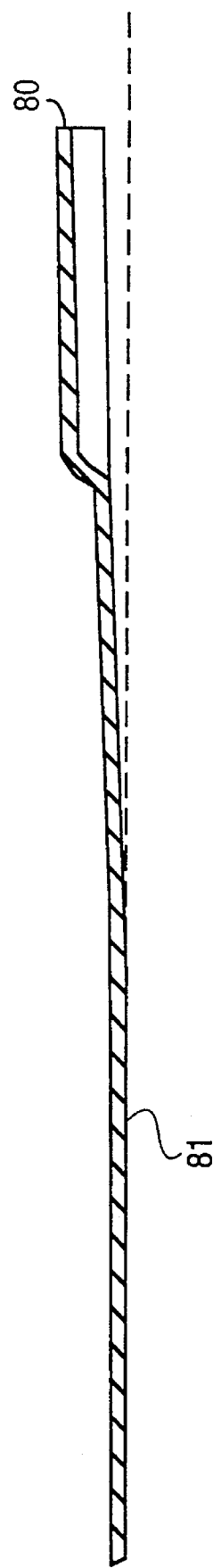
FIG. 6D is a cross-sectional view taken along lines 6D—6D in FIG. 6A.
Figure 6G:
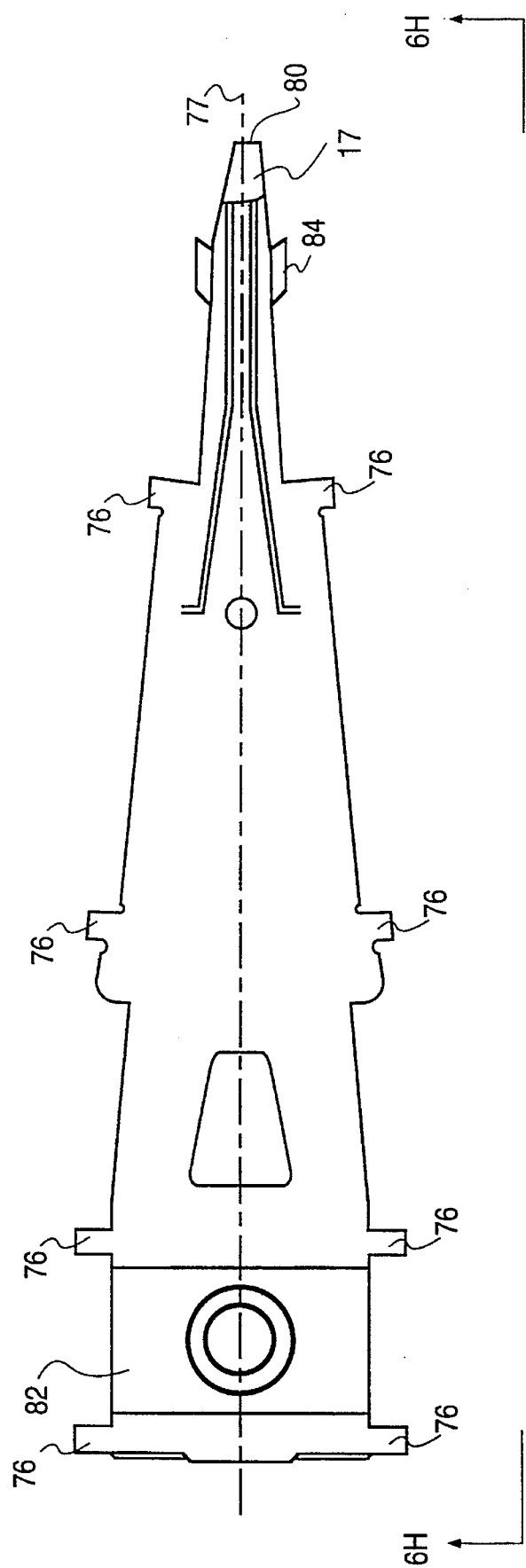
FIG. 6G is a top-plan view of a load beam used in the dynamic head-load version of drive in accordance with the present invention.
Figure 6J:
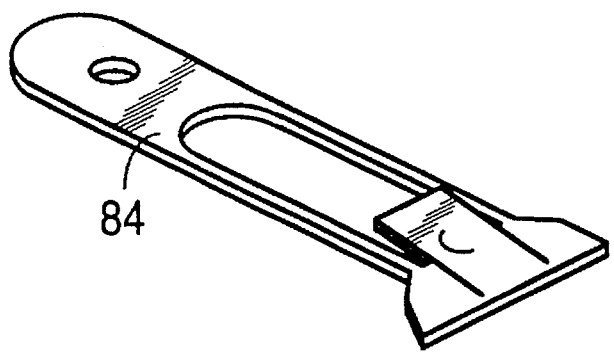
FIG. 6J illustrates the flexure utilized to support the read/write magnetic recording head on the lead beam.

Referring to FIG. 6D, a cross-sectional view taken along the line 6D—6D of FIG. 6A, it will be appreciated that the free end 80 of load 17 is offset downwardly (with respect to the surface of the disk with which the load beam interfaces) from the plane of the flat surface of load beam 14-1 indicated by reference character 81 in FIG. 6D. This offset is provided to maximize the clearance between load beams when the read/write heads are unloaded. Referring to FIG. 6G, swage plate is 82 illustrated. Swage plate 82 is utilized in connecting the load beam to the actuator body. Also illustrated in FIG. 6G is flexure 84, only a portion of which is illustrated in this figure. Flexure 84, which is preferably constructed from stainless steel having a thickness in the range of about 0.0015 inches to 0.002 inches, is utilized to support the read/write transducer head in a flexible manner below the underside of its respective load beam. A perspective view of flexure 84 is illustrated in FIG. 6J.

A side view of load beam 14-1 with its swage plate 82 is illustrated in FIG. 6H which is a view taken along the lines 6H—6H in FIG. 6G. In FIG. 6H the load beam, flexure and associated read/write transducer are illustrated in loaded position. FIG. 6I illustrates load beam 14-1 with associated read/write transducer and flexure in the unloaded position. As illustrated in FIG. 6I, there is a normal downward positioning of the free end of load beam 14-1 which is by bending load beam 14-1 to provide a predetermined pre-tensioning.

Figure 6K:
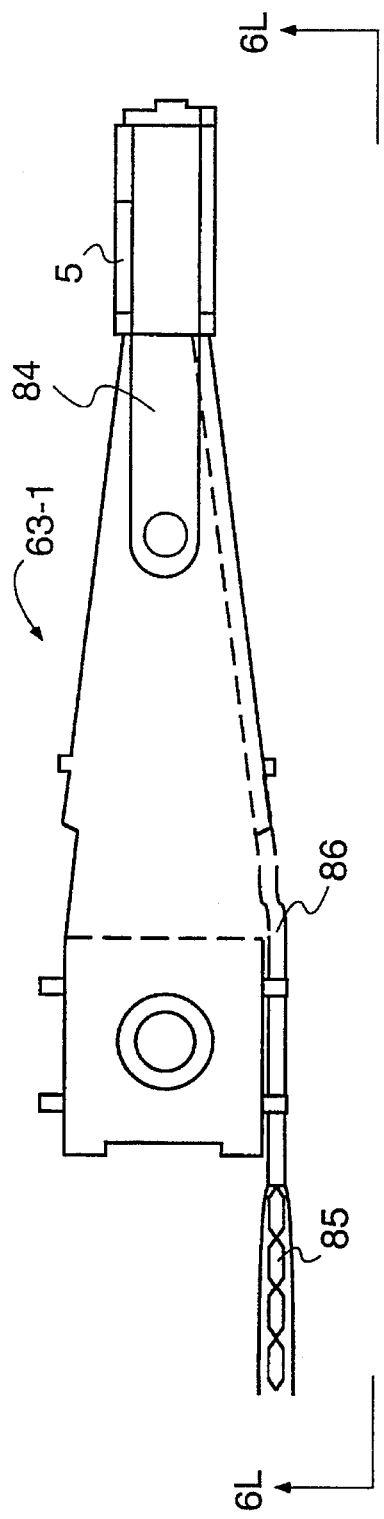
FIG. 6K illustrates in plan view of the underside of a lead beam in the contact start/stop version of the disk drive in accordance with the present invention.
Figure 6L:
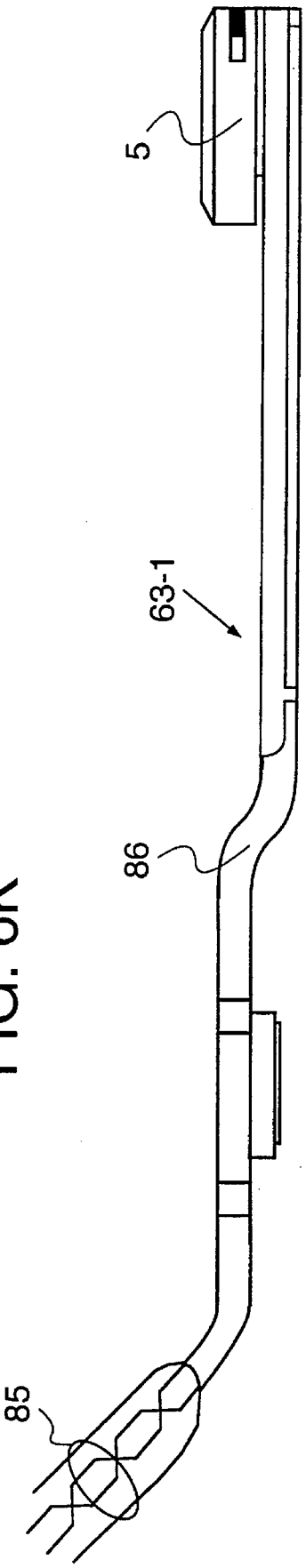
FIG. 6L is a view taken along the line 6L—6L of FIG. 6K.

Referring to FIG. 6K, load beam 63-1 with its associated read/write transducer 5 and flexure 84 are illustrated in a plan view taken from the underside of load beam 63-1. Also illustrated in FIG. 6K is wiring leads 85 which extend within tubing 86 which is supported in place by tabs 76 along the edge of load beam 63-1 to provide electrical connection to read/write transducer 5. Although not illustrated in the figures for the dynamic load beam version, a similar wiring arrangement is utilized for that structure as well. A side view of load beam 63-1 and its associated structure is illustrated in FIG. 6L which is taken along the lines of 6L—6L in FIG. 6K. Load beam 63-1 is constructed of the same type of material and same thickness is that used for load beams 14-1 and 14-2 in the dynamic head load version.

Figure 7A:
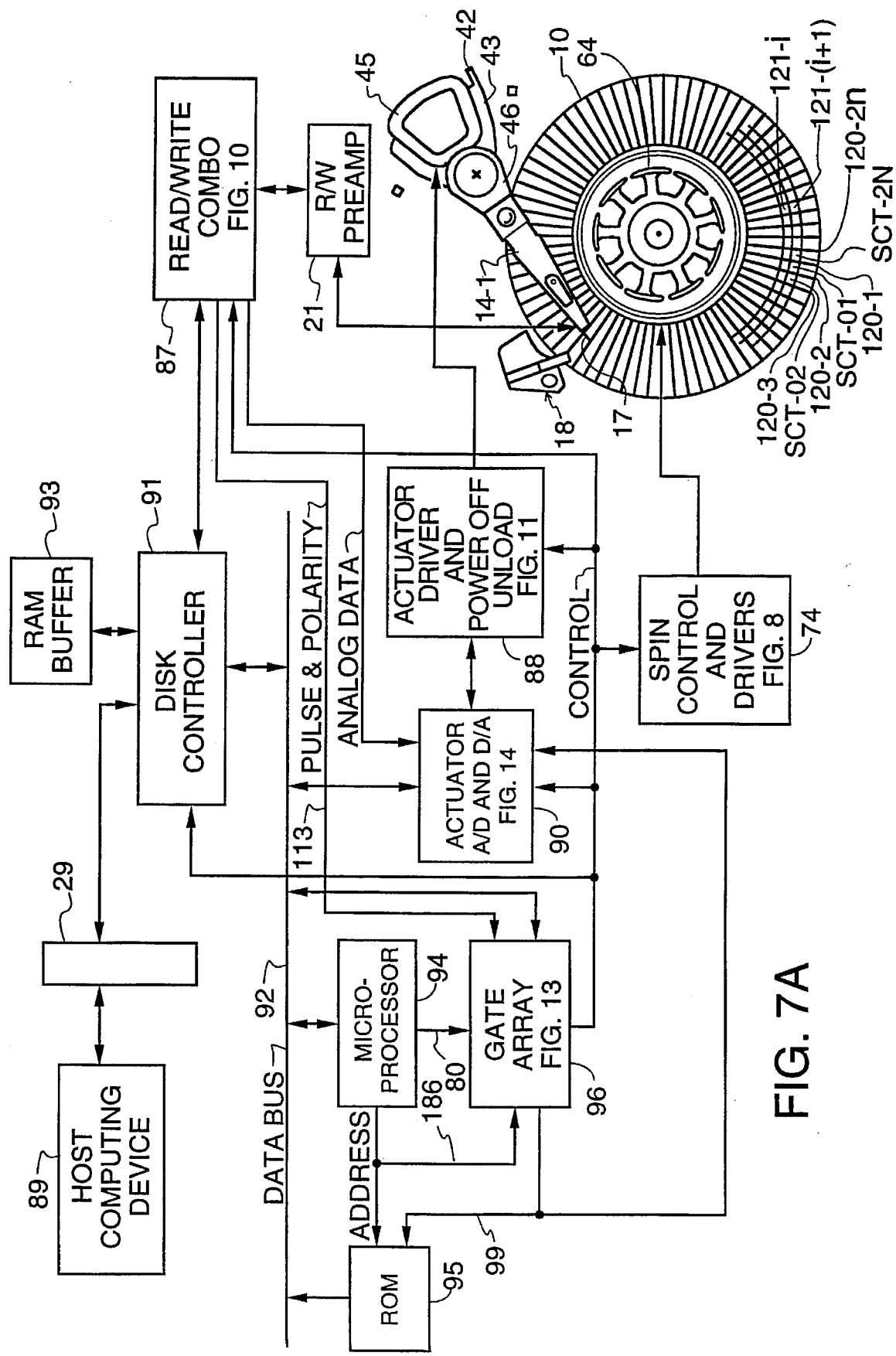
FIG. 7A is a combined electrical block diagram and partial structural diagram of one embodiment of a disk drive in accordance with the present invention.
Figure 7B:
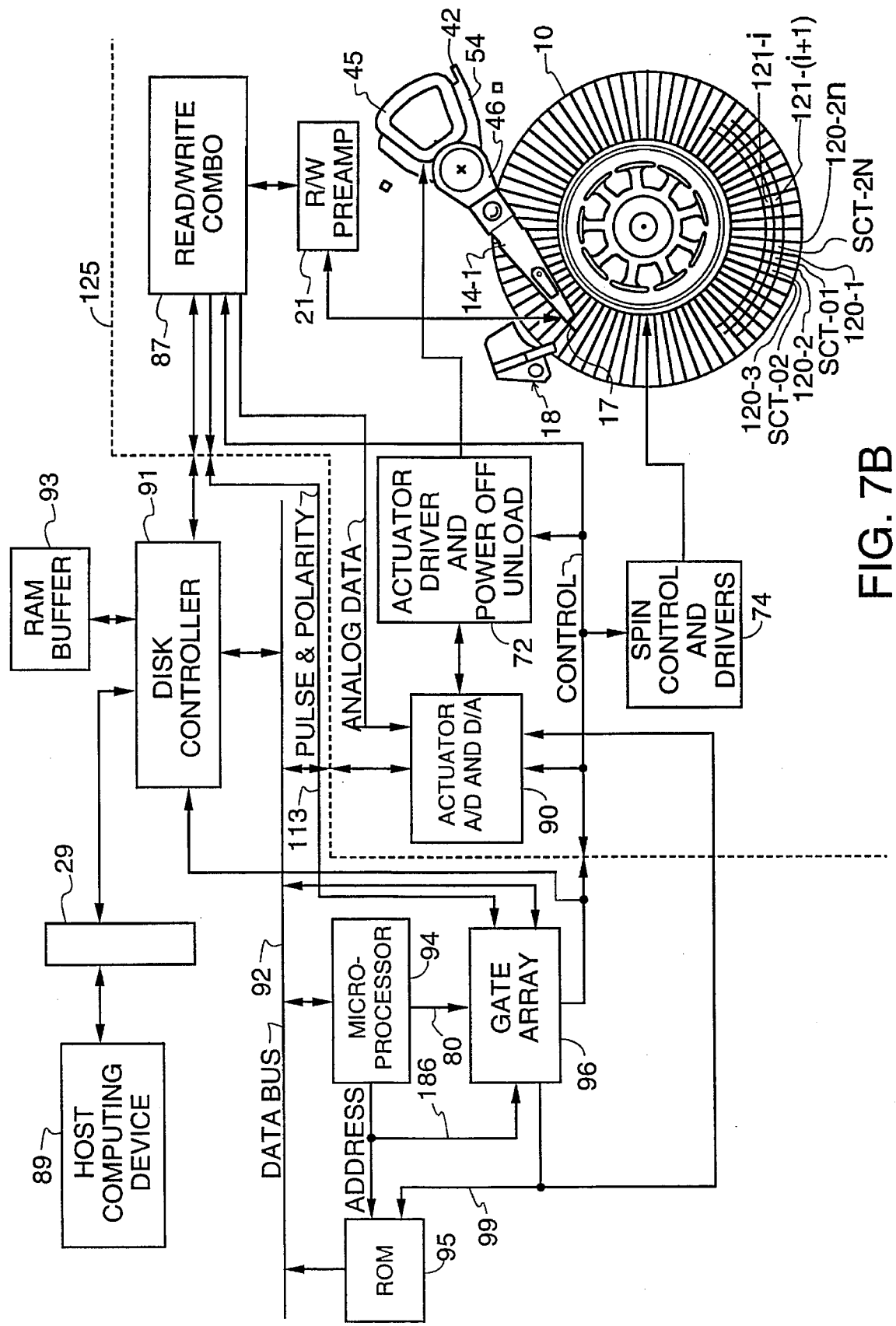
FIG. 7B is a combined electrical block diagram and partial structural diagram of a disk drive in accordance with an alternative embodiment of the present invention.

FIG. 7A is a combined electrical block diagram and partial structural diagram illustrating, from a circuit standpoint the drive and controller electronics included on printed circuit board 2, and in addition the read/write analog integrated circuit 21 which is included within the enclosure of hard disk drive 1 (FIG. 1). In FIG. 7A, rigid disk 10 is illustrated in conjunction with lamination portions 64 of spin motor 3. The spin-up and control of the drive of the spin motor is under the electrical control of spin control and drivers circuitry 74, an expanded block diagram of which is illustrated in FIG. 8. In the embodiment illustrated in FIG. 1, spin control circuitry 74 is included on circuit board 2. As indicated above, spin control circuitry 74 may be implemented using an Allegro MicroSystems, Inc., part no. ULM 8902 denominated Three Phase Brushless DC Motor Drive With Back-EMF Sensing (illustrated in FIG. 8 in block diagram form). Alternatively, the spin control and drivers circuitry described in the above identified U.S. patent application Ser. No. 07/630,470 could be used to control and drive the spin motor. As also noted above, an alternative spin motor and associated drive circuit may be used.

In FIG. 7A, upper load beam 14-1 is illustrated as positioned over a read/write area of disk 10, positioning read/write transducer 5 to a desired, addressed track location. Electrical conductors in a cable (not shown) provide analog information from the read/write recording element to read/write preamp 21, which in the present embodiment is located in baseplate 6 (as illustrated in FIGS. 1, 3A and 3B). Read/write preamp 21 may be implemented, for example, by a Silicon Systems Incorporated, of Tustin, Calif., part no. 32R2030, or equivalent amplifier. Read/write preamp 21 provides the functions well known to those skilled in the art to facilitate the recording and playback of digital information from the surface of rigid disk 10. Signals from read/write preamp 21 are provided to and received from read/write combined function circuit 87, which in the present embodiment of FIG. 7A is included on circuit board 2.

Figure 10:
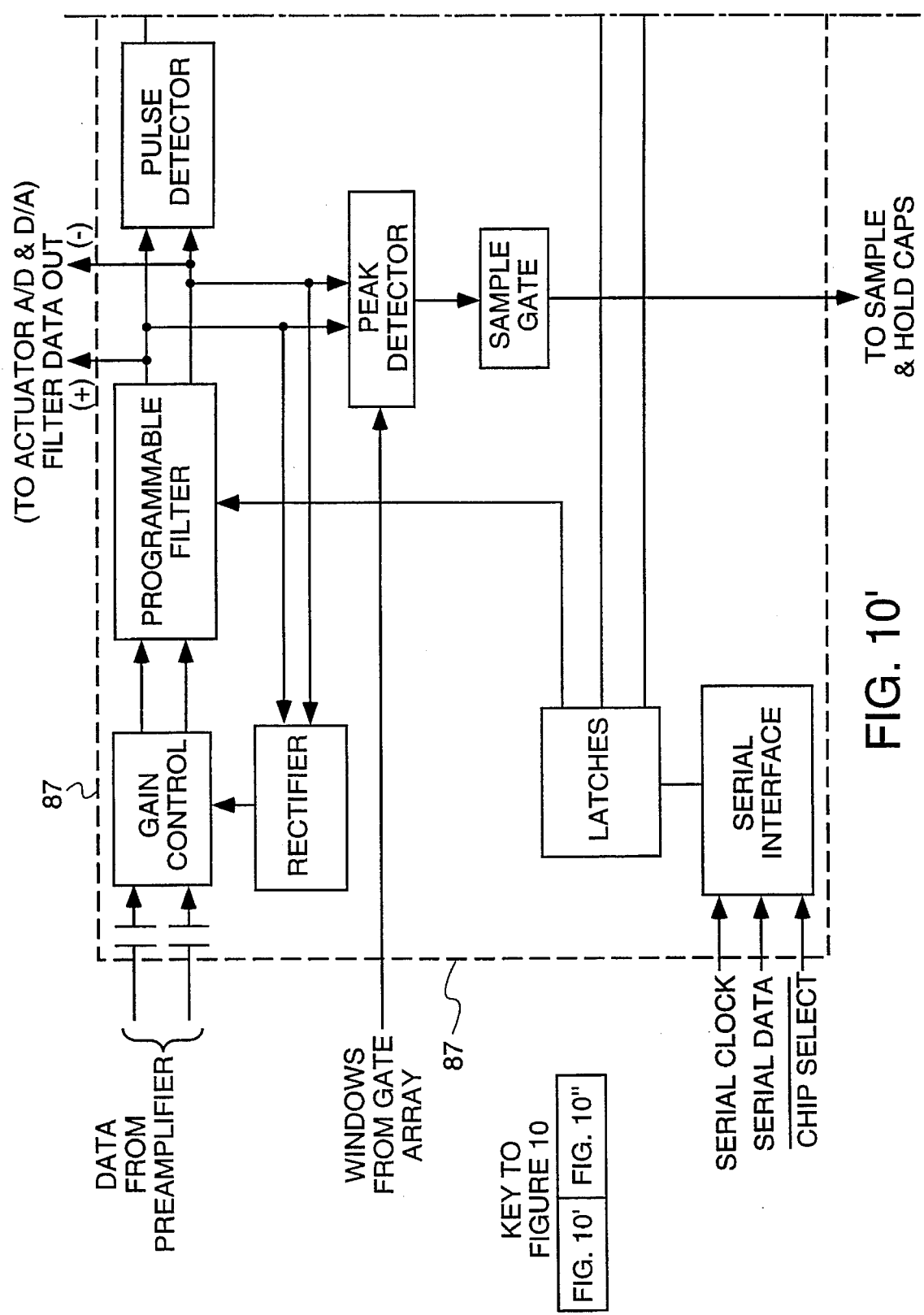
FIG. 10 which is comprised of FIG. 10' and FIG. 10" arranged as illustrated in Key To FIG. 10 is a block diagram of the read/write circuitry utilized with the present invention.

FIG. 10 illustrates in functional block form the circuits included in read/write combined function circuit 87. Read/write combined function circuit 87 may be implemented by, for example, a National Semiconductor part no. DP8491 denominated Hard Disk Data Path Electronics Circuit.

Figure 11:
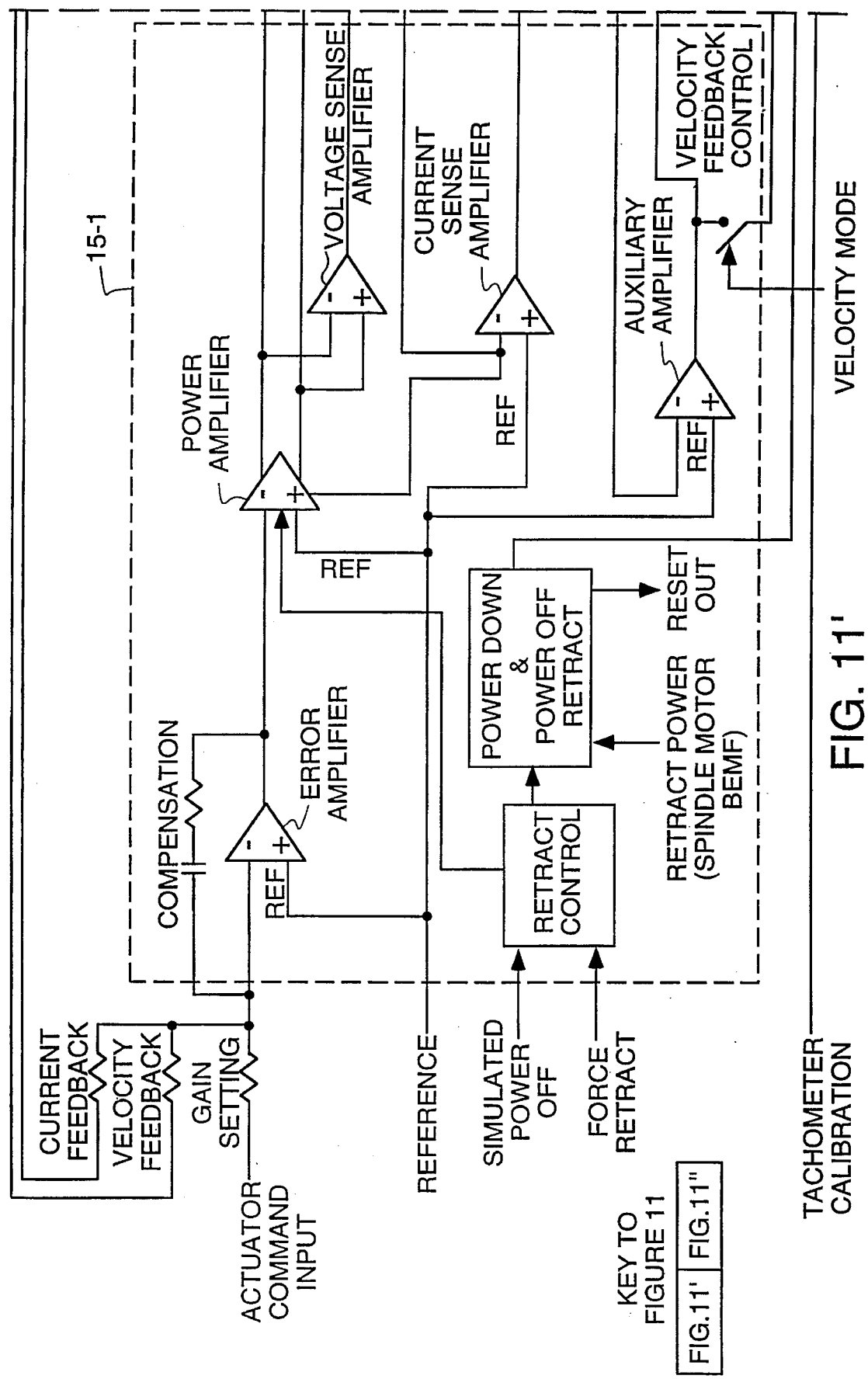
FIG. 11, which is comprised of FIG. 11' and FIG. 11" arranged as illustrated in Key To FIG. 11, is a block diagram of the actuator driver and power-off unload circuit utilized with the present invention.
Figure 14:
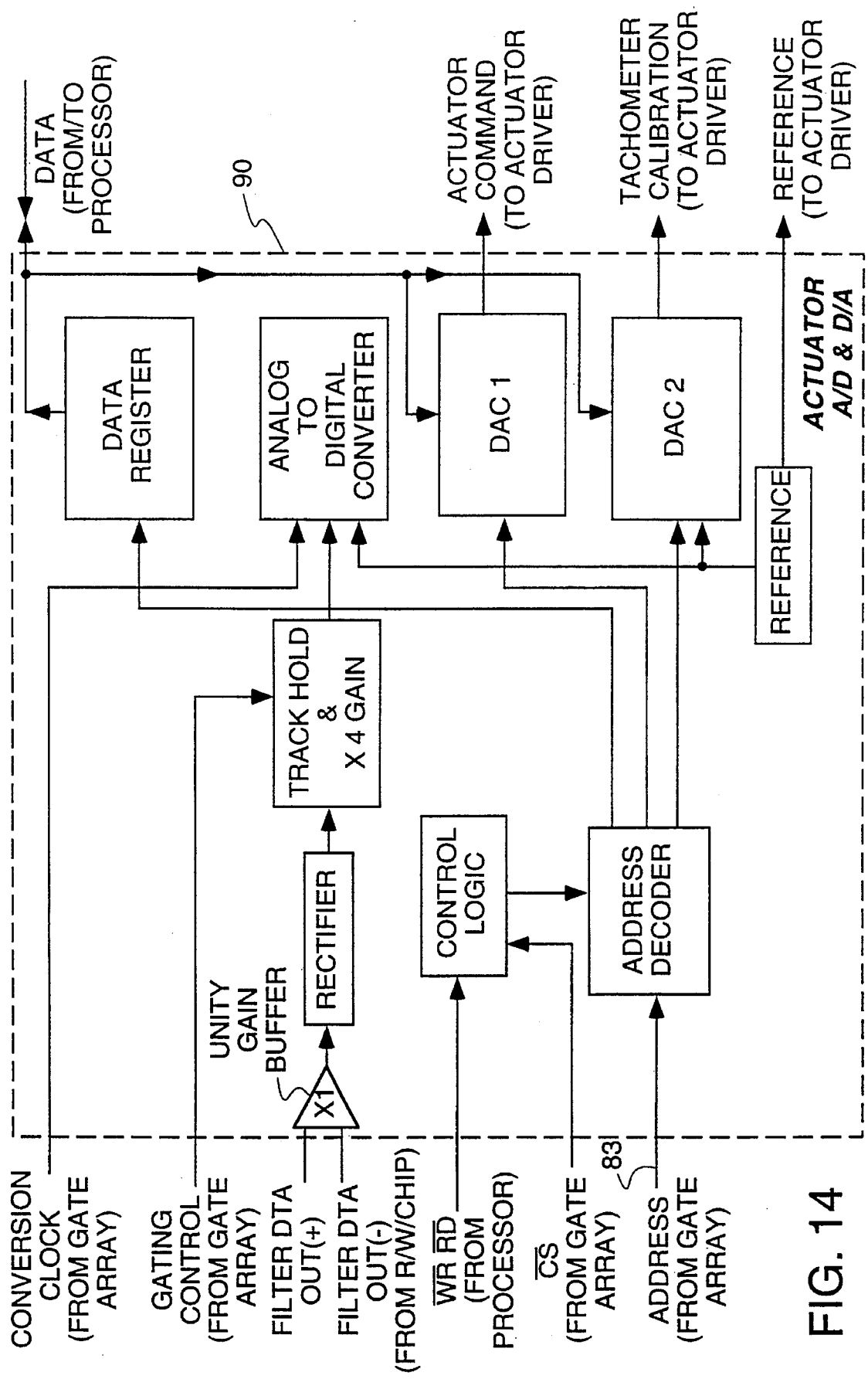
FIG. 14 is a block diagram of the A/D & D/A circuitry.

Control signals to actuator coil 45 of the rotary actuator control the position of the read/write recording elements supported on their respective load beams. In the present embodiment, actuator driver and power off unload circuit 88 (FIG. 7A) provides control signals to position the read/write recording elements to the desired location. A detailed block diagram of actuator driver and power off unload circuit 88 is illustrated in FIG. 11. The portion of actuator driver and power off unload circuit 88 of FIG. 11 illustrated within dashed line denoted by reference character 15-1 may be implemented by, for example, Allegro MicroSystems, Inc., Worchester, Mass., part no. 8932, denominated as a voice coil motor driver. The control signal to actuator coil 45 is analog and is provided by actuator driver and power off unload circuit 88. Also, as is well known to those skilled in the art, the feedback signals from the embedded servo (which will be described hereinafter) are provided in analog form. The seek control signals issued by host computing device 87 when the host computing device 89 desires that the read/write recording element be positioned over a designated track, are provided in digital form. To convert the analog signals returned from the embedded servo loop to digital signals and to convert the digital signals required for addressing a particular track to analog signals, actuator A/D & D/A circuit 90 is utilized. A detailed block diagram of the circuitry utilized in actuator A/D & D/A circuit 90 is illustrated in FIG. 14. This circuit may be conveniently implemented utilizing a generally available part from Analog Devices, Norwood, Mass., their part no. ADC 7773, which is denominated as a complete embedded servo front end for hard disk drive.

Returning to FIG. 7A, disk controller 91 is coupled between read/write combo circuit 71, data bus 92, RAM buffer 93, and also provides signals to and receives signals from interface connector 39 (FIG. 1) for communication outside of the drive and controller electronics board 2. Disk controller 91 may be conveniently implemented using Cirrus Logic, Inc. of Milpitas, Calif., Integrated PC Disk and Controller part no. CL-SH 265. RAM buffer 93 may be any digital storage device having a capacity of 32K addressable storage locations, each of 8 bits in width, and is preferably for convenience a semiconductor type random access memory device.

Drive and controller electronics board 2 further includes microprocessor 94 which is coupled to data bus 92, read only memory 95 and gate array 96. Microprocessor 77 may be implemented by, for example, a Motorola microprocessor model no. 68HC11 or an Intel Corporation microprocessor part no. 80C196, or similarly functional microprocessors from other sources. Read only memory 95 may be any suitable memory device having 32,000 storage locations, each 8 bits wide, and in the present implementation, for reduction of size, is preferably a semiconductor memory device.

FIG. 13 is a block diagram of gate array 96 (which is used with spin motor in prior application Ser. No. 07/630,110) illustrating the blocks utilized therein. A description of the operation of gate array 96 will follow hereinafter. Gate array circuit 97 (FIG. 15) is utilized with the above-described alternative spin motor.

An embedded servo system is utilized in hard disk drive 1 of the present invention, the embedded servo system being implemented with the use of electronics which is illustrated in FIG. 7A (which includes other circuitry). As illustrated in FIG. 7A, rigid disk 10 includes a plurality of circular tracks, for example tracks 121-i and 121-(i+1). If both sides of rigid disk 10 are used for data, corresponding tracks on the disk surfaces are approximately cylindrically aligned. Each track is segmented into one or more sectors SCT-01, SCT-02, . . . , SCT-n by prerecorded information in embedded servo field regions 120-1 through 120-n. Each servo field region 120-j, where j=1, 2, . . . , n, includes m concentric servo fields, where m is the number of concentric circular data tracks on the disk, that is, one servo field in each data track at position j (a total of nm servo fields per surface). The particular embedded servo system utilized with hard disk drives 1 or 4 may be of the type described in copending and commonly assigned U.S. patent application Ser. No. 07/630, 475 describe above. Alternatively, the servo system described in the above-described copending commonly assigned U.S. patent application No. 08/250,987 may be utilized.

Attention is directed to FIG. 13, which is a block diagram of gate array 96 of FIG. 7A. As will be appreciated by reference to FIGS. 7A and FIG. 13, multiplexed low address and data bus 92 is coupled to gate array 96 for the bidirectional flow of information between microprocessor 94 and gate array 96. Throughout the drawing figures, lines with arrows on both ends indicate that there is a bidirectional flow of information over the lines in contrast to lines with an arrow on a single end which indicates that information passes in the direction of the arrow only. As will also be appreciated by reference to FIGS. 7A and 13, address information is provided from microprocessor 94 to gate array 96 as inputs to gate array 96. In addition, gate array 96 provides information to and receives information from other circuitry in FIG. 7A and for convenience for understanding lines entering and leaving gate array 96 in FIG. 13 have labels adjacent thereto to indicate the circuitry from which or to which the line is coupled. Referring to FIG. 13, address latch 98 is coupled to multiplexed low address and data bus 92 from which it receives and holds the lower order address information received from multiplexed low address and data bus 92. Address latch 98 receives an address strobe from microprocessor 94 which establishes the timing when the address is valid. All outputs from address latch 98 are provided over bus 99 to read only memory 95 and additionally low order address information is also provided from address latch 98 to actuator A/D & D/A circuit 90. The low order address from address latch 98 is also provided to address decoder 100 over bus 101. Address latch 98 is equivalent to any available 8 bit latch, such as a 74LS373 latch. Address decoder 100 receives the high order address information from microprocessor 94 via bus 186. Address decoder 100 uses the external high order address bits, the latched low order address bits from address latch 98 and the timing signal, denominated DATASTROBE, received over line 80 from microprocessor 94 to decode the address for the gate array registers as well and for external chip select lines. More particularly, EXTERNAL $\overline{\text{CHIP SELECTS}}$ signals are provided over line 187 to the serial port select of read/write combined function circuit 87, the select port for spin control circuit 74, as well as for the chip select inputs to actuator A/D & D/A circuit 90. Internally within gate array 96 the decoded address information is used to select memory mapped control/status registers for all of the blocks in gate array 96. Address decoder 100 may take the form of a well known circuit such as a group 74LS138 decoders.

Clock logic memory mapped register 188 generates all of the required clock signals for programmable low power timer circuit 189, programmable word length serial port 190, digital demodulator & Gray code address separator 191, pulse width modulated timer 192, pulse width modulated timer 193 and encoder/decoder 194. Crystal 195, which is provided externally of gate array 96, is used to provide a stable frequency of oscillation for clock logic memory mapped register 188. The memory mapped register portion of clock logic memory mapped register 188 functions to insure that minimum power is used or dissipated by enabling only the required clocks for the operation in progress at the time the clock signal is required.

Programmable low power timer circuit 189 generates timing signals which are provided to read/write preamp 21, over line 106, a timing signal on line 107 to read/write combined function circuit 87, a plurality of timing signals (which will be fully described hereinafter) over bus 108 to digital demodulator & Gray code address separator 191 and, a timing signal over line 109 to integrity checks & address comparator 110. Digital demodulator & Gray code address separator 191 generates windows for the pulse detector included in read/write combined function circuit 87, over bus 111. To aid in understanding the operation of the various circuits and timing windows, attention is directed to FIG. 12A which illustrates the servo field utilized on the disk 10 in conjunction with the servo system in U.S. patent application Ser. No. 07/630,475, along with FIG. 12B which illustrates the windows produced by programmable low power timer circuit 189 and FIG. 12C which illustrates the windows produced by digital demodulator & Gray code address separator 191. As will be appreciated by reference to FIGS. 12B and 12C, the timing of the respective windows have been illustrated in timed relationship to the servo field of FIG. 12A. A detailed description of the servo field in FIG. 12A along with the circuitry involved is found in U.S. patent application Ser. No. 07/630,475 referred to above and the explanation therefore will not be repeated. As an aid to understanding the windows generated by programmable low timers circuit 189 and digital demodulator & Gray code address separator 191, the following table is provided which in the left hand column lists the window acronym designation illustrated in FIGS. 12B and 12C, in the center column provides a descriptive title for the windows function and in the far right column indicates the circuit to which the window signal is provided.

TABLE

| Window Acronym | Description Function Of Window | Window Signal Provided to |
| --- | --- | --- |
| RW_ON | Read/write preamp turned on | R/W Preamp 49 R/W combo 71 |
| PD_ON | Pulse detector turned on | R/W combo 71 |
| START_SF | Start servo field | Digital Demodulator 91 & Gray Code Address Separator |
| SRCH_ON | Search for Gap and Sync | Digital Demodulator 91 & Gray Code Address Separator |
| SRCH_END | End search for Gap and Sync | Digital Demodulator 91 & Gray Code Address Separator |
| NOM_END | Nominal end of servo field | Digital Demodulator 91 & Gray Code Address Separator |
| SVF_Time | Servo field time | Read/Write Combo 71 |
| SV_WR_EN | Servo write enable | Read/Write Combo 71 |
| AGC_HOLD | Hold gain of AGC during gap and position | Read/Write Combo 71 |

TABLE-continued

| Window Acronym | Description Function Of Window | Window Signal Provided to |
| --- | --- | --- |
| LOW_THRS | Lower detection threshold during Gray address field | Read/Write Combo 71 |
| RESTART | Restart low power timers | To low power timers |

Integrity checks & address comparator 110 compares the integrity check pattern which is created from reading the servo field information (which is described in detail from the above-referenced M-1470 U.S. patent application Ser. No. 07/630,475) with the expected pattern stored in a memory mapped register in integrity check & address comparator 110. In addition, the track address is selectively compared with the expected track address during track following (ON track MODE). If either of these comparisons do not match, an error condition stored in a status register is assumed and is sent to microprocessor 94 over data line 112 as status information.

Returning to digital demodulator & Gray code address separator 191 which was briefly referred to above, the output of this circuit is provided over bus 111 as windows for the pulse detector in read/write combo chip 87. Digital demodulator & Gray code address separator 191 receives, over line 113, the transition pulse and polarity signals from read/write combo chip 87. Using this information, digital demodulator & Gray code address separator 191 determines the track address and provides this track address information to microprocessor 94, as well as to integrity checks & address comparator 110.

Pulse width modulated timer 192 has an input coupled to multiplexed low address and data bus 92 through which the microprocessor programs the frequency and the duty cycle of the output. This data is stored in two memory registers which are included in pulse width modulated timer 192 which generates at its output a control signal to set the level of the read threshold, this control signal being provided to read/write combined function circuit 87 over line 123. Pulse width modulated timer 193 also receives an input from multiplexed low address and data bus 92 and provides at its output a write current control signal which is provided to read/write analog circuit 21 over line 114. The outputs of timers 192 and 193 are filtered by suitable RC networks (not shown) to provide an appropriate voltage for the above two functions. The time constant of the RC network for the output of these two timers is a function of the device being driven and is determined by well known techniques.

Programmable word length serial port 190 is utilized to program read/write combined function circuit 87, actuator driver 88 and spin control circuit 74. Serial clock output from programmable word length serial port 190 is also provided to each of the foregoing chips. The programming information to be provided to read/write combined function circuit 87, actuator driver 88 and spin control and driver circuit 74 is loaded into programmable word length serial port 90 from microprocessor 94 over multiplexed low address and data bus 92. The designated address for this programming is set by the microprocessor through address decoder 100, and the data contents and length is set by a microprocessor through the memory map register included in programmable word length serial port 190.

Power management circuit 119 is a memory mapped set of registers which controls the activation of each functional block of the drive. Only the blocks requiring to be active at a given time are activated and therefore the minimum overall power required by the drive is utilized.

Encoder/decoder 194 receives NRZ write data and clock signals from disk controller 91 and generates from these signals write code data which is provided over line 120 to read/write combined function circuit 87. Encoder/decoder 194 receives RDGATE and WRGATE signals as enable signals from disk controller 91. Encoder/decoder 194 receives read code data and clock signals from read/write combined function circuit 87 and generates NRZ read data and NRZ read clock signals which are provided to disk controller 91 over lines 121 and 122 respectively. Encoder decoder circuit 194 may be implemented by using standard 1,7 encoding circuitry well known to those skilled in the art.

Figure 12D:
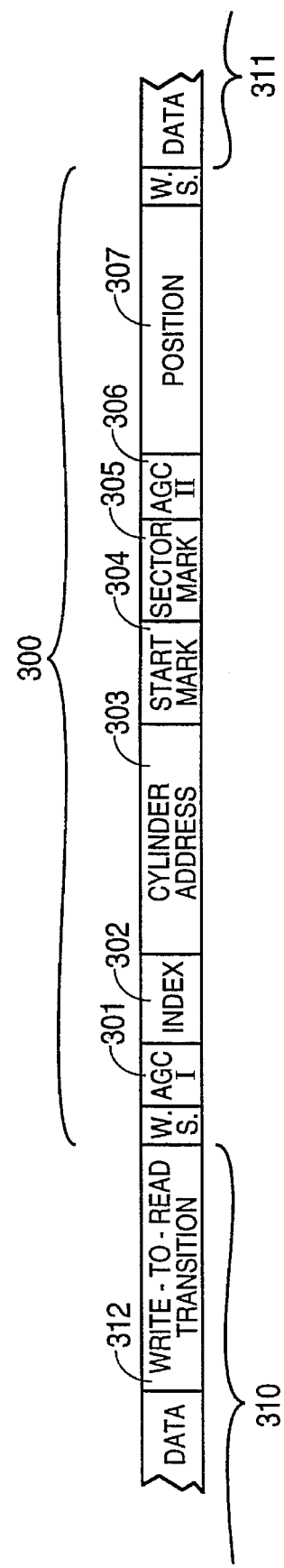
FIG. 12D is a timing diagram of the window signals produced by the digital demodulator & Gray code address separator of the gate array circuit of FIG. 13.

FIG. 12D illustrates the servo field utilized in conjunction with the servo circuitry described and claimed in the above-identified U.S. patent application Ser. No. 07/765,348.

In the terminology used in the rigid disk drive and other computer peripheral storage device art, the term head disk assembly, also sometimes abbreviated HDA, refers to the head and disk structures and other apparatus and circuitry included within the enclosure which houses the head and disk mechanism. For example, in FIG. 1, the components included in the housing which is bounded on the lower side by base plate 6 and on the upper side by top cover 26 be considered the HDA for hard disk drive 1. An advantage to housing circuitry within the HDA is that since the base plate and top cover are both electrically conductive, there is a sealed housing which prevents external electrical interference from entering the housing and affecting circuitry within the HDA. External electrical interference is normally only a problem with circuits and conductors which carry analog signals. It has been discovered that a very advantageous disk drive system can be constructed by including within the HDA all of the analog circuitry and signal lines, while including exterior of the HDA signal lines and circuits which process only digital information. Digital circuitry could of course also be included within the HDA housing, however doing so may result in a size penalty for the HDA which may not be desirable. Referring to FIG. 7B, an embodiment of the present invention is disclosed in which the above-identified advantageous result of reduced interference to electrical signals in the system is achieved. In FIG. 7b, the dashed line indicated by reference character 125 demarks the above-described separation of the analog and digital circuitry for accomplishing the separation to provide the advantageous result of reduced susceptibility to noise interference from external sources. As it will be appreciated by, referring to FIG. 7B, the circuitry to the right of, and below, line 125 process analog signals and converts them into digital form before those signals are sent to the circuitry in the blocks to the left of line 125. More particularly, the read/write preamp 21, read/write combined function circuit 87, actuator driver and power off unload circuit 88, spin control and driver circuity 74 and the actuator A/D and D/A circuitry 90 all process analog data, however the analog data is converted into digital data before that data is transferred to the other circuit blocks within the disk drive system. Strutrurally, implementing the invention described above is achieved by placing the aforementioned analog circuitry within the HDA housing and sending to the exterior of the housing via suitable connectors digital information to the remaining portions of the system. In this manner, only digital information is transferred from the interior of the HDA to the outside circuitry and any electrical interference which may be present in the area would be less likely to affect the digital signals since they are less susceptible electrical noise than other types of signals.

Figure 15:
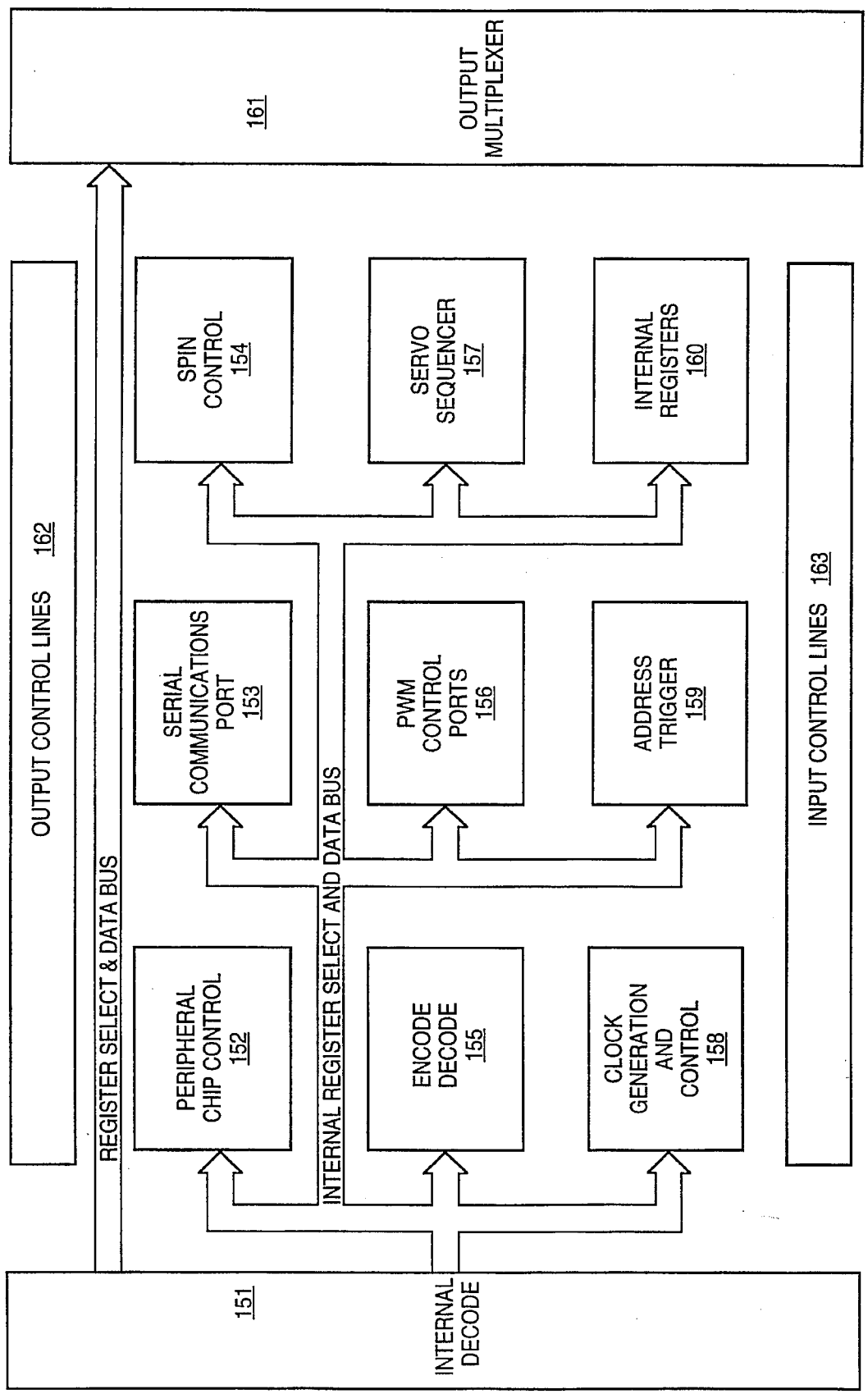
FIG. 15 illustrates in block-diagram form the gate array circuit utilized in conjunction with the alternative servo system, the servo pattern of which is illustrated in FIG. 12D.

As mentioned previously, the gate array circuitry utilized with the present invention is a function of which spin control and driver circuit, and which spin control motor previously described will be utilized in the drive. FIG. 15 illustrates gate array 97, in high level block diagram form, which is utilized with the spin motor and drive circuitry discussed above with respect to spin motor drive circuit 75 and the modified spin motor described in connection therewith. Internal decoder circuitry 151 receives address and data signals from microprocessor 94. Internal decoder circuitry 151 contains the memory map for the entire system as well as address latches and data read or write state. The address may map to an internal, on-chip, function or may be an external location. A digital decoder determines the routing and sends all external address commands out to either the address and data lines output multiplex circuitry 161 or output control lines 162.

Peripheral chip control circuitry 152 receives commands from input control lines 163 (connections not illustrated in the figure) or internally written ASIC registers and sends commands to output control lines 162 (connections not illustrated in the figure) to control the read/write integrated circuit 21 in the HDA. Serial communication port circuitry 153 is similar in operation to an RS-232 interface. It is used to load other chips with serial data from microprocessor 94, such as the frequency synthesizer, D/A converter, R/W pulse detector and filter used in the encoder decoder logic. Signals from this port appear at output control lines 162.

Spin control circuitry 154 selects the spin motor logic control clock from either the external spin motor generated clock or an internally generated clock derived from sector pulses. The output clock is placed on output control lines 162. Encode decode circuitry 155 provides encoding and decoding of the 1,7:2,3 coded read/write data signals from the input control lines 163 to the output control lines 162.

PWM control ports circuitry 156 generates three pulse-width modulated bit streams which are placed on output control lines 162. The first signal is used to control the magnetic head write current, the second to control the read channel amplitude threshold and the third to control the spin motor voltage.

Servo sequencer circuitry 157 reads the track position servo information. It acts to detect index and cylinder address information and derives timing signals from the synchronization signals, and further steers analog position information to the peak detection circuitry to obtain exact position information. Information is received from input control lines 163 and after processing appears at output control lines 162.

Clock generation and control circuitry 158 enables and disables the crystal oscillator (not shown) which is connected to clock generation and control circuitry 158. Programmable dividers provide variable clock signals for spin motor control, buffer control and frequency synthesizing.

Address trigger circuitry 159 is comprised of a programmable 16 bit register and digital comparator which examines address information from the internal decoder circuitry 151 and can be used for diagnostic purposes. Output signals appear at output control lines 162.

Internal registers 160 are used to store index address, cylinder address, status information and bit mapped error codes from the servo sequencer and to drive the peripheral control lines. Output multiplex circuitry 161 allows internal data registers and input control lines to be read by the microprocessor.

We claim:

1. A disk drive information storage device comprising:
   a housing having a footprint that includes a first dimension of about 35 mm;
   a pair of substantially rigid disks, each of said disks having an inside edge;
   a hub supported in said housing, said hub being adapted to receive said disks;
   a clamp for mounting said disks on said hub, said clamp comprising:
      an annular element having a central axis;
      a first set of fingers extending from said annular element in a first direction substantially parallel to said central axis, each finger in said first set of fingers being for imposing a radial force on an inside edge of a first disk; and
      a second set of fingers extending from said annular element in a second direction substantially parallel to said central axis and opposite to said first direction, each finger in said second set of fingers being for imposing a radial force on an inside edge of a second disk.

2. A disk drive information storage device according to claim 1, further comprising a spin motor for driving said disks to rotate said disks, wherein said spin motor is operable from a supply voltage in the range of from about 3 volts to about 5 volts.

3. A disk drive information storage device according to claim 1, further comprising an actuator rotatable about a pivot and comprising a head for storing information in and/or retrieving information from said disks, and a ferrite shield member supported in said housing adjacent to said head for shielding said head from electrical noise.

4. A disk drive information storage device according to claim 1, wherein said disk drive information storage device further includes a 50% read/write transducer.

5. A disk drive information storage device according to claim 1, wherein a portion of a surface of one of said disks is textured thereby providing a take-off and landing zone, and further wherein said disk drive is a contact start/stop device.

6. A disk drive information storage device according to claim 1, further comprising a spin motor for rotating said disk, said spin motor including a plurality of poles, and wherein the number of poles is greater than twelve.

7. A disk drive information storage device according to claim 1, wherein at least one of said disks has a diameter in the range of from about 33 mm to about 34 mm.

8. A disk drive information storage device according to claim 1, wherein said footprint includes a second dimension of about 50.8 mm.

9. A disk drive information storage device comprising:
   a housing having a footprint that includes a first dimension of about 35 mm;
   a pair of substantially rigid disks;
   a spindle motor disposed in said housing, said spindle motor defining a first thickness, said spindle motor having a rotor, said rotor including a rotor shaft, a cap connected to one end of the rotor shaft, a cylindrical portion having a first end connected to the cap, the cylindrical portion being coaxial with the rotor shaft, and a disk-shaped portion connected to a second end of the cylindrical portion, the disk-shaped portion having an outer diameter and having an upper surface, a first one of said pair of disks fixedly connected to said rotor such that a first surface of said first disk substantially abuts said upper surface of said disk-shaped portion, said first disk also having a second surface opposite said first surface;
   a second one of said pair of disks fixedly connected to said rotor on a side of said first disk opposite said spindle motor, said second disk having a third surface facing said second surface and a fourth surface;
   a clamp, having an outer diameter smaller than said outer diameter of the disk-shaped portion of the rotor, connected to the cylindrical portion between said first disk and said second disk;
   an actuator disposed in said housing adjacent said disks; and
   a first read/write head fixedly connected to said actuator and disposed adjacent said second surface; and
   a second read/write head fixedly connected to said actuator and disposed adjacent said third surface;
   wherein said actuator is movable to position said first and second read/write heads such that said first read/write head reads information from or writes information to a portion of said second surface located between said outer diameter of the disk-shaped portion of the rotor and said outside diameter of the clamp.

10. A disk drive information storage device according to claim 9, wherein said spindle motor is operable from a supply voltage in the range of from about 3 volts to about 5 volts.

11. A disk drive information storage device according to claim 9, further comprising a ferrite shield member supported in said housing adjacent to one of said first or second read/write heads for shielding the head from electrical noise.

12. A disk drive information storage device according to claim 9, wherein said first read/write head is of the 50% size type.

13. A disk drive information storage device according to claim 9, wherein a portion of a surface of one of said disks is textured thereby providing a take-off and landing zone, and further wherein said disk drive is a contact start/stop device.

14. A disk drive information storage device according to claim 9, wherein said spindle motor includes plurality of poles, and further wherein the number of poles is greater than twelve.

15. A disk drive information storage device according to claim 9, wherein at least one of said disks has a diameter in the range of from about 33 mm to about 34 mm.

16. A disk drive information storage device according to claim 9, wherein said footprint includes a second dimension of about 50.8 mm.

17. A disk drive information storage device comprising:
   a housing;
   a pair of substantially rigid disks, at least one of said disks having a diameter in the range of from about 33 mm to about 34 mm;
   a spindle motor disposed in said housing, said spindle motor defining a first thickness, said spindle motor having a rotor, said rotor including a rotor shaft, a cap connected to one end of the rotor shaft, a cylindrical portion having a first end connected to the cap, the cylindrical portion being coaxial with the rotor shaft, and a disk-shaped portion connected to a second end of the cylindrical portion, the disk-shaped portion having an outer diameter and having an upper surface, a first one of said pair of disks fixedly connected to said rotor such that a first surface of said first disk substantially abuts said upper surface of said disk-shaped portion, said first disk also having a second surface opposite said first surface;
   a second one of said pair of disks fixedly connected to said rotor on a side of said first disk opposite said spindle motor, said second disk having a third surface facing said second surface and a fourth surface;

a clamp, having an outer diameter smaller than said outer diameter of the disk-shaped portion of the rotor, connected to the cylindrical portion between said first disk and said second disk;

an actuator disposed in said housing adjacent said disks; and a first read/write head fixedly connected to said actuator and disposed adjacent said second surface; and a second read/write head fixedly connected to said actuator and disposed adjacent said third surface;

wherein said actuator is movable to position said first and second read/write heads such that said first read/write head reads information from or writes information to a portion of said second surface located between said outer diameter of the disk-shaped portion of the rotor and said outside diameter of the clamp.

18. A disk drive information storage device according to claim 17, wherein said spindle motor is operable from a supply voltage in the range of from about 3 volts to about 5 volts.

19. A disk drive information storage device according to claim 17, further comprising a ferrite shield member supported in said housing adjacent to one of said first or second read/write heads for shielding the head from electrical noise.

20. A disk drive information storage device according to claim 17, wherein said first read/write head is of the 50% size type.

21. A disk drive information storage device according to claim 17, wherein a portion of a surface of one said disks is textured thereby providing a take-off and landing zone, and further wherein said disk drive is a contact start/stop device.

22. A disk drive information storage device according to claim 17, wherein said spindle motor includes a plurality of poles, and further wherein the number of poles is greater than twelve.

23. A disk drive information storage device according to claim 17, wherein said housing has a footprint that includes a first dimension of about 35 mm and a second dimension of about 50.8 mm.

* * * * *